US009971482B2

(12) United States Patent
Casalaina et al.

(10) Patent No.: US 9,971,482 B2
(45) Date of Patent: May 15, 2018

(54) SERVICE CLOUD CONSOLE

(71) Applicant: salesforce.com, inc., San Francisco, CA (US)

(72) Inventors: Marco S. Casalaina, San Francisco, CA (US); Jason A. Ellis, San Leandro, CA (US); David Yung, Concord, CA (US); Luke Fu, San Francisco, CA (US); Eric Wulff, San Francisco, CA (US); Chitra Gulabrani, San Francisco, CA (US); Sutthipong Thavisomboon, San Francisco, CA (US); Natalie Doan, San Jose, CA (US); Steve Weiss, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 211 days.

(21) Appl. No.: 14/727,067

(22) Filed: Jun. 1, 2015

(65) Prior Publication Data

US 2016/0019550 A1 Jan. 21, 2016

Related U.S. Application Data

(63) Continuation of application No. 14/520,217, filed on Oct. 21, 2014, which is a continuation of application (Continued)

(51) Int. Cl.

*G06F 17/20* (2006.01)
*G06F 3/0484* (2013.01)

(Continued)

(52) U.S. Cl.

CPC .......... *G06F 3/0484* (2013.01); *G06F 3/0481* (2013.01); *G06F 3/0483* (2013.01);

(Continued)

(58) Field of Classification Search

None

See application file for complete search history.

(56) References Cited

U.S. PATENT DOCUMENTS 5,577,188 A 11/1996 Zhu
5,608,872 A 3/1997 Schwartz et al.

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Keith D Bloomquist

(74) *Attorney, Agent, or Firm* — Weaver Austin Villeneuve & Sampson LLP

(57) ABSTRACT

Disclosed are some examples of methods, apparatus, systems and computer program products related to a user interface providing a call center service. In some implementations, the user interface presents session tabs and application tabs. A session tab can have a parent-child relationship with an application tab. Customer data can be retrieved from a database, where the customer data includes account data and child data. The customer data can be provided to cause display in the user interface of the account data in association with a first session tab and the child data in association with a first application tab. Edits to the child data can cause the first application tab to be designated as unsaved.

20 Claims, 107 Drawing Sheets

Related U.S. Application Data

No. 14/477,705, filed on Sep. 4, 2014, which is a continuation of application No. 12/878,884, filed on Sep. 9, 2010, now abandoned.

(60) Provisional application No. 61/313,609, filed on Mar. 12, 2010.

(51) Int. Cl.

| | |
|---|---|
| ***G06F 17/30*** | (2006.01) |
| ***H04L 12/24*** | (2006.01) |
| ***G06F 3/0481*** | (2013.01) |
| ***G06F 3/0483*** | (2013.01) |
| ***G06Q 30/00*** | (2012.01) |
| *H04M 3/51* | (2006.01) |
| *H04L 29/08* | (2006.01) |
| *H04L 29/06* | (2006.01) |

(52) U.S. Cl.

CPC .. *G06F 17/30528* (2013.01); *G06F 17/30554* (2013.01); *G06F 17/30557* (2013.01); *G06F 17/30905* (2013.01); *G06Q 30/016* (2013.01); *H04L 41/22* (2013.01); *H04L 41/5061* (2013.01); *H04L 67/02* (2013.01); *H04L 67/42* (2013.01); *H04M 3/5183* (2013.01)

(56) References Cited

U.S. PATENT DOCUMENTS 5,649,104 A 7/1997 Carleton et al.
5,715,450 A 2/1998 Ambrose et al.
5,761,419 A 6/1998 Schwartz et al.
5,819,038 A 10/1998 Carleton et al.
5,821,937 A 10/1998 Tonelli et al.
5,831,610 A 11/1998 Tonelli et al.
5,873,096 A 2/1999 Lim et al.
5,918,159 A 6/1999 Fomukong et al.
5,963,953 A 10/1999 Cram et al.
5,983,227 A 11/1999 Nazem et al.
6,092,083 A 7/2000 Brodersen et al.
6,100,873 A 8/2000 Bayless et al.
6,161,149 A 12/2000 Achacoso et al.
6,169,534 B1 1/2001 Raffel et al.
6,178,425 B1 1/2001 Brodersen et al.
6,189,011 B1 2/2001 Lim et al.
6,216,133 B1 4/2001 Masthoff
6,216,135 B1 4/2001 Brodersen et al.
6,233,617 B1 5/2001 Rothwein et al.
6,236,978 B1 5/2001 Tuzhilin
6,266,669 B1 7/2001 Brodersen et al.
6,288,717 B1 9/2001 Dunkle
6,295,530 B1 9/2001 Ritchie et al.
6,324,568 B1 11/2001 Diec et al.
6,324,693 B1 11/2001 Brodersen et al.
6,336,137 B1 1/2002 Lee et al.
D454,139 S 3/2002 Feldcamp et al.
6,367,077 B1 4/2002 Brodersen et al.
6,393,605 B1 5/2002 Loomans
6,405,220 B1 6/2002 Brodersen et al.
6,411,949 B1 6/2002 Schaffer
6,434,550 B1 8/2002 Warner et al.
6,446,089 B1 9/2002 Brodersen et al.
6,535,909 B1 3/2003 Rust
6,549,908 B1 4/2003 Loomans
6,553,563 B2 4/2003 Ambrose et al.
6,560,461 B1 5/2003 Fomukong et al.
6,574,635 B2 6/2003 Stauber et al.
6,577,726 B1 6/2003 Huang et al.
6,601,087 B1 7/2003 Zhu et al.
6,604,117 B2 8/2003 Lim et al.
6,604,128 B2 8/2003 Diec et al.
6,609,150 B2 8/2003 Lee et al.
6,621,834 B1 9/2003 Scherpbier et al.
6,654,032 B1 11/2003 Zhu et al.
6,665,648 B2 12/2003 Brodersen et al.
6,665,655 B1 12/2003 Warner et al.
6,684,438 B2 2/2004 Brodersen et al.
6,711,565 B1 3/2004 Subramaniam et al.
6,724,399 B1 4/2004 Katchour et al.
6,728,702 B1 4/2004 Subramaniam et al.
6,728,960 B1 4/2004 Loomans et al.
6,732,095 B1 5/2004 Warshaysky et al.
6,732,100 B1 5/2004 Brodersen et al.
6,732,111 B2 5/2004 Brodersen et al.
6,744,266 B2 6/2004 Dor et al.
6,754,681 B2 6/2004 Brodersen et al.
6,763,351 B1 7/2004 Subramaniam et al.
6,763,501 B1 7/2004 Zhu et al.
6,768,904 B2 7/2004 Kim
6,772,229 B1 8/2004 Achacoso et al.
6,782,383 B2 8/2004 Subramaniam et al.
6,804,330 B1 10/2004 Jones et al.
6,826,565 B2 11/2004 Ritchie et al.
6,826,582 B1 11/2004 Chatterjee et al.
6,826,745 B2 11/2004 Coker
6,829,655 B1 12/2004 Huang et al.
6,842,748 B1 1/2005 Warner et al.
6,850,895 B2 2/2005 Brodersen et al.
6,850,949 B2 2/2005 Warner et al.
6,907,566 B1 6/2005 McElfresh et al.
6,947,388 B1 9/2005 Wagner
7,062,502 B1 6/2006 Kesler
7,069,231 B1 6/2006 Cinarkaya et al.
7,069,497 B1 6/2006 Desai
7,100,111 B2 8/2006 McElfresh et al.
7,181,758 B1 2/2007 Chan
7,187,376 B2 3/2007 Brendle
7,269,590 B2 9/2007 Hull et al.
7,289,976 B2 10/2007 Kihneman et al.
7,340,411 B2 3/2008 Cook
7,356,482 B2 4/2008 Frankland et al.
7,373,599 B2 5/2008 McElfresh et al.
7,401,094 B1 7/2008 Kesler
7,406,501 B2 7/2008 Szeto et al.
7,412,455 B2 8/2008 Dillon
7,454,509 B2 11/2008 Boulter et al.
7,464,092 B2 12/2008 Lee et al.
7,469,302 B2 12/2008 Whittle et al.
7,508,789 B2 3/2009 Chan
7,571,250 B2 8/2009 Ludvig et al.
7,599,935 B2 10/2009 La Rotonda et al.
7,603,331 B2 10/2009 Tuzhilin et al.
7,603,483 B2 10/2009 Psounis et al.
7,606,881 B2 10/2009 Chasman et al.
7,620,655 B2 11/2009 Larsson et al.
7,644,122 B2 1/2010 Weyer et al.
7,668,861 B2 2/2010 Steven
7,698,160 B2 4/2010 Beaven et al.
7,730,478 B2 6/2010 Weissman
7,747,648 B1 6/2010 Kraft et al.
7,779,039 B2 8/2010 Weissman et al.
7,779,475 B2 8/2010 Jakobson et al.
7,792,889 B1 9/2010 Lee et al.
7,805,670 B2 9/2010 Lipton et al.
7,827,208 B2 11/2010 Bosworth et al.
7,836,403 B2 11/2010 Viswanathan et al.
7,851,004 B2 12/2010 Hirao et al.
7,853,881 B1 12/2010 Aly Assal et al.
7,870,596 B2 1/2011 Schackow et al.
7,945,653 B2 5/2011 Zukerberg et al.
7,975,019 B1 7/2011 Green et al.
7,979,791 B2 7/2011 Yang et al.
7,996,492 B2 8/2011 Simpson et al.
8,005,896 B2 8/2011 Cheah
8,014,943 B2 9/2011 Jakobson
8,015,495 B2 9/2011 Achacoso et al.
8,032,297 B2 10/2011 Jakobson
8,073,712 B2 12/2011 Jacobus et al.
8,073,850 B1 12/2011 Hubbard et al.
8,082,301 B2 12/2011 Ahlgren et al.
8,090,763 B2 1/2012 Li
8,095,413 B1 1/2012 Beaven
8,095,531 B2 1/2012 Weissman et al.

(56) References Cited

U.S. PATENT DOCUMENTS 8,095,594 B2 1/2012 Beaven et al.
8,103,611 B2 1/2012 Tuzhilin et al.
8,103,740 B1 1/2012 Abramov et al.
8,150,913 B2 4/2012 Cheah
8,209,308 B2 6/2012 Rueben et al.
8,209,333 B2 6/2012 Hubbard et al.
8,255,824 B2 8/2012 Selig
8,275,836 B2 9/2012 Beaven et al.
8,280,819 B2 10/2012 Davis et al.
8,457,545 B2 6/2013 Chan
8,484,111 B2 7/2013 Frankland et al.
8,489,878 B2 7/2013 Isaacs et al.
8,490,025 B2 7/2013 Jakobson et al.
8,504,945 B2 8/2013 Jakobson et al.
8,510,045 B2 8/2013 Rueben et al.
8,510,664 B2 8/2013 Rueben et al.
8,527,881 B2 9/2013 Selig
8,549,047 B2 10/2013 Beechuk et al.
8,566,301 B2 10/2013 Rueben et al.
8,578,290 B2 11/2013 Amadio et al.
8,646,103 B2 2/2014 Jakobson et al.
8,693,649 B2 4/2014 Casalaina et al.
8,718,241 B2 5/2014 Casalaina et al.
8,745,272 B2 6/2014 Casalaina et al.
8,751,939 B2 6/2014 Law et al.
8,769,416 B2 7/2014 Casalaina et al.
8,898,582 B2 11/2014 Law et al.
8,914,539 B2 12/2014 Casalaina et al.
8,984,409 B2 3/2015 Casalaina et al.
9,037,963 B1 5/2015 Chandi et al.
9,195,648 B2 11/2015 Giraudy et al.
9,197,513 B2 11/2015 Vasudev et al.
9,215,096 B2 12/2015 Vasudev et al.
9,235,614 B2 1/2016 Beechuk et al.
9,398,156 B2 7/2016 Snyder et al.
9,419,863 B2 8/2016 Casalaina et al.
9,569,060 B2 2/2017 Al-Alami et al.
9,830,054 B2 11/2017 Casalaina et al.
2001/0044791 A1 11/2001 Richter et al.
2002/0072951 A1 6/2002 Lee et al.
2002/0082892 A1 6/2002 Raffel et al.
2002/0129352 A1 9/2002 Brodersen et al.
2002/0140731 A1 10/2002 Subramaniam et al.
2002/0143997 A1 10/2002 Huang et al.
2002/0162090 A1 10/2002 Parnell et al.
2002/0165742 A1 11/2002 Robbins
2003/0004971 A1 1/2003 Gong
2003/0018705 A1 1/2003 Chen et al.
2003/0018830 A1 1/2003 Chen et al.
2003/0066031 A1 4/2003 Laane et al.
2003/0066032 A1 4/2003 Ramachandran et al.
2003/0069936 A1 4/2003 Warner et al.
2003/0070000 A1 4/2003 Coker et al.
2003/0070004 A1 4/2003 Mukundan et al.
2003/0070005 A1 4/2003 Mukundan et al.
2003/0074418 A1 4/2003 Coker et al.
2003/0088831 A1 5/2003 Bauer et al.
2003/0093810 A1 5/2003 Taniguchi
2003/0120675 A1 6/2003 Stauber et al.
2003/0151633 A1 8/2003 George et al.
2003/0159136 A1 8/2003 Huang et al.
2003/0187921 A1 10/2003 Diec et al.
2003/0189600 A1 10/2003 Gune et al.
2003/0204427 A1 10/2003 Gune et al.
2003/0206192 A1 11/2003 Chen et al.
2003/0225730 A1 12/2003 Warner et al.
2004/0001092 A1 1/2004 Rothwein et al.
2004/0010489 A1 1/2004 Rio et al.
2004/0015981 A1 1/2004 Coker et al.
2004/0027388 A1 2/2004 Berg et al.
2004/0041841 A1* 3/2004 LeMogne ............. G06F 3/0481
715/777
2004/0128001 A1 7/2004 Levin et al.
2004/0186860 A1 9/2004 Lee et al.
2004/0193510 A1 9/2004 Catahan et al.
2004/0199489 A1 10/2004 Barnes-Leon et al.
2004/0199536 A1 10/2004 Barnes-Leon et al.
2004/0199543 A1 10/2004 Braud et al.
2004/0249854 A1 12/2004 Barnes-Leon et al.
2004/0260534 A1 12/2004 Pak et al.
2004/0260659 A1 12/2004 Chan et al.
2004/0268299 A1 12/2004 Lei et al.
2005/0050555 A1 3/2005 Exley et al.
2005/0060664 A1 3/2005 Rogers
2005/0066018 A1 3/2005 Whittle et al.
2005/0091098 A1 4/2005 Brodersen et al.
2005/0102173 A1* 5/2005 Barker ................ G06Q 10/063
705/7.26
2005/0187895 A1 8/2005 Paya et al.
2005/0216948 A1 9/2005 MacInnis
2006/0010134 A1 1/2006 Davis et al.
2006/0184894 A1 8/2006 Daniels et al.
2007/0016319 A1 1/2007 Forster et al.
2007/0044035 A1 2/2007 Amadio et al.
2007/0088741 A1 4/2007 Brooks et al.
2007/0133510 A1 6/2007 Da Palma et al.
2007/0136449 A1 6/2007 Da Palma et al.
2007/0146392 A1 6/2007 Feldman et al.
2007/0157105 A1 7/2007 Owens et al.
2007/0157108 A1 7/2007 Bishop
2007/0157114 A1 7/2007 Bishop et al.
2007/0174390 A1 7/2007 Silvain et al.
2007/0226204 A1 9/2007 Feldman
2008/0010152 A1* 1/2008 Sennott .................. G06Q 20/10
705/313
2008/0028329 A1 1/2008 Erl
2008/0046340 A1 2/2008 Brown
2008/0071917 A1 3/2008 Petrovykh
2008/0080689 A1 4/2008 Casalaina et al.
2008/0120569 A1 5/2008 Mann et al.
2008/0152237 A1 6/2008 Sinha et al.
2008/0184157 A1 7/2008 Selig
2008/0184159 A1 7/2008 Selig
2008/0249972 A1 10/2008 Dillon
2008/0255893 A1 10/2008 Barker et al.
2008/0270894 A1 10/2008 Whittle et al.
2008/0313648 A1 12/2008 Wang et al.
2009/0055553 A1 2/2009 Chasman et al.
2009/0063415 A1 3/2009 Chatfield et al.
2009/0100342 A1 4/2009 Jakobson
2009/0119589 A1 5/2009 Rowell et al.
2009/0132713 A1 5/2009 Dutta et al.
2009/0150426 A1 6/2009 Cannon et al.
2009/0177744 A1 7/2009 Marlow et al.
2009/0222738 A1 9/2009 Drieschner
2009/0254563 A1 10/2009 Arnold et al.
2009/0259795 A1 10/2009 Panabaker et al.
2009/0276835 A1 11/2009 Jackson et al.
2009/0299875 A1 12/2009 Zhu et al.
2009/0327947 A1 12/2009 Schreiner et al.
2009/0328063 A1 12/2009 Corvera et al.
2010/0031153 A1 2/2010 Ortwein et al.
2010/0037150 A1 2/2010 Sawant
2010/0049782 A1 2/2010 Li
2010/0049792 A1 2/2010 Hao et al.
2010/0082570 A1 4/2010 Altaf et al.
2010/0094729 A1 4/2010 Gray et al.
2010/0107218 A1 4/2010 Kurien et al.
2010/0169364 A1 7/2010 Hardt
2010/0192165 A1 7/2010 Varshney et al.
2010/0223467 A1 9/2010 Dismore et al.
2010/0223573 A1* 9/2010 Tanaka ..................... A61B 6/00
715/777
2010/0274910 A1 10/2010 Ghanaie-Sichanie et al.
2010/0281372 A1 11/2010 Lyons et al.
2010/0281498 A1 11/2010 Tanemura et al.
2010/0299205 A1 11/2010 Erdmann et al.
2011/0022505 A1 1/2011 Kino
2011/0055712 A1 3/2011 Tung et al.
2011/0066664 A1 3/2011 Goldman et al.
2011/0197124 A1 8/2011 Garaventa
2011/0218958 A1 9/2011 Warshaysky et al.
2011/0225232 A1 9/2011 Casalaina et al.
2011/0225233 A1 9/2011 Casalaina et al.

(56) References Cited

U.S. PATENT DOCUMENTS

| | | | |
|---|---|---|---|
| 2011/0225495 | A1 | 9/2011 | Casalaina et al. |
| 2011/0225500 | A1 | 9/2011 | Casalaina et al. |
| 2011/0225506 | A1 | 9/2011 | Casalaina et al. |
| 2011/0225527 | A1 | 9/2011 | Law et al. |
| 2011/0238524 | A1 | 9/2011 | Green et al. |
| 2011/0247051 | A1 | 10/2011 | Bulumulla et al. |
| 2011/0289010 | A1 | 11/2011 | Rankin, Jr. et al. |
| 2012/0016849 | A1 | 1/2012 | Garrod et al. |
| 2012/0042218 | A1 | 2/2012 | Cinarkaya et al. |
| 2012/0110062 | A1 | 5/2012 | Savage et al. |
| 2012/0110638 | A1 | 5/2012 | Wu |
| 2012/0173868 | A1 | 7/2012 | Isaacs et al. |
| 2012/0233137 | A1 | 9/2012 | Jakobson et al. |
| 2012/0246017 | A1 | 9/2012 | Kleber |
| 2012/0290407 | A1 | 11/2012 | Hubbard et al. |
| 2012/0330644 | A1 | 12/2012 | Giraudy et al. |
| 2013/0013990 | A1 | 1/2013 | Green et al. |
| 2013/0014241 | A1 | 1/2013 | Crespo et al. |
| 2013/0046789 | A1 | 2/2013 | Lulew cz |
| 2013/0055147 | A1 | 2/2013 | Vasudev et al. |
| 2013/0073683 | A1 | 3/2013 | Davis |
| 2013/0151231 | A1 | 6/2013 | Giraudy et al. |
| 2013/0173720 | A1 | 7/2013 | Vasudev et al. |
| 2013/0212497 | A1 | 8/2013 | Zelenko et al. |
| 2013/0218948 | A1 | 8/2013 | Jakobson |
| 2013/0218949 | A1 | 8/2013 | Jakobson |
| 2013/0218966 | A1 | 8/2013 | Jakobson |
| 2013/0247216 | A1 | 9/2013 | Cinarkaya et al. |
| 2013/0339162 | A1 | 12/2013 | Dunagan et al. |
| 2013/0346362 | A1 | 12/2013 | Beechuk et al. |
| 2014/0032597 | A1 | 1/2014 | Ellis et al. |
| 2014/0032713 | A1 | 1/2014 | Phan et al. |
| 2014/0033076 | A1 | 1/2014 | Al-alami et al. |
| 2014/0201641 | A1 | 7/2014 | Casalaina et al. |
| 2014/0237414 | A1 | 8/2014 | Law et al. |
| 2014/0307863 | A1 | 10/2014 | Snyder et al. |
| 2014/0310608 | A1 | 10/2014 | Snyder et al. |
| 2014/0359537 | A1 | 12/2014 | Jakobson et al. |
| 2014/0380180 | A1 | 12/2014 | Casalaina et al. |
| 2015/0006289 | A1 | 1/2015 | Jakobson et al. |
| 2015/0007050 | A1 | 1/2015 | Jakobson et al. |
| 2015/0040013 | A1 | 2/2015 | Casalaina et al. |
| 2015/0095162 | A1 | 4/2015 | Jakobson et al. |
| 2015/0142596 | A1 | 5/2015 | Jakobson et al. |
| 2015/0172563 | A1 | 6/2015 | Jakobson et al. |
| 2016/0019550 | A1 | 1/2016 | Casalaina et al. |
| 2016/0048281 | A1 | 2/2016 | Casalaina et al. |
| 2016/0065522 | A1 | 3/2016 | Vasudev et al. |
| 2016/0085787 | A1 | 3/2016 | Beechuk et al. |
| 2016/0266755 | A1 | 9/2016 | Casalaina et al. |

OTHER PUBLICATIONS

U.S. Office Action dated Apr. 25, 2012 issued in U.S. Appl. No. 12/878,884.
U.S. Final Office Action dated Oct. 24, 2012 issued in U.S. Appl. No. 12/878,884.
U.S. Office Action dated Nov. 27, 2013 issued in U.S. Appl. No. 12/878,884.
U.S. Final Office Action dated Jun. 5, 2014 issued in U.S. Appl. No. 12/878,884.
U.S. Office Action dated Sep. 29, 2014 issued in U.S. Appl. No. 12/878,884.
U.S. Final Office Action dated Mar. 12, 2015 issued in U.S. Appl. No. 12/878,884.
U.S. Office Action dated Oct. 12, 2012 issued in U.S. Appl. No. 12/878,889.
U.S. Final Office Action dated Aug. 20, 2013 issued in U.S. Appl. No. 12/878,889.
U.S. Notice of Allowance dated May 7, 2014 issued in U.S. Appl. No. 12/878,889.
U.S. Office Action dated Feb. 7, 2013 issued in U.S. Appl. No. 12/878,891.
U.S. Final Office Action dated Jun. 10, 2013 issued in U.S. Appl. No. 12/878,891.
U.S. Office Action dated Jun. 26, 2014 issued in U.S. Appl. No. 12/878,891.
U.S. Notice of Allowance dated Jan. 8, 2015 issued in U.S. Appl. No. 12/878,891.
U.S. Office Action dated Apr. 1, 2013 issued in U.S. Appl. No. 12/878,894.
U.S. Final Office Action dated Nov. 22, 2013 issued in U.S. Appl. No. 12/878,894.
U.S. Notice of Allowance dated Mar. 26, 2014 issued in U.S. Appl. No. 12/878,894.
U.S. Office Action dated Mar. 24, 2017 issued in U.S. Appl. No. 14/477,705.
U.S. Office Action dated Mar. 23, 2017 issued in U.S. Appl. No. 14/520,217.
U.S. Office Action dated Aug. 26, 2013 issued in U.S. Appl. No. 12/878,898.
U.S. Final Office Action dated Jan. 22, 2014 issued in U.S. Appl. No. 12/878,898.
U.S. Notice of Allowance dated Jul. 30, 2014 issued in U.S. Appl. No. 12/878,898.
U.S. Office Action dated Mar. 7, 2014 issued in U.S. Appl. No. 13/584,227.
U.S. Final Office Action dated Oct. 17, 2014 issued in U.S. Appl. No. 13/584,227.
U.S. Notice of Allowance dated Aug. 3, 2015 issued in U.S. Appl. No. 13/584,227.
U.S. Office Action dated Nov. 9, 2016 issued in U.S. Appl. No. 14/938,231.
U.S. Final Office Action dated Apr. 17, 2017 issued in U.S. Appl. No. 14/938,231.
Ajax, (Mar. 5, 2009) http://web.archive.org/web/200903005010402/http://en.wikipedia.org/wiki/Ajax_(programming), 6pp.
"Electronic Desktop Application Navigator (EDAN) Training Manual" (Jul. 2007), pp. 1-1, 4-6, 4-11, 4-12, 4-15 (140pp).
"Microsoft Office Outlook 2007 Product Overview", [retrieved on Jun. 1, 2007 from the Internet at http://office.microsoft.com/enus/outlook/HA101656351033.aspx?mode=print], 2007, pp. 1-5.
"Up to speed with Outlook 2007", Training—Office.com, Tutorial, [retrieved from the Internet at http://office.microsoft.com/en-us/training/overview-RZ010115400.aspx?section=1], 2007, pp. 1-39.
U.S. Notice of Allowance dated Sep. 20, 2017 issued in U.S. Appl. No. 14/477,705.
U.S. Final Office Action dated Sep, 21, 2017 issued in U.S. Appl. No. 14/520,217.
U.S. Office Action dated Jan. 23, 2018 issued in U.S. Appl. No. 14/520,217.

* cited by examiner

Console 2.0 would be managed just like apps are managed today within Setup > Create > Apps.

Clicking the "New" button will launch the app creation wizard (existing functionality).

SERVICE CLOUD CONSOLE

PRIORITY DATA

This application is a continuation of co-pending and commonly assigned U.S. patent application Ser. No. 14/520,217 titled SERVICE CLOUD CONSOLE, by Casalaina et al., filed Oct. 21, 2014, which is a continuation of U.S. patent application Ser. No. 14/477,705 titled SERVICE CLOUD CONSOLE, by Casalaina et al., filed Sep. 4, 2014, which is a continuation of U.S. patent application Ser. No. 12/878,884 titled SERVICE CLOUD CONSOLE, by Casalaina et al., filed Sep. 9, 2010, which claims priority to U.S. Provisional Patent Application No. 61/313,609 titled AGENT CONSOLE, by Casalaina et al., filed Mar. 12, 2010, all of which are hereby incorporated by reference in their entireties and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to on-demand services provided over a data network such as the Internet, and more specifically to a console application for accessing and interacting with information stored in the data network, for instance, in a database.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process steps for the disclosed inventive systems and methods for providing services to remote clients. These drawings in no way limit any changes in form and detail that may be made to embodiments by one skilled in the art without departing from the spirit and scope of the disclosure.

DETAILED DESCRIPTION

Figure 1:
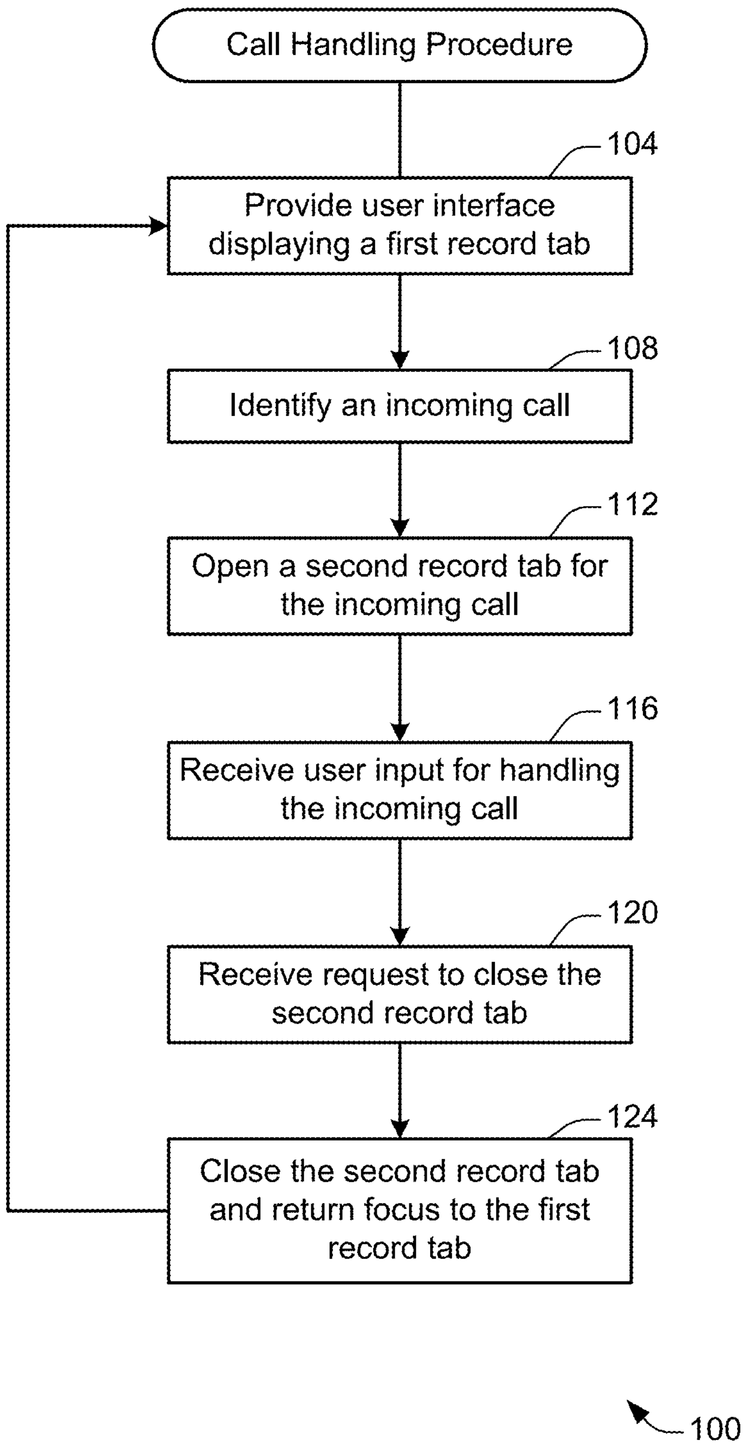
FIG. 1 shows a flow diagram of a method 100 for handling a call, performed in accordance with one embodiment.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

Some embodiments are directed to a user interface console provided at a client machine for interacting with object record information stored in a multitenant database at a server in an on-demand service environment. Some embodiments of the apparatuses, systems and methods disclosed herein are adapted for use in other types of devices, systems or environments, as applicable, such that their use is applicable in broader applications than the environments and contexts described herein.

In the following figures, methods and apparatus applicable to various service cloud console configurations and their associated components are described. In one or more embodiments, the service cloud console may be used to provide an on-demand, web-based system for accessing data and applications. The service cloud console (alternately described as the console, the console application, the agent console, or the service desk) includes a user interface provided at a client machine for interacting with object record information stored in storage facilities such as databases at a server.

In one or more embodiments, an agent of an organization who is using an instance of a service cloud console application may receive a call from a client who has an account with the organization. Using the service cloud console application, the agent may open, close, edit, and/or save object records associated with the client's account.

Certain components and services of the service cloud console may be used to replace software for accessing data and managing customer records typically installed on separate computers in an organization. For example, the service cloud console may replace one or more customer relations management ("CRM") programs, call center programs, etc. By using the service cloud console, an agent for an organization can access data associated with a client of the organization.

Use of the service cloud console may be provided over data networks such as the Internet to a plurality of different organizations. The data network in which embodiments of the service cloud console is implemented may include other wide area networks ("WAN") and local area networks ("LAN"), or portions thereof. In one or more embodiments, different organizations may customize the service cloud console to suit their own needs. For example, an organization may create more than one console application, adjust the settings of a console application, apply a name to a console application, etc.

A single console application provided to an organization may be used by many different users associated with the organization. Users may include administrators who configure or otherwise administer the organization-specific console application, agents who use the console application to interact with data stored in a remote database, supervisors who supervise the work of agents, or other types of users.

In one or more embodiments, the service cloud console may include one or more graphical user interfaces tailored to maintain the context of an account using a tab metaphor. Examples of selected portions of such a graphical user interface according to one or more embodiments are shown FIGS. 11-110. The service cloud console may be componentized such that each tab can display and/or refer to all or selected portions of groups of information. For example, a tab or component in the service cloud console may display all or selected portions of an individual row of data in a database, data integrated from an external system, or any other arrangement of data.

The system may be both easy for agents to use and easy for administrators to manage. One or more embodiments may facilitate speed and simplicity, giving the agent the ability to navigate through the interface with a limited number of clicks, and without a great deal of training. One or more embodiments may allow the agent to maintain the context, or frame of reference, of a current call and prior calls in an easily navigable interface. One or more embodiments may allow the integration of external systems into a single, fluid agent interface. One or more embodiments may improve access to a knowledge base, supplying the agent with the information he needs when he needs it.

In some embodiments, certain components and services of the service cloud console may lower average handle time as compared to conventional call center techniques by enabling the agent to move quickly and fluidly through the interface while accessing the needed information. The service cloud console may reduce cost by making it easier to train agents and/or by being centrally managed. Customer satisfaction may be improved by enabling the agent to service the customer more effectively.

In one or more embodiments, certain components and services of the service cloud console may reduce the number of clicks an agent needed to make to perform a task. An agent's interaction with the console application is made as fast and as fluid as possible. Further, the console application maintains as much context as possible so the agent always knows what he's doing and where he's been in the console application.

The following two sections describe use cases for two fictional individuals named Amber and Scott. Amber and Scott are agents who use call center software as part of their work. The use cases discuss various deficiencies of existing call center software. One or more embodiments described herein may remedy one or more of the difficulties faced by agents such as Amber and Scott.

Amber: The High Volume Call Center Agent

Amber is a call center agent at Universal Cable Corp. She sits in a 4'×4' cubicle, wears a headset, and uses a 5-year-old personal computer ("PC") with a 15" cathode ray tube ("CRT") monitor. She answers calls from Universal Cable customers, and it is not unusual for the customers to be frustrated or angry. Her official schedule is 8:00 AM to 5:00 PM, but she frequently works overtime—sometimes as late as 9:00 PM.

The Universal Cable call center is a controlled, high-pressure environment where representatives ("reps") have to clock out just to use the bathroom. Amber has worked there for about three years and is therefore considered a veteran. Having memorized the call scripts, Amber often lends her laminated copies out to new reps that have misplaced theirs. She's attempted to keep her spirits up by embellishing her cubicle with various awards and decorations. One decoration she doesn't like is the light on her phone—when it turns red, Amber knows there are too many customers in her queue and she has to handle calls more quickly.

Up-selling, or inducing a customer to purchase additional products and services, is a high priority for Universal and for Amber. During calls, however, Amber has difficulty balancing support of the issue-at-hand with her attempts at up-selling. Amber must focus on servicing the highest possible volume of calls when her team is not meeting their service level agreement (which is displayed in real-time on a wall ticker).

Amber's biggest frustration is that she has to access many different systems to get the information she needs to answer each support call. She would prefer to see it all in one place. After three years of getting used to the way the systems are set up, Amber has found some workarounds. For example, when she's on a call, she takes notes in her notebook to reference while researching the issue in different systems. Amber finds the documentation process tedious—she needs to enter specific codes to document the types of customer issues she handles. She often references printouts she keeps in a binder to find the correct codes to enter into the system. Each week, Amber's supervisor reviews her cases and if the wrong codes have been used, Amber must correct them in the system.

Amber would prefer a single screen view of everything she needs to do her job. Knowledge base articles and data from legacy systems would preferably be visible inline on the page, and should require as little interaction from her as possible. She frequently get calls from contacts who are not in the system, and the information provided during those calls often lacks structure, so she needs the ability to fill in data to multiple objects at once such as a case (e.g., a particular customer interaction or issue) and a contact (e.g., an individual associated with a customer organization).

Scott: The Problem-Solving Support Rep

Scott is a problem-solving rep who has his own office and uses two laptops and three flat-screen monitors. Most of the customer support requests that Scott handles come in via email rather than the phone. The requests are not automatically assigned to Scott. Instead, he accesses the new request queue and assigns specific requests to himself. He works flex hours—typically 12 hours a day, 4 days a week. This allows him to be home with his wife and baby daughter one extra day a week.

In his job at Acme Technologies, Scott is provided with the time necessary to research complex issues for customers—the time to resolve an issue can range from 5 minutes to 5 hours. His work performance is not measured by how quickly he handles calls but by the success of solving issues for customers.

Scott's job is a "problem-solving job." He has a Bachelor's degree in computer science and his technical skills are useful when troubleshooting customer issues. He occasionally sits with new reps while they handle calls, helping them find the resources they need and increasing their technical expertise. He also collaborates with people on different teams (e.g., IT and Developers) based on what is needed to resolve issues for the customer.

Although he is free to instant message people or to discuss issues in person, the bulk of his communication is handled via email. He adds comments about each case in the system, but he uses a free-form style to provide a quick summary of the issue.

Scott often works on more than one case at a time. Since the email responses from the IT and engineering teams are often not immediate, Scott works on new cases while he awaits answers on others. When an email response comes in from IT or engineering, Scott has difficulty identifying the related case in the system. The case list is often quite long, and he would like a better way to prioritize the list of cases assigned to him. Scott's biggest frustration is that his email, rather than the customer support tool, acts as his knowledge base. He commonly recognizes issues as previously addressed and captured in old email messages. Yet sometimes he still does not find what he's looking for—there is a storage limit on his inbox and he has lost relevant emails in the past that he needed to help support a customer.

Like Amber, Scott needs a single screen view of everything he needs to do his job. However, Scott's job involves more interaction with email and pending cases, so he needs to see a list of actionable items. He also is much more likely to deal with customers' support contracts, so he needs an entitlements view. He will require access to detailed knowledge base articles, so he will need access to an in-depth search for knowledge.

User Interface Overview

Figure 11:
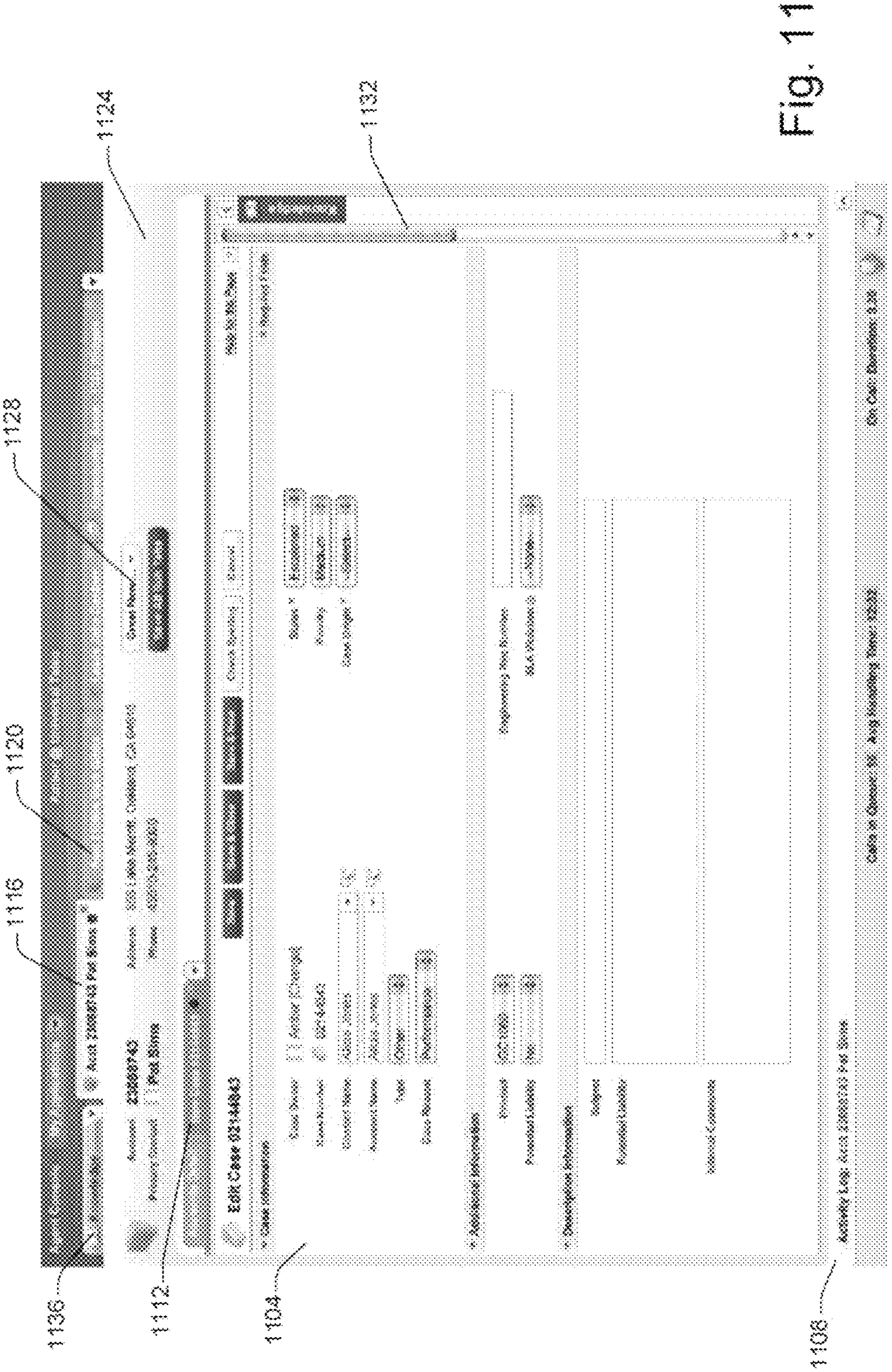
FIGS. 11-107 show images of graphical user interfaces presented in a web browser at a client machine, in accordance with one or more embodiments.
Figure 107:
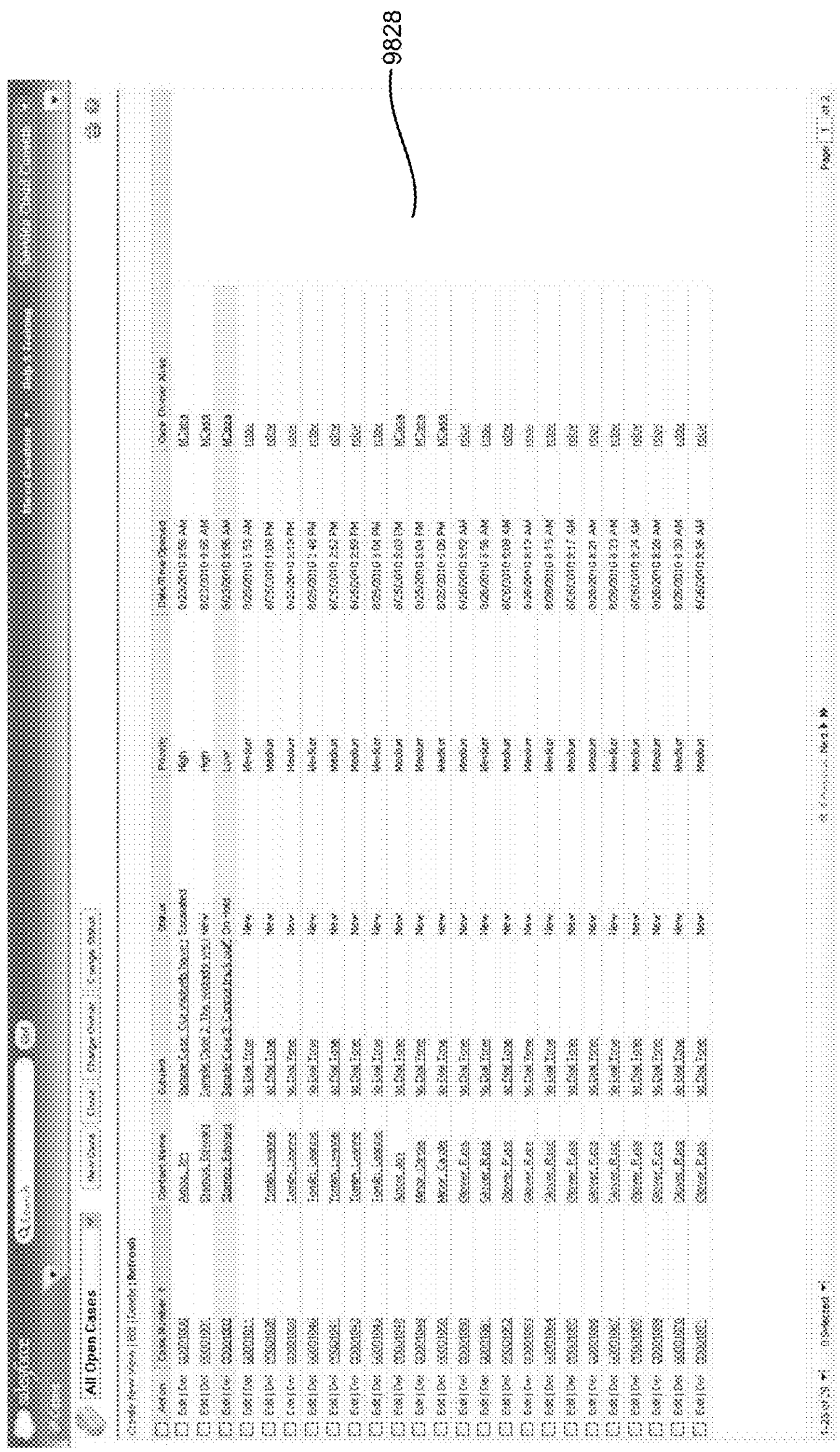

FIGS. 11-107 show images of user interfaces that may be presented in a web browser at a client machine, in accordance with one or more embodiments. Different embodiments may include various user interfaces. For example, the user interface shown in FIG. 12 has a different appearance than the user interface shown in FIG. 11. Thus, the claims should not be construed as being limited to any particular user interface(s).

In one or more embodiments, the user interface of the service cloud console may include one or more of an overview area, a main view area 1104, a context view area 1204, a sidebar area 1208, a marquee area 1108, and/or a highlights panel 1124. The overview area may be a container in which components associated with the service cloud console, such as components 1104, 1108, 112, 1116, 1120, 1124, 1128, 1132, and 1136, are displayed. The overview area may show components that span a large set of information (e.g., a list view 9828).

The main view 1104 may show the detail or edit page of a single object or a search results page. The context view 1204 may show small but editable views of objects that are related to the object in the main view. The sidebar 1208 may be positioned on the side of the screen and may include an ability to handle a wide range of components. The marquee 1108 may display a limited amount (e.g., one line) of informational text.

In some embodiments, the main view 1104 may display various information associated with one or more object records that are currently open as a primary tab (alternately referred to as a workspace) in the console application. The main view 1104 may display one or more secondary tabs 1112 that are each associated with the primary tab 1116 that has focus in the console application. When a different primary tab (e.g., primary tab 1120) is selected, then the one or more secondary tabs associated with the different primary tab may be displayed. The main view 1104 may include a UI tool such as a vertical and/or horizontal scroll bar 1132 to navigate the displayed page.

In one or more embodiments, the main view 1104 may rarely be overridden. For instance, search results and list views shown in the main view 1104 may open new tabs rather than overriding the content of the main view 1104 so that when the user navigates to an object, the results of the search are not lost. Similarly, sub-operations like creating tasks or sending emails may not override the content of the main view 1104, but may use a technique such as an HTML <div> overlay to maintain context. The main view 1104 may support inline editing.

The highlights panel 1124 may include an area in the workspace (e.g., at the top) which gives the user information about the object controlling that workspace. A "mutton" 1128 may be displayed in the highlights panel 1124. The mutton 1128 (alternately referred to as a multi-button) may be a button that acts as a dropdown menu containing multiple functions. The mutton 1128 may allow the agent to perform actions that would normally be performed from buttons on related lists of the layout. The mutton 1128 may include various buttons, which can be shown, for example, if the entity happens to be in a related list on the layout of the workspace entity, and if the button is shown in the layout for that related list.

Figure 12:
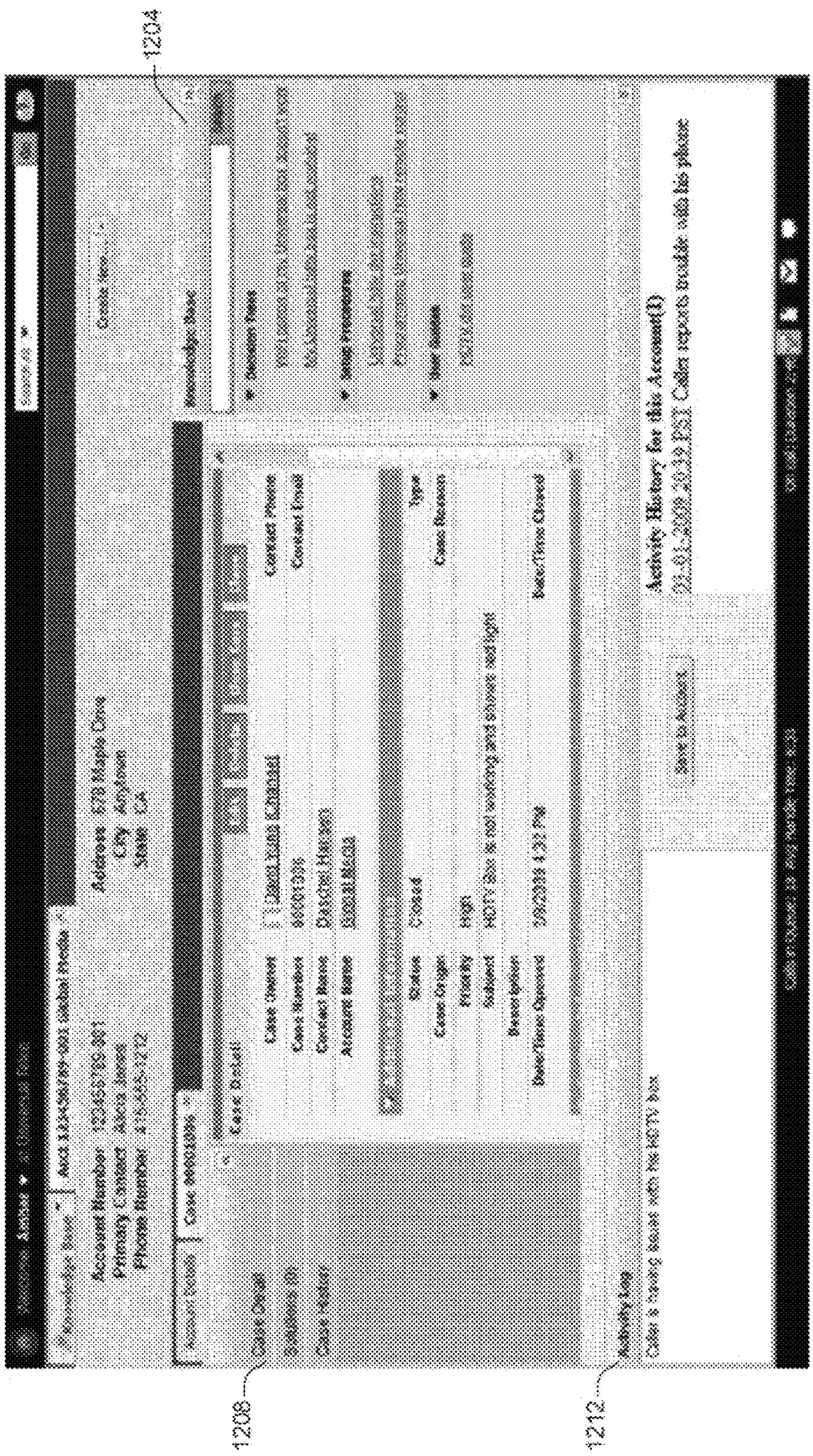

One or more embodiments may include a sidebar 1208 that may be displayed on the side of the interface, as shown in FIG. 12. The sidebar 1208 may be a separate layout such that there is a specific console sidebar component that is rendered in the console. The setup of the sidebar layout may be available in the console layout and may use concepts similar to that used for home page layouts.

In one or more embodiments, when displaying a record in the main view area, the sidebar 1208 may display one or more related lists, as shown in FIG. 12. The items displayed in the sidebar 1208 may be navigated by a UI tool such as a vertical scroll bar if the number of items exceeds the vertical space. In certain situations, such as when a record is being edited, the sidebar 1208 may be hidden.

The sidebar 1208 may allow handling of various types of components, so it may include an interface (e.g., a tab or accordion widget) to manage these components effectively (e.g., displaying them without sending them below the fold of the page). The sidebar 1208 may include a pluggable interface that has knowledge of the current context of the main page so that third parties can create custom sidebar components.

The marquee 1108 may be a short area (e.g., one character high) that may be shown at the top and/or bottom of the screen. The marquee 1108 may show fixed text and/or scrolling text. The direction of the scrolling text may depend on the agent's preferred language (e.g., right to left for user languages like English that are left-to-right, and left to right for languages like Hebrew that are right-to-left). The API may include a message object as a container for marquee messages. Message rows may count towards storage (e.g., in the database).

One or more embodiments may include a control 1136 referred to as a navigation tab (alternately referred to herein as Silvertab) which provides agents access to various objects without leaving the console. The navigation tab 1136 can be configured by the administrator (alternately referred to as an admin) to access various available objects. In some embodiments, only objects designated as navigation tab items for the console will be listed in the navigation tab menu. A default item can be selected from the chosen navigation tab items. On initial view of the console, the end user may see the navigation tab 1136 in the top left region of the console with the default item name, color, and/or icon. In some embodiments, the navigation tab 1136 provides an approximately 150 px width space for icon and text. An item label that exceeds the available width (e.g., 150 px) may be truncated and appended with an ellipsis. In other embodiments, the width space of the navigation tab may be a different size.

In some embodiments, the overview area may display general overview information. The general overview information may be displayed using one or more list views, dashboards, or custom components. One or more embodiments may include an activity log 1212 for entering information related to changes to the record, as shown in FIG. 12.

List views may include various capabilities, such as inline editing. When an object is clicked in the list view 9828, it may raise an event that opens one or more tabs that pertain to that object. One or more list views may auto-update. For example, the list view 9828 may be configurable to auto-refresh at an interval (e.g., 5 minutes). One or more list views may be multi-sortable (e.g., an agent may be able to select multiple columns by which to sort). One or more list views may include hovers, a preview icon that can be clicked to show a hover, or both. One or more list views may include one or more visual indicators (e.g., indicating whether a new comment, email, or escalation has been added to a case). One or more list views may include a provision for mass actions.

One type of list view may be a universal inbox, which may contain a list of actionable items. This list may include (but is not limited to) new cases, leads, case comments, emails, tasks, and pending events. One advantage of the universal inbox is that it can show many different types of objects in one place and may allow users to prioritize them.

In one or more embodiments, the overview area may be populable by draggable dashboard components. The overview area may be able to contain one or more of list views and/or dashboard components at the same time. A dashboard that is visible to a user may be available as a dashboard component.

In some embodiments, one or more of these views may be collapsible. Collapsible views allow views to be hidden if the agent does not desire them there. The size of each of the views may be saved across sessions on a per-agent basis so that the agent does not have to re-layout his console every time he navigates to it.

Figure 13:
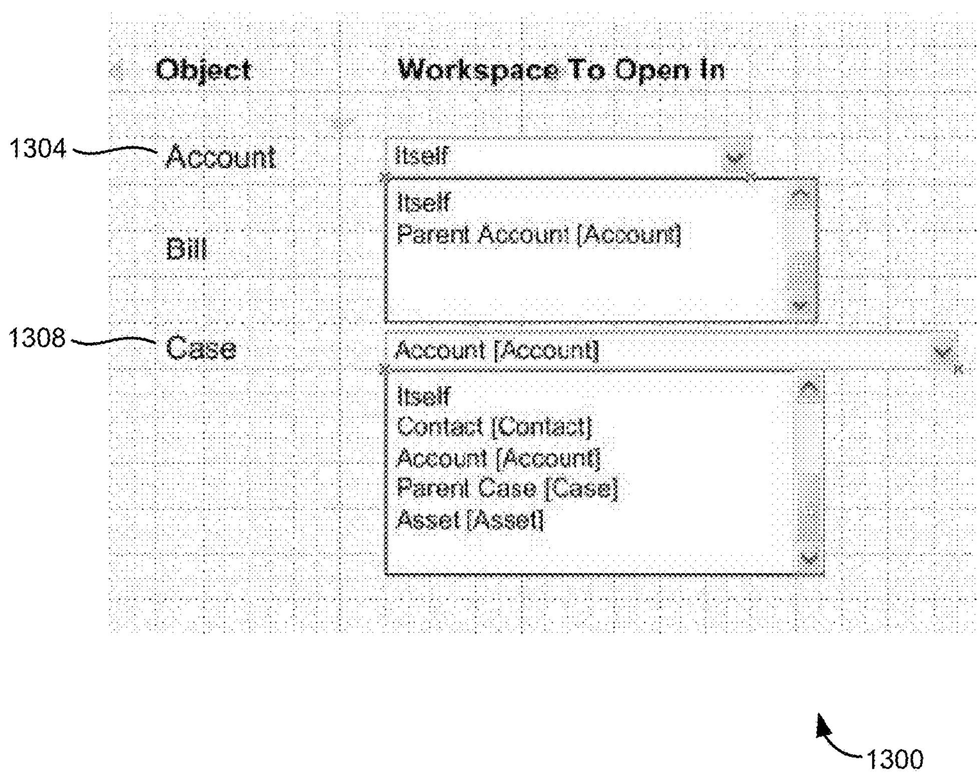

The URL format of the service cloud console may be regular and/or bookmarkable. For instance, if an agent is viewing a case detail page, the agent may be able to copy that URL from the browser and email it to a colleague. When the colleague clicks on that URL, the corresponding case should appear in the main view of the colleague's console (even if the colleague's console is otherwise laid out differently). As discussed herein, FIGS. 13-110 show additional features of the service cloud console.

FIG. 1 shows a flow diagram of a method 100 for handling a call, performed in accordance with one embodiment. The call handling method 100 may be performed to facilitate the handling of a call by an agent using the service cloud console. For example, the call handling method 100 may be performed at a client machine in communication with a server. The client machine may be running a web browser displaying a user interface representing an instance of the service cloud console, such as the user interfaces shown in FIGS. 11 and 12.

In some embodiments, one or more of the operations shown in FIG. 1 may be completed without refreshing the user interface or web page displayed in the web browser at the client machine in which the user interface is shown. Completing operations without refreshing the web page may allow the agent to receive calls and to open, edit, save, and close object records without significant interruptions.

At 104, a first record tab for accessing a first object record is provided. In one or more embodiments, the first object record tab is provided in the user interface displayed in the web browser running at the client machine. An example of such a tab is shown at 1116 in FIG. 11. The first object record tab may display information associated with the first object record. The first object record may be, for example, a database object stored in a database on the server.

For example, the first object record may be a client account, or a portion of a client account, such as the account shown on tab 1116 in FIG. 11. The first object record tab may then contain information related to the client account, such as one or more names, phone numbers, e-mail addresses, or other contact information. Additionally, or alternately, the first object record tab may contain information such as billing data, technical data, client preferences, or any other type of information associated with the first object record in the database such as the case information shown in the main view 1104 in FIG. 11.

Although one or more embodiments display object records as tabs as user interface components, the user interface components for displaying object records are not limited to being displayed in tabs. According to various embodiments, different types of user interface components may be used, such as window panes, windows, ribbons, 3D navigation environments, etc.

At 108, an incoming call is identified. The call may include any communication from an individual. In some instances, the call may be a communication from an individual associated with an account accessible via the service cloud console. For example, the call may be a communication from an individual associated with a customer of the organization using the service cloud console application.

In one or more embodiments, the incoming call may be a voice call. The voice call may be a telephone call transmitted over a telephone network such as the public switched telephone network (PTSN), a voice over IP (VOIP) call received over a computer network, a pre-recorded voice call, or any other type of voice call. In some embodiments, the incoming call may be another type of call, such as a text chat session, an e-mail, a text message, or any other type of communication.

In some embodiments, identifying the incoming call may include identifying a number from which the call originated (e.g., a PSTN number, a VOIP number, etc.). Alternately, identifying the incoming call may include identifying a chat handle, a customer identification number, a URL, an e-mail address, or any other relevant identifier. However, in some instances the source of the incoming call may not be identified.

In one or more embodiments, identifying the incoming call may include identifying an account associated with the incoming call. For example, a database at the server may be queried using a number associated with the incoming call to identify an account associated with the incoming call. In this case, the user interface may display information associated with the incoming call, such as the name of a client making the call, the name of an account associated with the client, or other information.

In one or more embodiments, the incoming call may be received by the agent. For example, the incoming call may be received within the user interface displayed in the web browser by opening or activating a user interface component associated with receiving a call.

As a different example, the incoming call may be received via a different program or web page at the client machine. For example, the client machine may have dedicated software for receiving calls. Alternately, a separate user interface for receiving calls via a web browser may be displayed in a different tab or window of the web browser.

As yet another example, the incoming call may be received via a device other than the client machine, such as a telephone or headset. The telephone or headset may be communicatively coupled with one or both of the client machine or the server.

Techniques for receiving a call are described in further detail in commonly-assigned U.S. Pat. No. 8,718,241 and U.S. Pat. No. 8,693,649, each titled METHODS AND APPARATUS FOR INTERFACING WITH A PHONE SYSTEM IN AN ON-DEMAND SERVICE ENVIRONMENT, by Casalaina et al., filed herewith, which are incorporated herein by reference for all purposes.

At 112, a second record tab for the incoming call is opened. When the second record tab is opened, the first record tab may be hidden from view. One method for opening a record is discussed with reference to FIG. 2.

In one or more embodiments, a tab ordering including a listing of one or more previously accessed record tabs may be stored at the client machine. In this way, the focus of the user interface may be automatically returned to the previous record tab (e.g., the first record tab) when a subsequently accessed record tab (e.g., the second record tab) is closed.

In one or more embodiments, the second record tab may be opened automatically. For example, when the incoming call is identified, a query may be transmitted to a database at the server to identify an object record associated with the incoming call. When the record is identified, the second record tab may then be opened automatically opened. Opening the second record tab automatically may save time for the agent because the agent need not manually look up the client's account. Instead, the client's account may already be open so that the agent has access to the account information when handling the call.

Alternately, the second record tab may be opened manually (e.g., by the agent). For example, the agent may identify a record to open after receiving the call and receiving information from the client. Manually opening the second record tab may be necessary if, for example, the client is calling from an unidentified source or a source not yet associated with the client's account. In this case, the agent may receive information from the client and then provide input to the user interface causing the identified object record to open.

In some instances, the second record tab may be associated with a new or blank object record. For example, the client may not be associated with an existing account, as may be the case for a new client. As another example, the client may be establishing a new record associated with an existing account.

At 116, user input for handling the incoming call is received. The user input may include any information for handling the incoming call, such as modifying account information for the client's account, adding new account information, establishing a new account for the client, deleting existing account information, updating or entering account preferences, etc.

In some instances, one or more additional procedures may be triggered during or after the receipt of the user input. For example, one or more instances of a contextual sidebar update method and/or an edited page detection method may be triggered. Examples of these methods are discussed with reference to FIGS. 5 and 6.

At 120, a request is received to close the second record tab. The request to close the second record tab may be received by detecting a click of a close button on a primary tab, such as the primary tab 1508 shown in FIG. 36. In some instances, the received request may be an explicit request to close the second record tab. For example, the received request may be the detection of user input in the user interface such as clicking a "close" button or symbol, the detection of a keyboard command that corresponds with a request to close the tab, or any other technique for receiving an explicit request to close the second record tab.

In some instances, the received request may be an implicit request to close the second record tab. For example, the termination of the call may in some instances trigger a request to close the second record tab.

Figure 4:
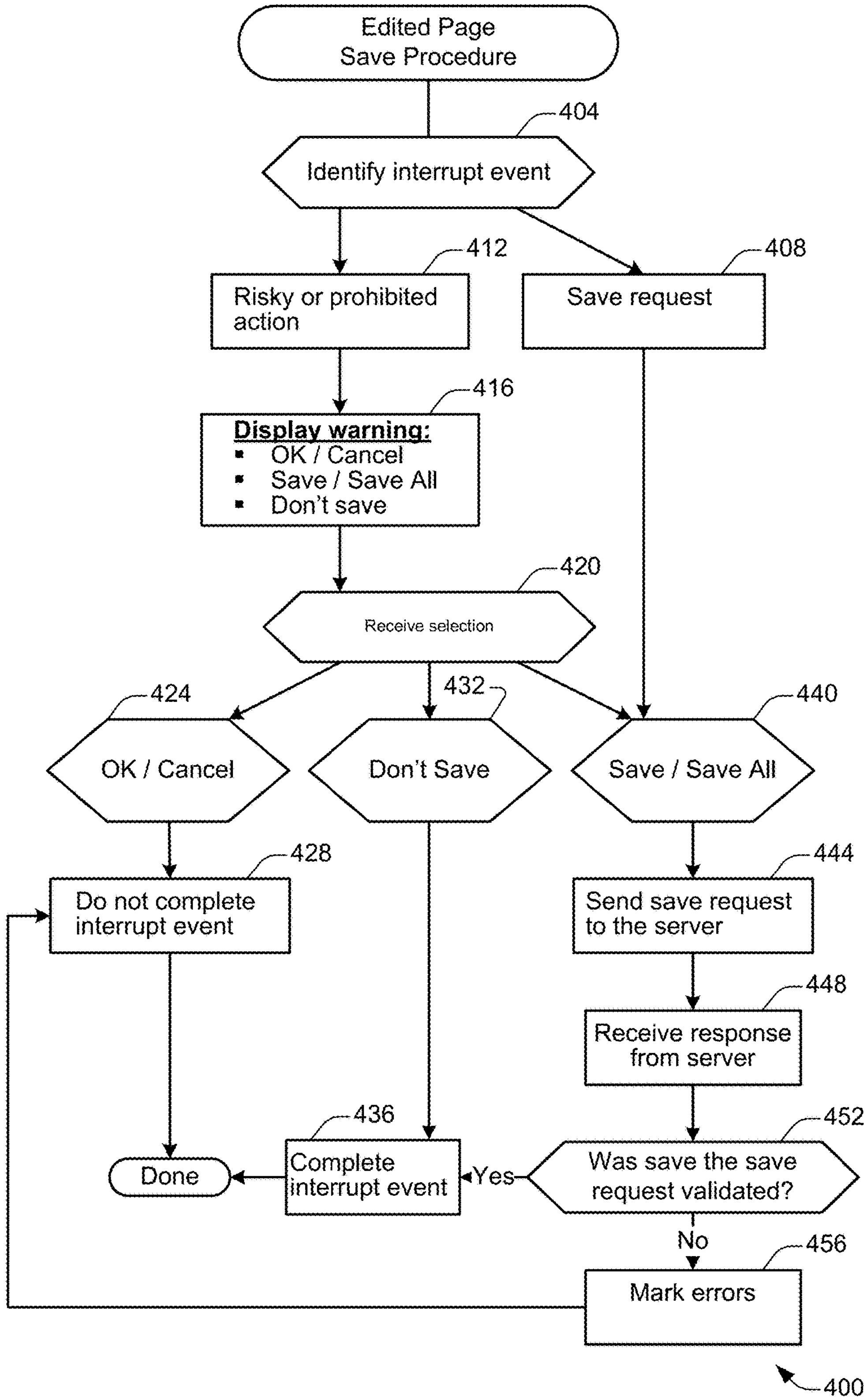
FIG. 4 shows a flow diagram of a method 400 for saving an edited page, performed in accordance with one embodiment.

In one or more embodiments, receiving a request to close the second record tab may trigger one or more procedures associated with ensuring that edited data is saved to the server, such as the edited page save method shown in FIG. 4.

At 124, the second record tab is closed. When the second record tab is closed, the second record tab may be removed from the user interface. Further, the first record tab, such as the primary tab 1512 shown in FIG. 37, may be revealed to the agent. Revealing the first record tab when the second record tab is closed may allow the agent to quickly resume interacting with the first record tab, thus reducing the interruption caused by receiving the call.

Figure 2:
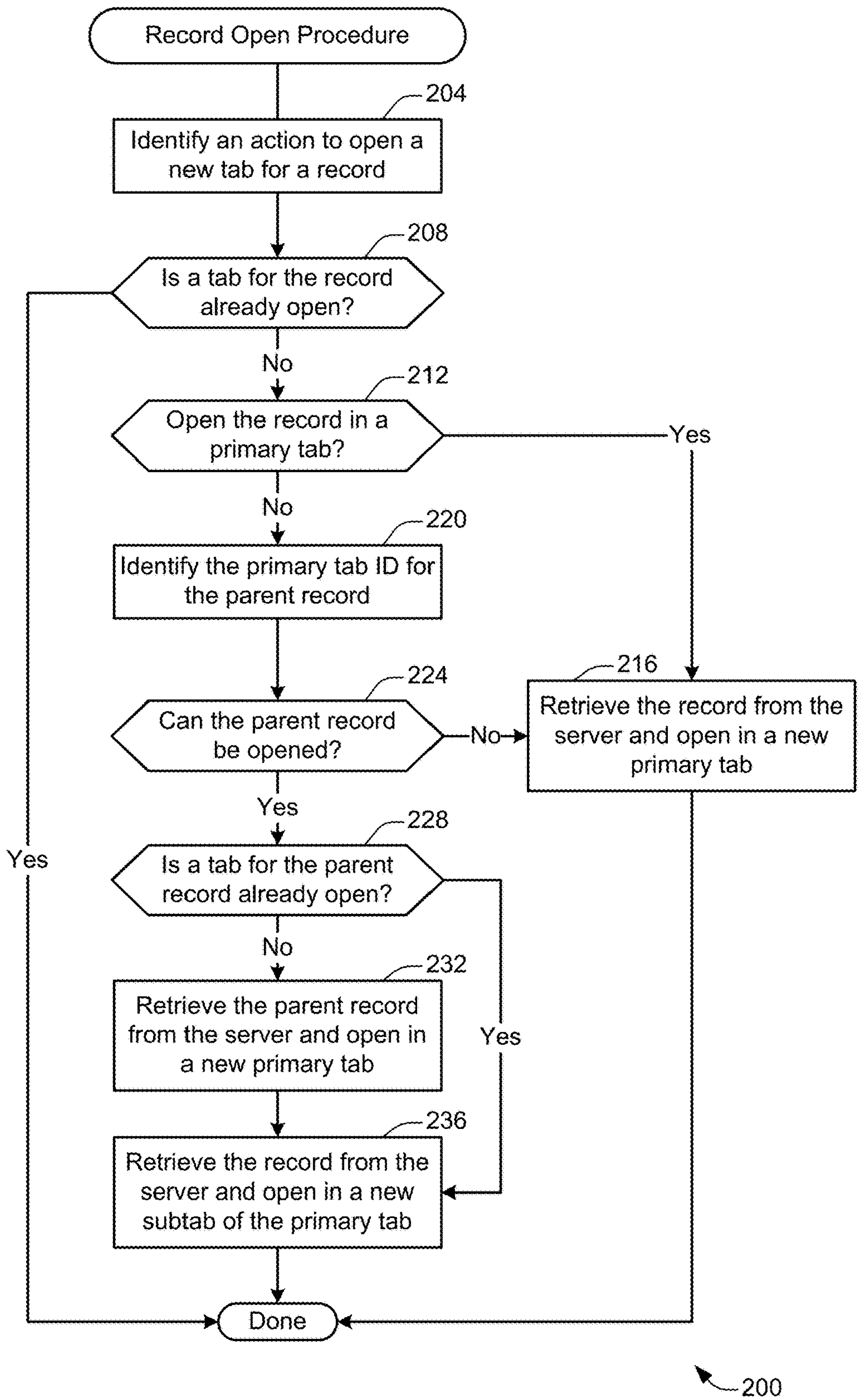
FIG. 2 shows a flow diagram of a method 200 for opening a record, performed in accordance with one embodiment.

FIG. 2 shows a flow diagram of a method 200 for opening a record, performed in accordance with one embodiment. The record open method 200 may be performed when the service cloud console user interface is displayed in a web browser at a client machine. The service cloud console interface may be open in a browser tab of a web browser or may be the only page open in the browser.

In one or more embodiments, the service cloud console may display one or more user interface components for displaying object record information associated with object records stored in a database. Object records may include any database objects accessible via the service cloud console. In some embodiments, these user interfaces may be arranged according to a tab metaphor, as is illustrated in the user interfaces shown in FIGS. 16-37. One or more embodiments may use one or more different types of user interface components, such as windows, window panes, pages, wizard guides, list boxes, tree controls, etc. For example, one or more embodiments may employ a "wizard-style" interface in which an agent is led through one or more tasks (e.g., using arrows). However, records are described herein as being displayed within tabs.

Figure 15:
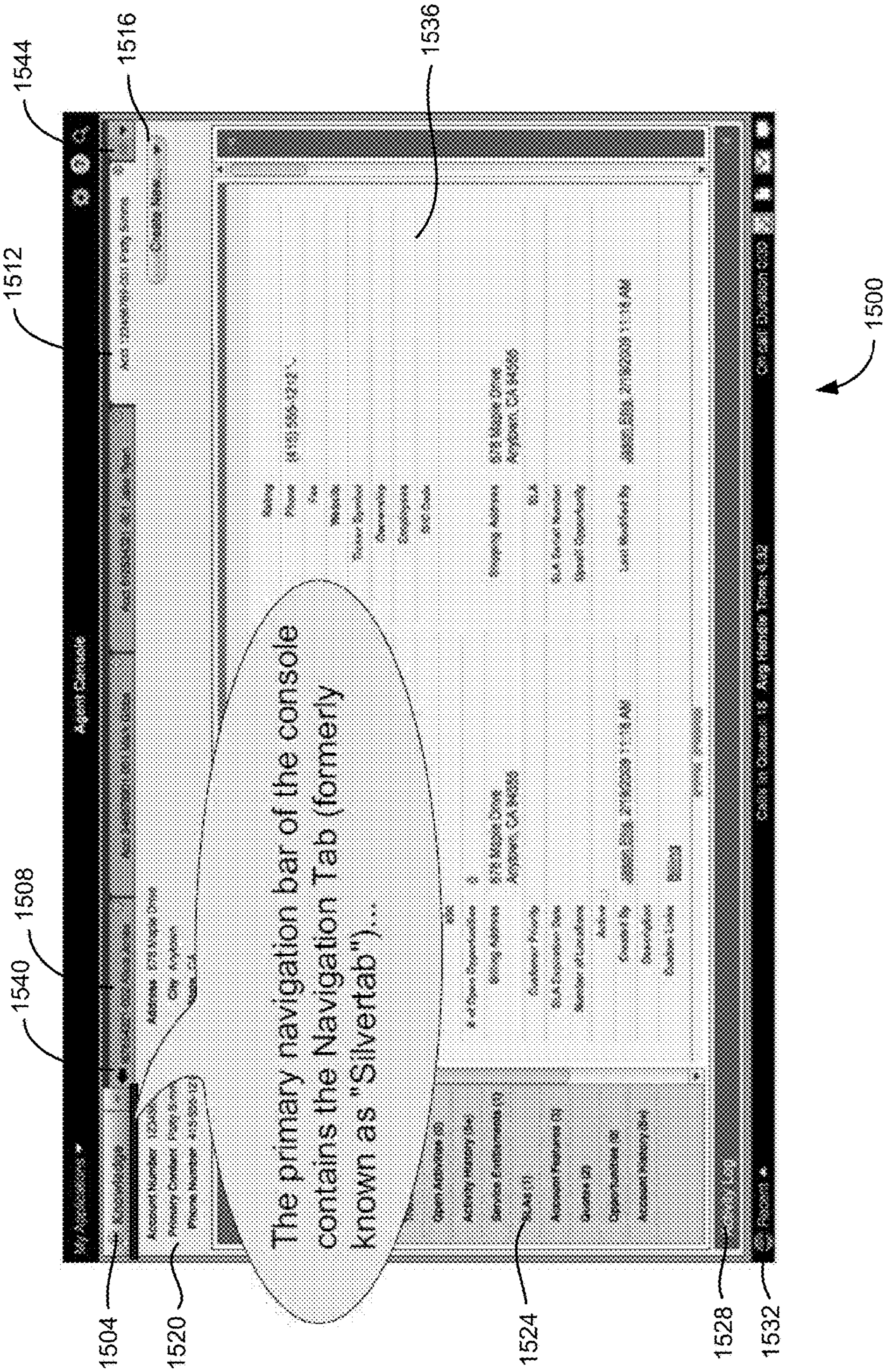
Figure 16:
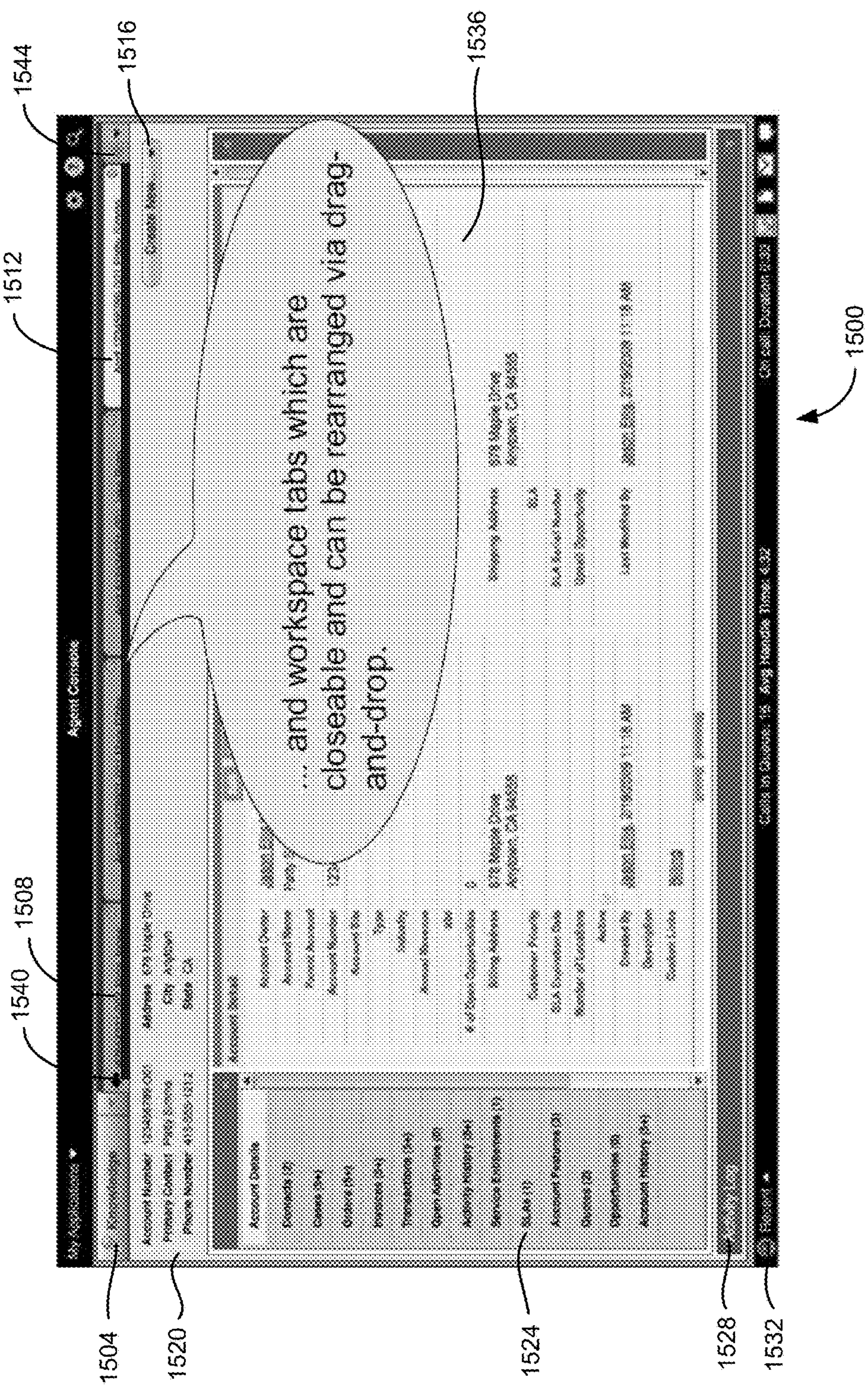

In one or more embodiments, the service cloud console may display one or more primary tabs (alternately referred to as workspace tabs). As is shown in FIGS. 15 and 16, primary tabs may be arranged in a drag-and-drop user interface. The graphical user interface 1500 shown in FIG. 1500 includes a navigation tab 1504, primary tabs 1508 and 1512, and scroll buttons 1540 and 1544 positioned on the primary tab bar. The graphical user interface 1500 also includes a highlights panel 1520, a mutton 1516, an activity log 1528, and a marquee 1532. The record opened in the primary tab is displayed in the main view 1536, and the graphical user interface also includes a sidebar 1524.

Figure 22:
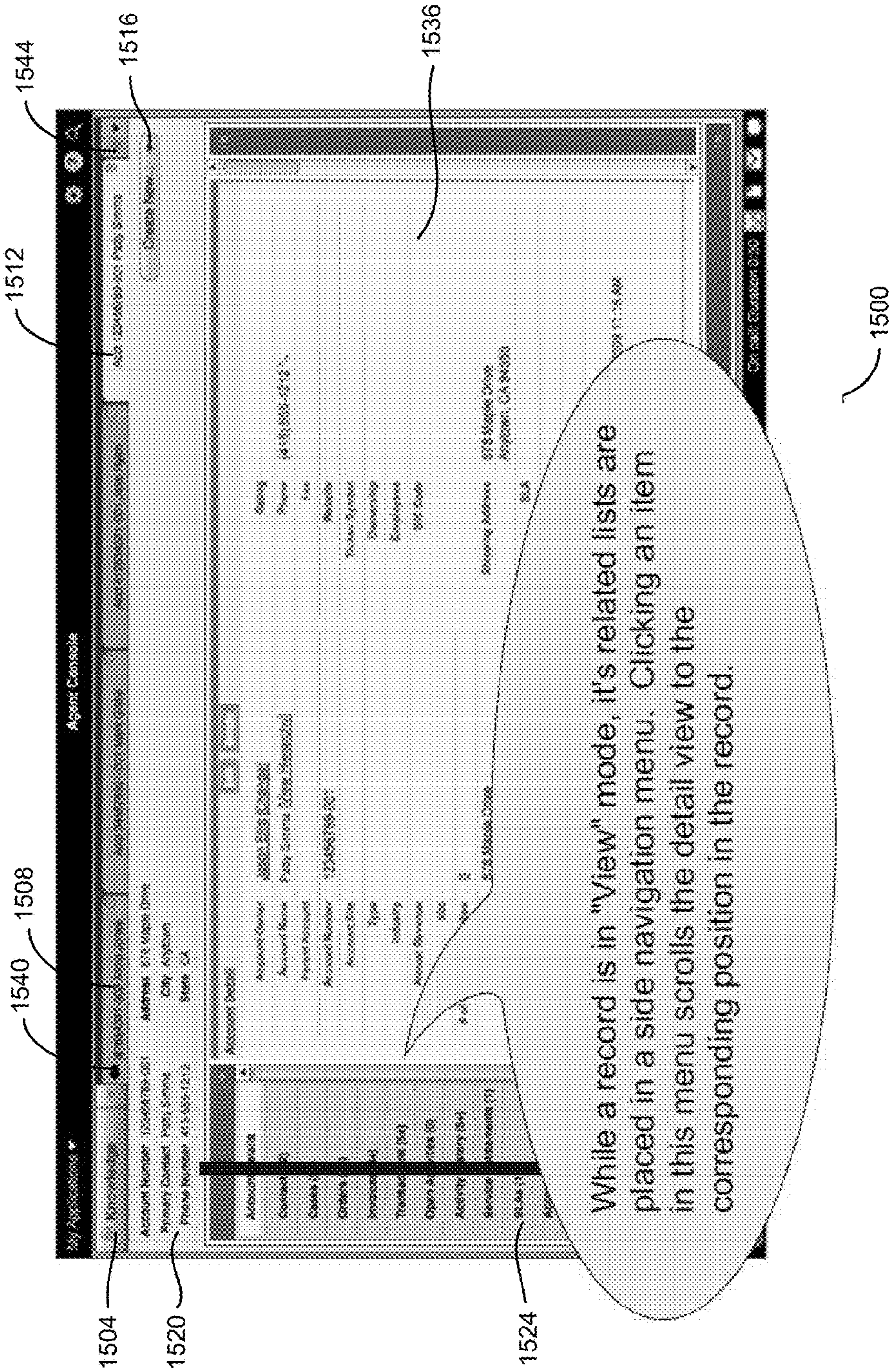
Figure 23:
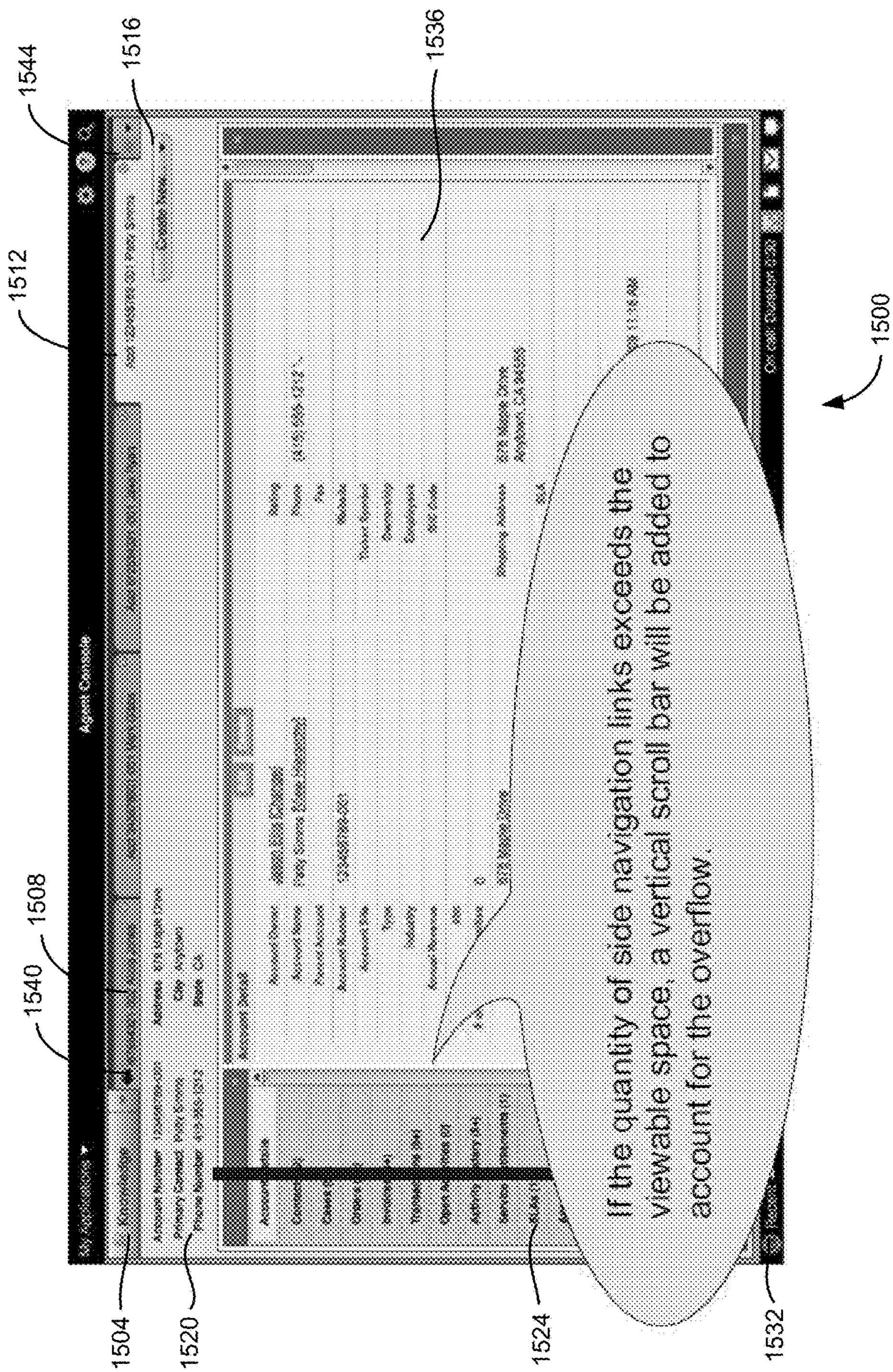
Figure 24:
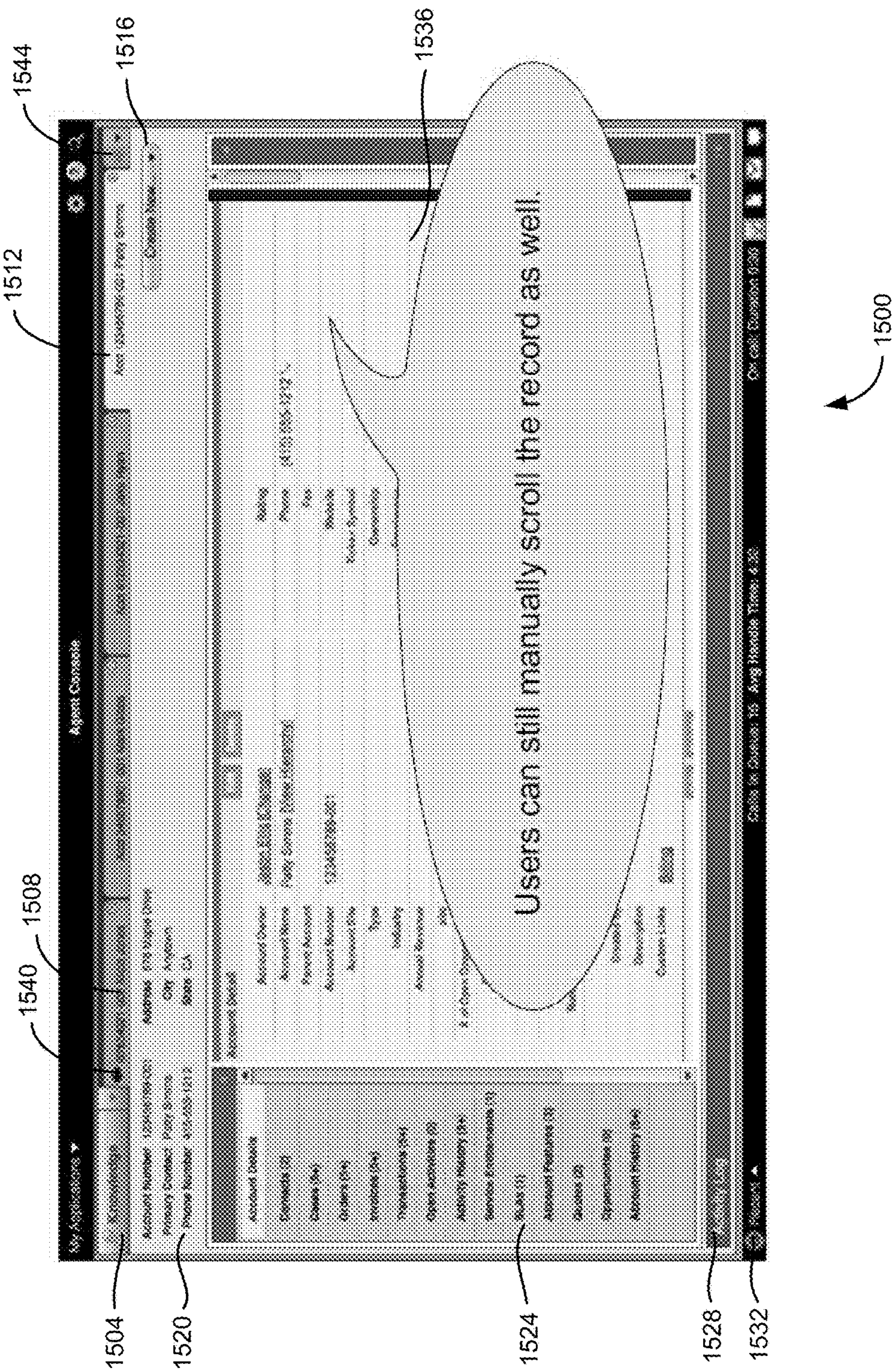
Figure 25:
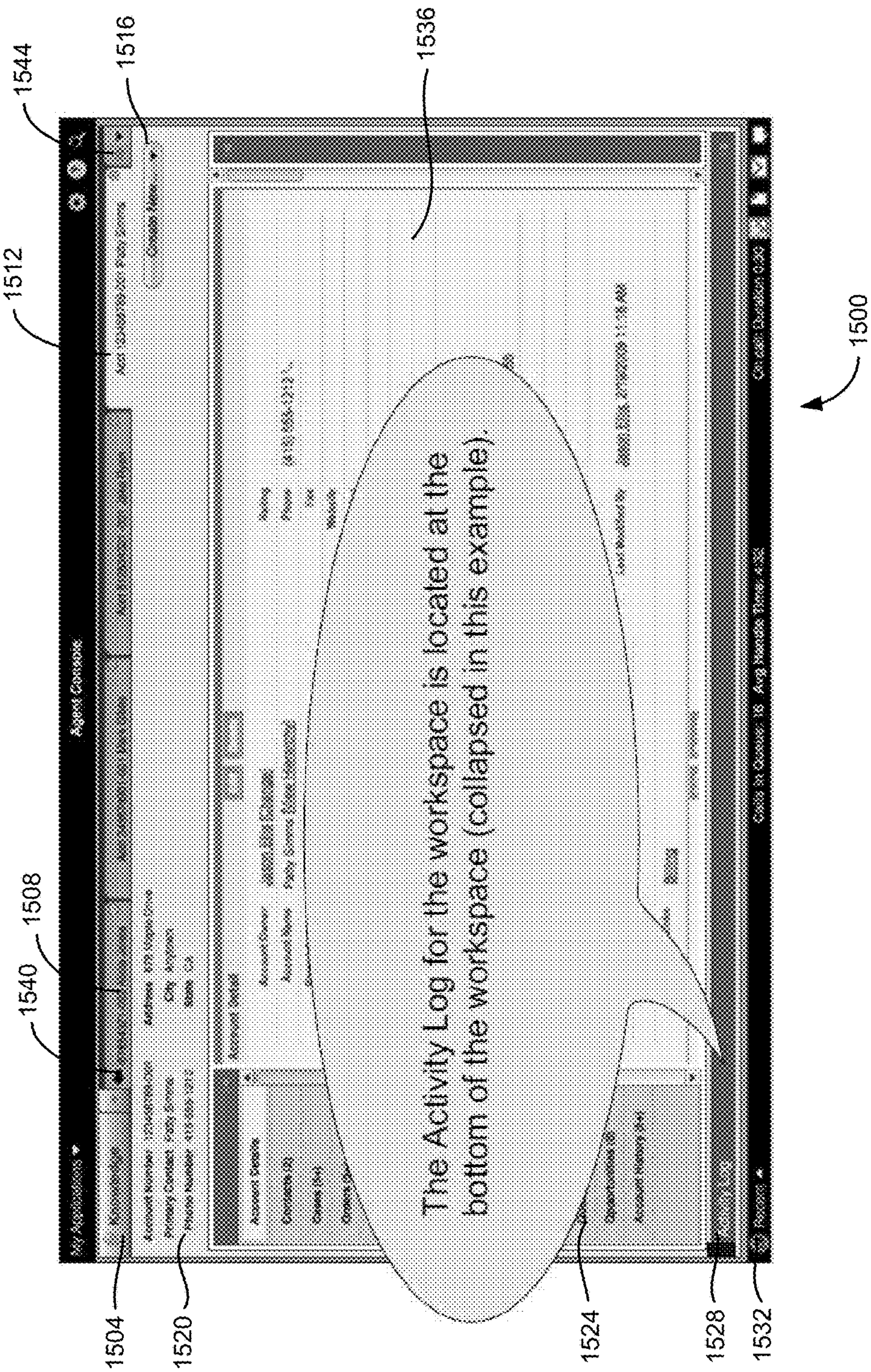
Figure 30:
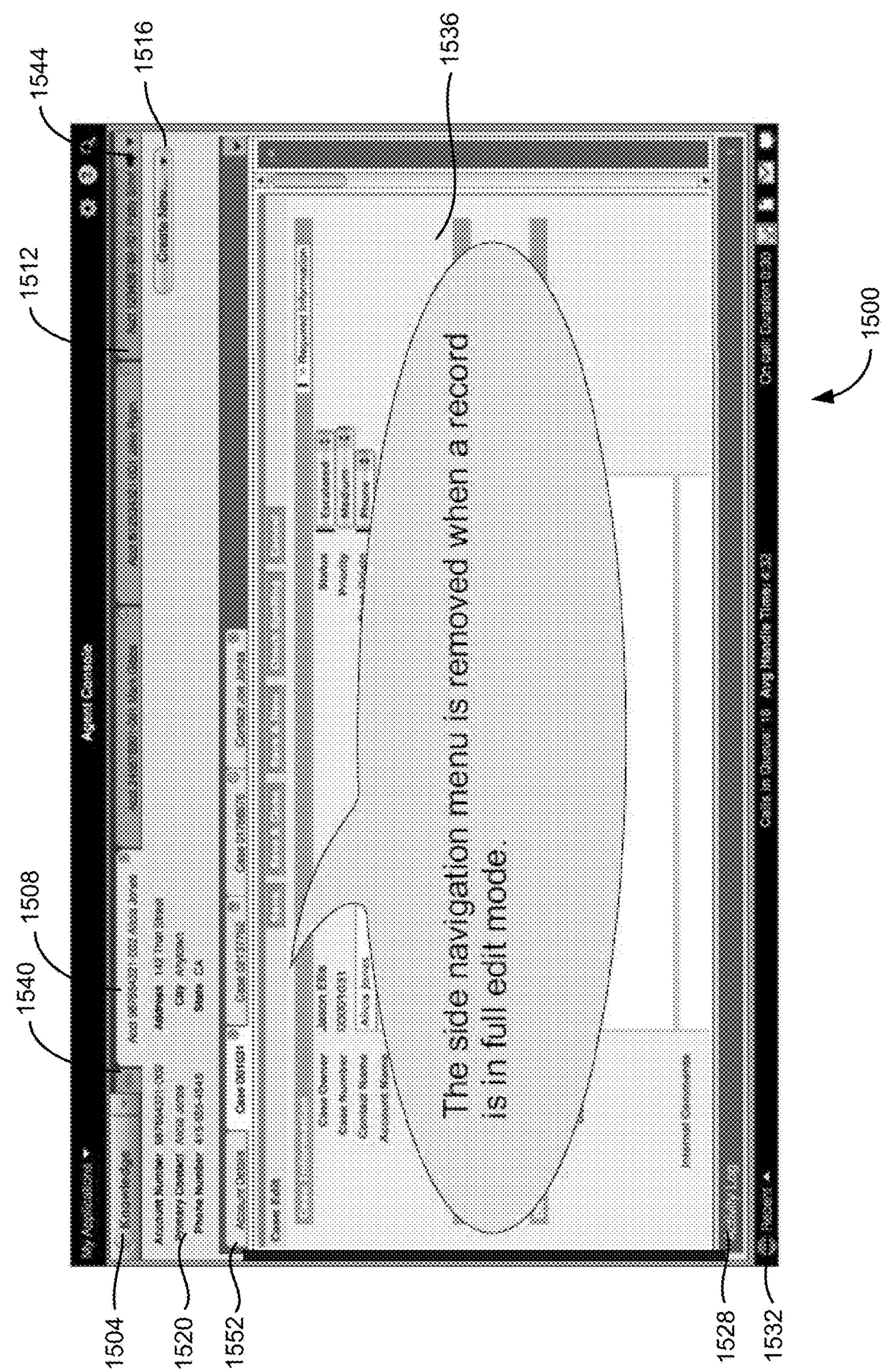

As shown in FIGS. 22 and 23, the sidebar 1524 may display lists related to the record displayed in the main view 1536, and may include a scroll bar to access links that overflow the sidebar area. The sidebar 1524 may be removed in certain instances, such as when a record is being edited, as shown in FIG. 30.

Figure 17:
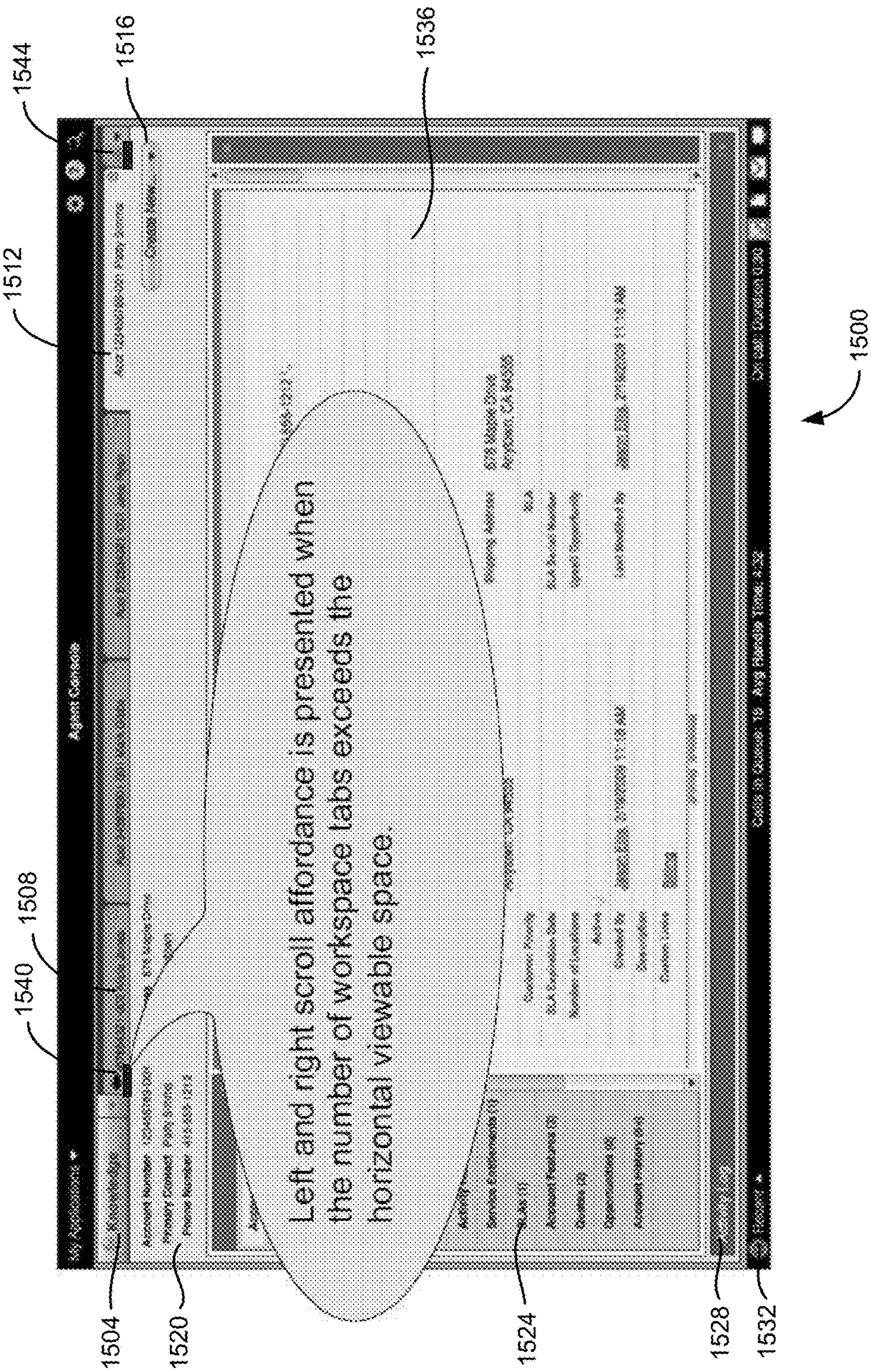
Figure 18:
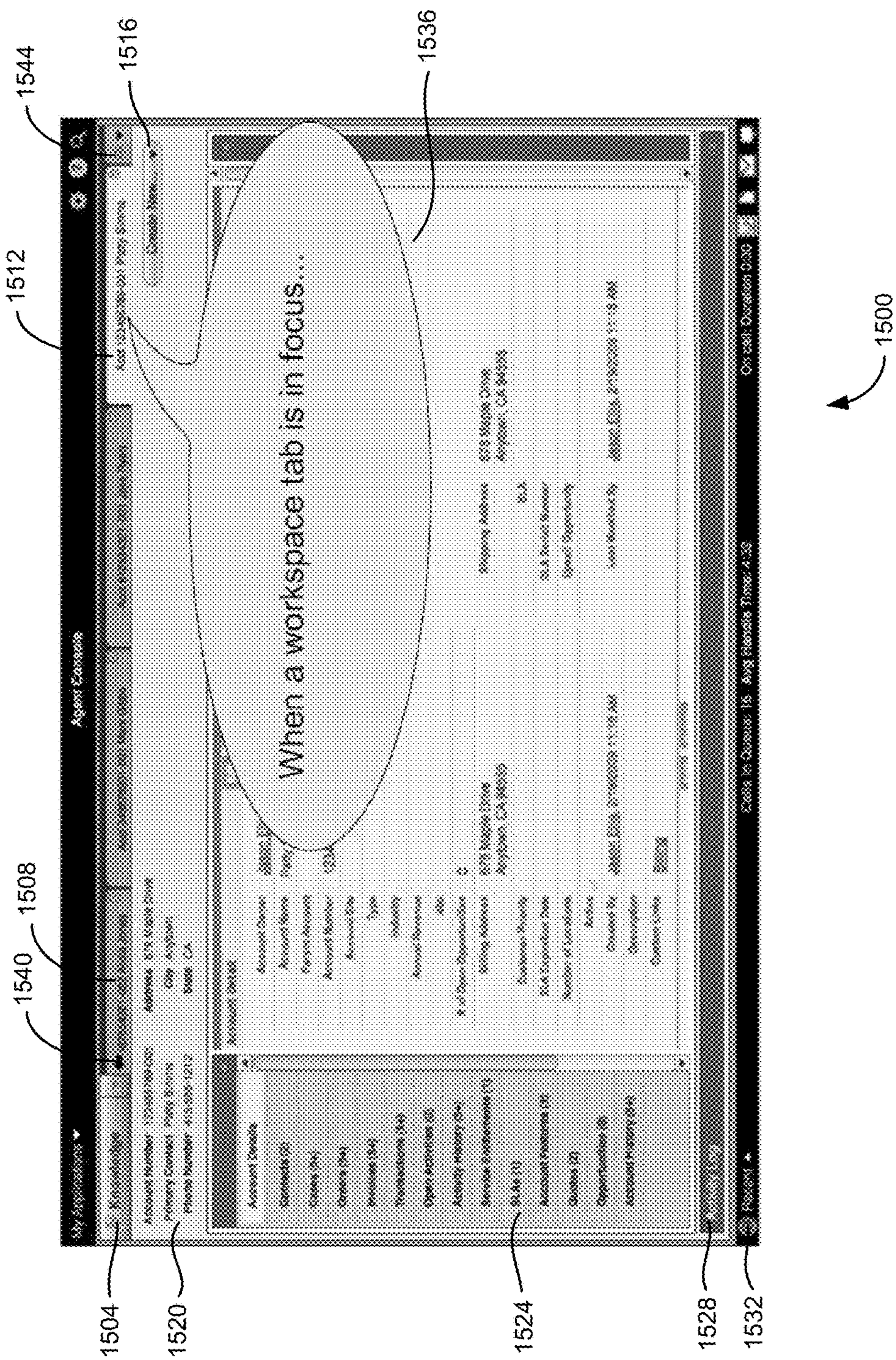
Figure 19:
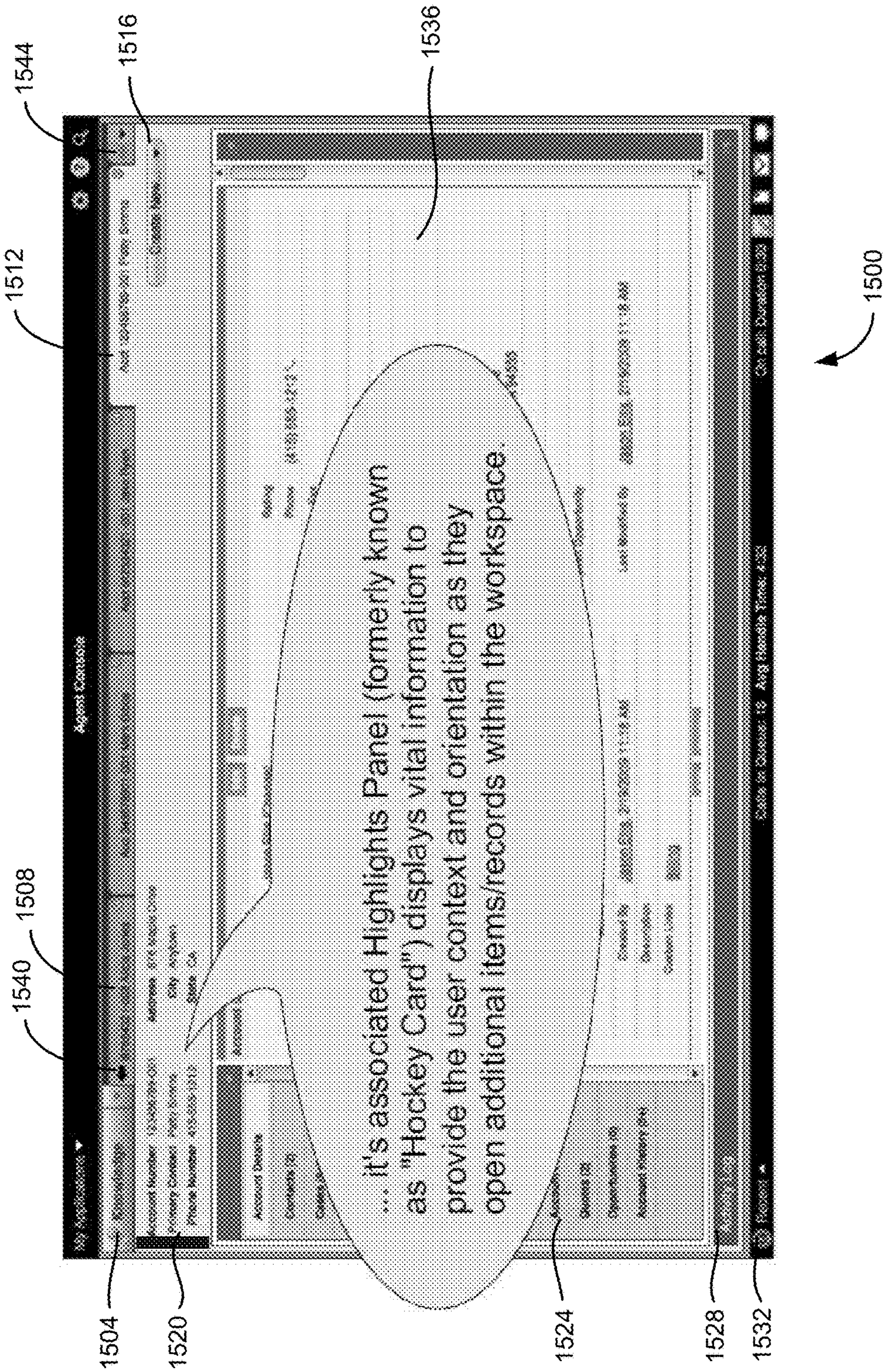
Figure 20:
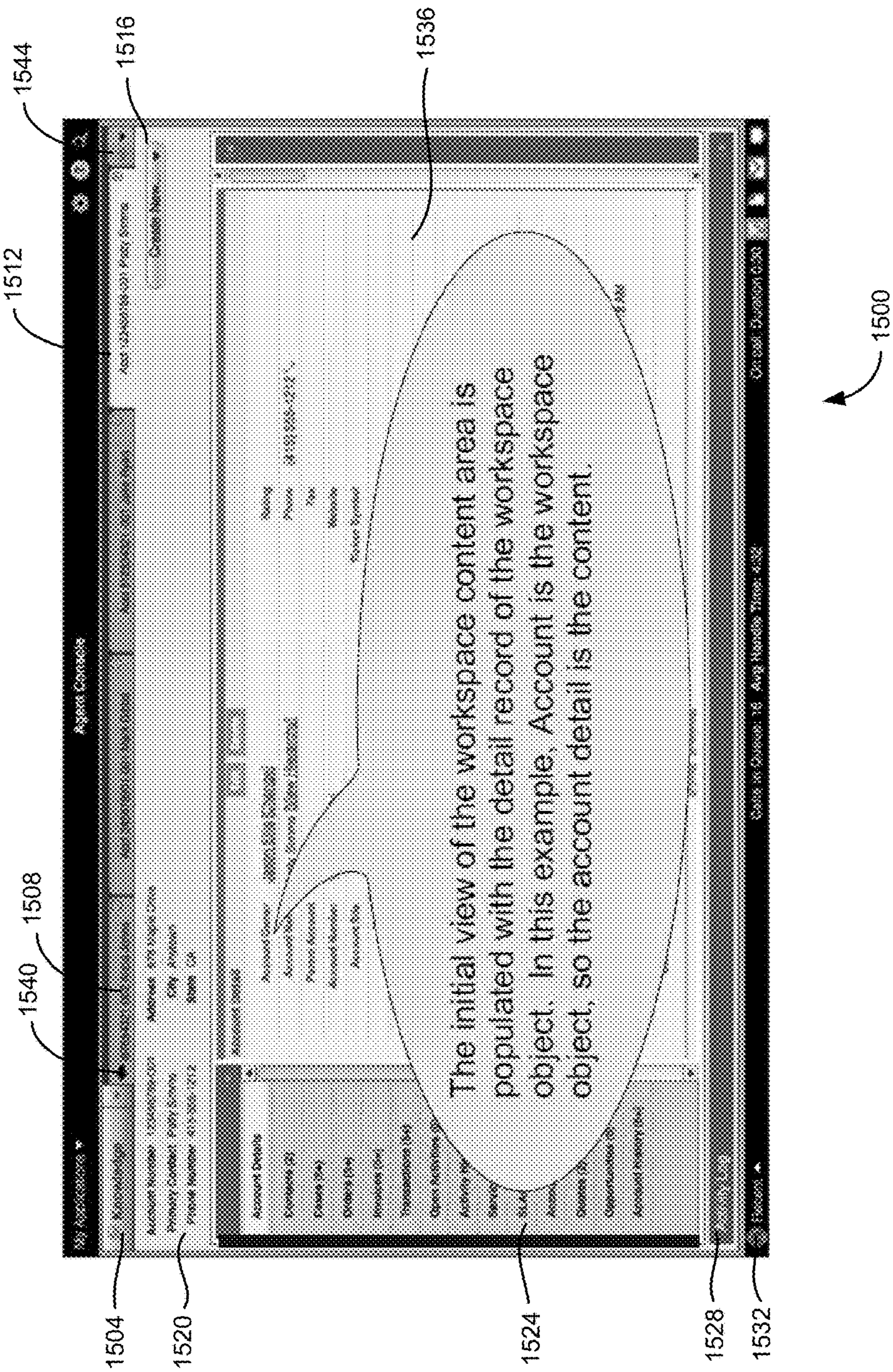
Figure 27:
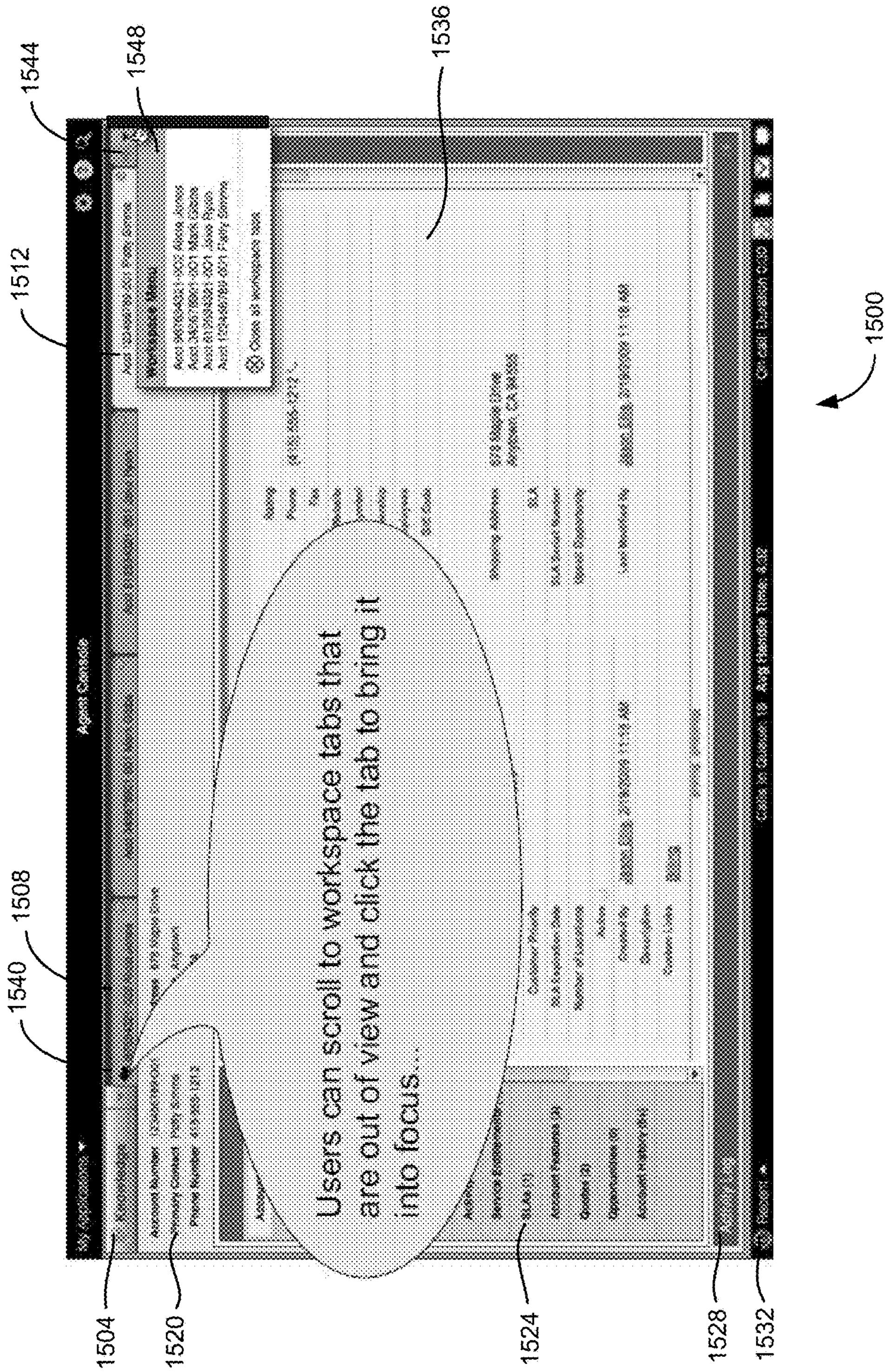

As is shown in FIGS. 17 and 27, one or more navigation mechanisms such as scroll buttons 1540 and 1544 may be used to navigate the primary tabs if the number of tabs displayed exceeds the horizontal viewable space. Alternately, tabs may be resized or displayed in more than one row. When a primary tab such as tab 1512 is in focus, as shown in FIG. 18, the main view area 1536 may initially display detail record information for the primary tab, as is shown in FIG. 20.

Figure 36:
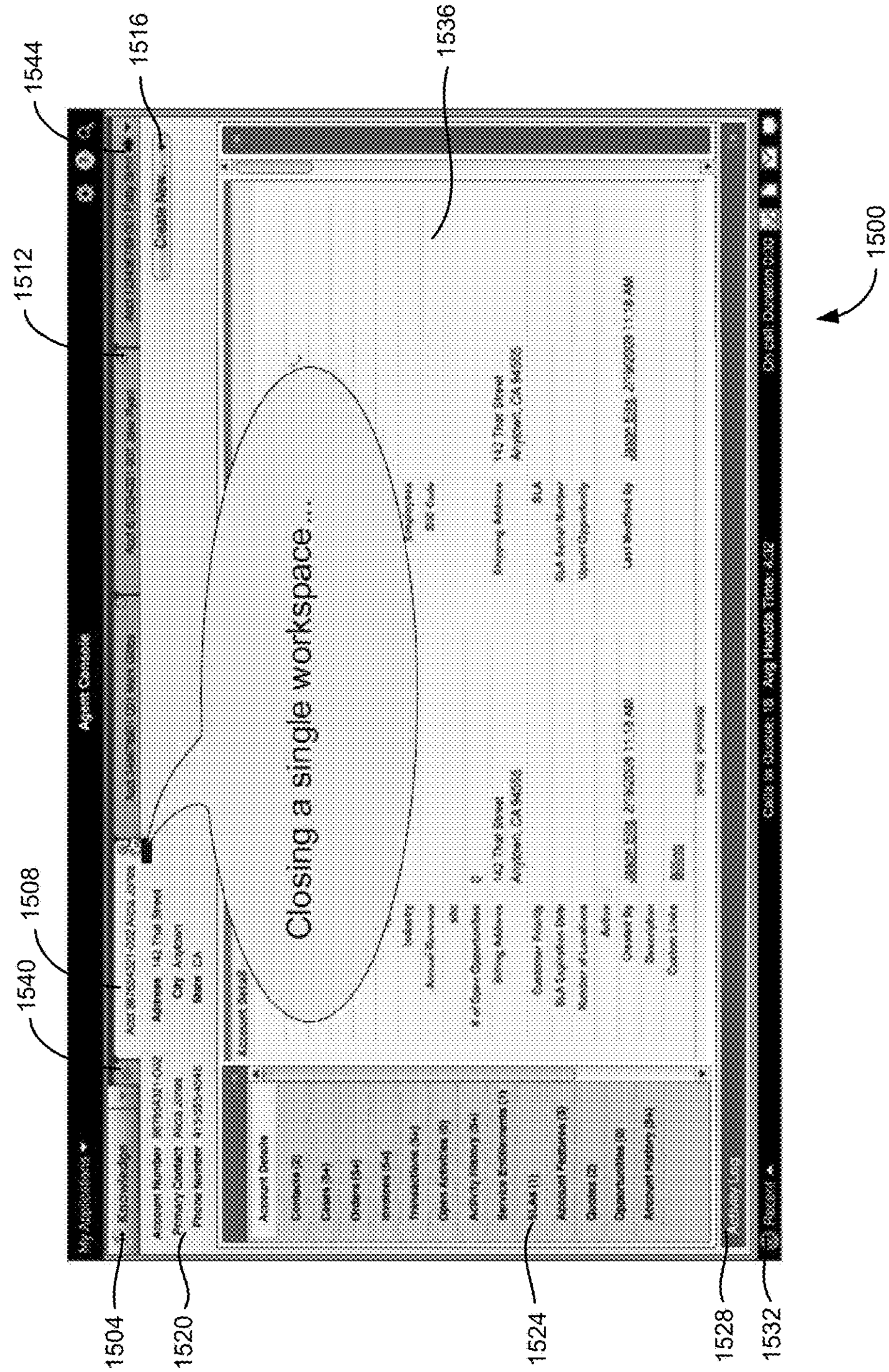
Figure 37:
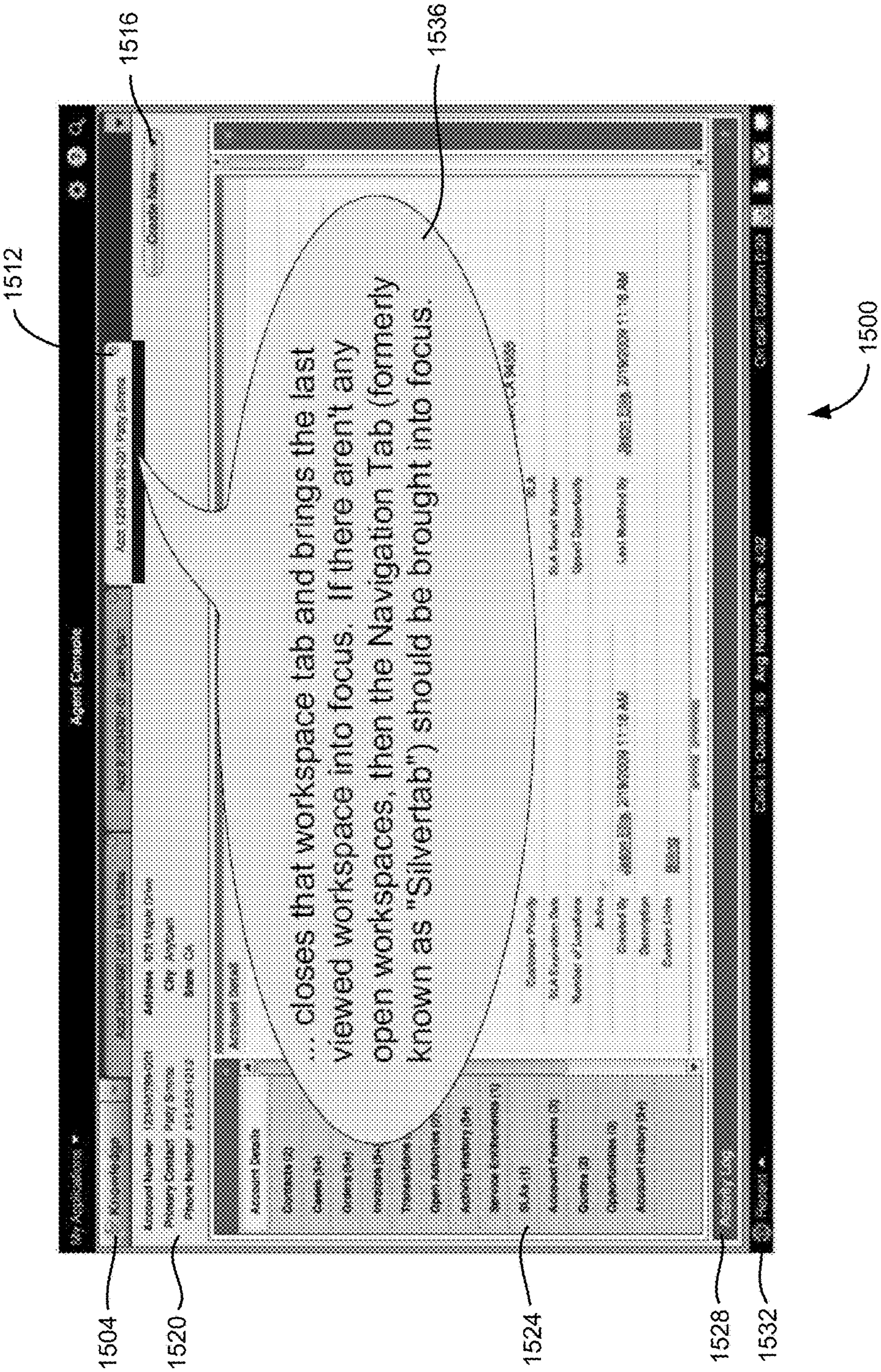

In one or more embodiments, as shown in FIG. 36, an individual primary tab may be closed using a close button. When an individual tab is closed, the last-viewed primary tab or the navigation tab may be brought into focus, as shown in FIG. 37.

Figure 26:
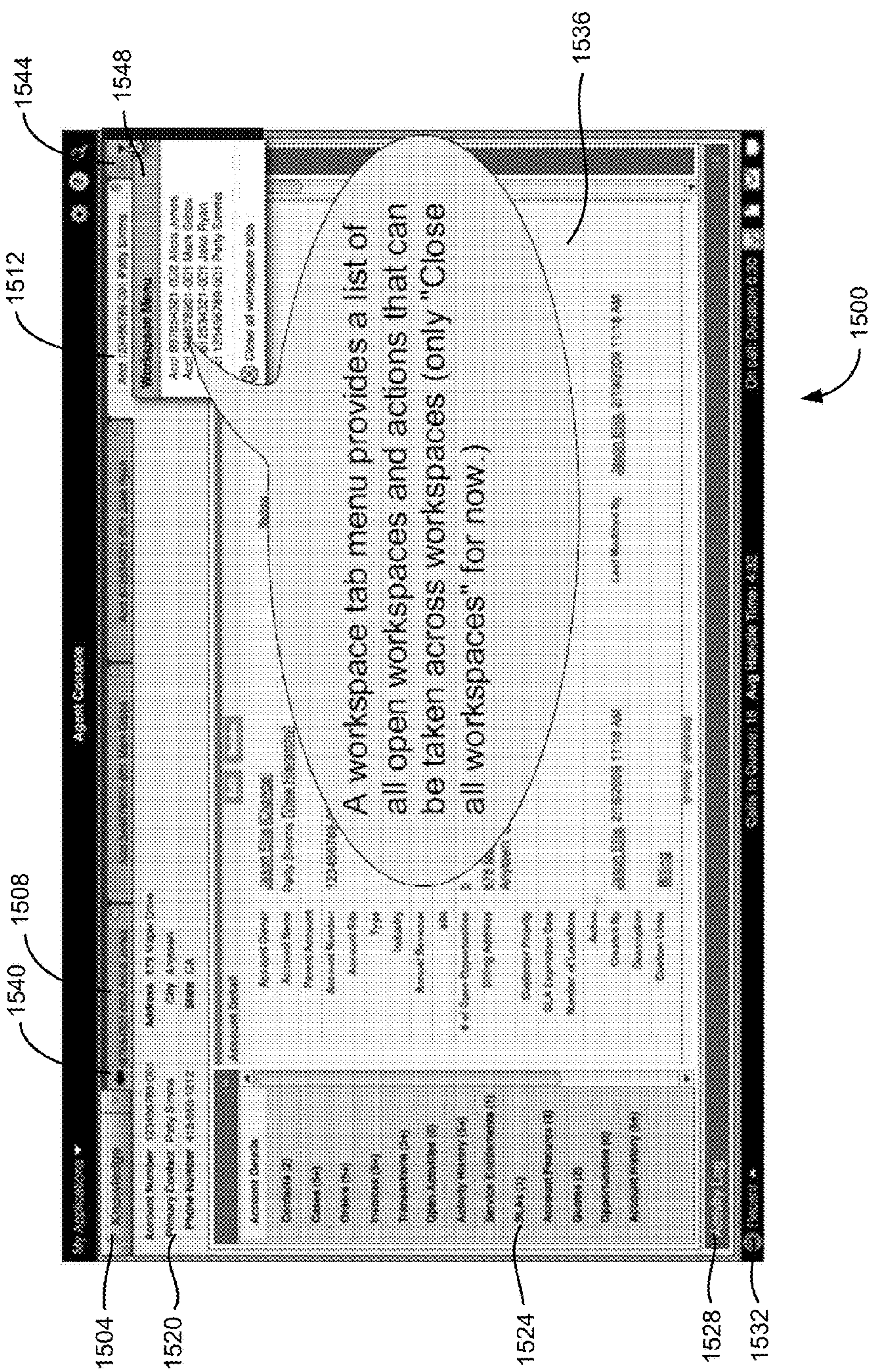
Figure 28:
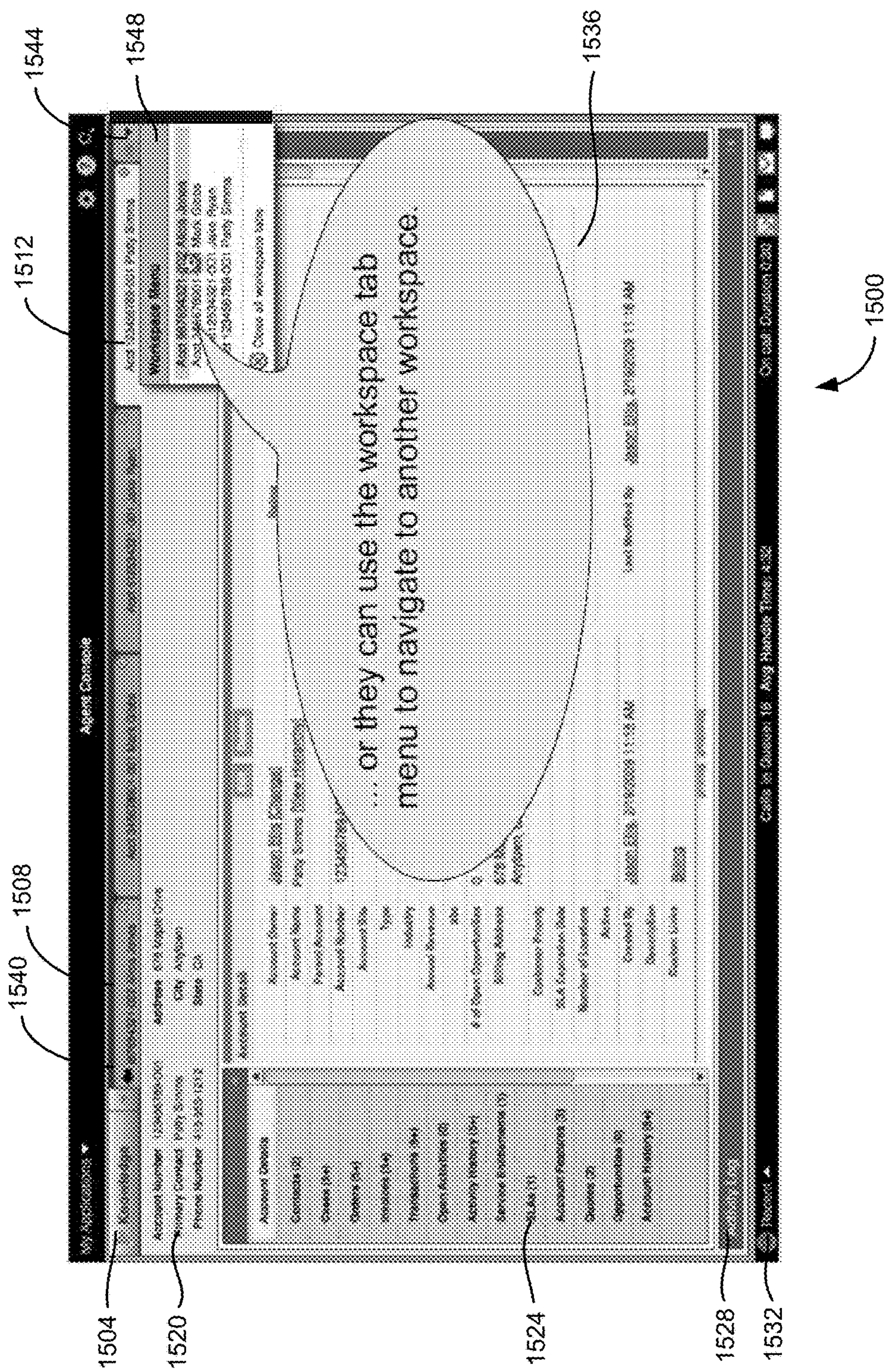

The graphical user interface shown in FIG. 26 includes a primary tab menu 1548. The primary tab menu 1548 may provide a list of open primary tabs and/or actions that may be taken across primary tabs. In the example shown in FIG. 26, the only action that may be taken across primary tabs is to close all primary tabs. However, other actions may be provided, such as saving all primary tabs or refreshing all primary tabs. As shown in FIG. 28, the primary tab menu 1548 may also be used to navigate to other primary tabs.

Figure 21:
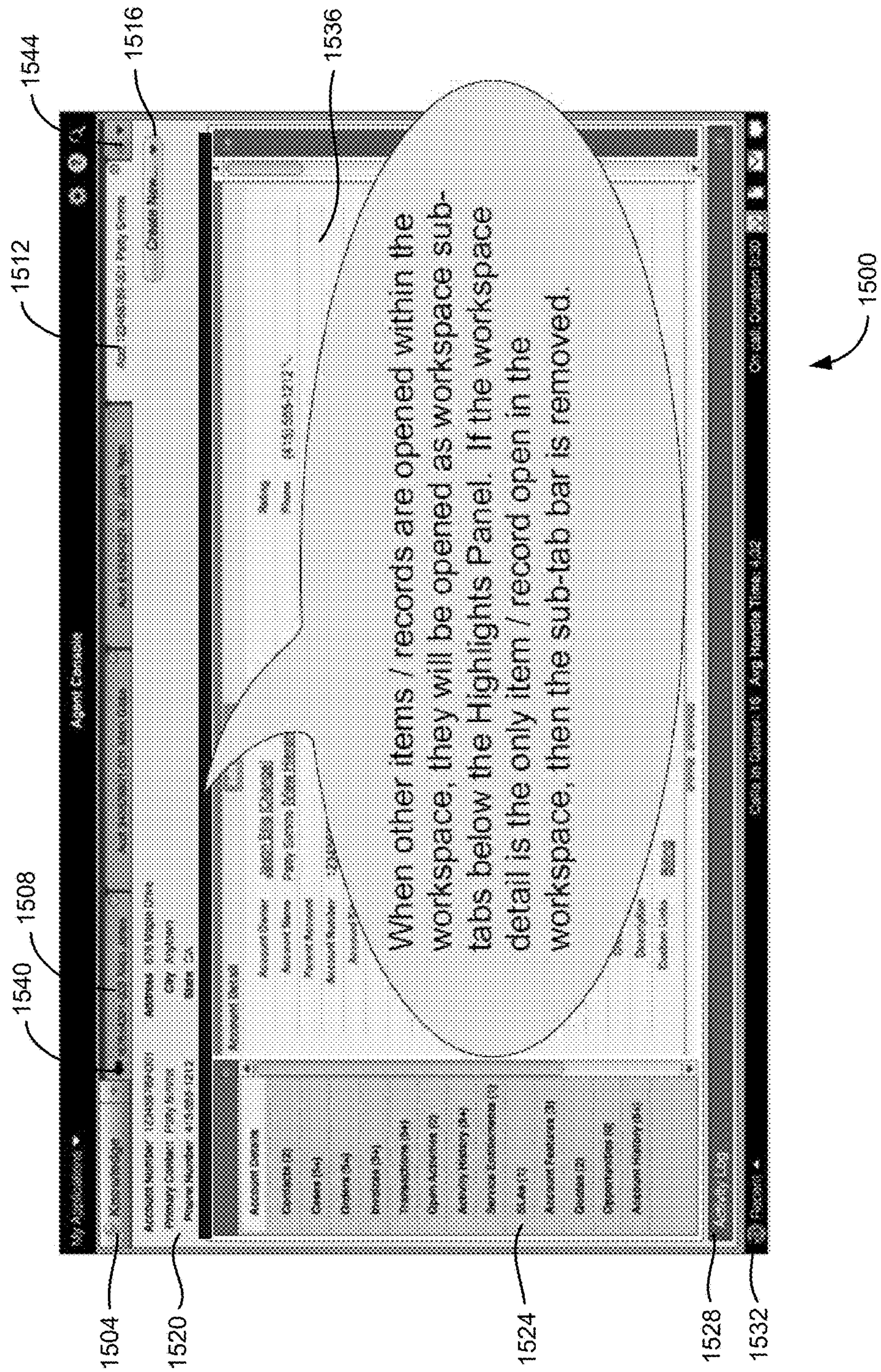
Figure 29:
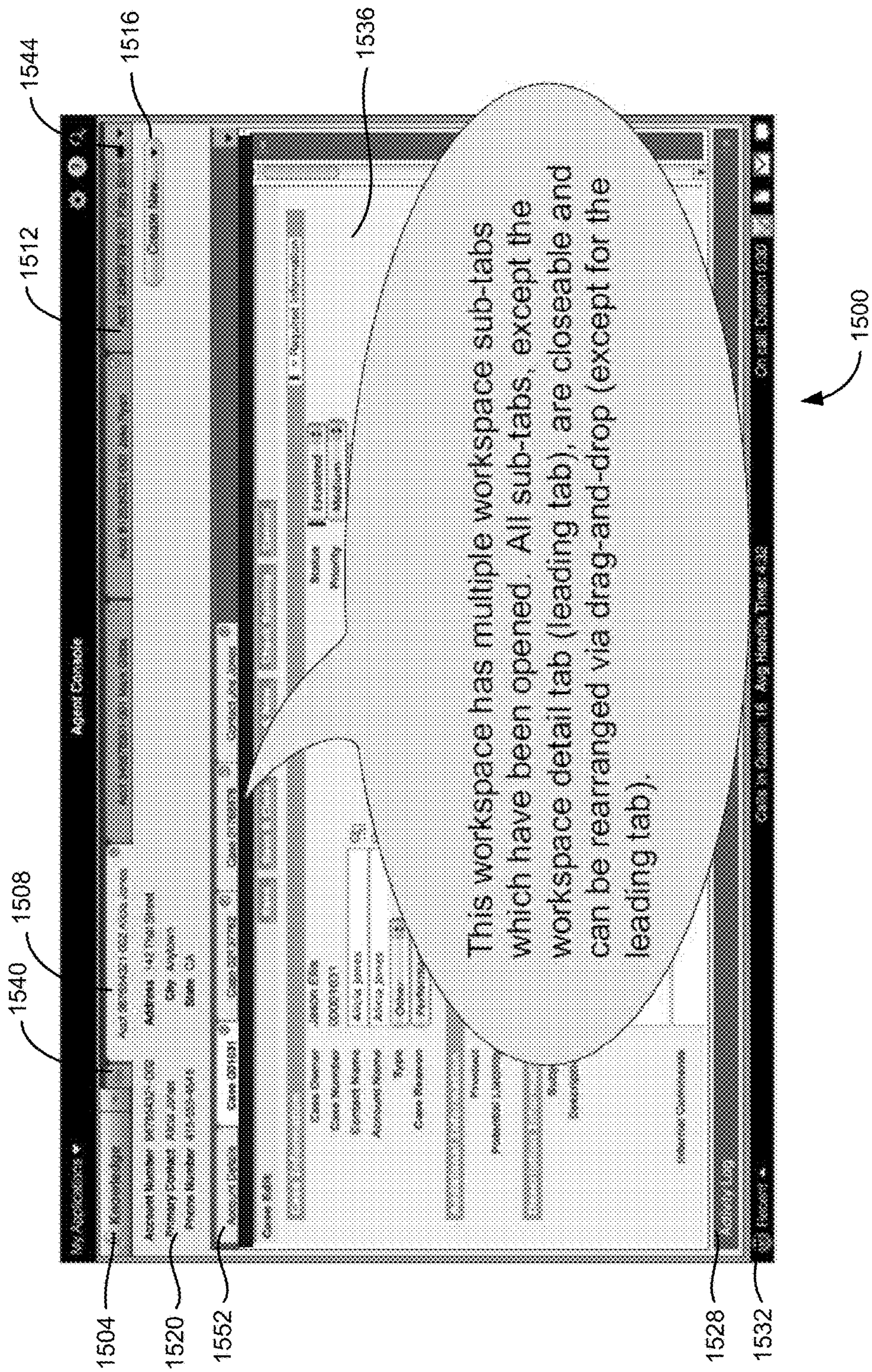
Figure 31:
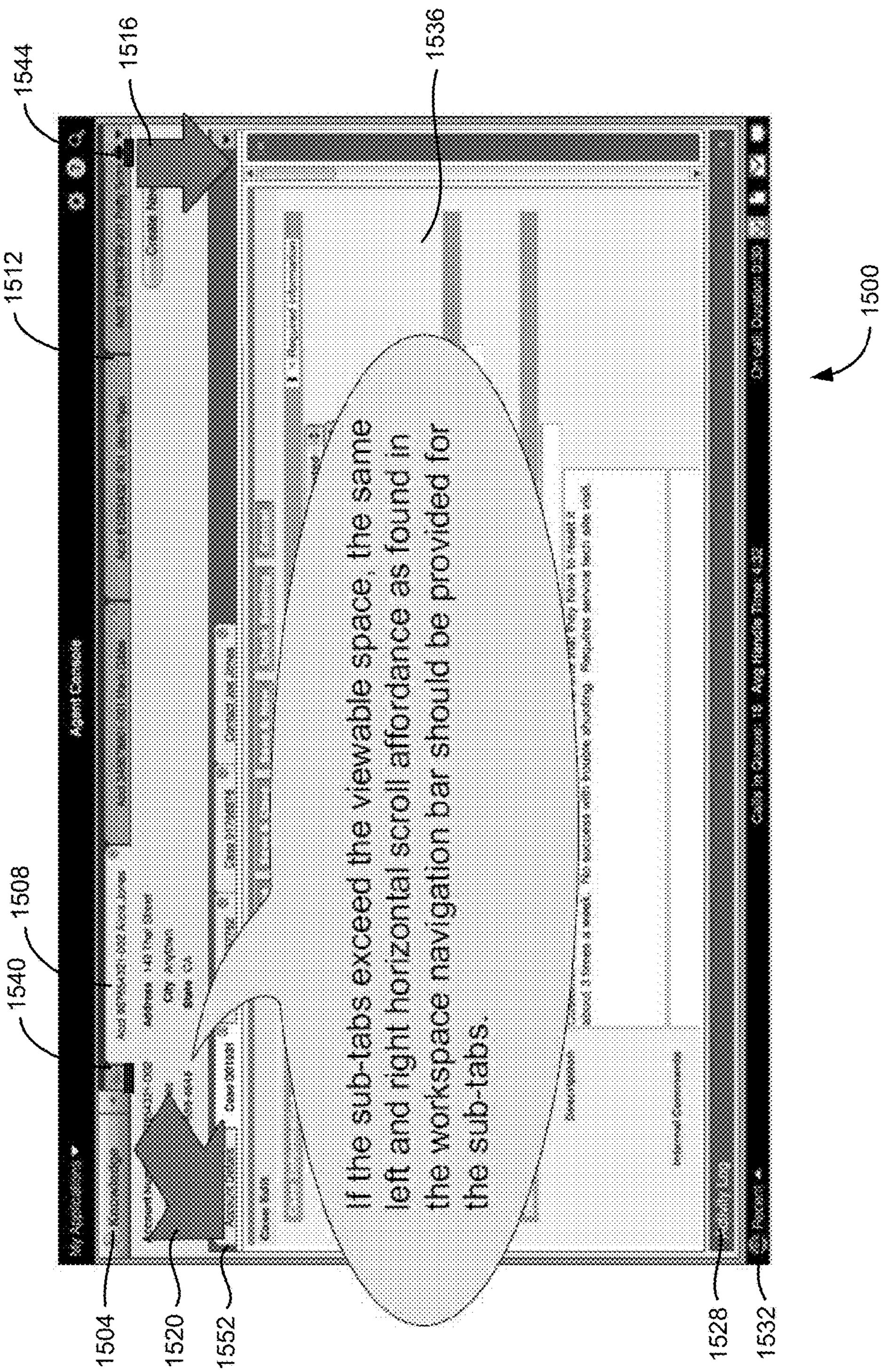

The graphical user interface shown in FIG. 29 includes a subtab bar 1552. In one or more embodiments, items or records other than the primary tab object opened within a primary tab may be displayed as subtabs in subtab bar 1552. However, the subtab bar may be absent if the workspace detail page is the only item open, as shown in FIG. 21. As with primary tabs, subtabs may be rearranged via a drag-and-drop interface, as shown in FIG. 29. However, one or more subtabs may be arranged in a fixed position. For example, the workspace detail page associated with the primary tab record may be fixed as the first subtab in the subtab bar 1552, as shown in FIG. 29. As with primary tabs, a mechanism such as scroll buttons may be used to navigate the subtabs tabs if the number of tabs displayed exceeds the horizontal viewable space of the subtab bar 1552, as shown in FIG. 31.

Figure 32:
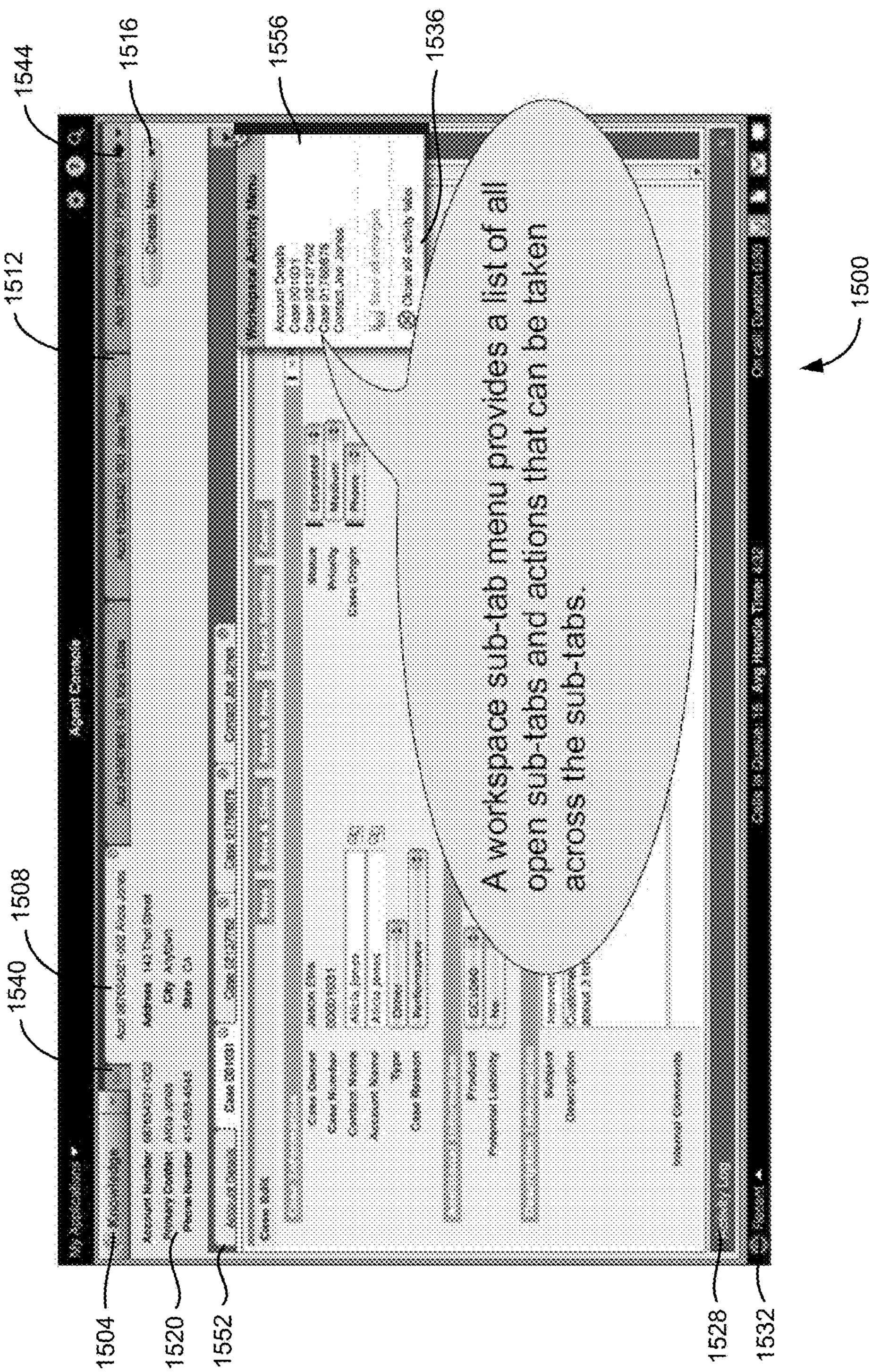
Figure 33:
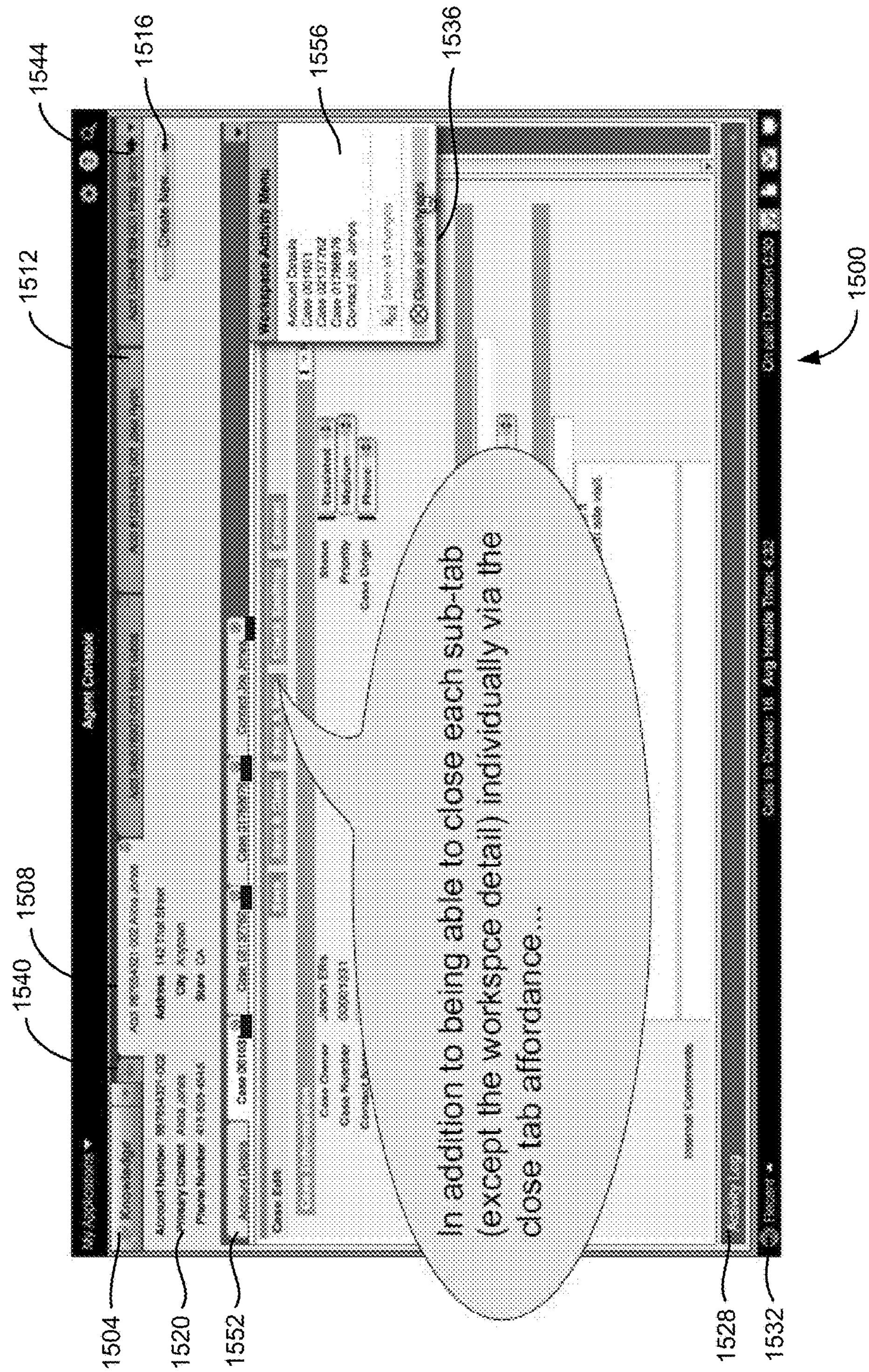
Figure 34:
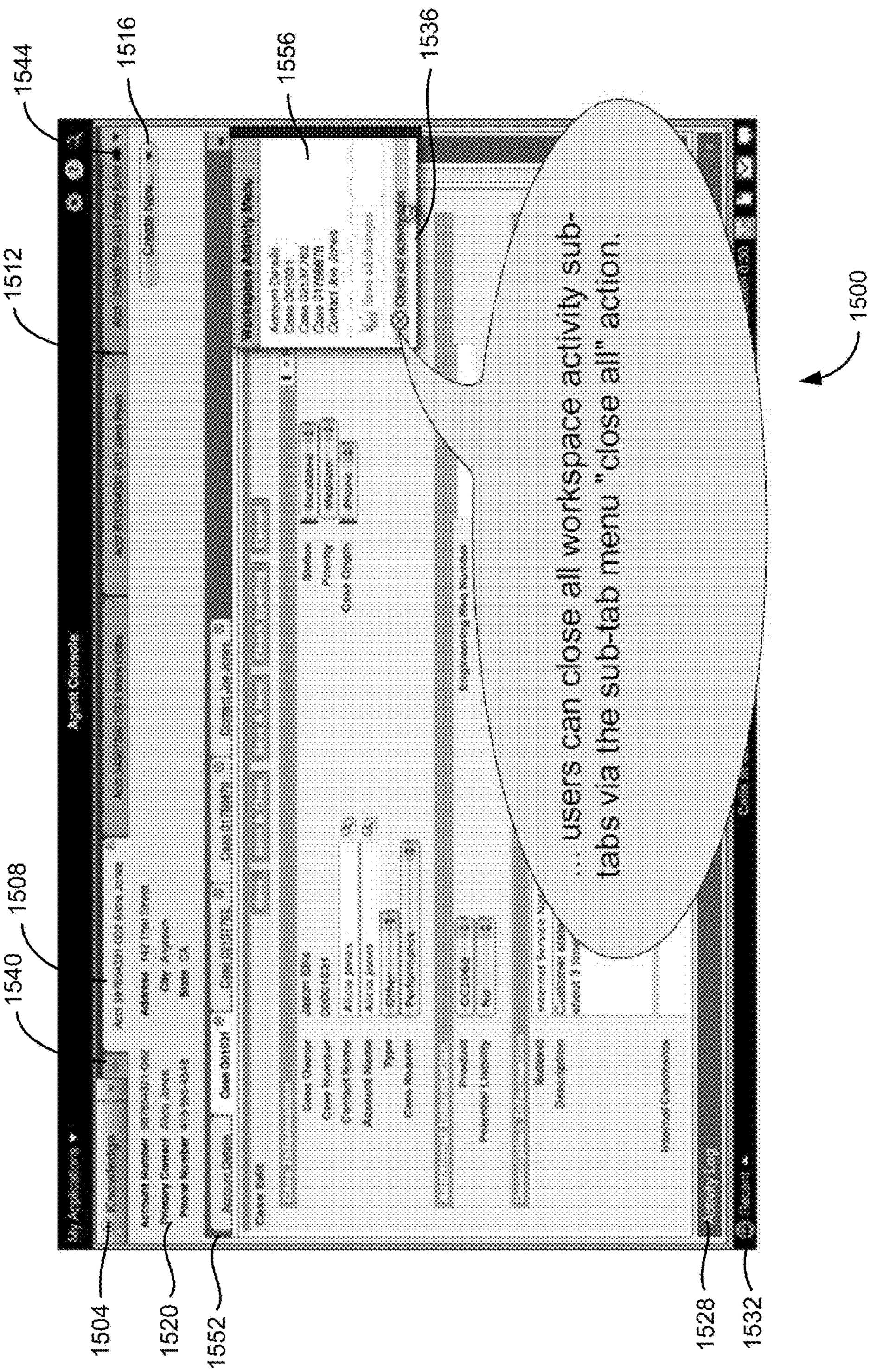
Figure 35:
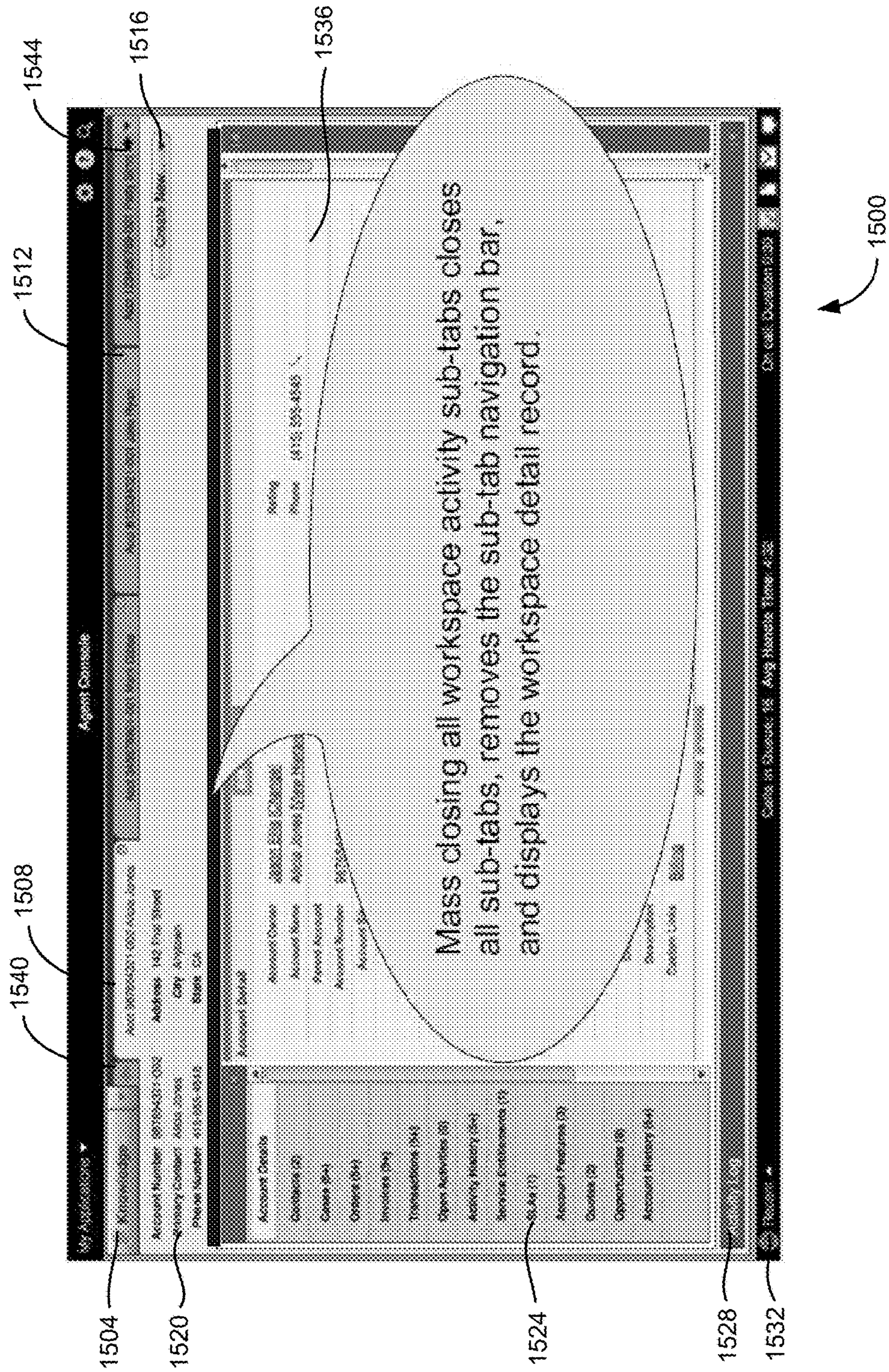

In one or more embodiments, as shown in FIG. 32, a workspace subtab menu 1556 may provide a list of open subtabs and/or one or more actions that can be taken across the subtabs. For example, all subtabs may be closed at one time using a "close all" button 1536 on the subtab menu 1556, as shown in FIG. 34. Alternately, or additionally, each subtab may be closed individually using a close button such as the close buttons shown on the subtab bar 1552 in FIG. 33. Closing all subtabs may result in the subtab navigation bar being removed and/or the primary tab detail record being displayed, as shown in FIG. 35.

The operations shown in FIG. 2 illustrate a method for opening a record tab according to one or more embodiments. The service cloud console may be operable to open and/or close record tabs without refreshing the web page in which the service cloud console user interface is displayed. Thus, an agent may open and/or close record tabs, which may include communications between the client machine and the server, without interrupting the user of the service cloud console.

At 204, an action to open a new tab for a record is identified. In some instances, the identified action may include an action taken by a user with the intention of opening a new record. For example, the identified action may be a mouse click or keyboard press indicating that a record should be open. In other instances, the identified action may include a condition or result that occurs in one or more processes. For example, a record may be automatically opened when a call is received.

In one or more embodiments, the action to open a new tab may be identified in various ways. In some instances the action may be identified by determining user input using one or more client-side web technologies, such as HTML or JavaScript®, to detect user interaction with the user interface. In some instances, the action may be identified by receiving a message from the server (e.g., an HTTP message, an Ajax message, etc.). For example, the server may send a message to the browser indicating that a call is being routed to the client machine.

In some embodiments, identifying the action to open a new tab for a record may include identifying the record itself. In some instances, an identifier for the record may be determined when the action is detected. For example, the identifier may be included in a link clicked by a user. In other instances, an identifier for the record may be determined based on cached information at the client and/or communication with the server.

At 208, a determination is made as to whether the record tab is already open. In some embodiments, the determination may be made based on information at the client machine. For example, a list of open tabs may be maintained at the client machine, and an identifier associated with the identified record may be compared against that list.

In some embodiments, the determination as to whether the record tab is already open may be made in cooperation with the server. For example, the server may query a database to determine an identifier associated with the record. As another example, the server may maintain a list of records opened at the client machine. The server may then return to the client an indication as to whether the record tab is already open.

At 212, a determination is made as to whether to open the record in a primary tab. In one or more embodiments, a record (e.g., a database row) may be either a primary object (e.g., a workspace object) or a secondary object. For example, a customer account may be treated as a primary object, while a case may be treated as a secondary object.

The determination as to whether to open the record in a primary tab may be based upon whether the record represents a primary or workspaceable object (e.g., an account), or a secondary object associated with a primary object (e.g., a case associated with an account). When record is associated with a workspace object, the record may be termed a "child" of the workspace "parent" object.

If the record is a workspace object, such as a customer account, then the record may open in a primary tab. If instead the record is a secondary object that is associated with a workspace object, such as a case that is associated with a customer account, then the record may open in a secondary tab.

If the record is a secondary object that is not associated with a workspace object, such as a case for which an account has not yet been opened, then the record may open in a primary tab. If the record is a custom object that does not have an assigned category or association, then the record may open as a primary tab. If a custom record or other secondary object is opened in a primary tab, then the record's own highlight's panel layout may be used to display a highlights panel for the workspace.

In some embodiments, the determination 212 may be made at the client machine. For example, the client machine may maintain information indicating certain record types that should open as primary or secondary tabs. In one or more embodiments, the determination 212 may be made in conjunction with communication with the server. For example, the client machine may transmit to the server a record type and/or record identifier associated with the record. The server may then conduct a database query and then return an indication as to whether to load the record in a primary or secondary tab.

At 220, the primary tab ID for the parent record is identified. In some instances, the primary tab ID may be identified at the server, for example by querying a database after the record has been identified by the client machine. In other instances, the primary tab ID may be identified at the client machine, for example by consulting cached tab information stored at the client machine.

At 216, the record is retrieved from the server and opened in a new primary tab. Retrieving the record may involve one or more database queries to collect data and/or layout information for display in some or all of the user interface components that may be associated with a tab, including main view information, contextual information, overview panel information, etc. Since the record is opened as a primary tab, highlights panel information may also be retrieved.

The retrieved information is then transmitted from the server to the client machine. When the retrieved record information is received at the client machine, the client machine opens the record in a new primary tab. The client machine may change focus to the new tab in the user interface once the new tab is open. However, the context is maintained so that other tabs that were previously open may be selected.

At 224, a determination is made as to whether the parent record can be opened. The parent record may not be available for opening if, for example, the user lacks permission to open the parent record, the parent record does not exist, the parent record is invalid, etc. If the parent record is not available for opening, then the parent record may be opened in a new primary tab, as shown at 216.

In some instances, the determination as to whether the parent record can be opened may be made on the client machine. For example, if the primary tab ID for the parent record is null or otherwise invalid, then the client machine may determine that the parent record may not be opened without communicating with the server.

In some instances, the determination as to whether the parent record can be opened may be made on the server. For example, the server may determine whether the user has permission to open the parent record by comparing one or more permissions associated with the user's profile to one or more permissions required to open the parent record.

At 228, a determination is made as to whether the parent record tab is already open. In some embodiments, the determination may be made based on information at the client machine. For example, a list of open tabs may be maintained at the client machine, and an identifier associated with the parent record may be compared against that list.

In some embodiments, the determination as to whether the record tab is already open may be made in cooperation with the server. For example, the server may maintain a list of records opened at the client machine. The server may then return to the client an indication as to whether the parent record tab is already open.

At 232, the parent record is retrieved from the server and opened as a primary tab. Retrieving the parent record may involve one or more database queries to collect data and/or layout information for display in some or all of the user interface components that may be associated with a tab, including main view information, contextual information, overview panel information, etc. Since the parent record is opened as a primary tab, highlights panel information may also be retrieved.

The retrieved record information is then transmitted from the server to the client machine. When the retrieved record information is received at the client machine, the client machine opens the parent record in a new primary tab. The client machine may change focus to the new tab in the user interface once the new tab is open. However, the context is maintained so that other tabs that were previously open may be selected.

At 236, the record is retrieved from the server and opened in a new subtab of the primary tab. Retrieving the record may involve one or more database queries to collect data and/or layout information for display in some or all of the user interface components that may be associated with a tab, including main view information, contextual information, overview panel information, etc.

The retrieved record information is then transmitted from the server to the client machine. When the retrieved record information is received at the client machine, the client machine opens the record in a new subtab of the primary tab. The client machine may change focus to the new subtab in the user interface once the new subtab tab is open. However, the context is maintained so that other tabs that were previously open may be selected.

In one or more embodiments, a record tab may include a tab label. A tab label may include information associated with the page, such as the name and/or type of page being opened. For example, an account record called Acme Systems may open with a tab labeled "Account: Acme Systems." As another example, tabs for external pages may be labeled as "External Page," since page titles currently may not be retrieved from HTML iframes. In some embodiments, the tab label of a tab may change when the tab or a subtab changes (e.g., when a page is moved from detail mode to edit mode).

In one or more embodiments, tab labels that exceed the tab size may be truncated. For example, excess characters may be replaced by an ellipsis. In some embodiments, tabs may be dynamically resized according to the number of tabs in existence.

In one or more embodiments, one or more of the operations shown in FIG. 2 may be performed at the client machine, at the server, or using a client/server combination. Where an operation is performed may be based on where information is located. For example, the client machine may maintain cached information that allows the client machine to perform one or more operations without communicating with the server. However, cached information may in some instances be insufficient to perform an operation without server interaction.

In some embodiments, one or more of the operations shown in FIG. 2 may be performed in a different order than is shown. For example, two or more operations that involve communication between the client machine and server may be combined into fewer operations in order to reduce the burden on the server and/or reduce client-side delays caused by communicating with the server. For example, operations 212 and 216 may be combined into a single client-server interaction in some instances.

Figure 3:
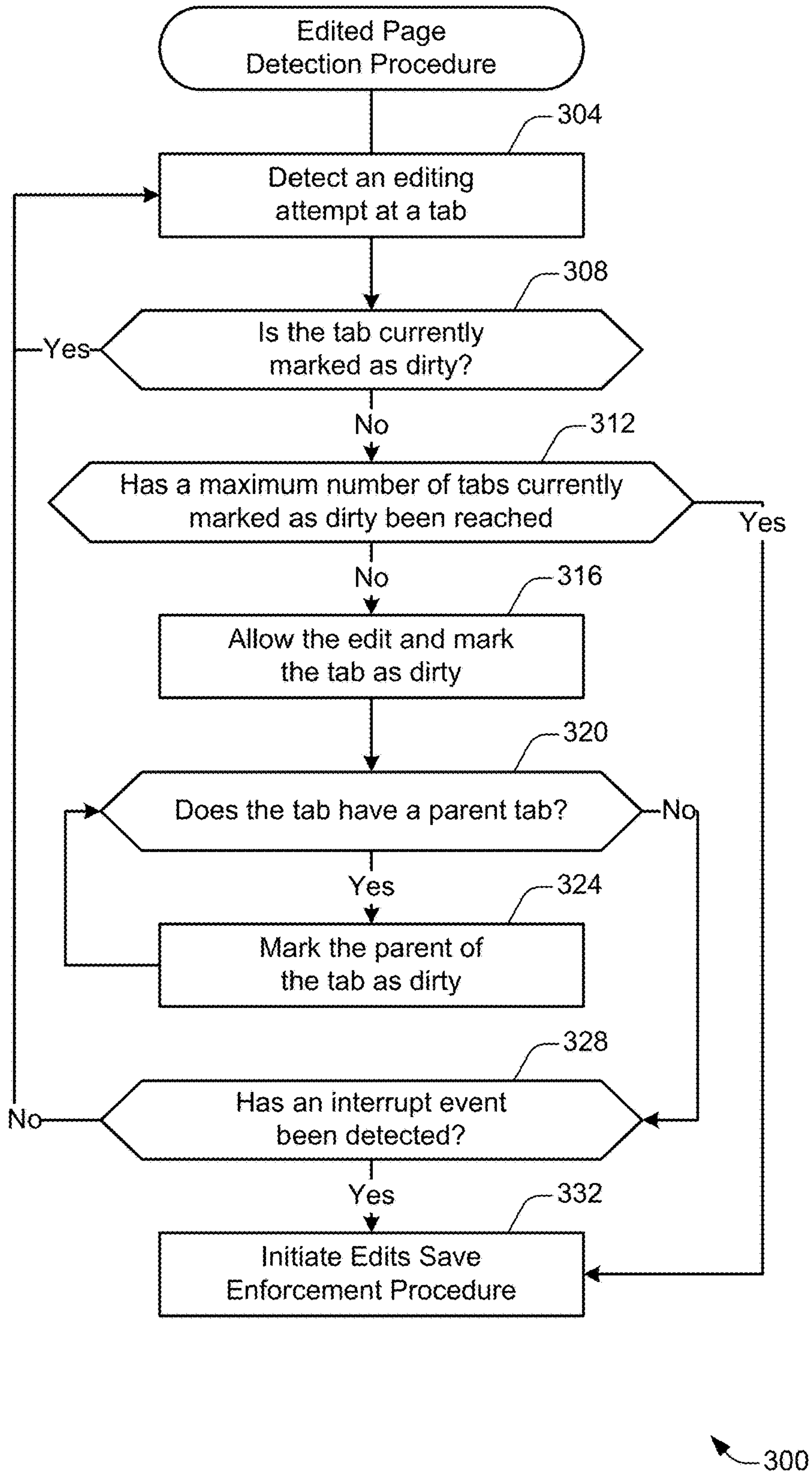
FIG. 3 shows a flow diagram of a method 300 for detecting an edited page, performed in accordance with one embodiment.

FIG. 3 shows a flow diagram of a method 300 for detecting an edited page, performed in accordance with one embodiment. In some embodiments, the edited page detection method 300 may allow the console application to limit the information that has been entered at the console but has not yet been saved to the server. The edited page detection method 300 may allow the console application to initiate an edits save enforcement method (e.g., method 400 shown in FIG. 4) to notify the user when edited information may be lost.

Figure 43:
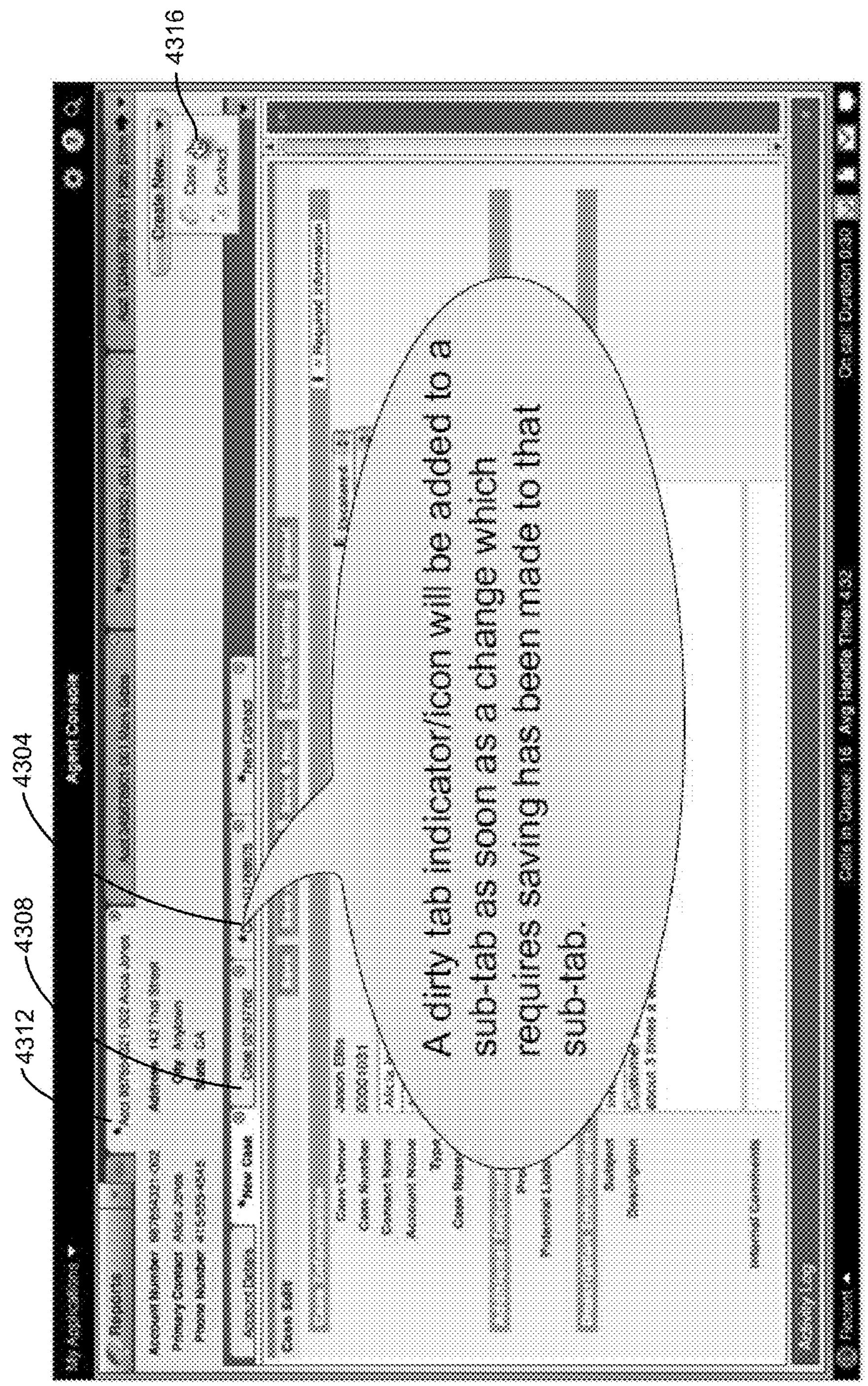
Figure 44:
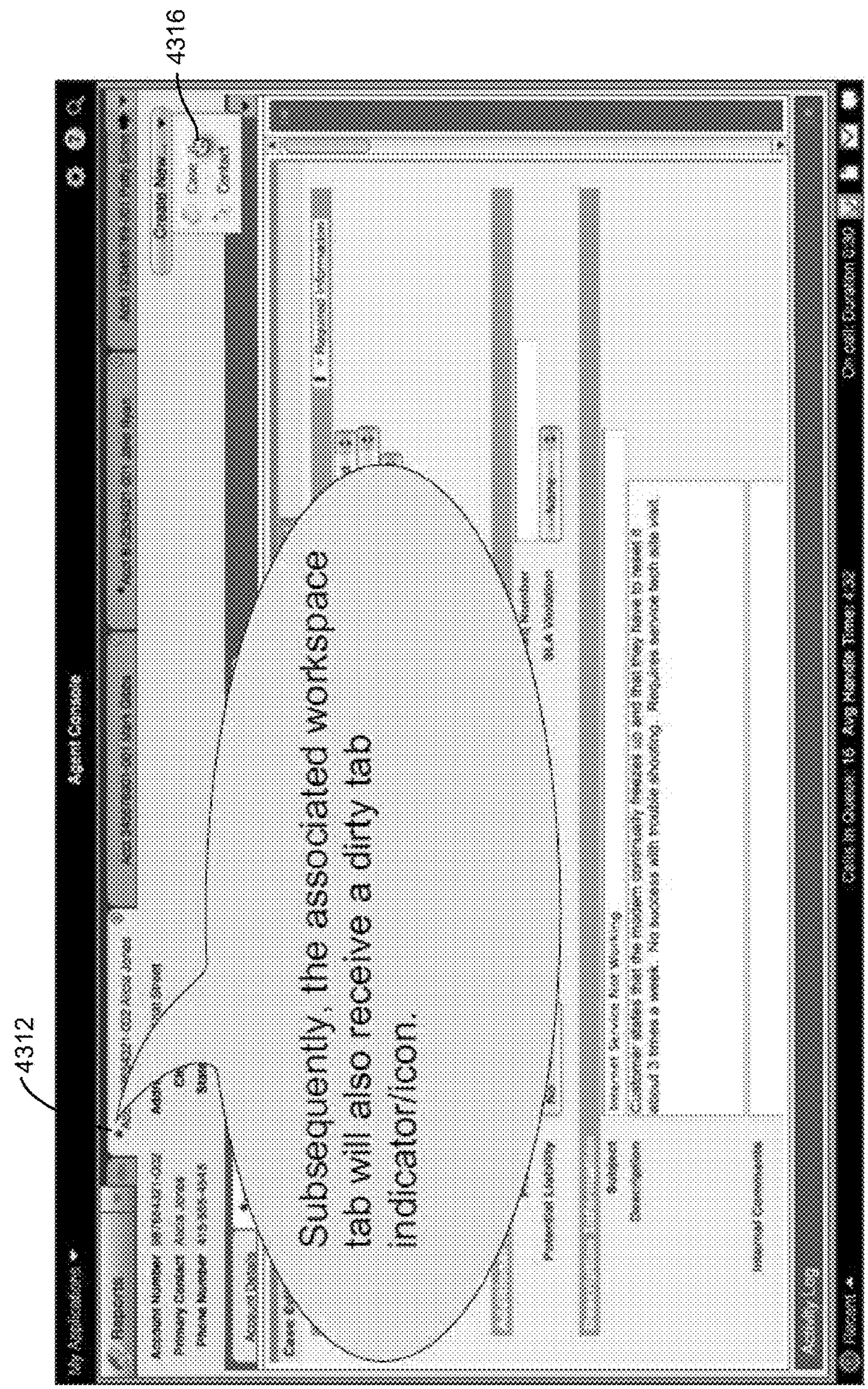
Figure 45:
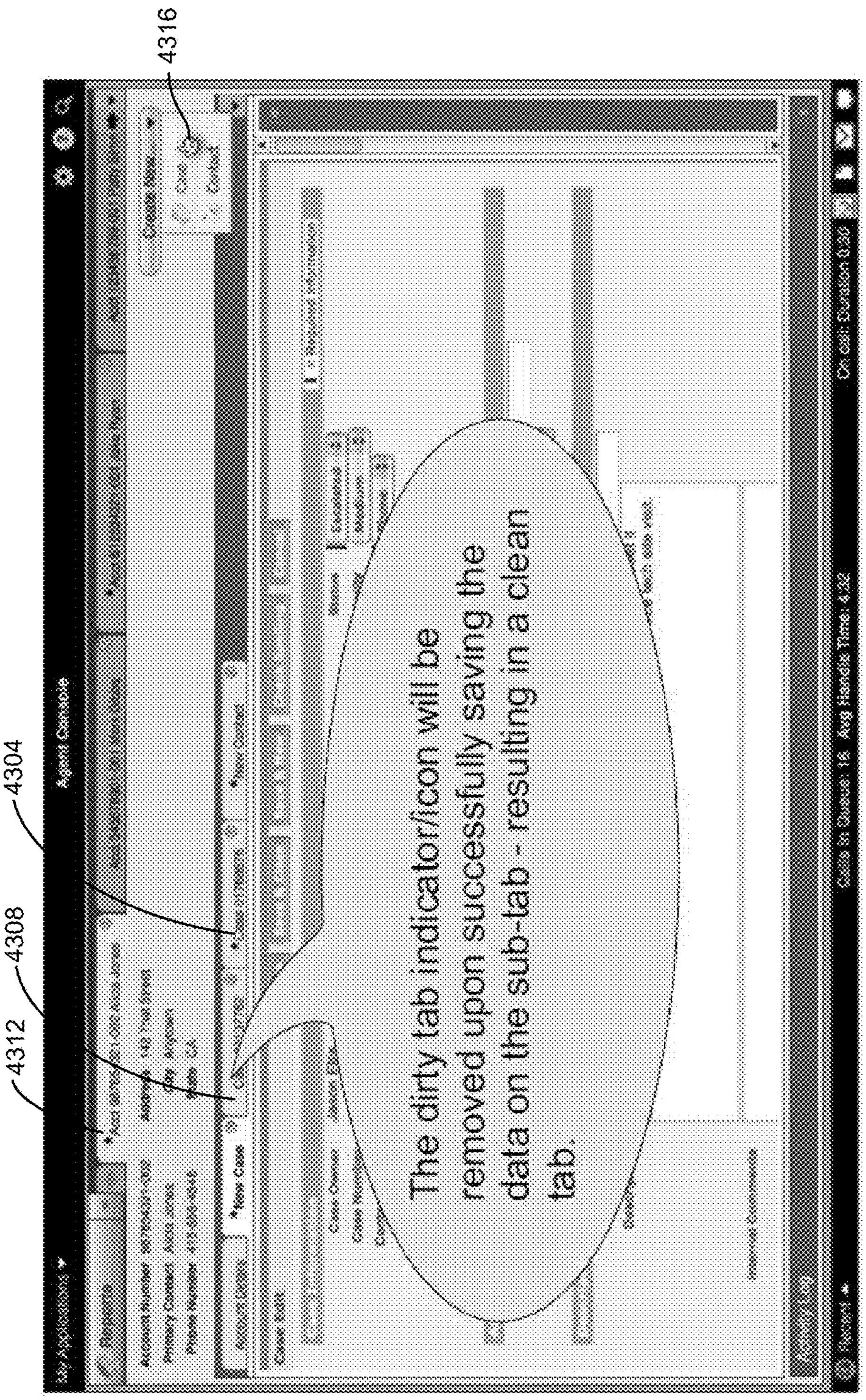
Figure 46:
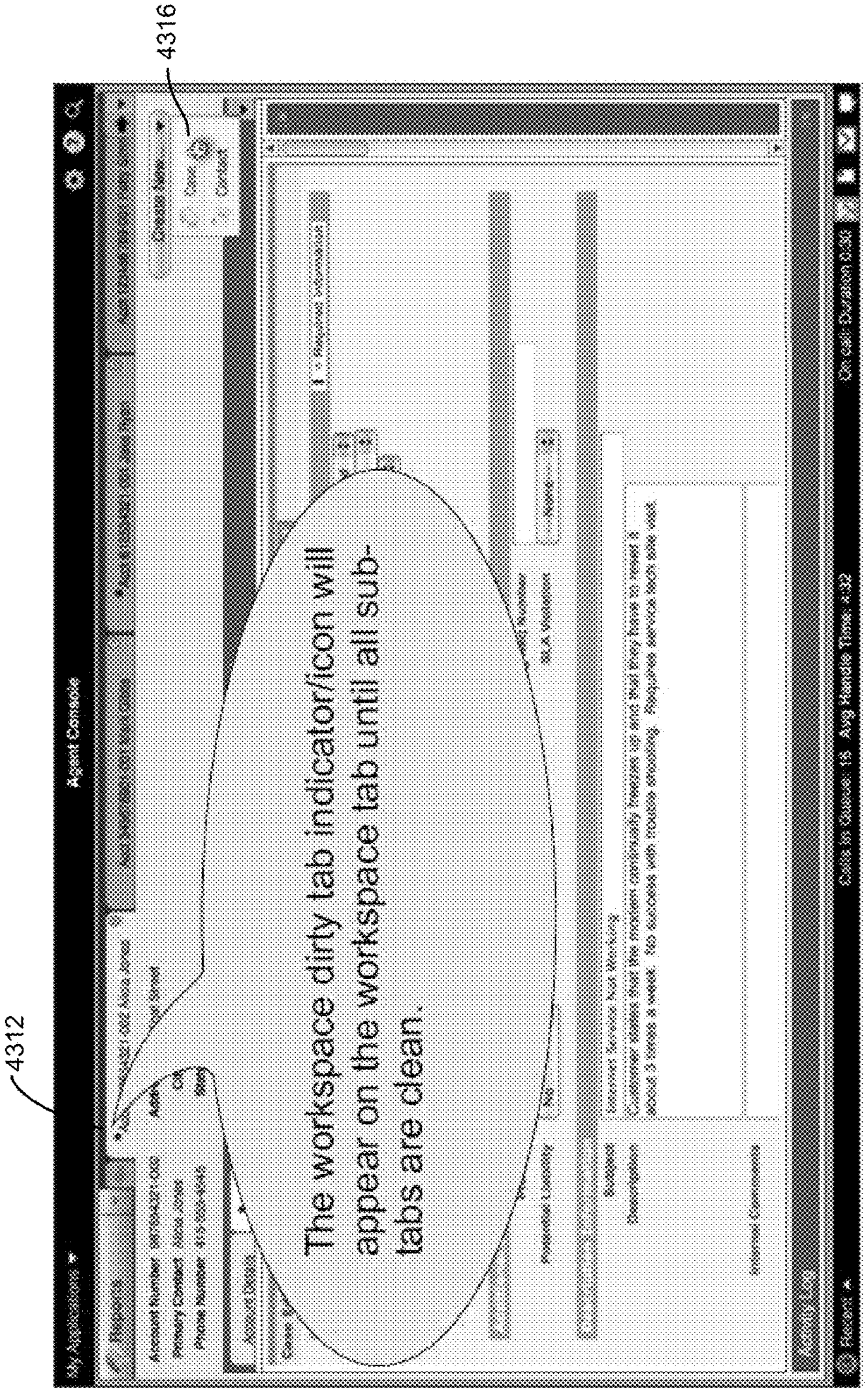

In one or more embodiments, tabs may be described as "clean" or "dirty" based on whether they have been edited. FIGS. 43-70 show images of a user interface displaying clean and dirty tabs according to one or more embodiments. The graphical user interface shown in FIG. 43 includes a primary tab 4312, secondary tabs 4304 and 4308, and a mutton 4316.

In one or more embodiments, a tab may be deemed unsaved, or "dirty," as soon as changes have been made to anything on the tab which require saving. A tab may be deemed saved, or "clean," when it does not contain any unsaved changes or errors. Alternately, a tab may be deemed unsaved, or "dirty," as soon as an attempt to edit or manipulate information displayed in the tab is detected. Then, a tab may be deemed saved, or "clean," when no such edit attempt has been detected or when the tab does not contain any unsaved changes or errors.

A dirty tab indicator or icon may be added to a sub-tab as soon as a change which requires saving has been made to that sub-tab. For example, the secondary tab 4304 is marked as dirty in FIG. 43. The associated workspace tab may also receive a dirty indicator or icon. For example, the primary tab 4312 is marked as dirty in FIG. 44. The dirty tab indicator or icon may be removed upon successfully saving the data on the sub-tab, resulting in a clean tab. For example, the secondary tab 4308 is marked as clean in FIG. 45. The workspace dirty tab indicator or icon may appear on the workspace tab until all sub-tabs are clean. For example, the primary tab 4312 remains marked as dirty in FIG. 46.

Figure 47:
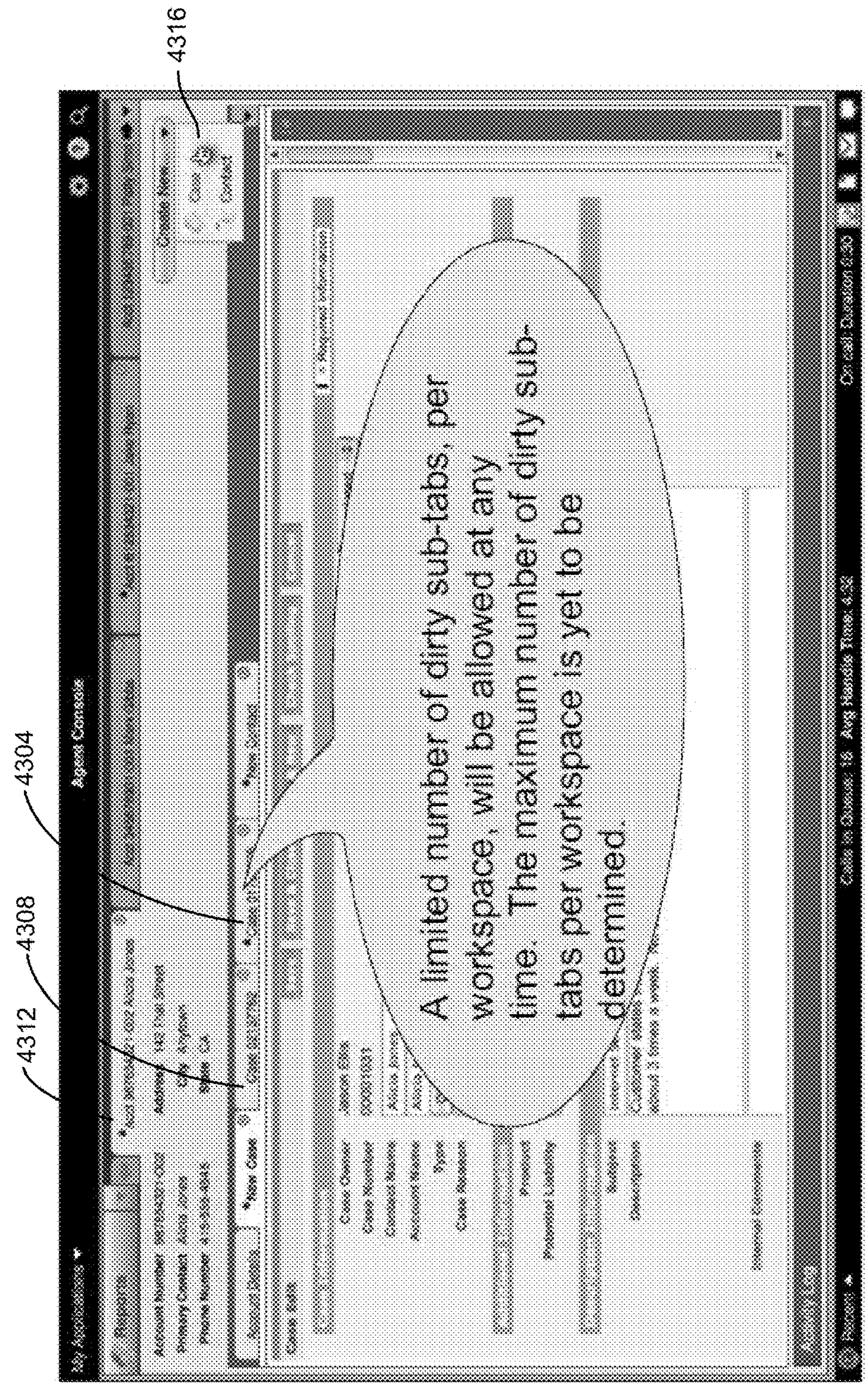

In one or more embodiments, a limited number of dirty sub-tabs per workspace may be allowed at any time, as shown in FIG. 47. The number of dirty subtabs per workspace may be limited by any or all of a default value, a configurable value, and a fixed value. In the specific example of a console application user interface shown in FIG. 47, the maximum number of dirty subtabs per workspace has not yet been set by the console administrator. However, a default value such as five dirty subtabs per workspace may be used instead. In one or more embodiments, a maximum number of dirty tabs may not be imposed.

At 304, an editing attempt at a tab is detected. In one or more embodiments, the editing attempt may include one or more mouse clicks, keyboard clicks, or other input from a user that involves the tab. Alternately, or additionally, the editing attempt may include input from within the console application. For example, actions occurring in one tab may affect information in a different tab.

In some embodiments, the editing attempt may be detected using one or more methods of a client-side scripting language, such as JavaScript®. For example, JavaScript® includes an "onClick" event handler that can execute a JavaScript® method when a mouse click is detected. Other types of JavaScript® event handlers that may be used include "onChange" and "onFocus."

In some embodiments, the detected editing attempt may include a request to open an "edit" page in which information can be edited. Thus, an editing attempt may be detected even if edited information has not yet been received. For example, an "edit" page may have a structure from which it may be determined that information is editable.

In some embodiments, an editing attempt may be detected at third party pages and/or user-customized pages (e.g., Visualforce™ pages). Third party pages and/or user-customized pages may have access to an interface so that such pages may be marked as dirty.

When an editing attempt at a tab is detected, a determination may be made at 308 as to whether the tab is currently marked as dirty. The determination as to whether the tab is currently marked as dirty may be made by consulting one or more data structures maintained at the client machine that contains status information about one or more user interface components open in the console application.

If the tab is already marked as dirty, then there may be no need to take further action in the edited page detection method since the tab already carries an indication that it may contain unsaved information. Accordingly, the edited page detection method may resume monitoring at 304 for further editing attempts.

At 312, a determination may be made as to whether a maximum number of tabs currently marked as dirty has been reached. The determination made at 312 may involve comparing one or more maximum values stored at the client machine with one or more current values representing the number of tabs currently marked as dirty.

According to various embodiments, the console application may enforce one or more different maximum numbers. In some instances, customers may be permitted to customize the type(s) and/or number(s) of maximum dirty UI elements. This may allow organization to moderate the risk of data loss. Additionally, or alternately, the console may include one or more default type(s) and/or number(s) of maximum dirty UI elements. For example, the console may permit by default a maximum of five dirty subtabs per workspace.

In one or more embodiments, the console application as a whole may have a maximum number of tabs that may be marked as dirty at any one time. In this way, the total amount of edited information may be limited.

In some embodiments, the console application may have a maximum number of tabs of one or more types that may be marked as dirty at any one time. For example, the console application may enforce a maximum number of parent tabs or workspaces that may be marked as dirty at any one time. In this way, the total number of accounts or workspaces that include edited information may be limited.

In one or more embodiments, the console application may enforce a maximum number of dirty children tabs for one or more parent tabs. In this way, the amount of edited information for a particular account or Workspace may be limited.

If the maximum number of tabs currently marked as dirty has been reached, then an edits save enforcement method may be initiated at 332. One or more embodiments of an edits save enforcement method are discussed in greater detail with reference to FIG. 4.

At 316, the edit is allowed and the tab is marked as dirty if the maximum number of tabs marked as dirty has not been reached.

To mark the tab as dirty, an indication may be made in one or more data structures at the client machine that track open tabs. Such data structures may store, for example, one or more lists of open tabs, indications of relationships between tabs, status information for tabs, etc.

In some embodiments, an indication may be displayed on the screen when a tab is marked as dirty. For example, a tab and/or label associated with a tab may be updated to include an indication such as an asterisk or other marking indicating that the tab is dirty. In this way, a user can quickly determine which tabs have been edited and/or accessed.

When the edit is allowed at 316, the tab may be available for receiving edited or updated information. In some embodiments, allowing the edit may involve entering an actual change to information displayed at the tab. For example, if the edit attempt included an attempt to change the value reflected by a radio button or other affordance, then the edit attempt may be entered. Alternately, or additionally, allowing the edit may permit further editing of the tab. For example, one or more text fields, radio buttons, or other affordances may become editable.

In one or more embodiments, the tab may be positioned in a hierarchical structure of tabs in which one or more tabs has a one or more "child" and/or "parent" components. For example, a primary tab in a user interface may be the parent of one or more subtabs. In a hierarchical structure of tabs, a parent tab may be thought of as containing each of its children. Thus, if a child tab is marked as dirty, then a parent tab of that child tab may also be marked as dirty because it contains a dirty child tab.

Accordingly, in some embodiments a determination may be made at 320 as to whether the tab has a parent tab. In some instances, the tab may not have a parent component. For example, the tab may be a top level tab that does not have any children.

In one or more embodiments, the determination at 320 as to whether the tab has a parent tab may be made by consulting one or more data structures stored at the client machine. For example, the client machine may maintain one or more structures indicating which tabs are open in the page and/or one or more hierarchical relationships between tabs.

If it is determined that the tab has a parent tab, then that parent tab is marked as dirty at 324. In some embodiments, the parent tab may be marked as dirty in a manner similar to the original tab.

In one or more embodiments, the determination as to whether the tab has a parent tab at 320 and marking the parent of the tab as dirty at 324 may repeat. For example, the hierarchical structure of tabs may have more than two layers, and multiple layers may need to be marked as dirty in one or more instances.

In one or more embodiments, the determination at 320 may be true only for a parent tab that is not already marked as dirty. A parent tab marked as dirty may not need to be remarked. If that parent tab itself has parent tabs (i.e. grandparent tabs of the original tab), then those grandparent tabs should have already been marked as dirty since the parent tab is marked as dirty.

At 328, a determination may be made as to whether an interrupt event has been detected. In one or more embodiments, an interrupt event may be any event that could cause one or more browser pages, browser instances, browser tabs, and/or user interface components to be closed. For example, one or more attempts to navigate away from the console web page, attempts to log out, or attempts to close one or more user interface components may be detected.

If an interrupt event is detected, then unsaved data may be lost unless it is saved before the interrupt event is carried out. Various types of interrupt events, as well as techniques for detecting interrupt events, are discussed in more detail with reference to FIG. 4. Accordingly, an instance of an edited page enforcement method is initiated at 332.

FIG. 4 shows a flow diagram of a method 400 for saving an edited page, performed in accordance with one embodiment. The edited page save method may be performed to ensure that a user is aware that edited information may be lost. The user may be provided with one or more choices, such as saving the edited information, canceling a requested action, or proceeding with the requested action without saving the edited data.

In one or more embodiments, both workspace tabs and subtabs may have a notion of being "dirty." Dirty may mean that the user has made a change in the context of that tab. If a workspace tab is marked as dirty, that implies that one of its subtabs is dirty. If the user attempts to close this workspace, he may be prompted with the names of the dirty subtabs and/or the opportunity to save them. If a subtab is marked as dirty, that may imply that the user has changed that subtab without saving it. If the user attempts to close this subtab, he may be prompted with the opportunity to save it.

In one or more embodiments, the service cloud console may be used to access a page created at least in part by a developer other than the provider of the console application. For example, the VisualForce™ technology available from Salesforce.com® allows users to create customized interfaces. One or more embodiments are described herein with reference to VisualForce™, but some embodiments may employ various other types of technology for facilitating user-created pages.

User-customization technology such as VisualForce™ may also provide an interface allowing a page to specify that its tab should be marked dirty. If it is marked dirty and the user attempts to close it, the user may be prompted as he would for a standard dirty tab.

An interrupt event is identified at 404. An interrupt event is an event that interrupts the normal operation of the service cloud console. For example, an interrupt event may be a request to save edited information entered in the service cloud console, an action that may lead to data loss, or an attempt to take a prohibited action.

Interrupt events may include attempts to close one or more tabs within the service cloud console, such as an attempt to close a primary tab, a secondary tab, all subtabs of a primary tab, or all open tabs. Interrupt events may include other types of actions within the service cloud console, such as a request to save one or more tabs, an attempt to edit a clean tab when the maximum number of dirty tabs has been reached, or any other type of action. Interrupt events may include browser-level events, such as an attempt to navigate away from the service cloud console, close the browser tab of the service cloud console, or close the browser itself.

Interrupt events may be identified by events triggered by a client-side scripting language, such as JavaScript®. For example, clicking on the close-tab button within the service cloud console may trigger a JavaScript® event (e.g., OnClick), which may cause an associated function in JavaScript® to execute.

Figure 70:
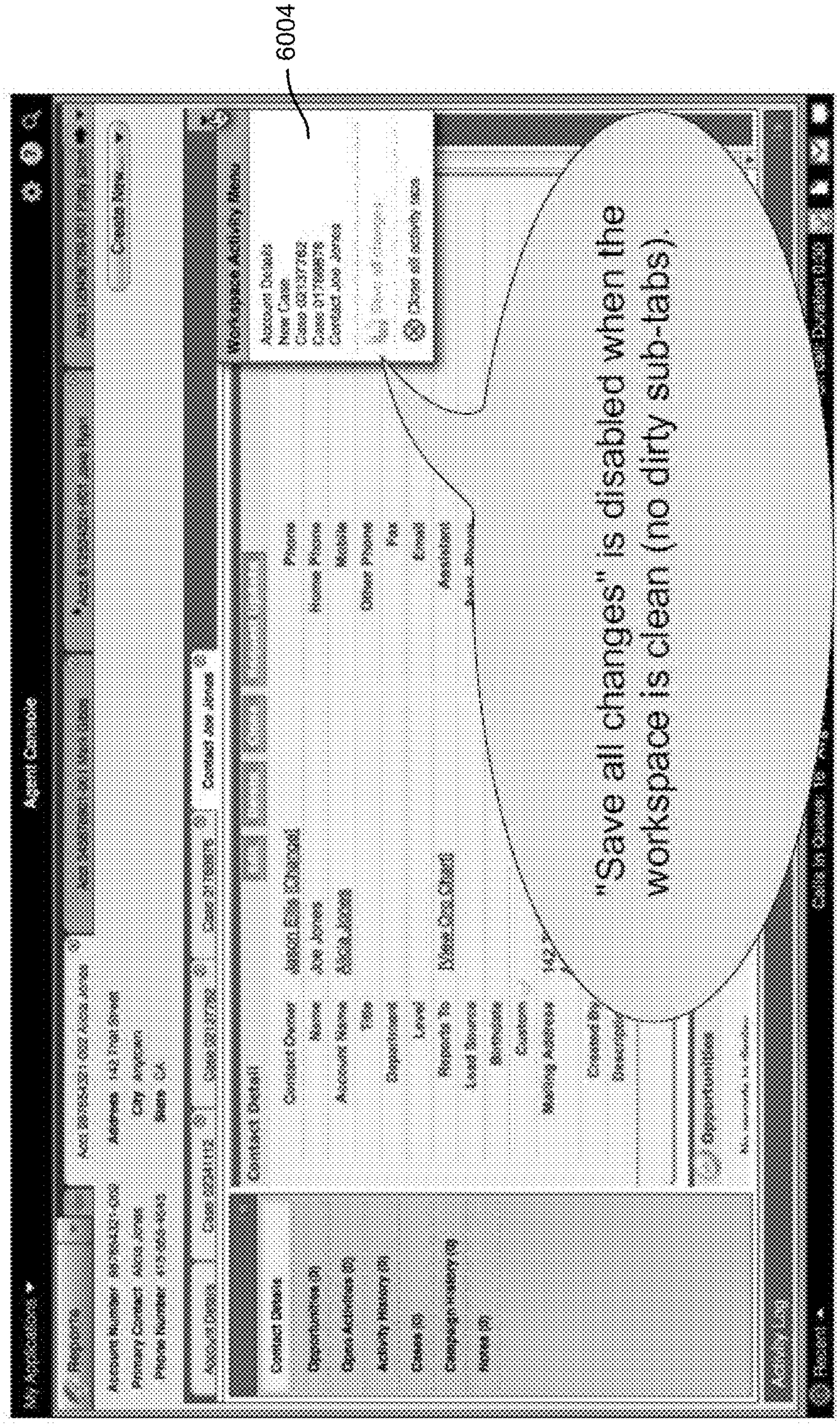

It may be determined, as shown at 408, that the interrupt event is a request to save one or more tabs. For example, the interrupt event may include the detection of a click on the "Save all changes" link in the subtab menu 6004 shown in FIG. 62. Alternately, the request to save one or more tabs may include a request to save a specific tab or a request to save some combination of tabs. As shown in FIG. 70, the "Save all changes" button may be disabled in the subtab menu 6004 when the selected primary tab is clean.

If instead it is determined, as shown in 412, that the interrupt event is a risky or prohibited action, then a warning message may be displayed in the console interface, as shown at 416. Accompanying the warning message may be one or more choices for responding to the potential loss of unsaved data.

A risky action may be any action that could lead to loss of unsaved data. For example, the service cloud console may include information that has been edited by the agent but that has not yet been saved to the server. A prohibited action may be any action disallowed by the service cloud console, such as an attempt to edit a clean tab when the maximum number of dirty tabs is already open.

Various warning messages and/or choices may be presented at 416. The warning message and/or the choices presented on 416 may depend on what type of interrupt event has been identified. FIGS. 48-70 show images of user interfaces that include warning messages and user choices, according to one or more embodiments. However, some embodiments may include different interrupt events, warning messages, and/or choices.

Figure 51:
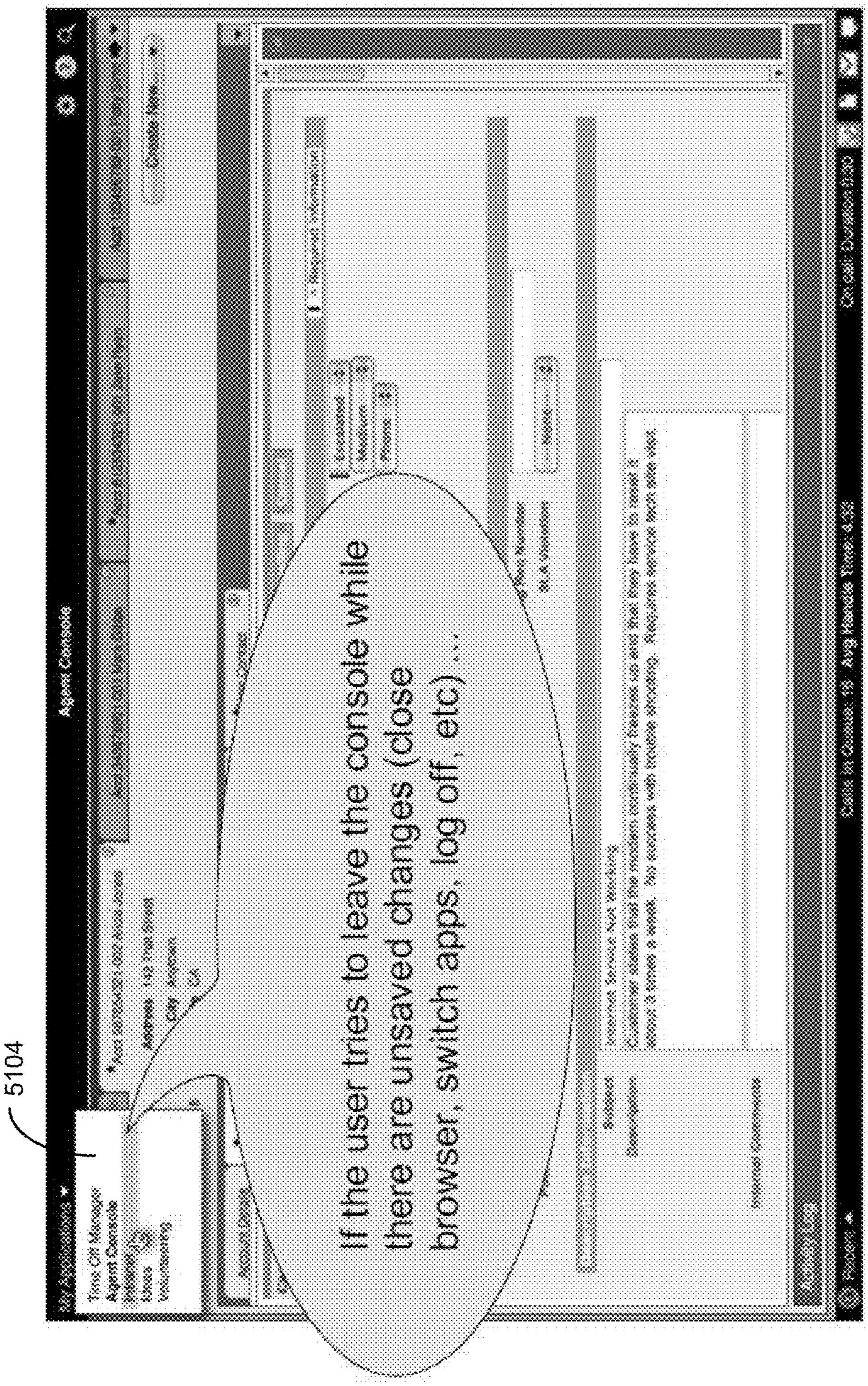
Figure 52:
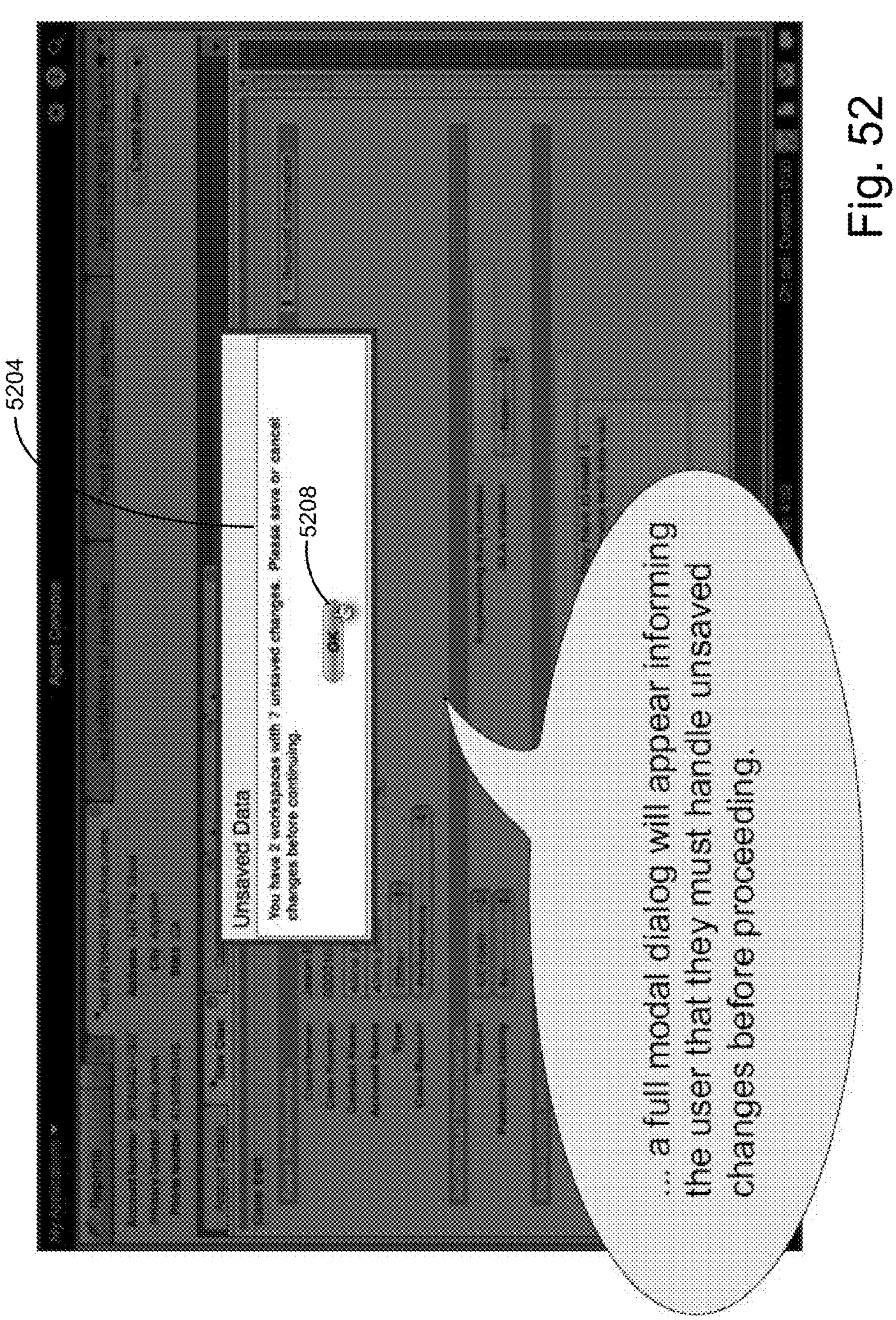

In some cases, the interrupt event may include an attempt to leave the console application, for example by navigating away from the console application by using the page menu 5104 shown in FIG. 51. Other interrupts events that may be treated as an attempt to leave the console application may include attempts to close the browser, switch applications, log off, close a browser tab, navigate away from the console application, etc. An attempt to leave the console application while there are unsaved changes may result in a warning message such as that displayed in the dialog box 5204 shown in FIG. 52, which states: "You have 2 workspaces with 7 unsaved changes and cannot simultaneously close the set until these items are either saved or cancelled." In this case, the choice provided may be an "OK" button 5208.

Figure 57:
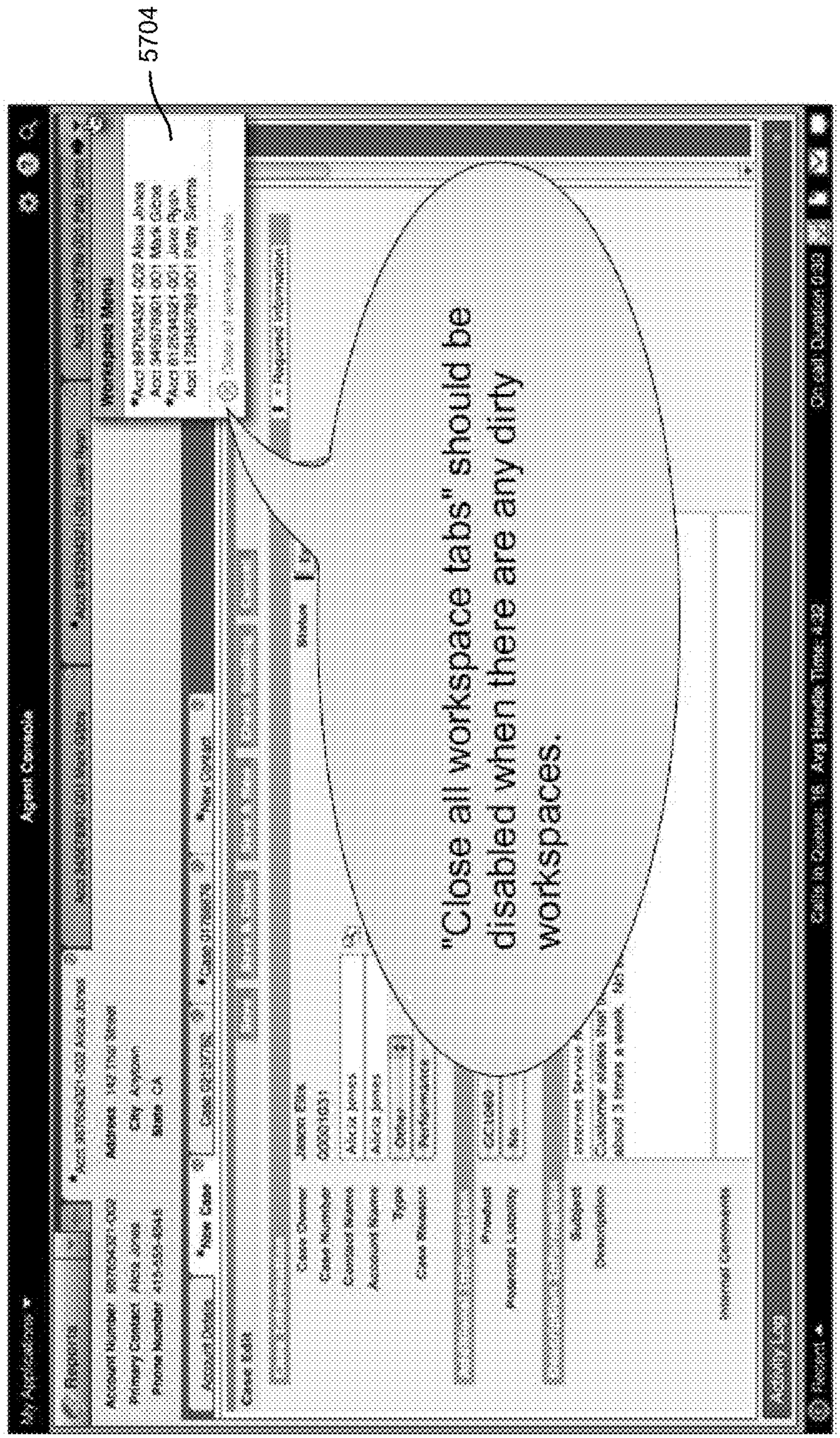
Figure 58:
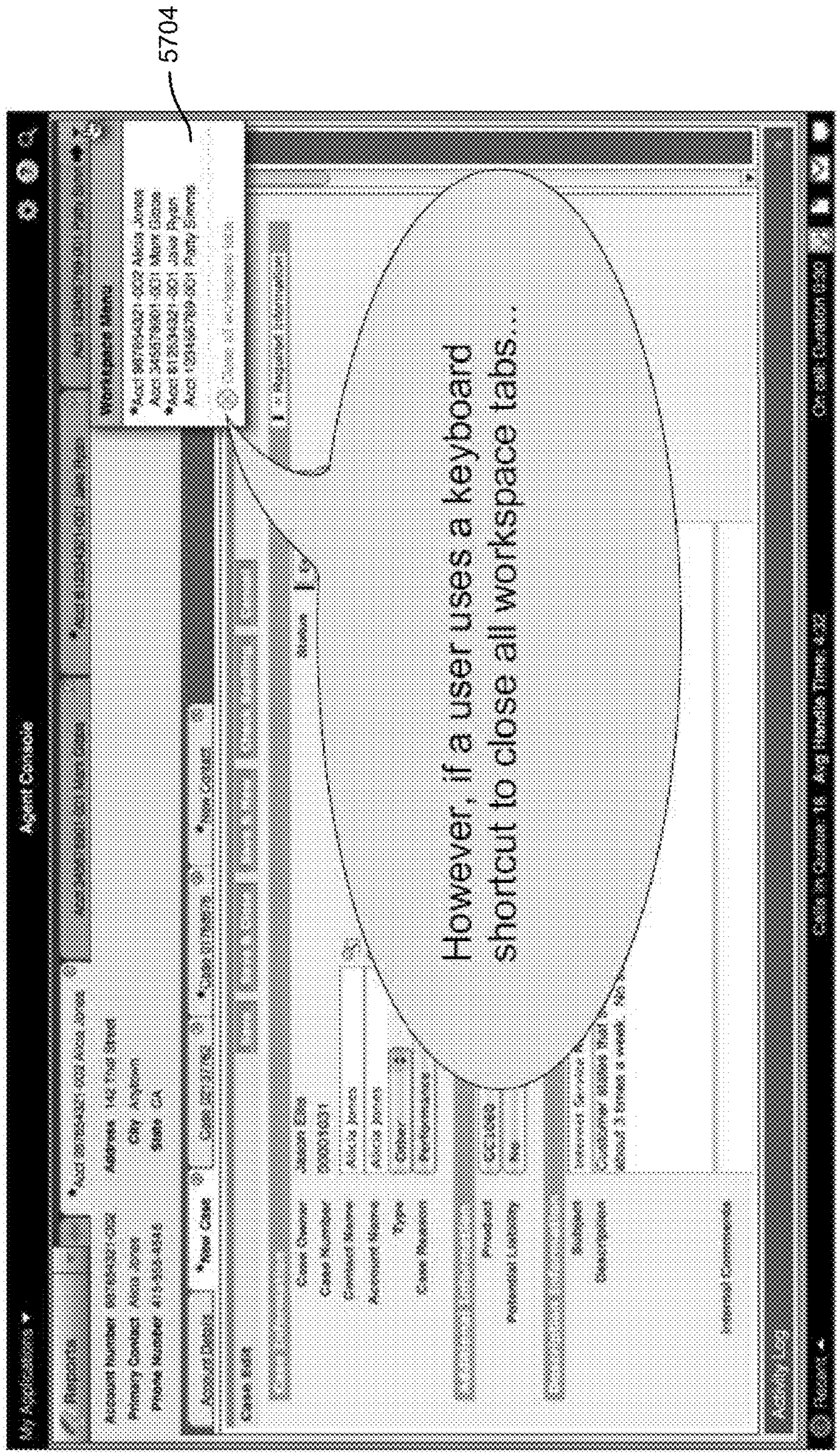
Figure 59:
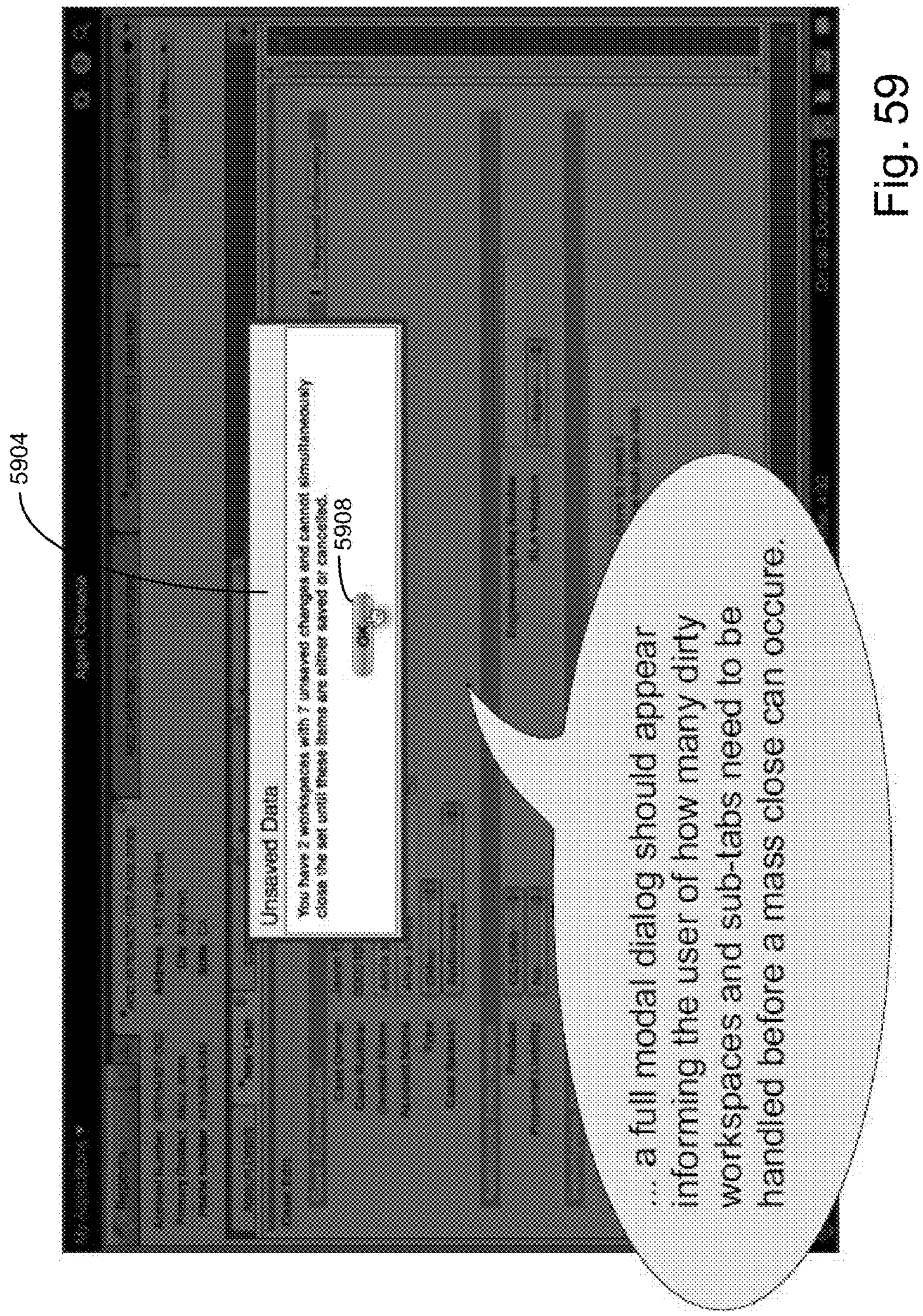

An attempt to close all primary tabs when one or more tabs is dirty, such as by activating a keyboard shortcut to the "Close all workspace tabs" option displayed in primary tab menu 5704 shown in FIGS. 57 and 58, may result in a warning message. For example, the dialog box 5904 shown in FIG. 59 includes a warning message which states: "You have 2 workspaces with 7 unsaved changes and cannot simultaneously close the set until these items are either saved or cancelled." In this case, the choice provided may be an "OK" button 5908

Figure 48:
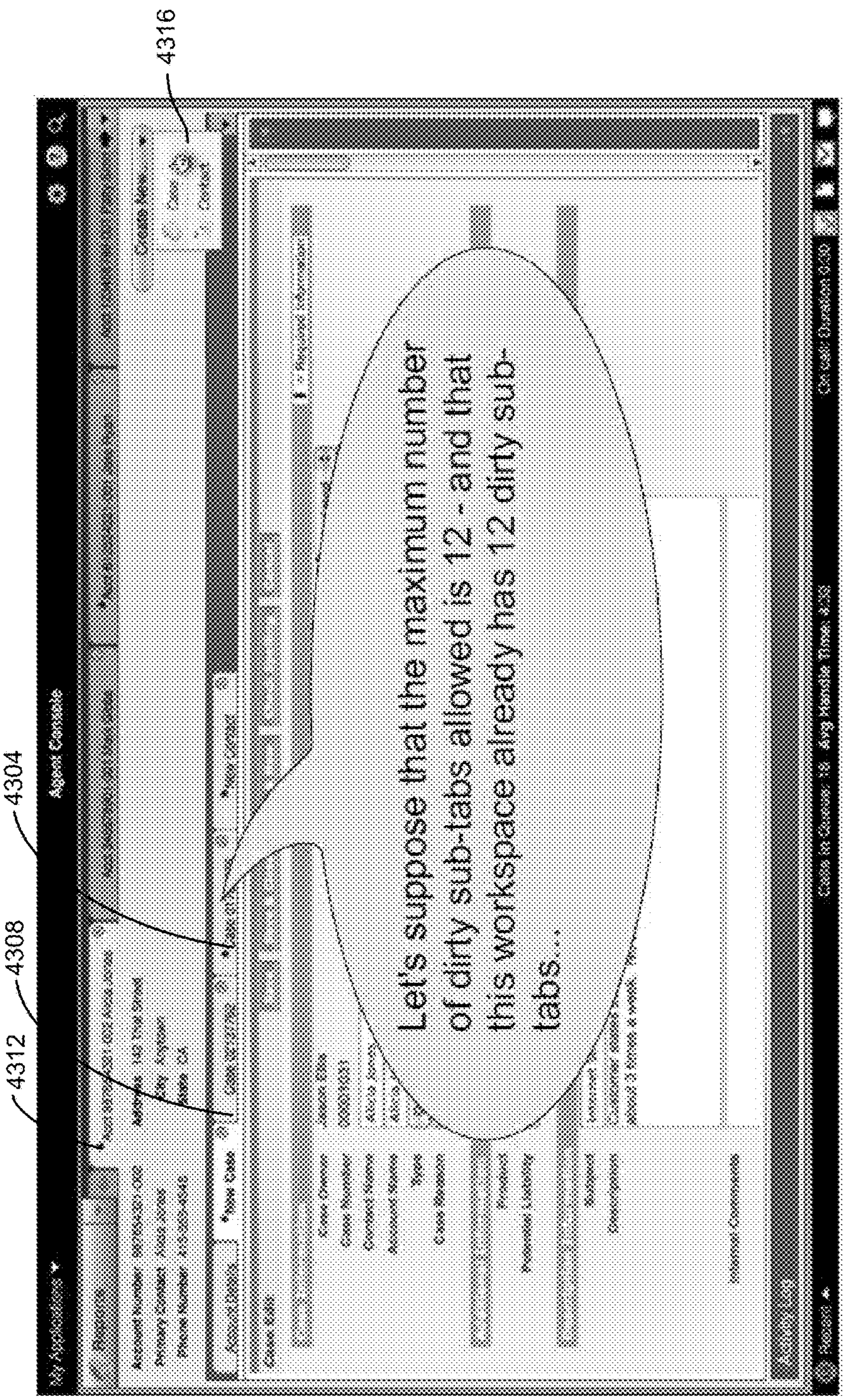
Figure 49:
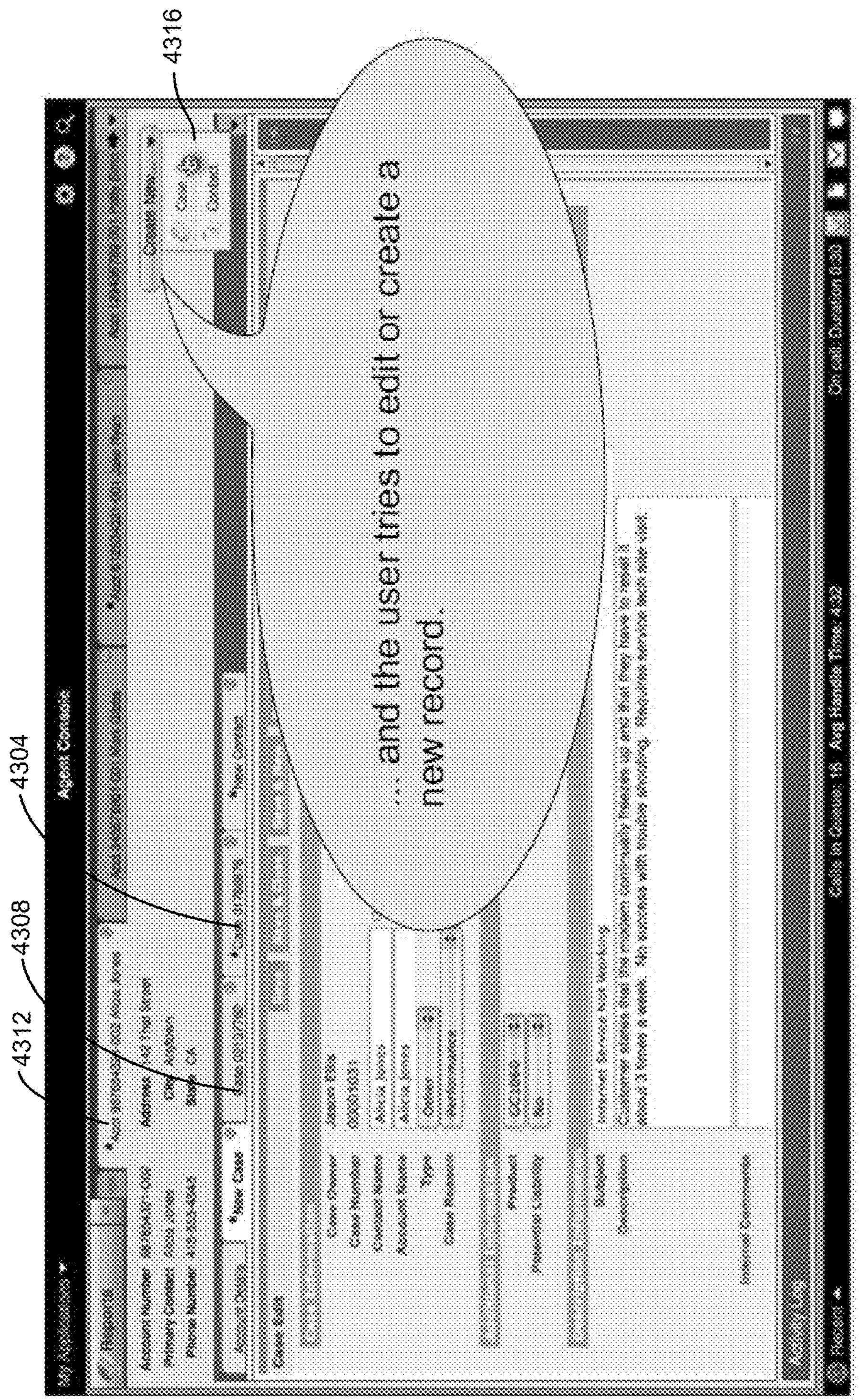

The maximum number of dirty subtabs allowed may be, for example, 12 subtabs, as shown in FIG. 48. An attempt to edit or create a new record, for example by using the mutton 4316 shown in FIG. 49, may result in a warning message if the maximum number of dirty sub-tabs has been reached for a given workspace. For example, the warning displayed in the dialog box 5004 in FIG. 50 states: "You have reached the maximum of 12 unsaved records in this workspace. Please save or cancel changes before continuing." In this case, the choice provided may be an "OK" button 5008.

Figure 50:
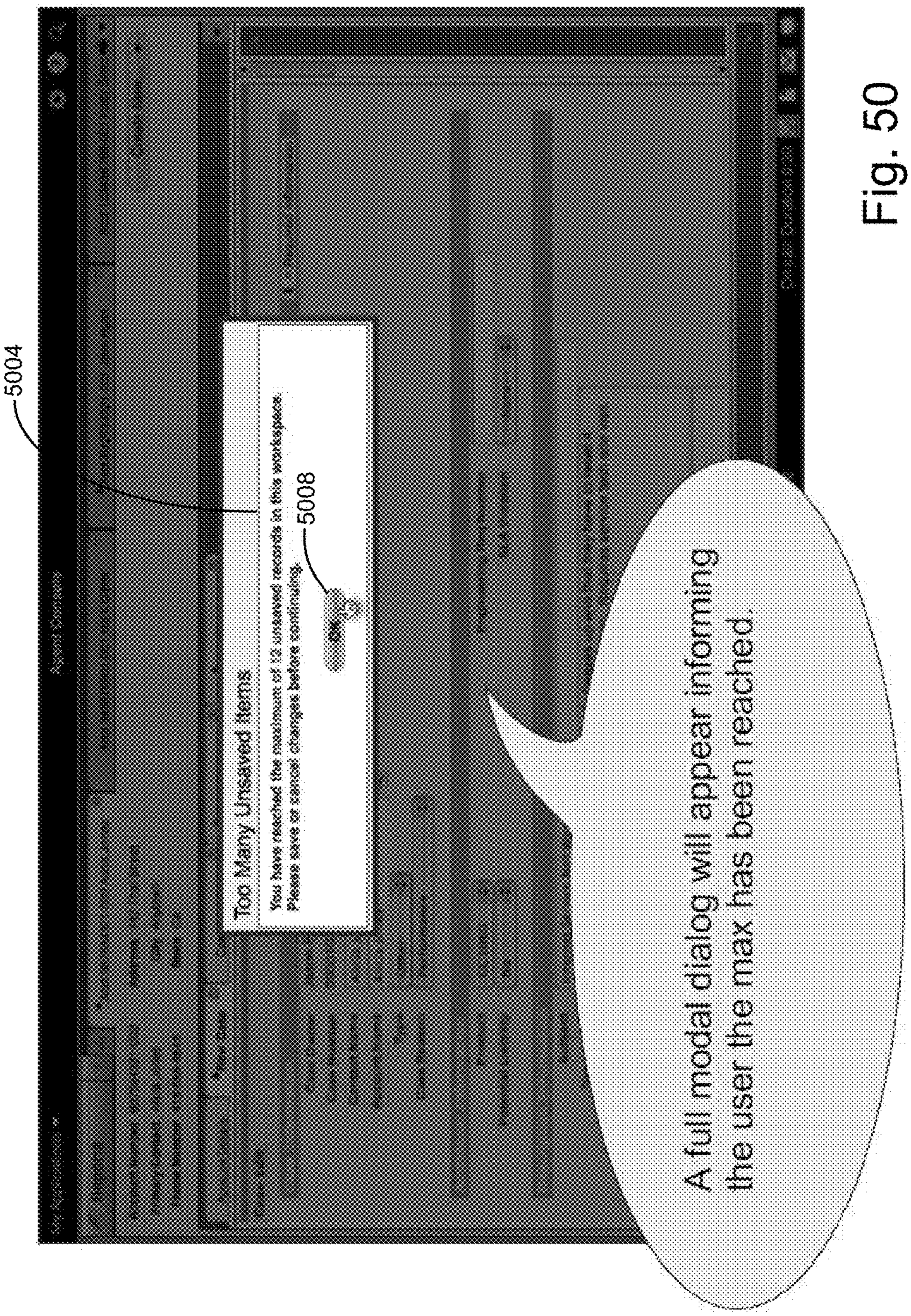

Although the maximum number of unsaved records in the example shown in FIG. 50 is 12, embodiments may use various values for the maximum number of unsaved records. In some embodiments, the maximum number of unsaved records may be strategically determined by, for example, balancing processing time with number of records An attempt to close a single dirty primary tab, such as primary tab 5504 shown in FIG. 55, may result in a warning message. For example, the message displayed in the dialog box 5604 shown in FIG. 56 states: "You have 3 items with unsaved changes. Click 'Save All' to save all changes and close tabs." In this case, the user may be presented with choices such as a "Save All" button 5608 and a "Cancel" button 5812.

Figure 60:
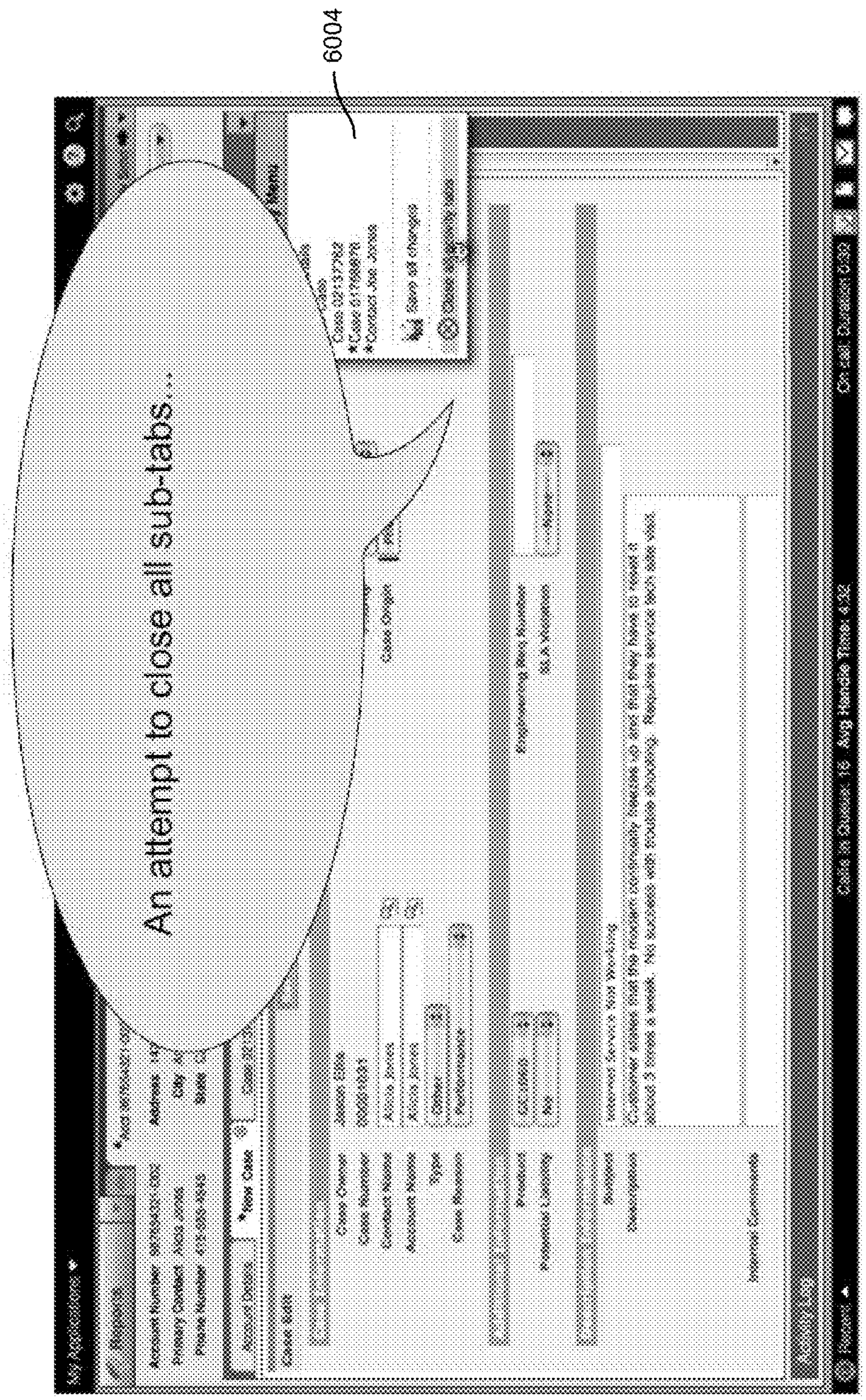
Figure 61:
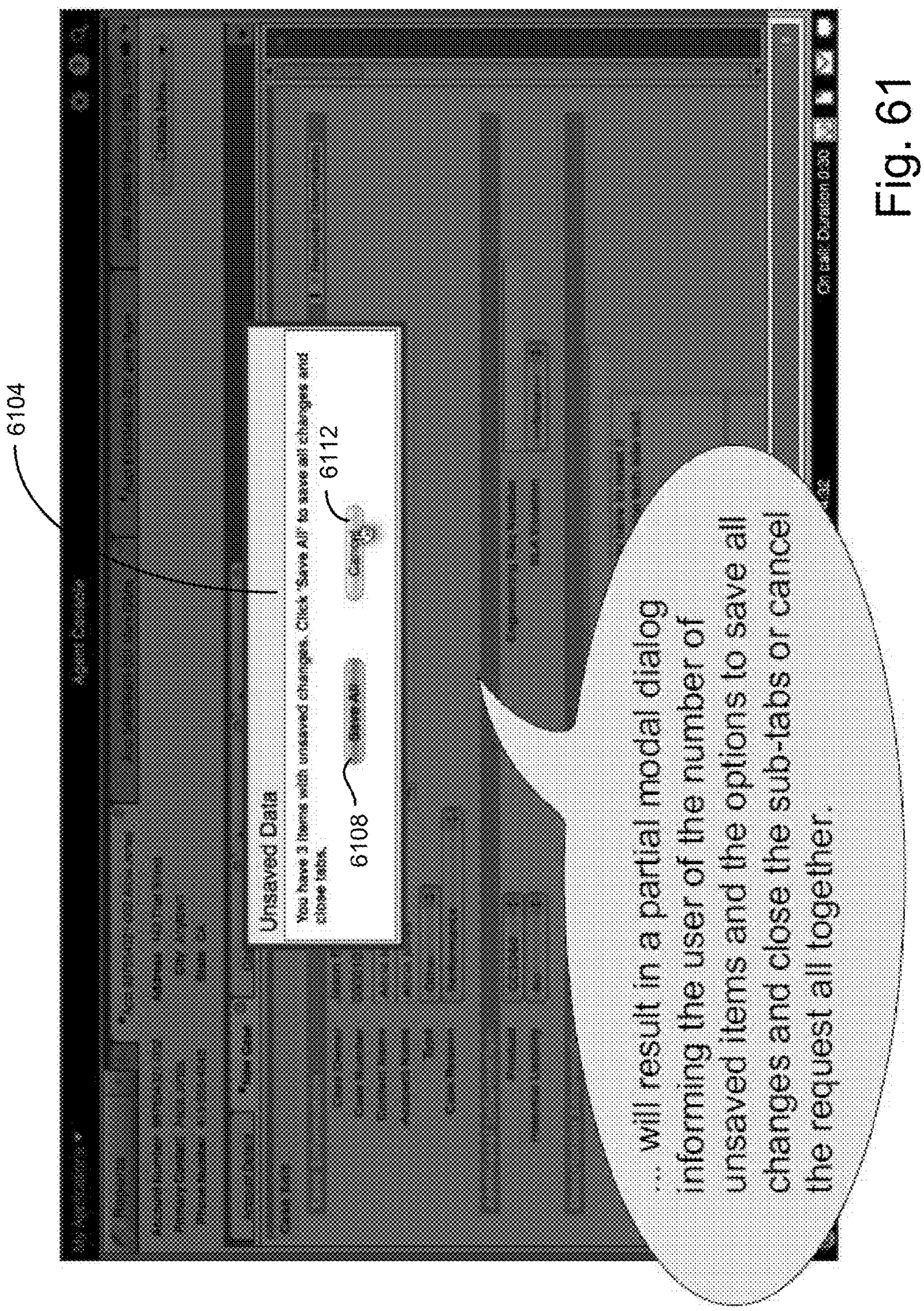
Figure 62:
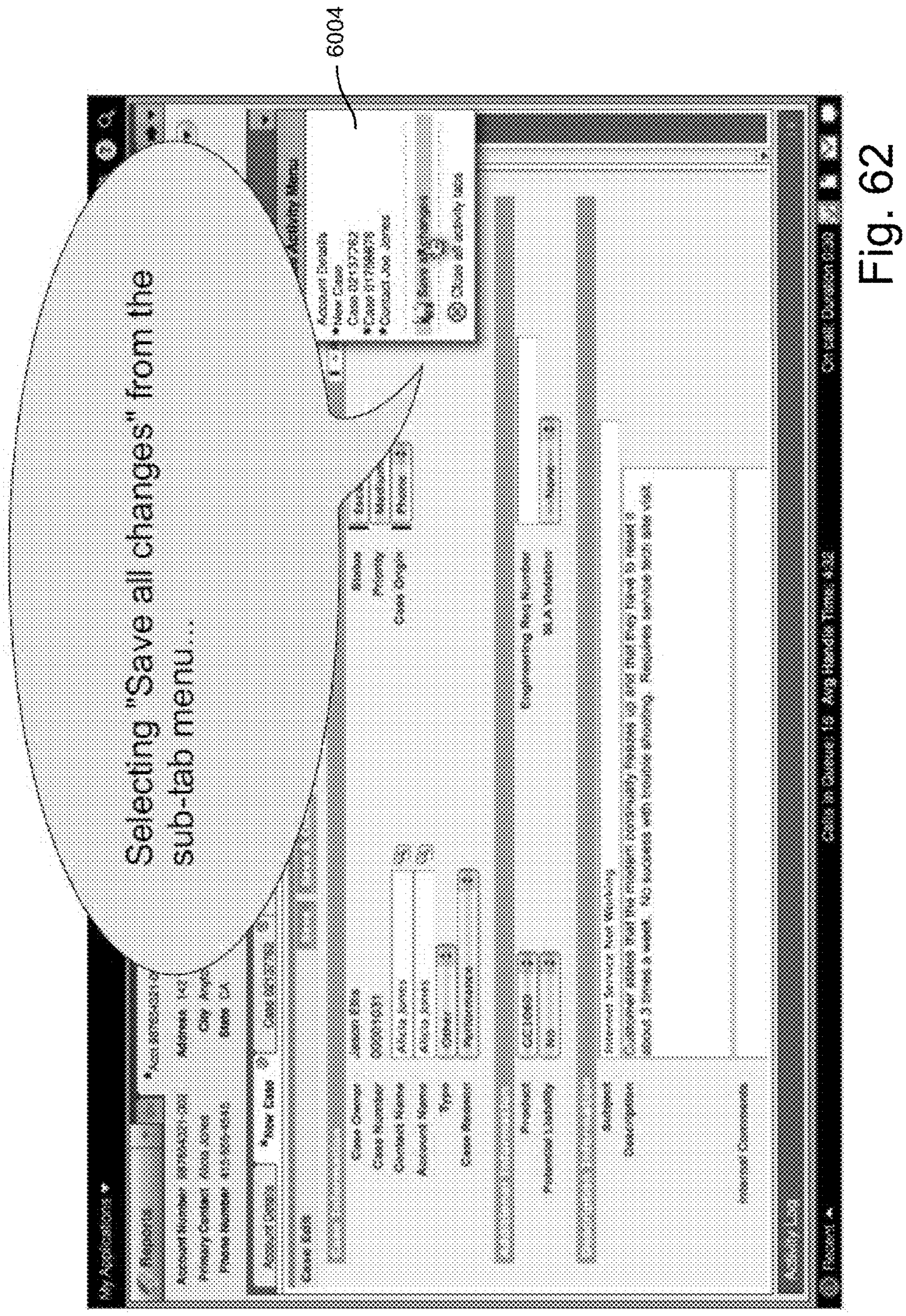
Figure 63:
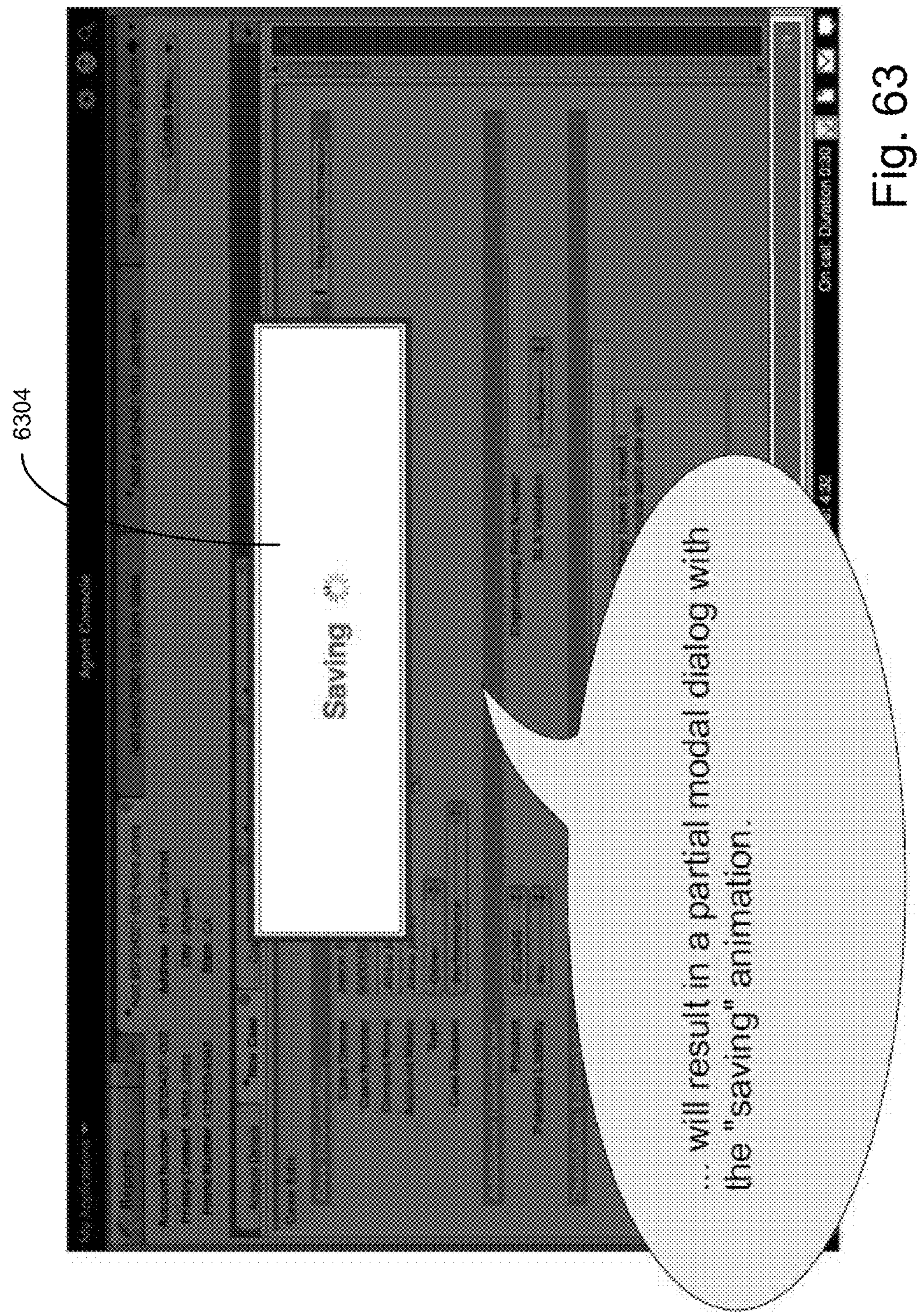

An attempt to close all subtabs of a primary tab, for example by clicking a link in the subtab menu 6004 shown in FIG. 60, may result in a warning message. For example, dialog box 6104 shown in FIG. 61 includes a message which states: "You have 3 items with unsaved changes. Click 'Save All' to save all changes and close tabs." In this case, the user may be presented with the choices such as a "Save All" button 6108 and a "Cancel" button 6112.

Figure 53:
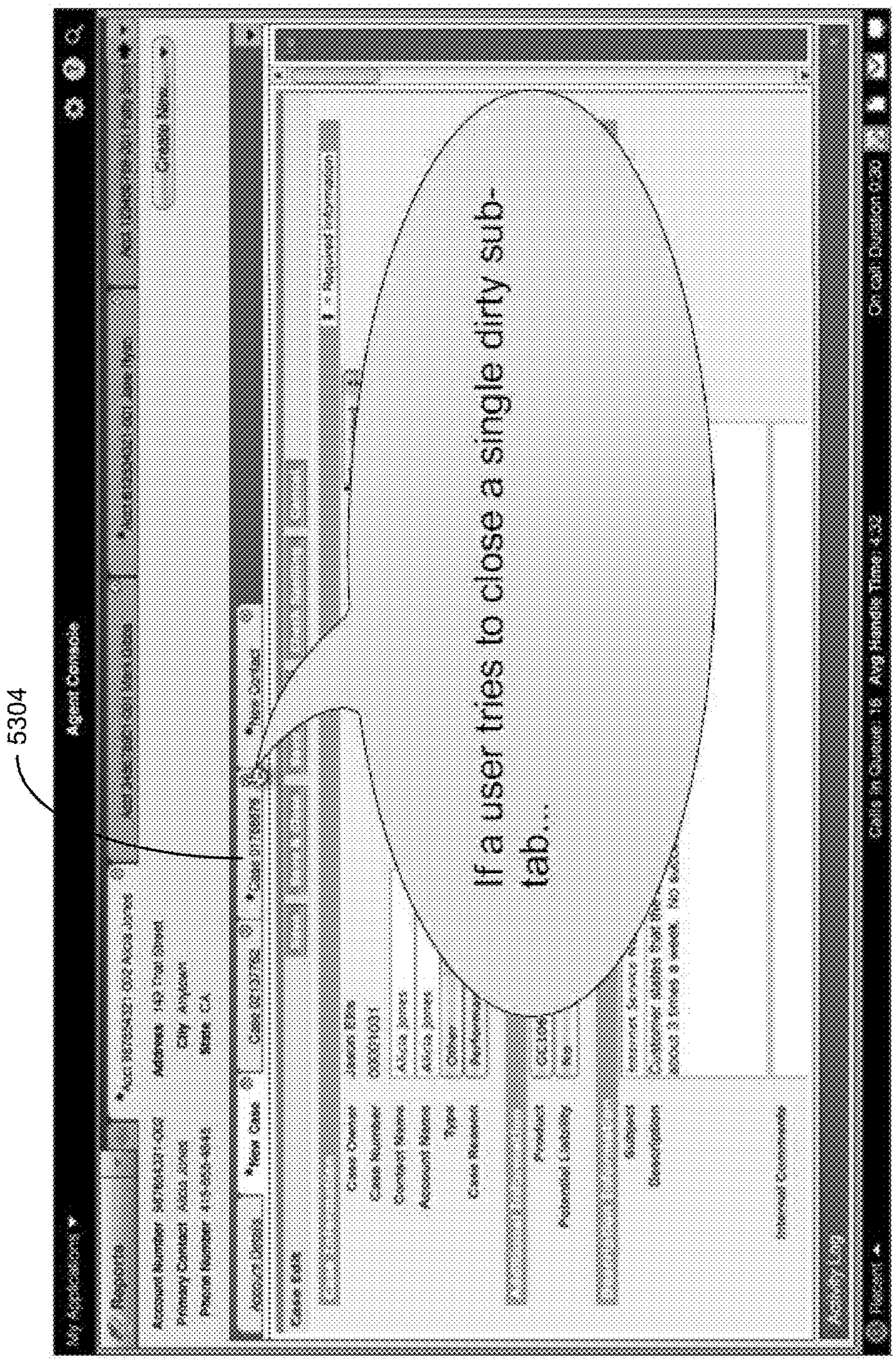
Figure 54:
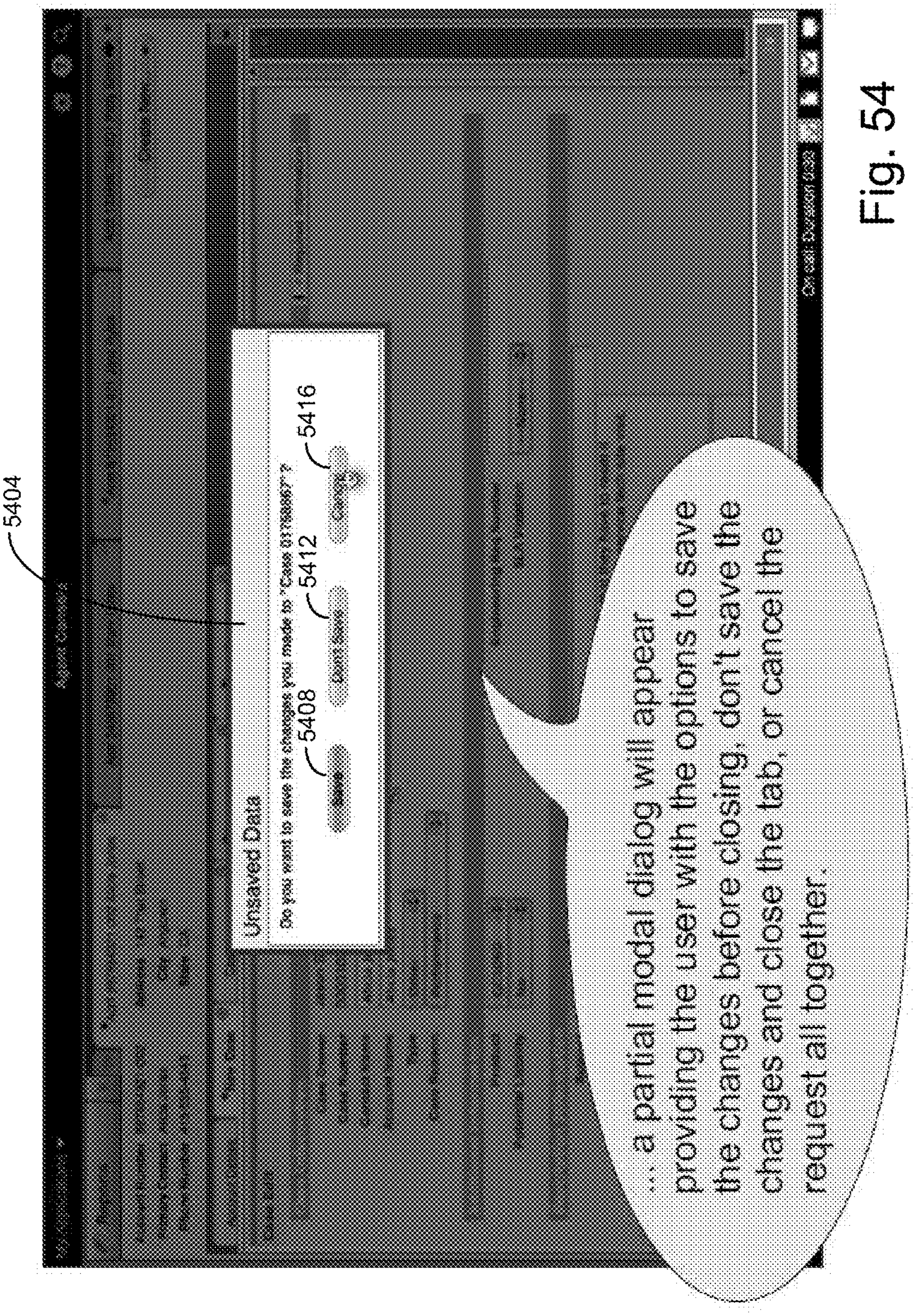
Figure 55:
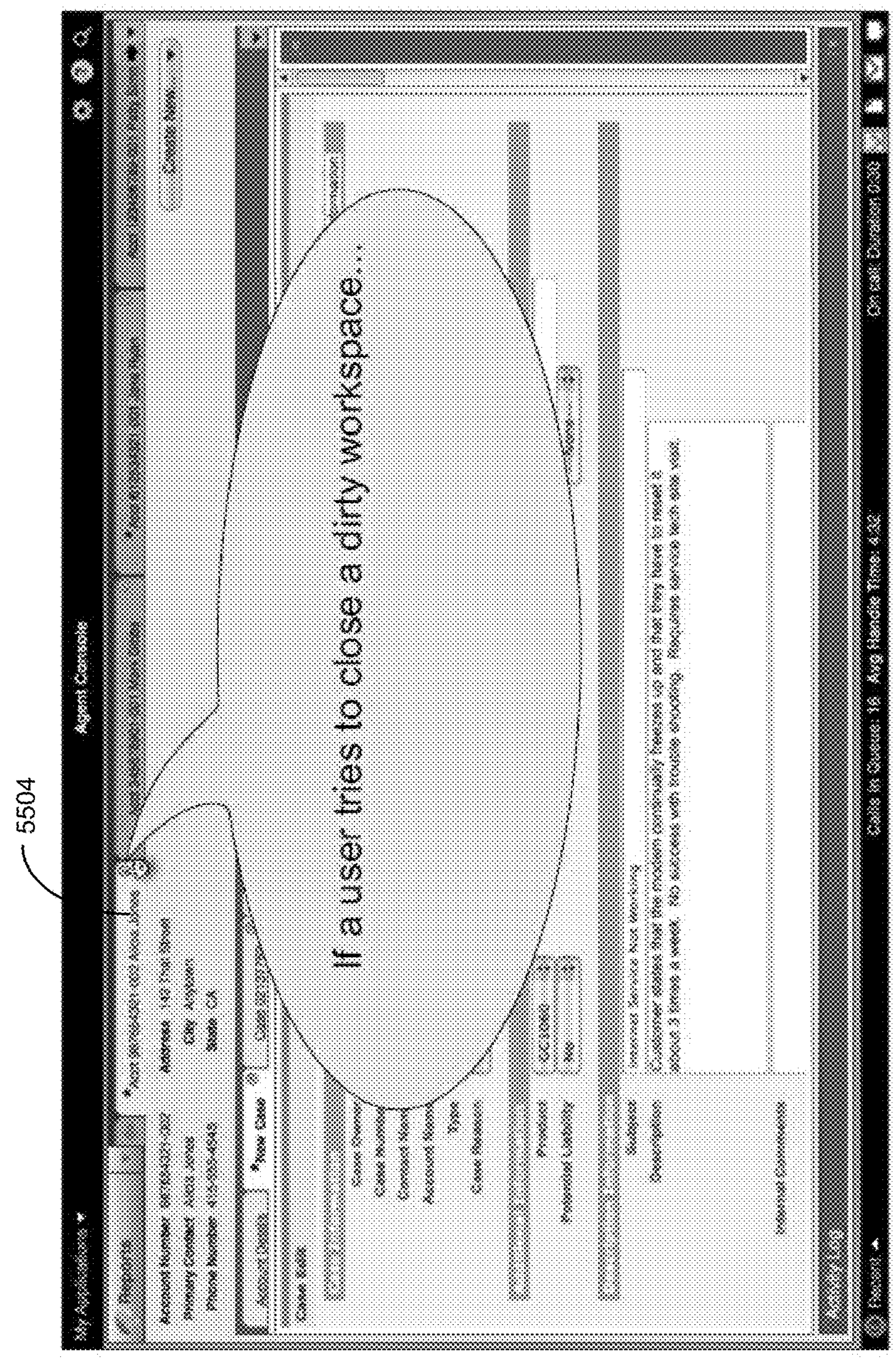
Figure 56:
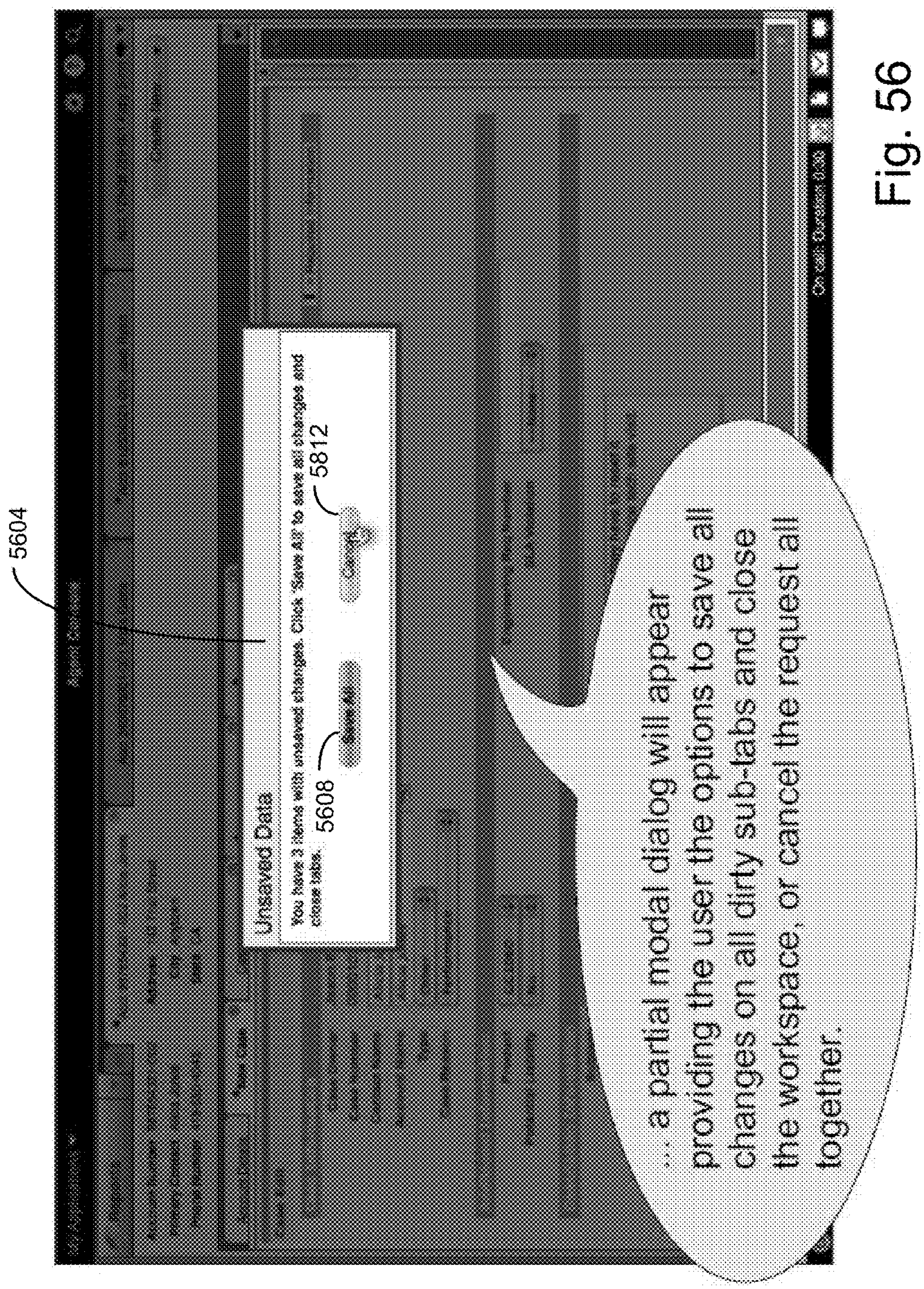

An attempt to close a single dirty subtab such as 5304 shown in FIG. 53 may result in a warning message. For example, the message displayed in the dialog box 5404 shown in FIG. 54 states: "Do you want to save the changes you made to 'Case 01768867T'" In this case, the user may be presented with choices such as a "Save" button 5408, a "Don't Save" button 5412, and a "Cancel" button 5418.

The selection is received at 420. The selection may be received by detecting user input at the dialog box.

If the received selection is "OK" or "Cancel" at 424, then the interrupt event is not completed, as shown at 428. When the interrupt event is not completed, the console may return to the previous context and ignore the interrupt event. In this case, the unsaved data will not be lost, and the user may take further action to save the data. For example, the user could later choose to save one or more dirty tabs that resulted in the warning message.

If the received selection is "Don't Save" at 432, then the interrupt event may be completed at 436 even though the edited information has not been saved. A user may choose the "Don't Save" option if, for example, information was mistakenly entered. Completing the interrupt event may involve, for example, closing the browser, navigating to a different web page, or performing any other action that was identified at 404. In this case, edited information may be lost.

At 440, a request to save one or more records is identified. The request to save one or more records may include a request to save a specific subtab, primary tab, combination of tabs, or all tabs. The request to save one or more records may be received via a dialog box having a warning, as shown at 420, or via a save request, as shown at 408.

If the user input indicates that the edits should be saved 444, then the save request is sent to the server 448. An attempt to save edited information to the server may result in the service cloud console displaying a "Saving" animation or dialog box, such as the saving dialog box 6304 shown in FIGS. 63 and 64.

In one or more embodiments, some or all interaction with the service cloud console may be disabled while the save request is sent to the server. For example, interaction with the activity log text area and/or scratchpad may be allowed, while interaction with the record tabs may be disallowed.

At 448, the response is received from the server. Based on the received response, a determination is made at 452 as to whether the save request was validated. A save request may not be validated for a variety of reasons, such as: the agent lacks permission to change the edited information, the edited information conflicts with other information, the edited information is not of the proper form (e.g., a phone number has the wrong number of digits), required information was not entered, etc.

Figure 64:
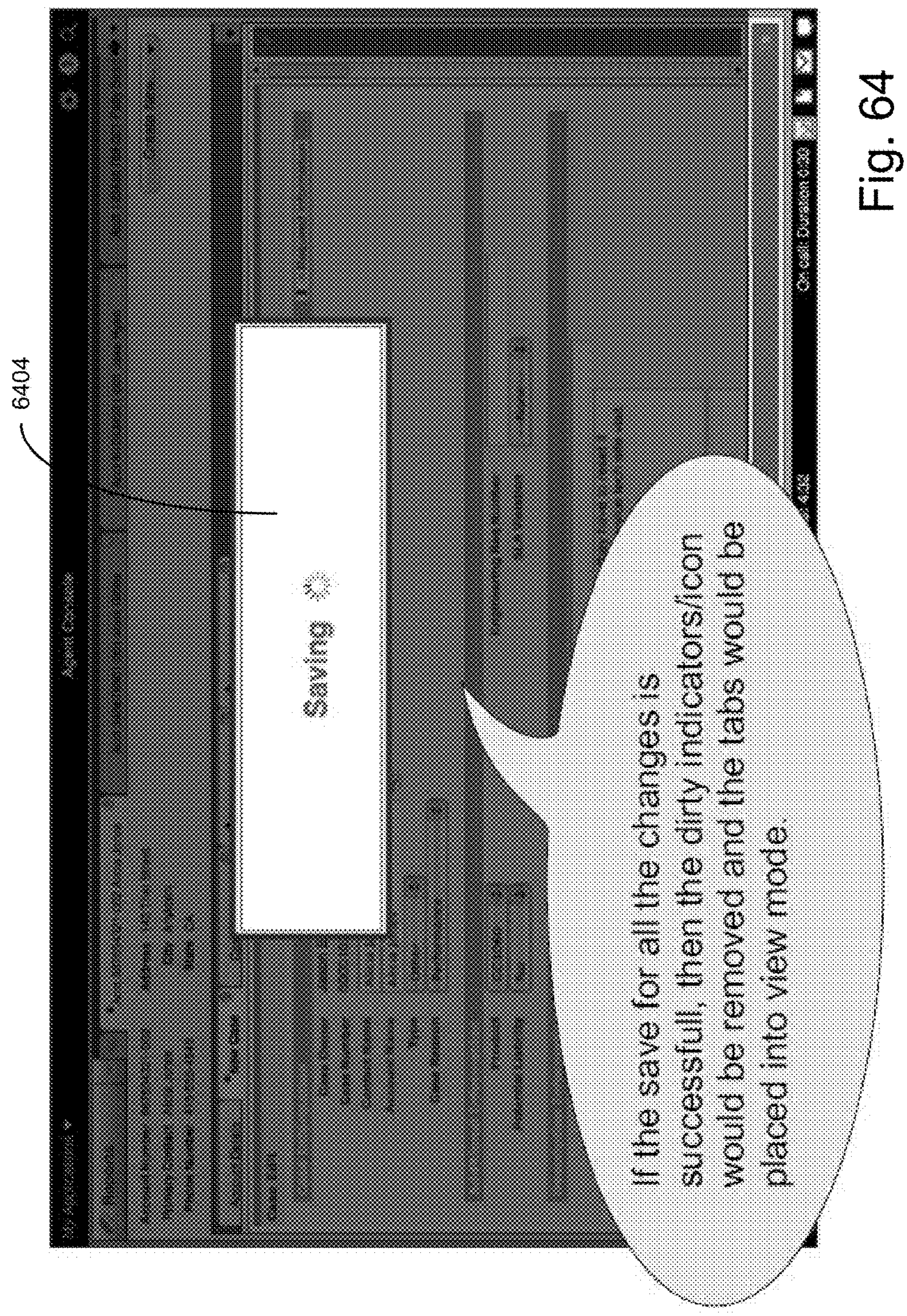
Figure 65:
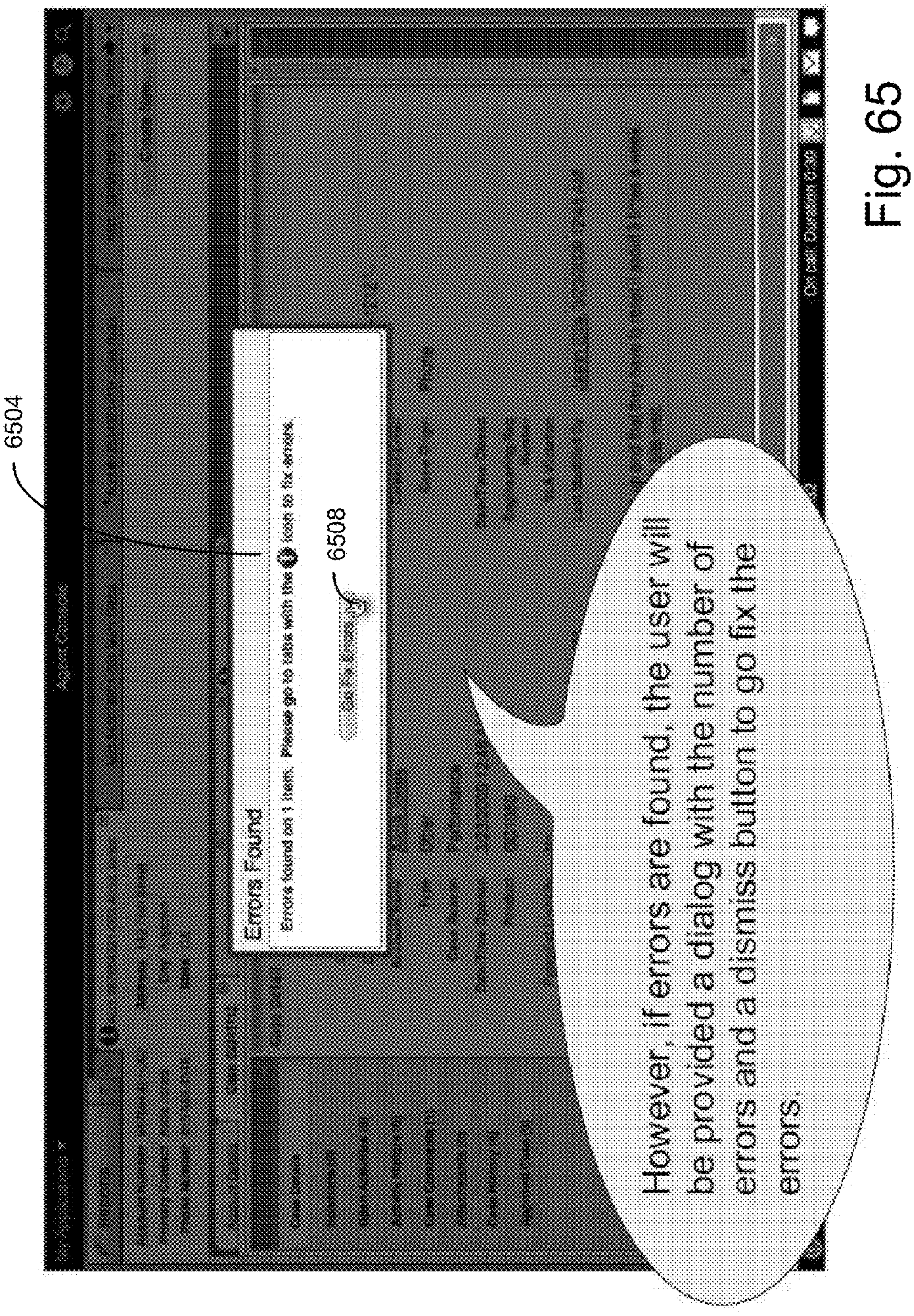
Figure 66:
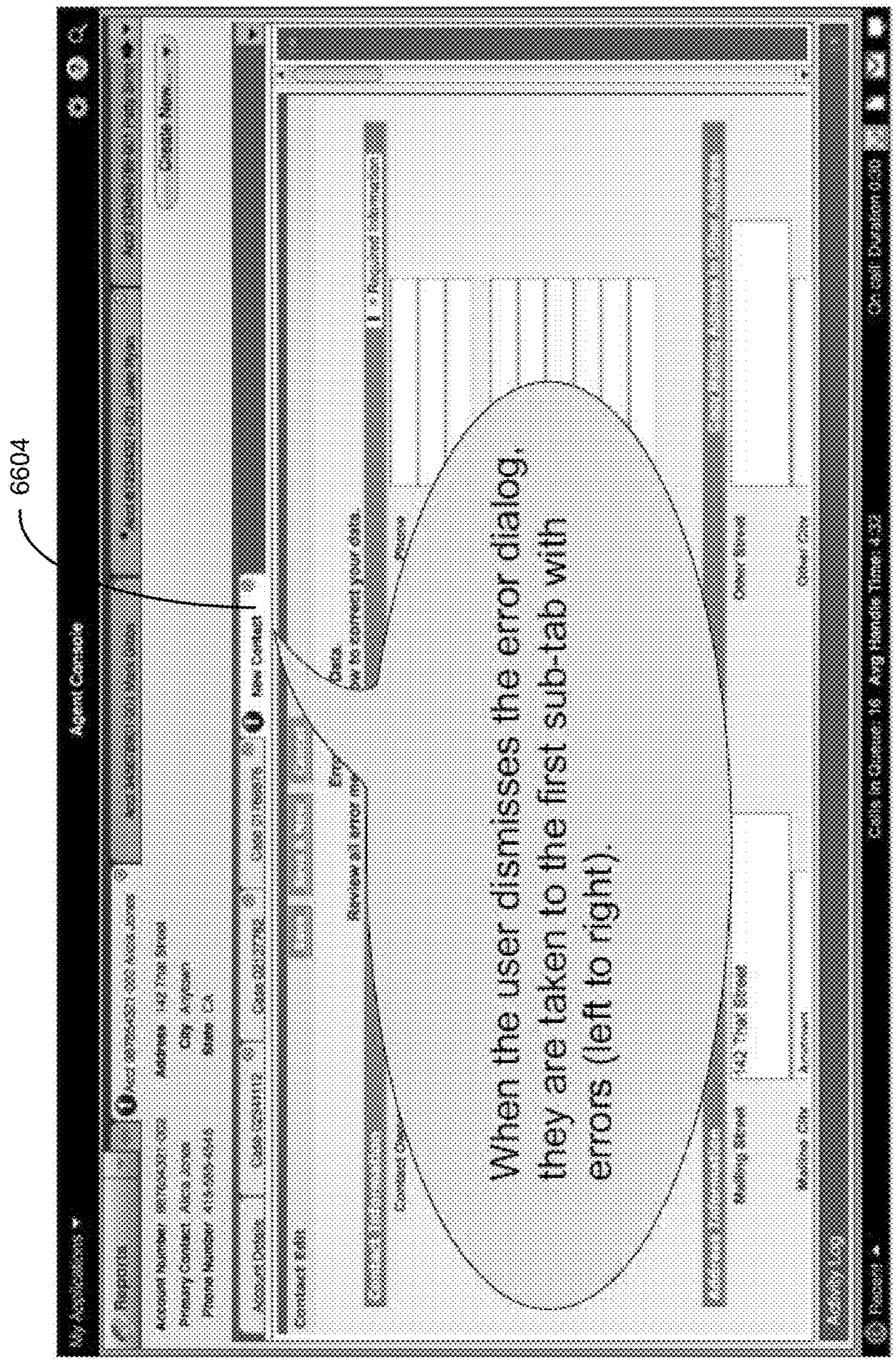

If the save request was validated, then the interrupt event may be completed, as shown at 436. For example, if the interrupt event was a request to save tabs and did not include a request to close tabs or leave the service cloud console, then the dialog and any dirty tab indicators may be removed, as shown in FIG. 64. In this case, any New tab may be renamed with its correct identification (e.g., "Case #####"). As another example, if instead the interrupt event included a request to close the unsaved tabs, then the now-saved tabs may be closed and focus may be turned to the last viewed workspace (or the navigation tab if no workspace remains open).

Figure 67:
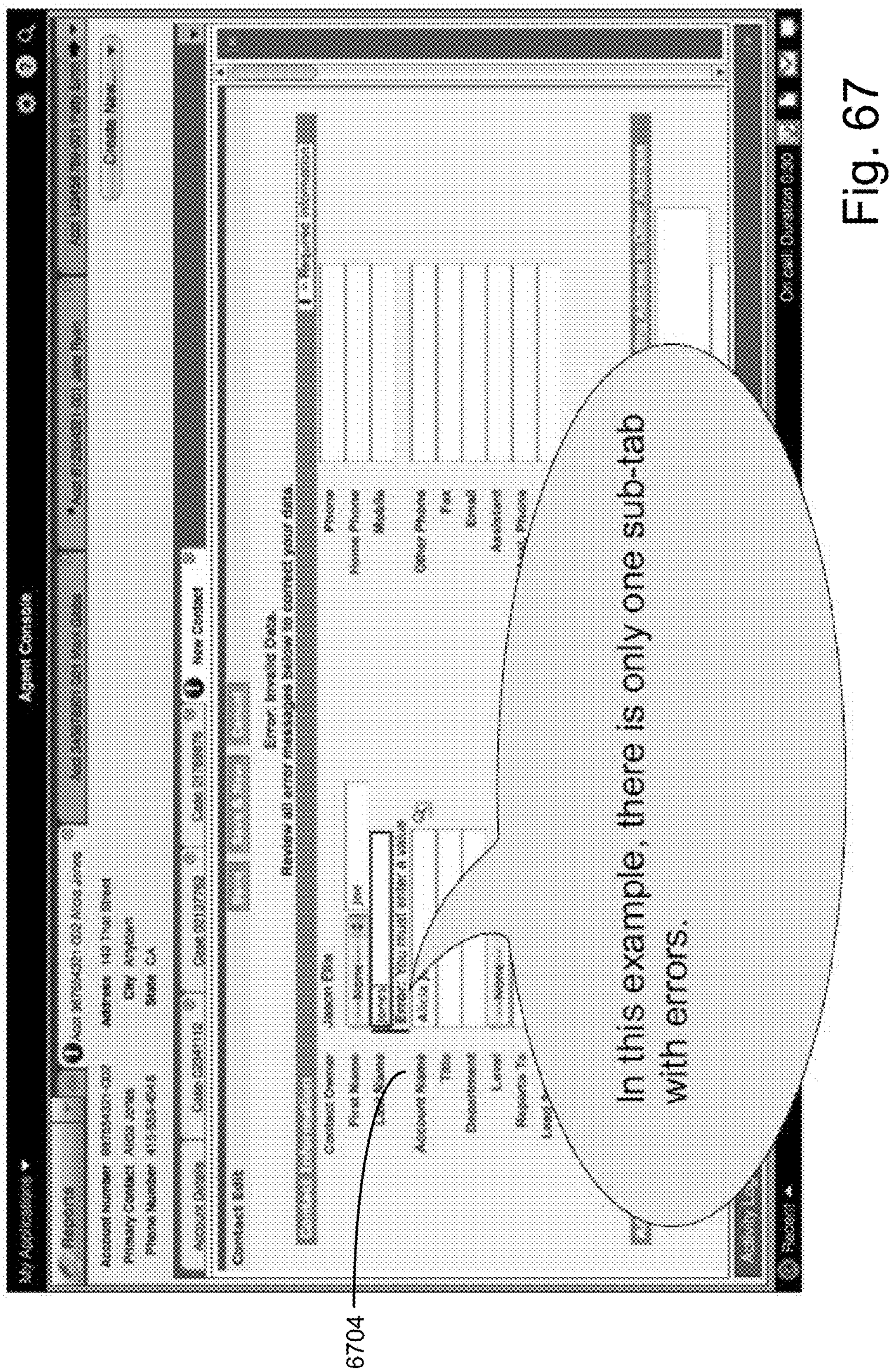
Figure 68:
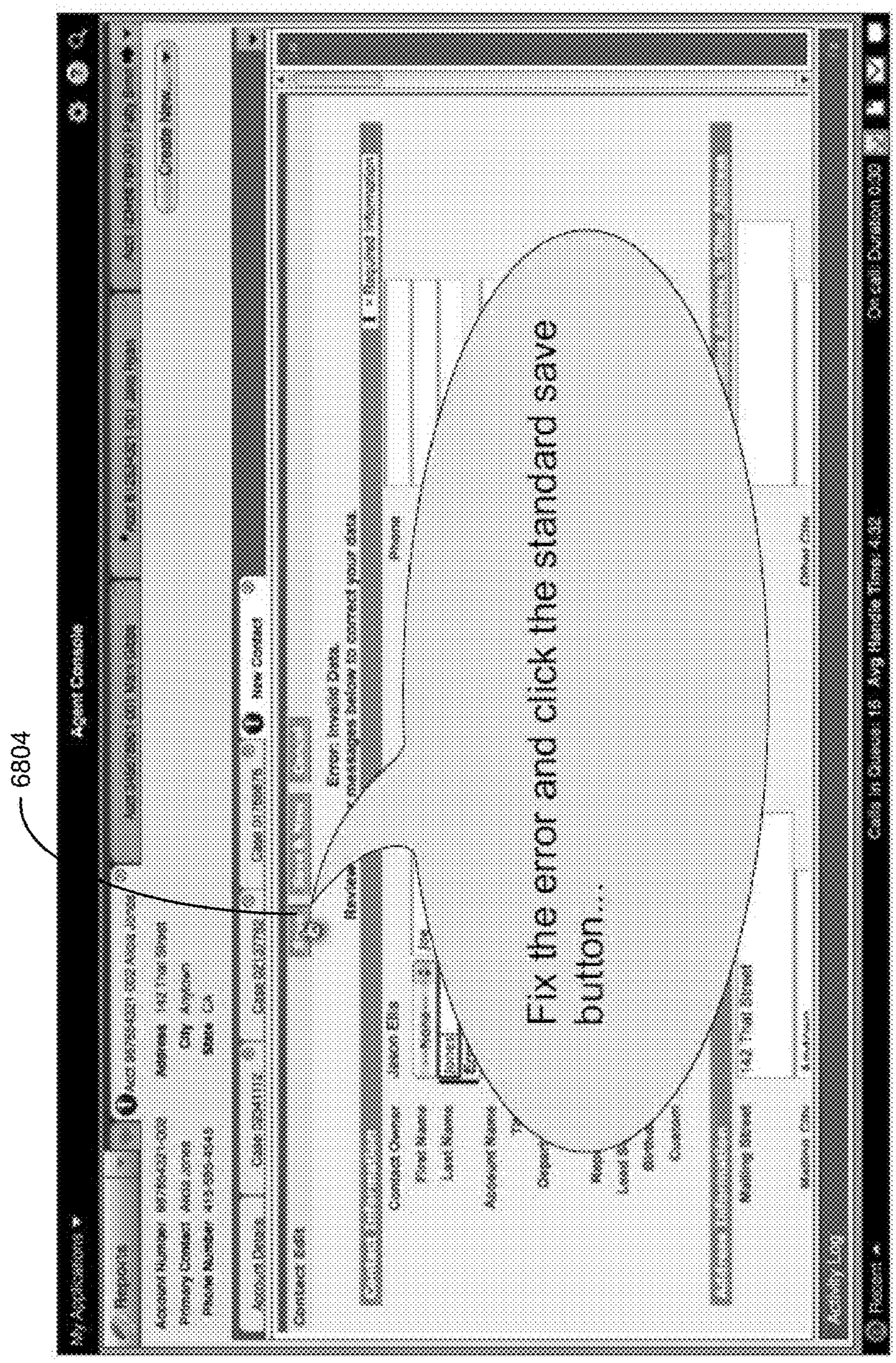
Figure 69:
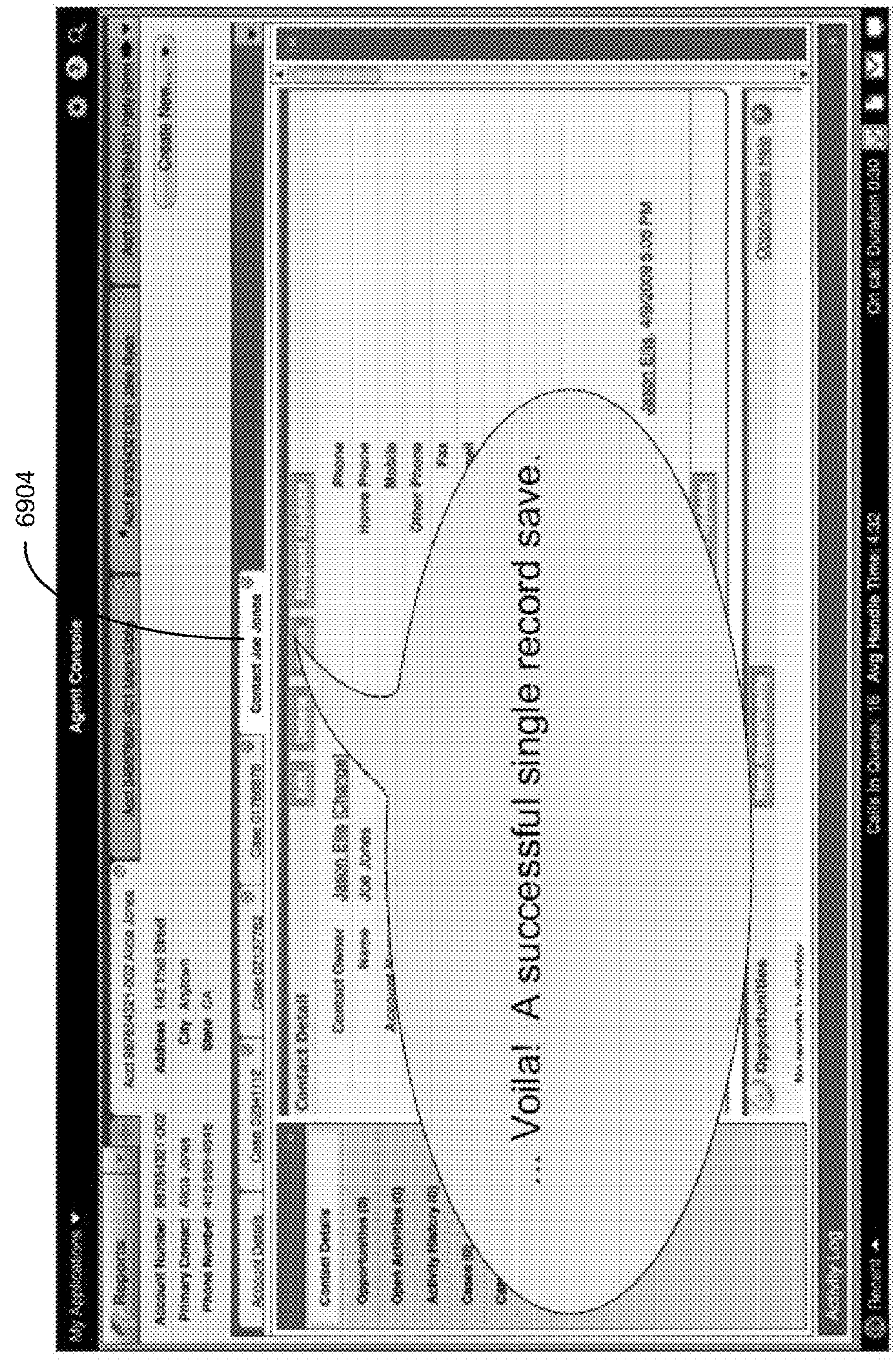

If it is determined, as shown at 456, that the save request was not validated, then errors may be marked in the service cloud console. For example, subtab 6604 shown in FIG. 66 includes an error icon indicating that the subtab has an error. The errors may be marked by adding an error icon to a tab that contains an error and/or indicating one or more fields in a tab that contain an error. For example, the "Last Name" field 6704 in FIG. 67 is marked with an error.

When the save request is not validated, an error message may be presented. For example, the dialog box 6504 shown in FIG. 65 includes a message that states: "Errors found on 1 item. Please go to tabs with the [error] icon to fix errors." Dismissing the error message by clicking the "Go Fix Errors" button 6508 may result in focus being directed one of the subtabs (e.g., the first subtab) with an error message.

When errors are marked, the interrupt event is not completed, as shown at 428. For example, if the interrupt event included a request to close one or more tabs, then those tabs may not be closed. When the interrupt event is not completed, the agent may attempt to fix the identified errors. For example, an attempt to save the corrected information may be made by clicking the save button 6804*s* shown in FIG. 68.

When the corrected information is successfully saved, the error indications displayed in the user interface may be removed. For example, the subtab 6904 shown in FIG. 69 does not have an error icon.

Figure 5:
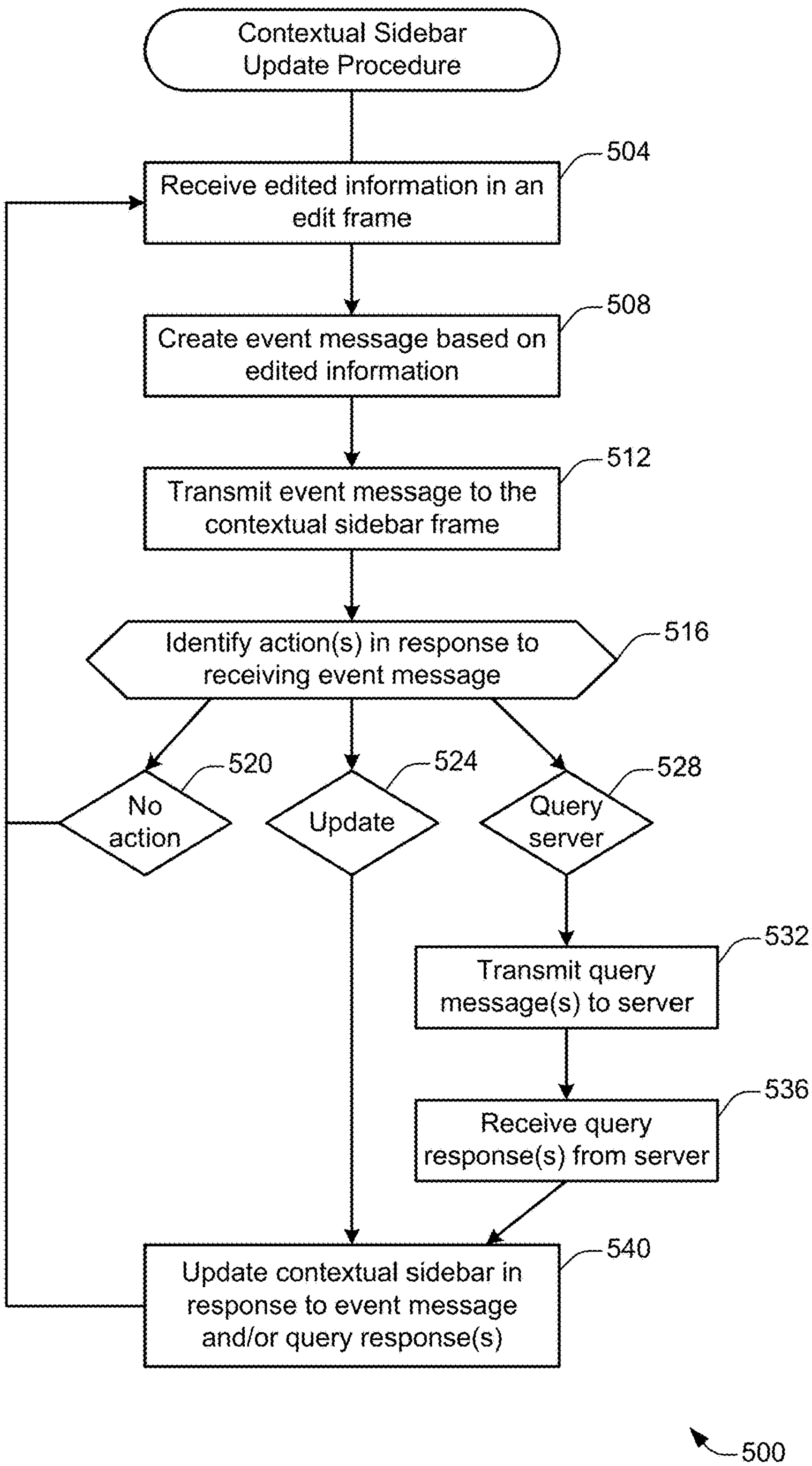
FIG. 5 shows a flow diagram of a method 500 for updating a contextual sidebar, performed in accordance with one embodiment.

FIG. 5 shows a flow diagram of a method 500 for updating a contextual sidebar, performed in accordance with one embodiment. The contextual sidebar is a user interface component that displays contextual information that may be related to other information displayed in the console. For example, the contextual sidebar may display one or more knowledge base articles, decision trees, setup procedures, user guides, etc. Images of a service cloud console user interface that includes a contextual sidebar are shown in FIGS. 71-78, according to one or more embodiments.

Figure 71:
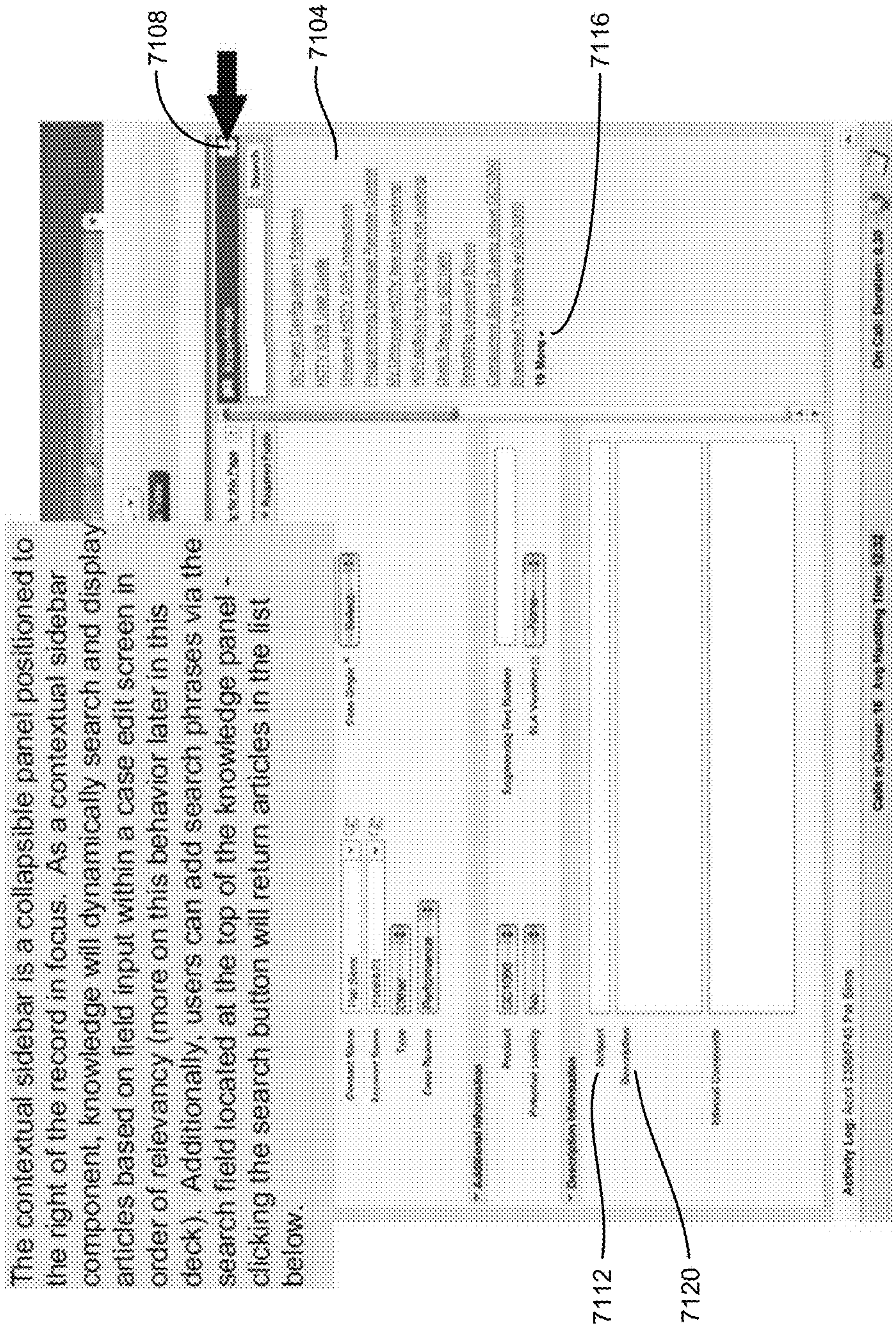
Figure 72:
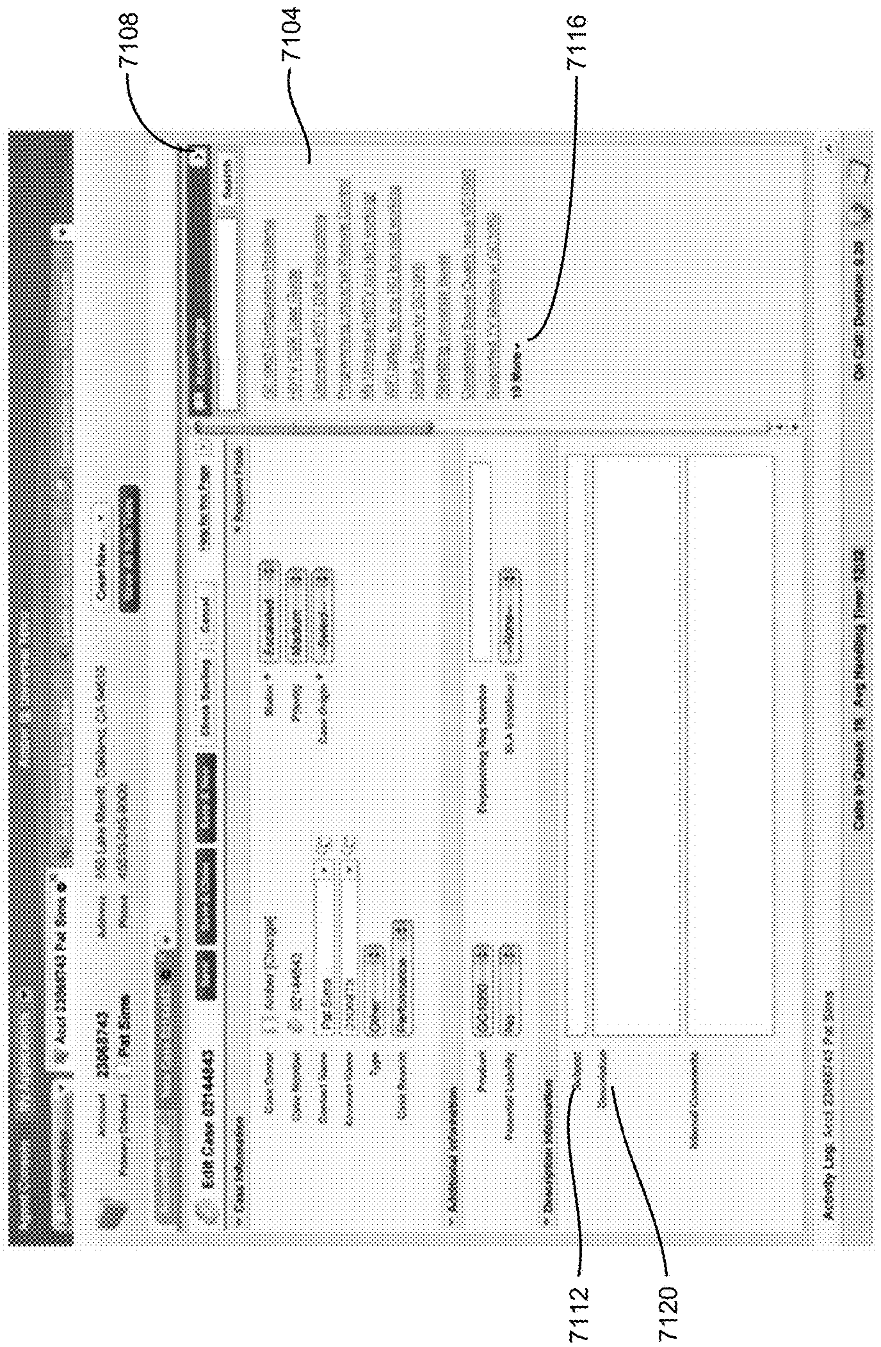

The graphical user interface shown in FIG. 71 includes a contextual sidebar area 7104, which includes a collapsing affordance 7108 and a more links affordance 7116. The graphical user interface shown in FIG. 71 also includes a main view area displaying a record that includes a subject field 7112 and a description 7120.

The context view may show objects that are related to the object in the main view. One or more objects in the context view may appear as links which, when clicked, may present an HTML <div> overlay to the user with a detail page. If the object in the main view is in edit mode, the context view may show information about various objects (e.g., as many objects as are known), and may update itself periodically (e.g., as lookups in the main view are updated). The context view may also be updated if the objects in the main view are being inline-edited.

In some embodiments, the contextual sidebar may be displayed in a right hand side of the screen in a visually separate area, as illustrated in FIG. 71. Alternately, or additionally, the contextual sidebar may be displayed in a different area of the screen, such as the left side of the screen, the bottom side of the screen, or integrated with an open record tab. The contextual sidebar may be collapsible.

The context view may be a pluggable entity. For example, it may be an area in which contextual information from third parties may be shown. Some components for the context view area may be available for different console applications. For example, one or more of the "suggested solutions" and "entitlements" may be universally available. However, the context view can also define an open interface whereby third parties can create their own context-aware components to display in that section. For example, customers may add information about billing (e.g., in an account context), or return merchandise authorizations (RMAs) (e.g., in a case context).

Figure 73:
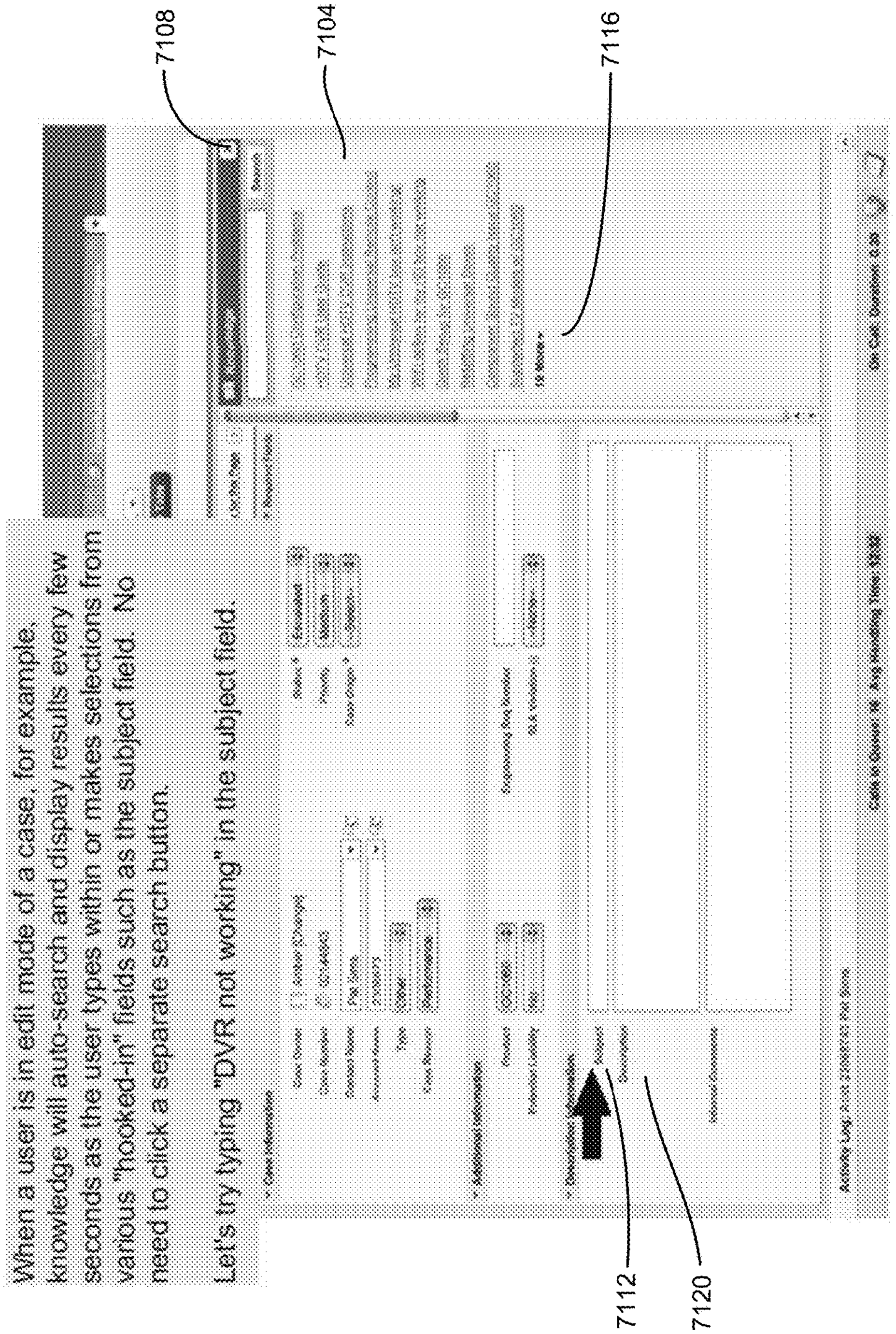

The context mode may have knowledge of some or all of the data entered in detail mode, such as the subject field 7112 shown in FIG. 73. The context mode may allow the context view to react to data as it's entered in edit mode (e.g., in the main view or in another view in the console).

The contextual related data component may be a layoutable component that shows contextual data from related objects (e.g., the account and contact minilayouts when a case is displayed in the main view).

The contextual suggested articles component may display suggested articles in a context view. If a case is shown in the main view, whether it is in edit mode or detail mode, suggested articles may appear in the context view. For example, suggested articles may appear when at least one of the subject or description fields is entered. These articles may appear with checkboxes next to them such that when the case is saved, these articles can be automatically related to the case. These articles may appear as links. When those links are clicked, an HTML <div> overlay may appear which allows the agent to view the solution without losing the context of the case he's working on. Articles related to the current case may be denoted with an icon indicating that they are attached already.

Figure 74:
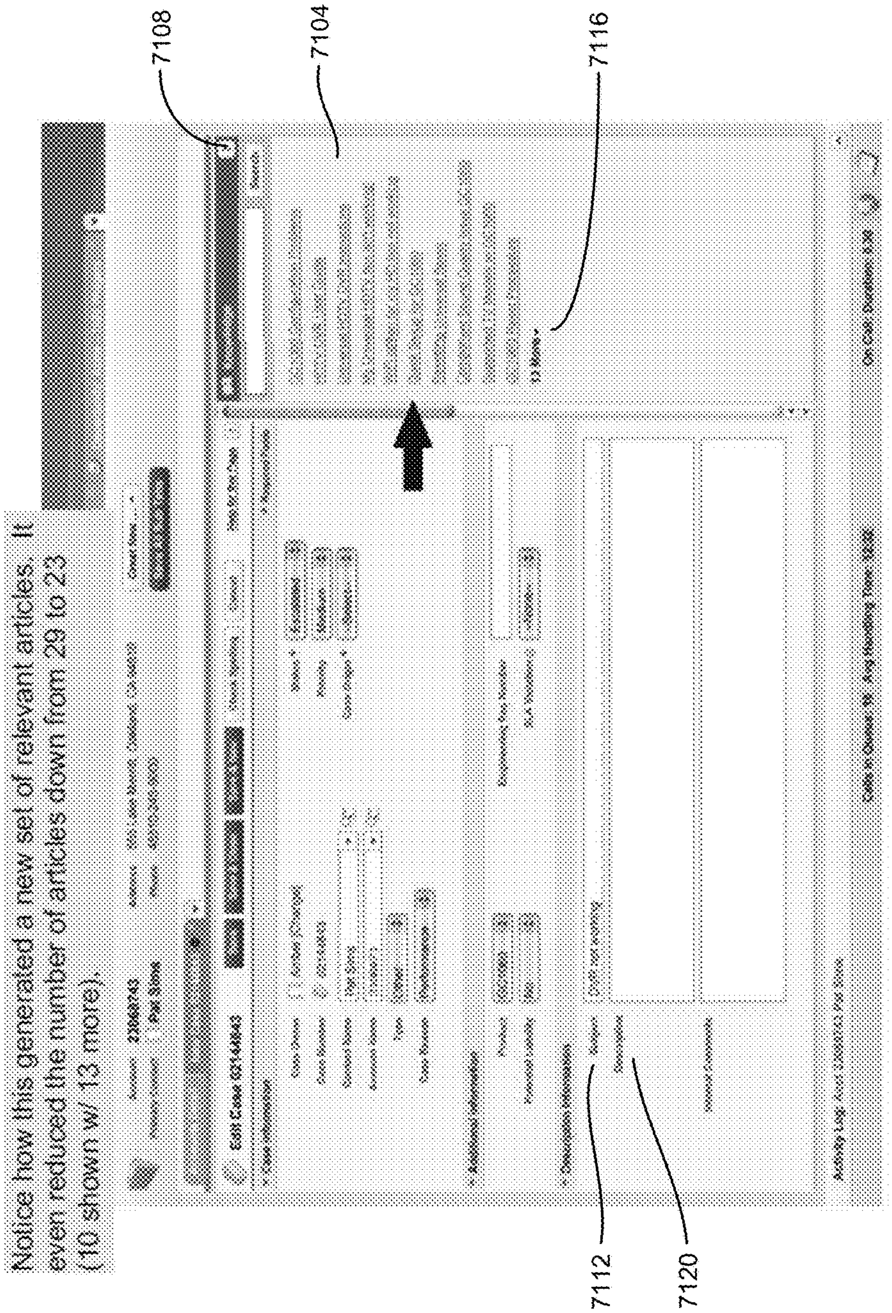

The contextual suggested articles area may update itself periodically (e.g., as the user types data into the case edit page) so that the case can potentially be closed before it is even saved. Articles may be able to be attached to the case, even prior to the first case save. As shown in FIG. 74, the links to articles presented in the knowledge section of the contextual sidebar area 7104 relate to information entered in the edit case section, such as the product, subject, and/or case reason.

Figure 75:
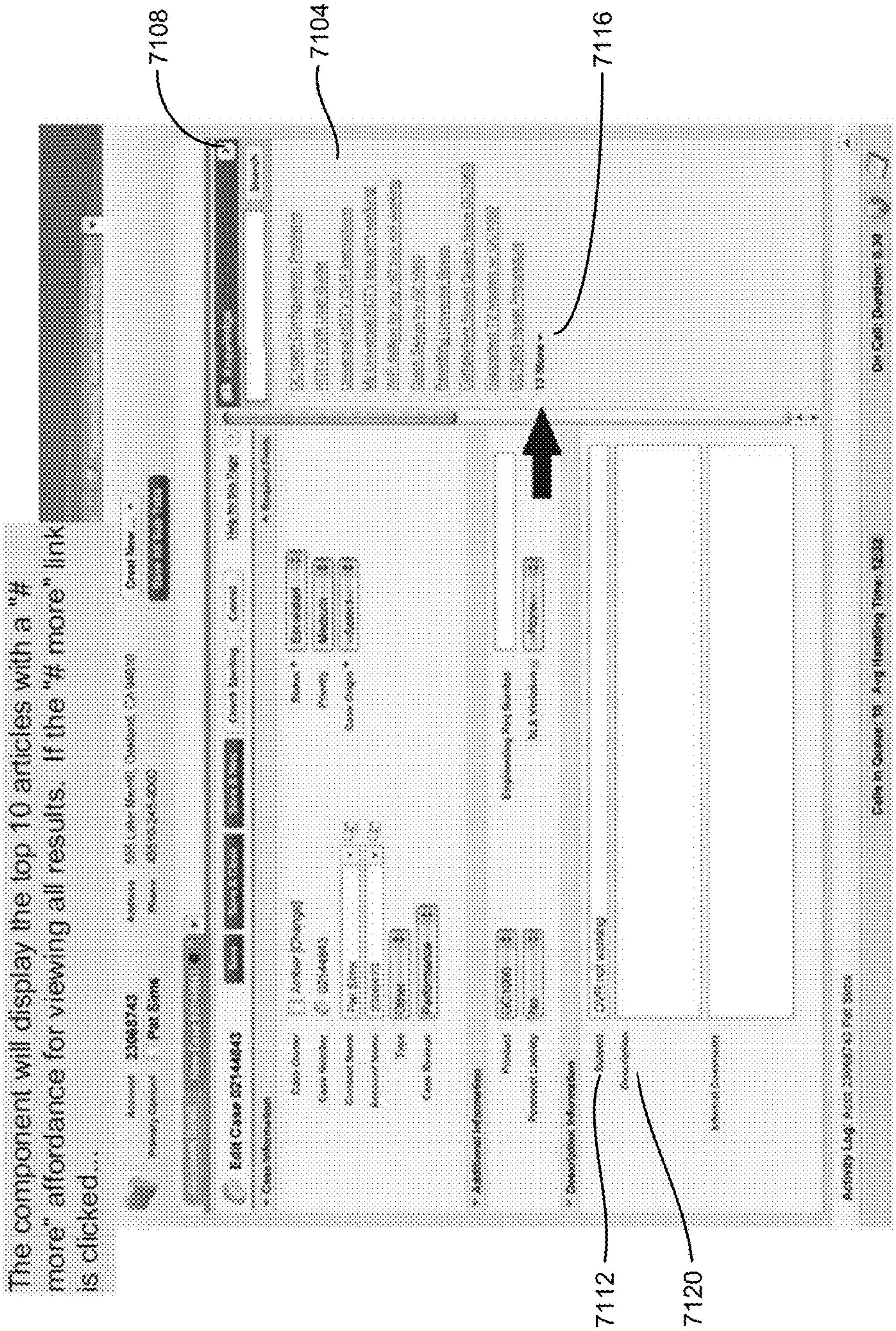
Figure 76:
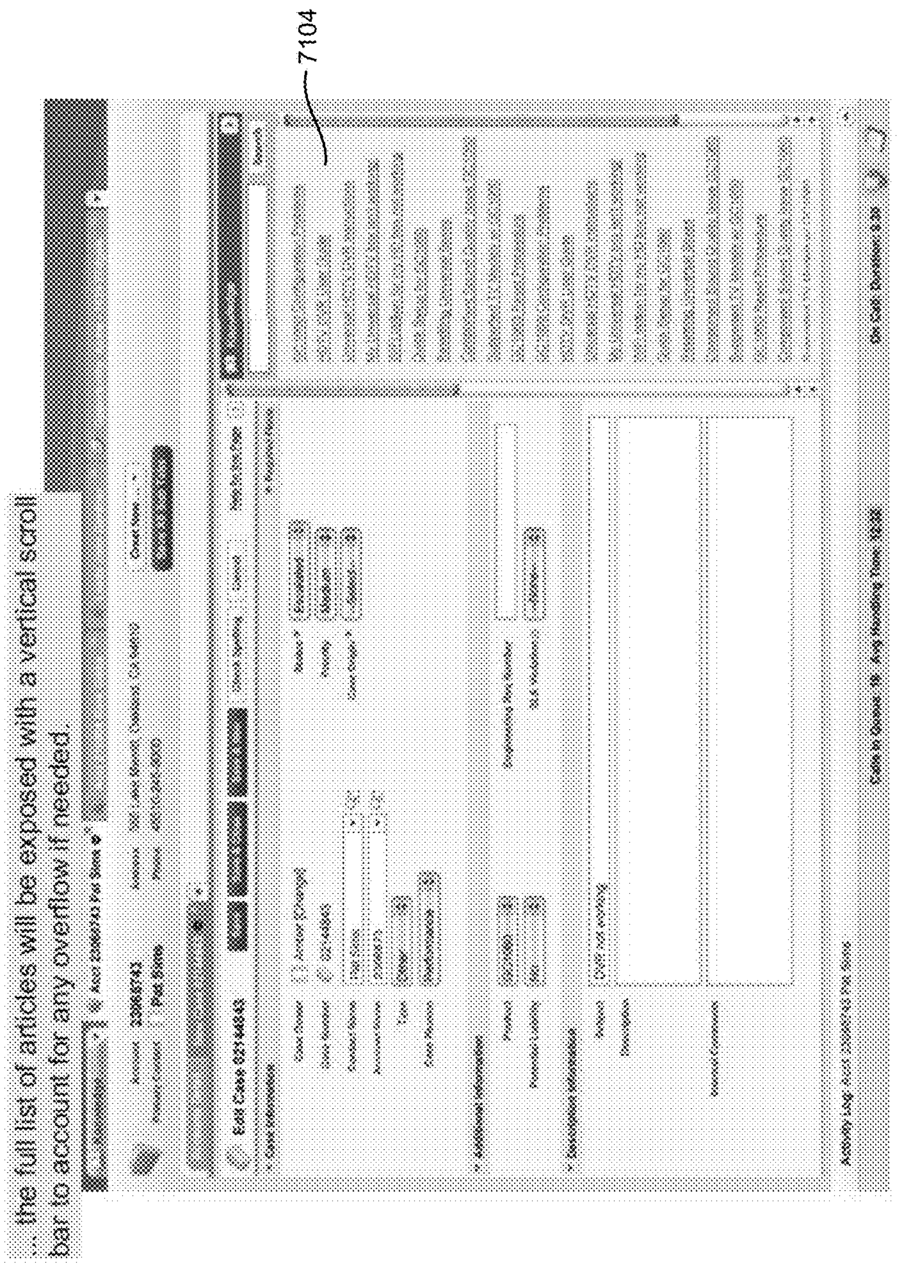
Figure 77:
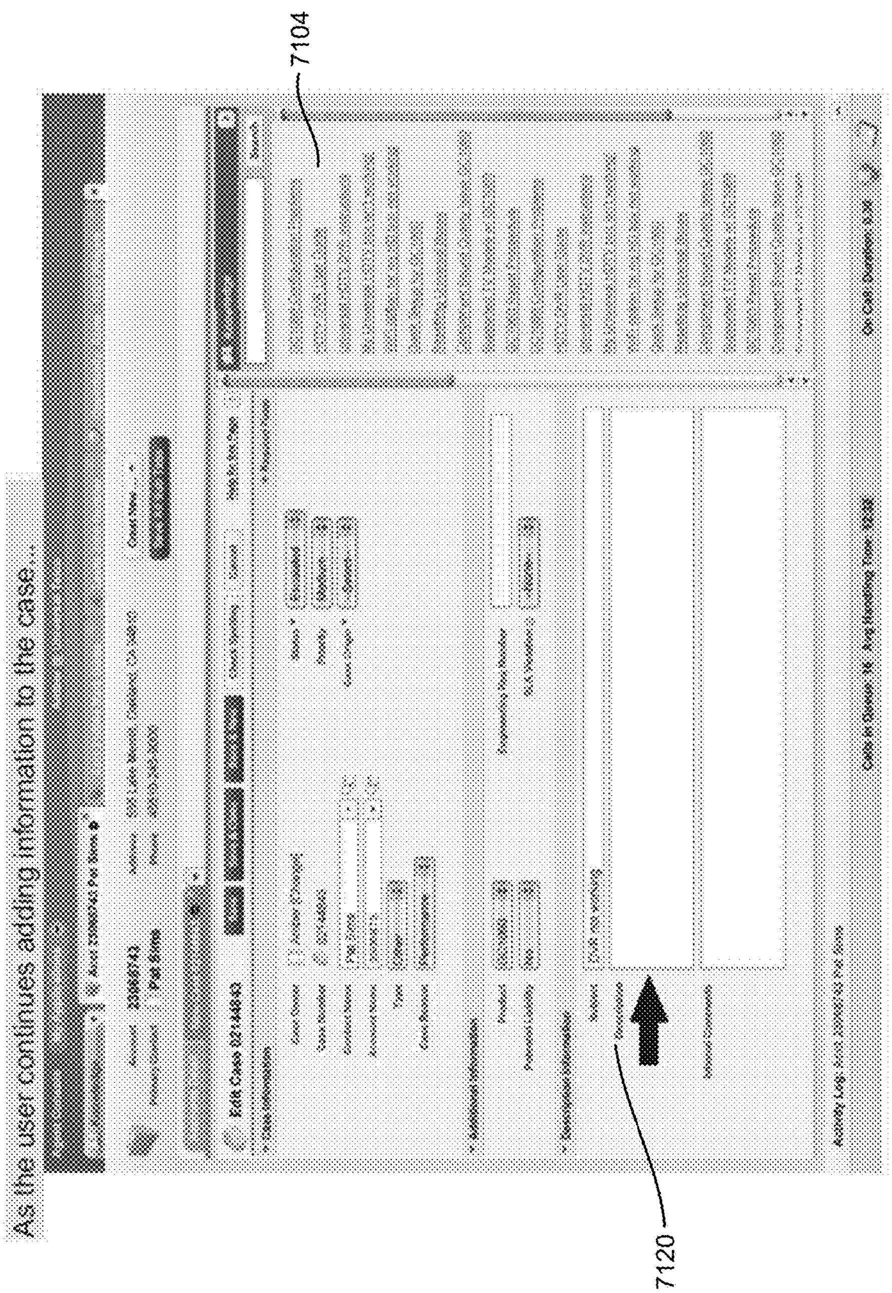
Figure 78:
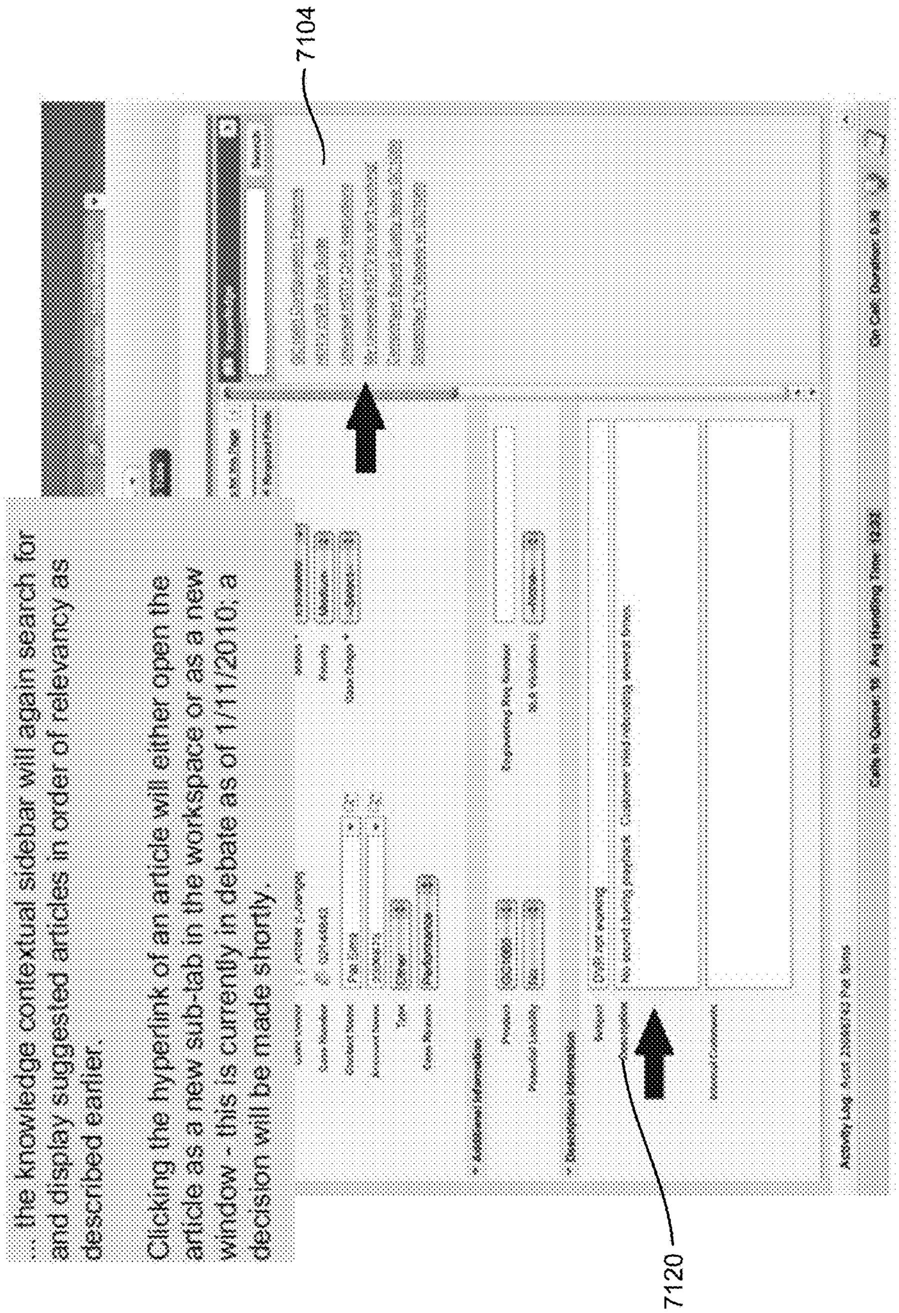

In one or more embodiments, as shown in FIG. 75, the contextual sidebar may present more information than is actually displayed. In this case, a user may be able to display the additional information. For example, the user may click the more links affordance 7116, as shown in FIGS. 75 and 76, to reveal the additional information. When an article is clicked, it may appear as a primary tab or a subtab of the current workspace.

The contextual entitlements component is a component that may allow an agent to verify the entitlements of a person or item. For example, if a contact, account, asset or contract is shown in the main view, the contextual entitlements component may allow an agent to verify whether that person or item is eligible for support, and may be able to take any additional information needed to provide that support. For instance, if a contact is shown in the main view, then the entitlement component might display a list of that contact's assets and entitlements related to those assets, and allow the agent to select an entitlement that's relevant to that contact-asset pair.

The contextual offer management is a component that may be driven by an offers capability (e.g., in Salesforce® Knowledge). When any object is shown in the main view that has a relationship to a contact or account, the contextual offer management component may display offers that are relevant to that contact or account.

The contextual decision tree is a component that may be driven by a decision tree capability (e.g., in Salesforce® Knowledge). When any object is shown in the main view that has a relationship to a contact or lead, the contextual decision tree component may display decision trees and/or call scripts that may be relevant for that caller and/or that could potentially result in lead conversion, case creation, knowledge base article presentation, or other such actions.

The call director is a call scripting component which may lay out the steps that the agent must take to complete the task presented in the call. Each step may be presented as a link which displays one or more steps. When that link is clicked, the relevant documents may be shown in the console view. For instance, Step 1 might be "Verify Caller." Until verification has occurred, the subsequent steps may not "light up." Upon verification, step 2 may "light up" and the agent may be taken to the relevant page. For example, if the call is about account balance, the agent may be taken directly to the billing page or tab. If the agent clicks on any previously completed step, he may be taken to the (possibly already filled) screen associated with that step.

In some embodiments, the contextual sidebar may be automatically and/or dynamically updated based on information entered elsewhere in the console. For example, when information regarding a customer support issue is entered into a secondary tab, the contextual sidebar may automatically update to display knowledge base articles related to the customer service issue. As another example, when information is entered related to billing, the contextual sidebar may be automatically updated to display information such as billing procedures for the account.

In one or more embodiments, the contextual sidebar may be displayed in a browser frame separate from one or more other browser frames in which information is displayed. For example, information may be entered in a primary or secondary record tab entered in a first HTML iframe. The record tab may be opened using a record open method 200, as shown in FIG. 2. The contextual sidebar may be displayed in a second HTML iframe.

In one or more embodiments, the contextual sidebar and edit frame may be different iframes served from the same domain. The contextual sidebar and edit frames may communicate using a client-side scripting language, such as JavaScript® or VBScript. In some embodiments, the contextual sidebar and the edit frame may be served from different domains. One or more techniques for cross-domain communication are discussed herein, for example with respect to FIG. 10.

In one or more embodiments, some or all of the operations in the contextual sidebar update method may be performed without refreshing the browser page in which the console application is displayed. For example, one or more server queries may be transmitted and/or received using Ajax, Comet, or other techniques for communicating between a client and server without refreshing a page.

In one or more embodiments, one or more instances of contextual sidebar update method may be executed upon identification of one or more of various triggering events. For example, the contextual sidebar update method may be executed automatically at a regular time interval, such as every five seconds.

In some embodiments, the contextual sidebar update method may be executed automatically based on a received user action. For example, the contextual sidebar update method may be triggered by the transfer of focus between two HTML form fields, the initiation of entering of user input, a pause in entering user input, or any other type of user action.

In one or more embodiments, the contextual sidebar update method may be executed at the request of the agent. For example, a request to search for information may be received at a search field in the contextual sidebar area 7108 shown in FIG. 71.

In some embodiments, the contextual sidebar method may be executed dynamically when edited information is received. The edited information that may trigger the contextual sidebar update method may include the receipt of one or more single characters, the receipt of one or more words, the receipt of one or more terminal characters such as a period, or the receipt of any other information.

At 504, edited information is received in an edit frame. In one or more embodiments, the edited information may include user input, information received from one or more servers, and/or information received internally within the console application.

In one or more embodiments, user input may be received at a record tab, interaction log, or other user interface component. The user input may include updated record information, such as new information received by an agent from a user. Alternately, or additionally, the user input may describe a customer issue or inquiry.

In one or more embodiments, edited information may be received at an edit frame internally within the console application automatically and/or dynamically from one or more other user interface components. For example, an action taken in an interaction log may cause information to be updated in a record tab.

In some embodiments, edited information may be received from one or more servers. For example, information may be transmitted from one or more servers to the console application in response to one or more queries or requests sent from the console application to the server. As another example, information may be transmitted from one or more servers to the console application based on information updated at the server (e.g., by a different agent).

Receiving the edited information may trigger one or more events associated with a client-side scripting language such as JavaScript® or VBScript. For example, a JavaScript® onEdit event may be triggered by the receipt of edited information in the edit frame.

In some embodiments, a message may be sent to a frame containing data related to the edited information. For example, editing a page related to a case object may trigger a message to a knowledge pane. Various types of pages may be automatically updated in response to the edited information.

At 508, the client-side scripting language event may execute code causing one or more event messages to be generated based on the edited information. The event message may include primary information such as the edited information, pre-existing information, and/or any other information available at the edited frame. Additionally, or alternately, the event message may include one or more indications of information type, the time at which information was entered, or any other meta-information related to the primary information.

Event messages may be generated at various intervals and/or upon various triggers. For example, event messages may be generated upon receipt of one or more edited characters, upon receipt of one or more edited words, upon receipt of one or more edited fields, and/or upon detection that user input has paused for a pre-determined period of time.

The event message is transmitted at 512 to the contextual sidebar frame. In some embodiments, the event message is transmitted by calling one or more client-side scripting language methods. For example, the edit frame may call a method available at the contextual sidebar frame and pass the generated event message as a parameter to the method.

In one or more embodiments, the contextual sidebar may be hosted in an HTML iframe and/or browser page served from a domain that is different from the domain from which the edit frame was served. One or more techniques for cross-domain communication between browser pages and/or HTML iframes are discussed herein, for example with reference to FIG. 10.

At 516, one or more actions are identified in response to receiving the event message at the contextual sidebar frame.

In some instances, as shown at 520, no action may be taken. When no action is taken, the contextual sidebar update method may continue monitoring for new edited information. No action may be taken if, for example, insufficient information is received to update the information displayed in the contextual sidebar. As another example, the information included in the event message may not be relevant to updating the information displayed in the contextual sidebar.

Even when no action is taken to update the contextual sidebar displayed in the user interface, one or more operations may be performed that do not immediately change the information displayed on the screen. For example, all or portions of the information received with the event message may be retained for later use. As another example, the contextual sidebar may transmit one or more messages back to the edit frame.

In some instances, as shown at 524, the contextual sidebar may be directly updated based on the received event message. The contextual sidebar may be directly updated based on the event message when a server query is not needed to change information at the contextual sidebar. For example, the received event message may include information that may cause one or more captions or titles displayed in the contextual sidebar to be altered.

In some instances, as shown at 532, one or more query messages are transmitted to the server to retrieve new contextual information for display in the contextual sidebar. The server may be queried when edited information is received from the edit frame. The edited information that may trigger one or more server queries may include the receipt of one or more single characters, the receipt of one or more words, the receipt of one or more terminal characters such as a period, or the receipt of any other information.

The query messages may include some or all of the information included in the event message received from the edit frame. Alternately, or additionally, one or more query messages may include information not contained in the event message. For example, the query message may identify a new type of information identified for display in the contextual sidebar. For instance, the agent may enter information in a previously empty field in a record tab, such as a case description. In response, the contextual sidebar may transmit a server query requesting a list of one or more decision trees to assist the agent in resolving the problem described in the case description.

In one or more embodiments, the query message may include information identifying one or more records for contextual searching. For example, the query message may include one or more identifiers associated with the secondary tab, the primary tab, or any other record shown in the service cloud console.

In some embodiments, the query message may be transmitted using one or more communication techniques, such as Ajax, that allow communication with the server without refreshing the contextual sidebar page. Alternately, the query message may be transmitted as an HTTP request in which the HTML iframe in which the contextual sidebar is located is refreshed, but without refreshing one or more other components of the console application such as the edit frame.

At 536, the query response is received from the server. In one or more embodiments, the query response may identify new information for display in the contextual sidebar. For example, the query response may identify a user guide or setup procedure that is specific to the case description entered in the edit frame. As another example, the query response may identify a new type of information for display in the contextual sidebar. For instance, the query response may instruct the console application at the client machine to display a new category of information, such as decision trees, that was not previously displayed in the contextual sidebar.

In some embodiments, the query message may be transmitted using one or more communication techniques, such as Ajax or Comet, that allow communication with the client without refreshing the contextual sidebar page. Alternately, the query response may be transmitted as an HTTP request in which the HTML iframe in which the contextual sidebar is located is refreshed, but without refreshing one or more other components of the console application such as the edit frame.

At 540, the contextual sidebar is updated in response to the event message and/or query response. Updating the contextual sidebar may include changing the information displayed in the contextual sidebar. The information that is changed may include one or more titles or captions, links, articles, or any other information displayed in the contextual sidebar.

In some instances, the changed information may reflect a query response received from the server. In this case, one or more new links to contextual information made available by the edited information may be displayed. Alternately, or additionally, one or more new steps in a decision tree may be displayed. In this way, new information may be provided to the agent based on information entered in the console application without refreshing the web page or otherwise interrupting the presentation of the console application user interface.

Figure 6:
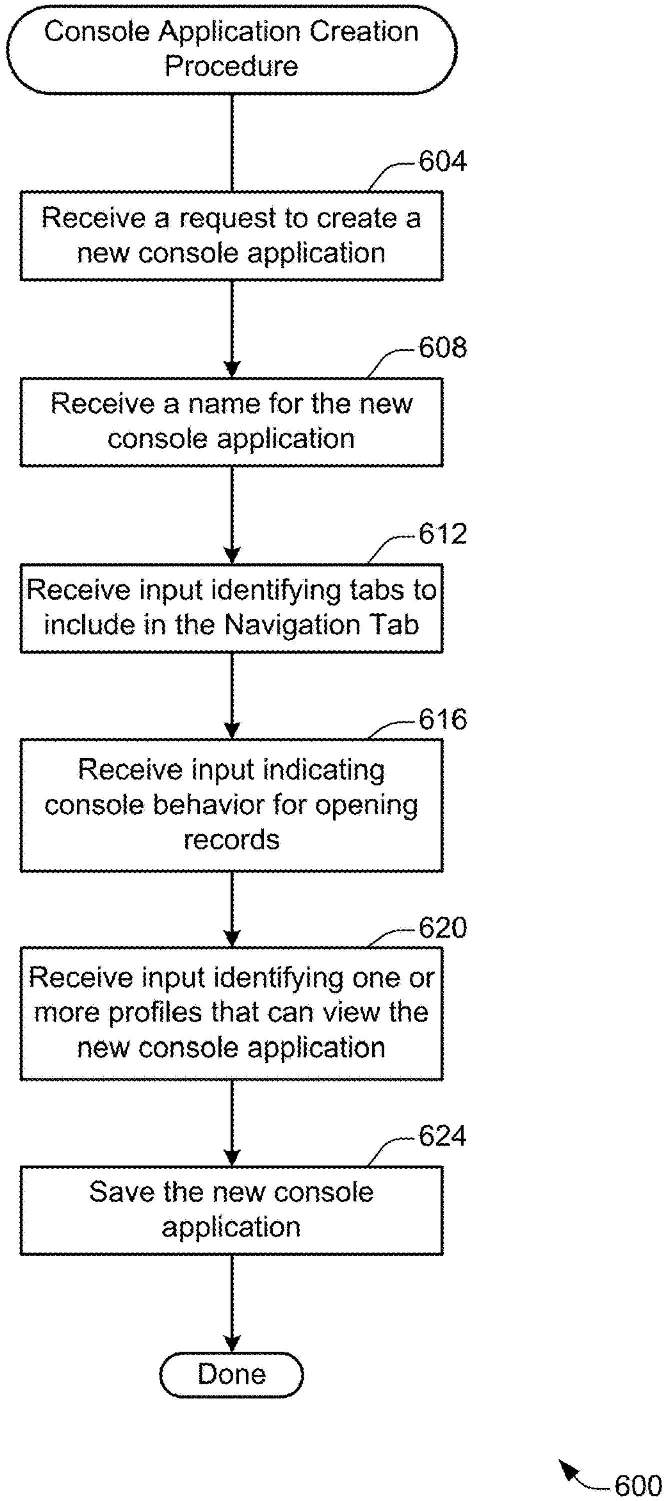
FIG. 6 shows a flow diagram of a method 600 for creating a console application, performed in accordance with one embodiment.

FIG. 6 shows a flow diagram of a method 600 for creating a console application, performed in accordance with one embodiment. The console application creation method shown in FIG. 6 may be performed to create a service cloud console application that is customized for one or more customers. For example, customers may specify such attributes of a console application as the content of the navigation tabs, behavior for opening records, profiles for users who may view the console application, etc.

Figure 14:
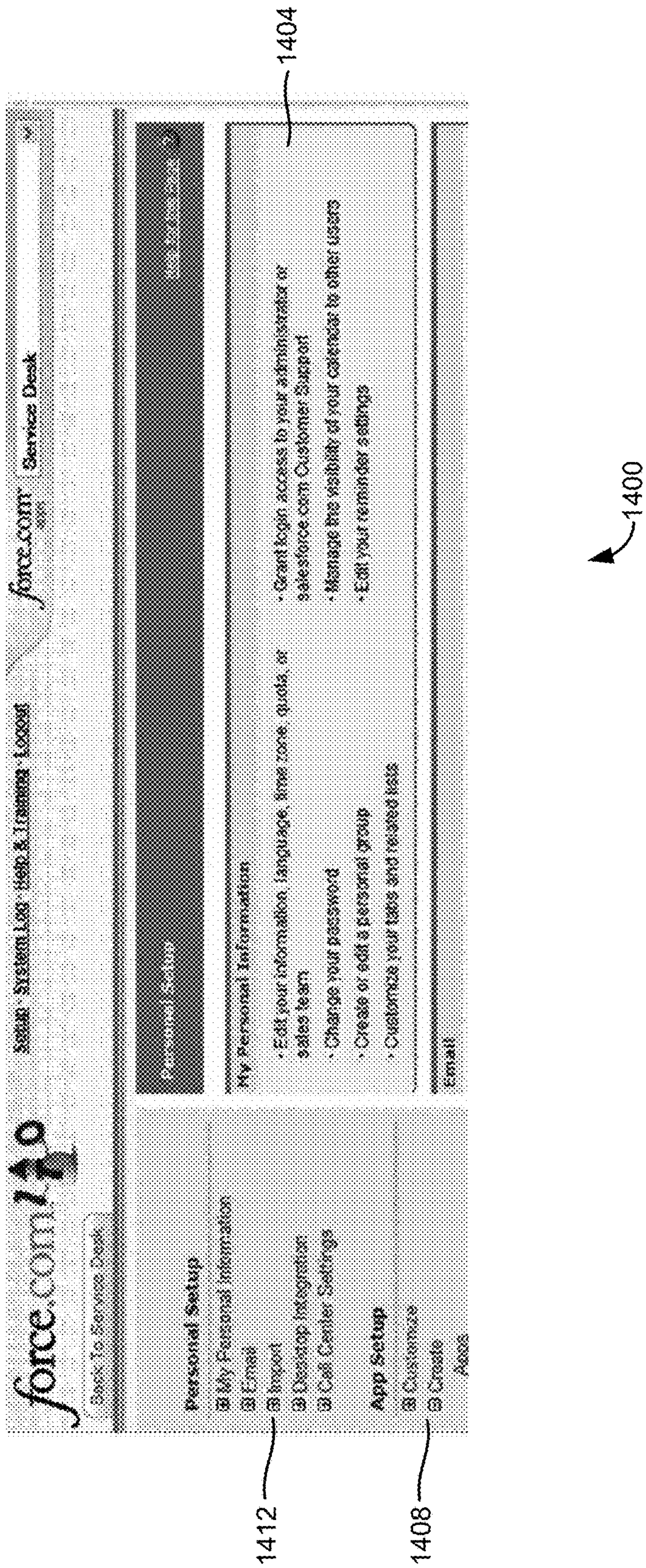

In one or more embodiments, the console application creation method 600 may be selected from a setup page, such as the setup page 1400 shown in FIG. 14, allowing an organization to setup and maintain one or more services provided by the on-demand service environment. Setup page 1400 includes a main settings page 1404, personal setup section 1412, and an application setup section 1408. The personal setup section 1412 provides one or more selections of personal settings pages for the current user, such as an e-mail setup page and a desktop integration setup page. The application setup section 1412 provides one or more selections of application setup pages for setting up one or more service cloud console applications, such as a customize page and a create page. The main settings page 1404 displays the selected setup page and may provide the ability to change one or more settings.

In some embodiments, the console application creation method 600 may be performed to develop a customized console application for an organization sharing a multi-tenant, on-demand service environment with other organizations. By creating a customized service cloud console application, the organization can benefit from the functionality provided by accessing the service cloud console on an on-demand basis, while having the service cloud console reflect the needs, policies, and preferences of the organization.

In one or more embodiments, an organization may be provided with a default service cloud console application if the organization enables the service cloud console but has not yet provided customization information. In some embodiments, organizations may be provided with a selection of default or template applications. The selection of default or template applications may have different initial settings.

At 604, a request is received to create a new console application. The request may be received from a client machine in communication with a server. The client machine may be operated by a user acting on behalf of an organization. One or more operations may be performed to verify the identity and/or authorization of the client machine and/or user. In some embodiments, the request to create a new console application may be received at an application setup and configuration page such as the one shown in FIGS. 90-92.

Figure 90:
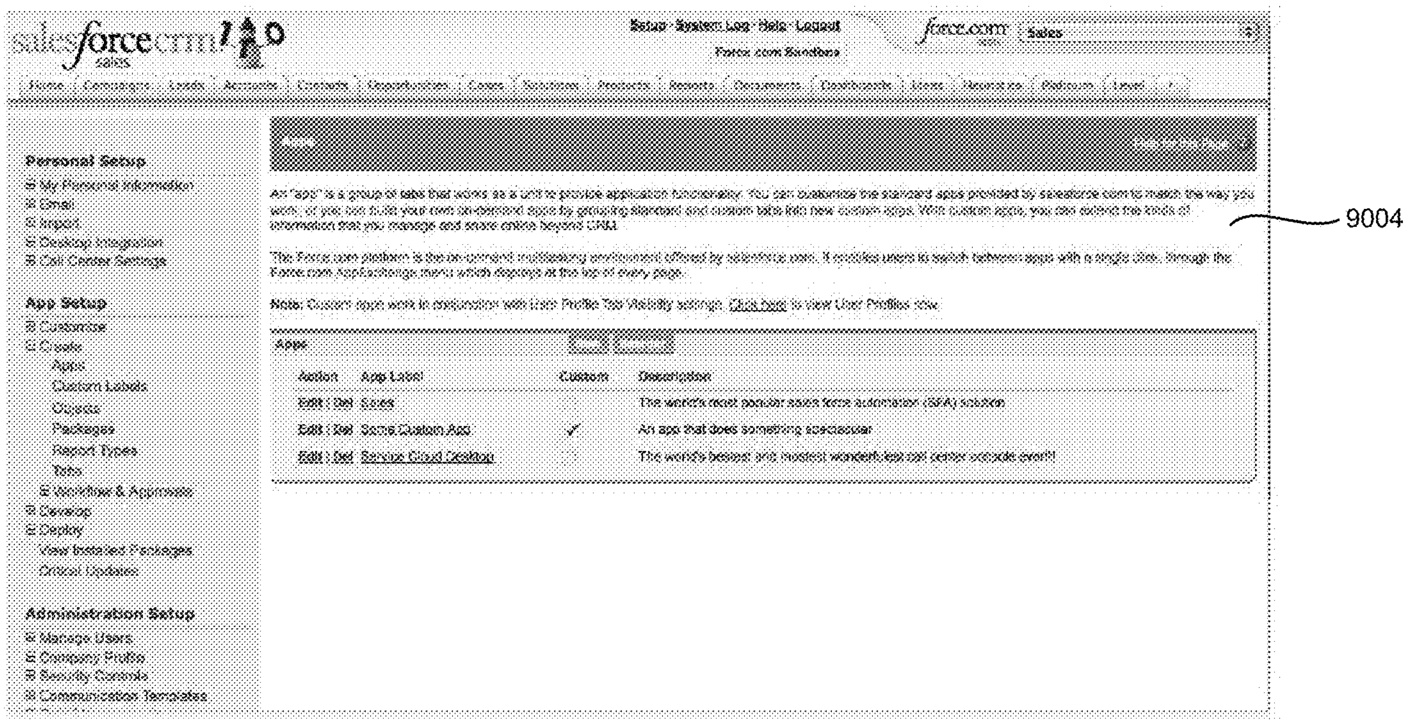
Figure 91:
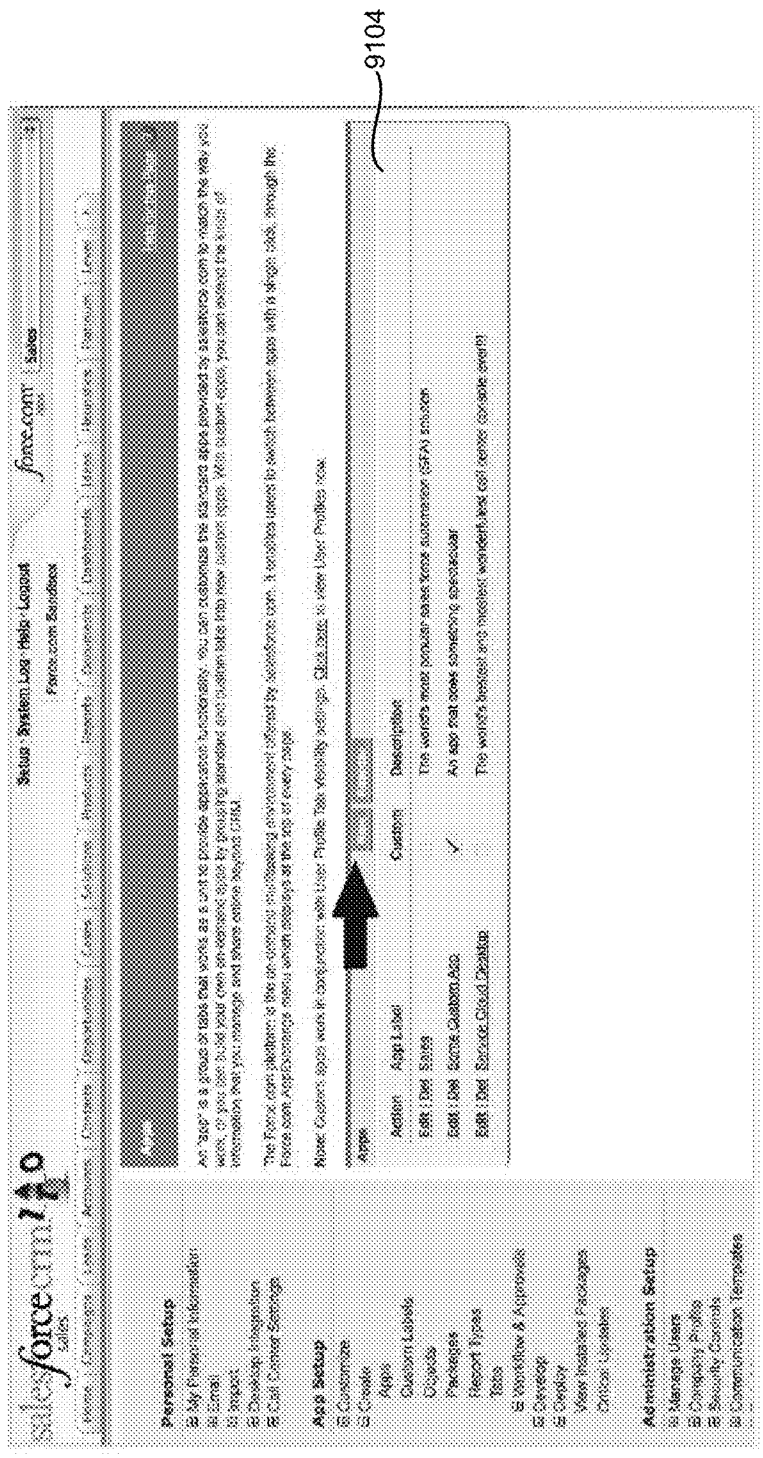
Figure 92:
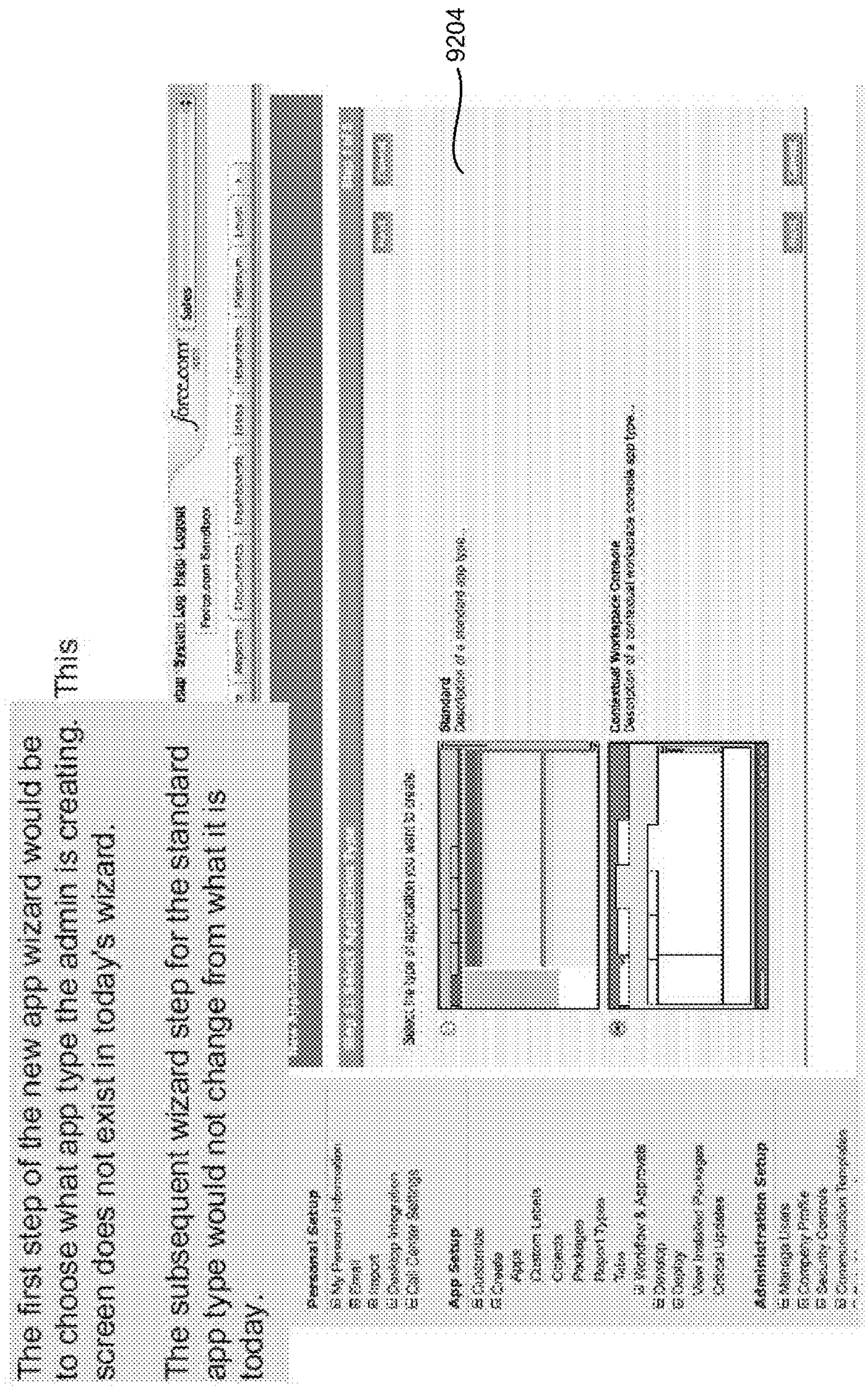

FIG. 90 includes an application setup information area 9004, which provides information regarding setup and configuration for console applications. FIG. 91 includes an application settings interface 9104, which includes links and buttons for setting up and configuring one or more console applications.

One or more embodiments may allow a choice as to the type of console application. For example, FIG. 92 includes a console type selection area 9204 that allows a choice between a standard application or a contextual application.

Figure 93:
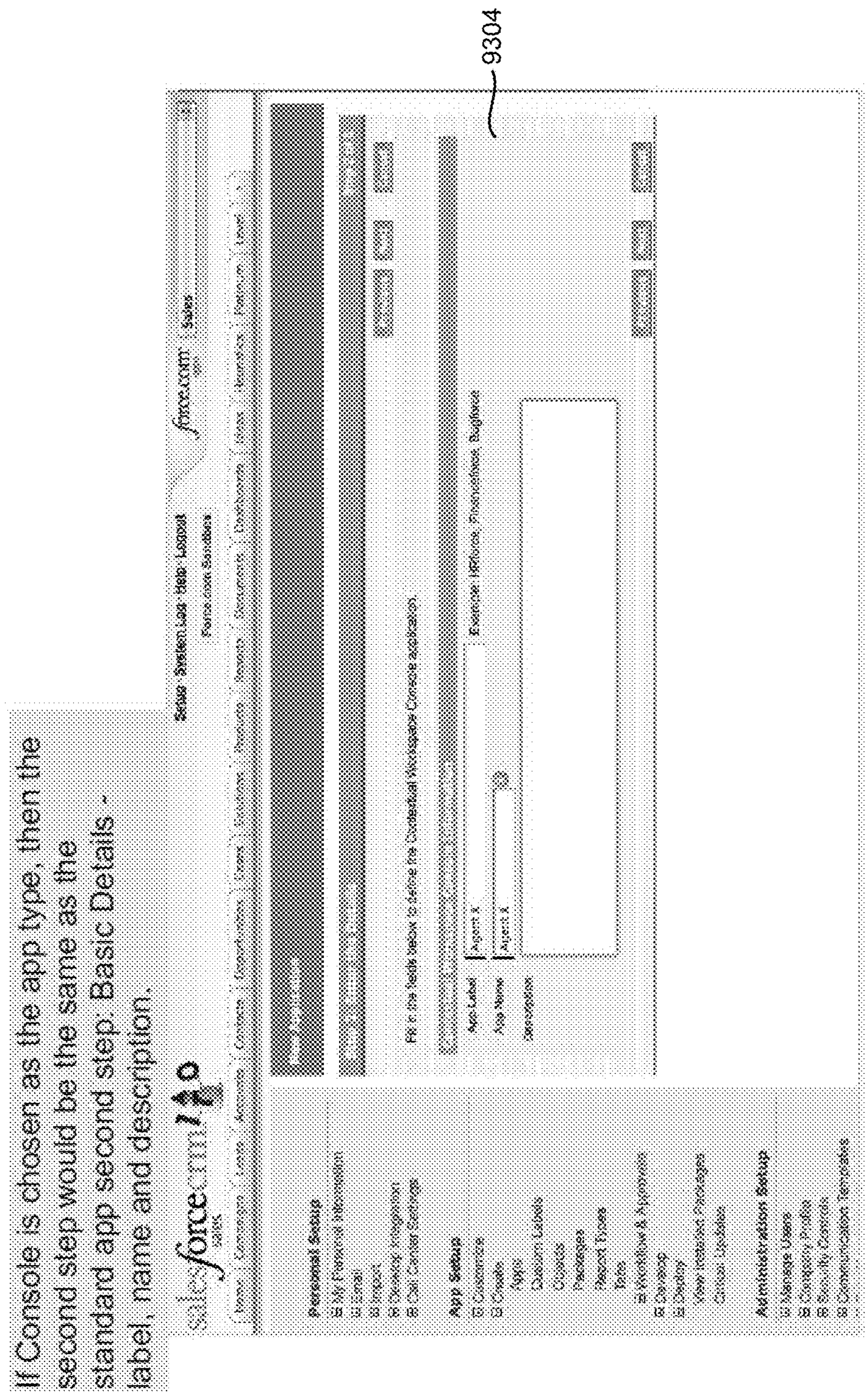

At 608, a name for the new console application is received. In one or more embodiments, the name for the new console may be entered by a user at a client machine in communication with the server. Alternately, or additionally, a default or suggested name may be provided for console application. For example, a name may be suggested based on the organizations identifying information or settings. The console application information input interface 9304 shown in FIG. 93 is an example of an interface that may be used to receive a name for the new console application.

Figure 94:
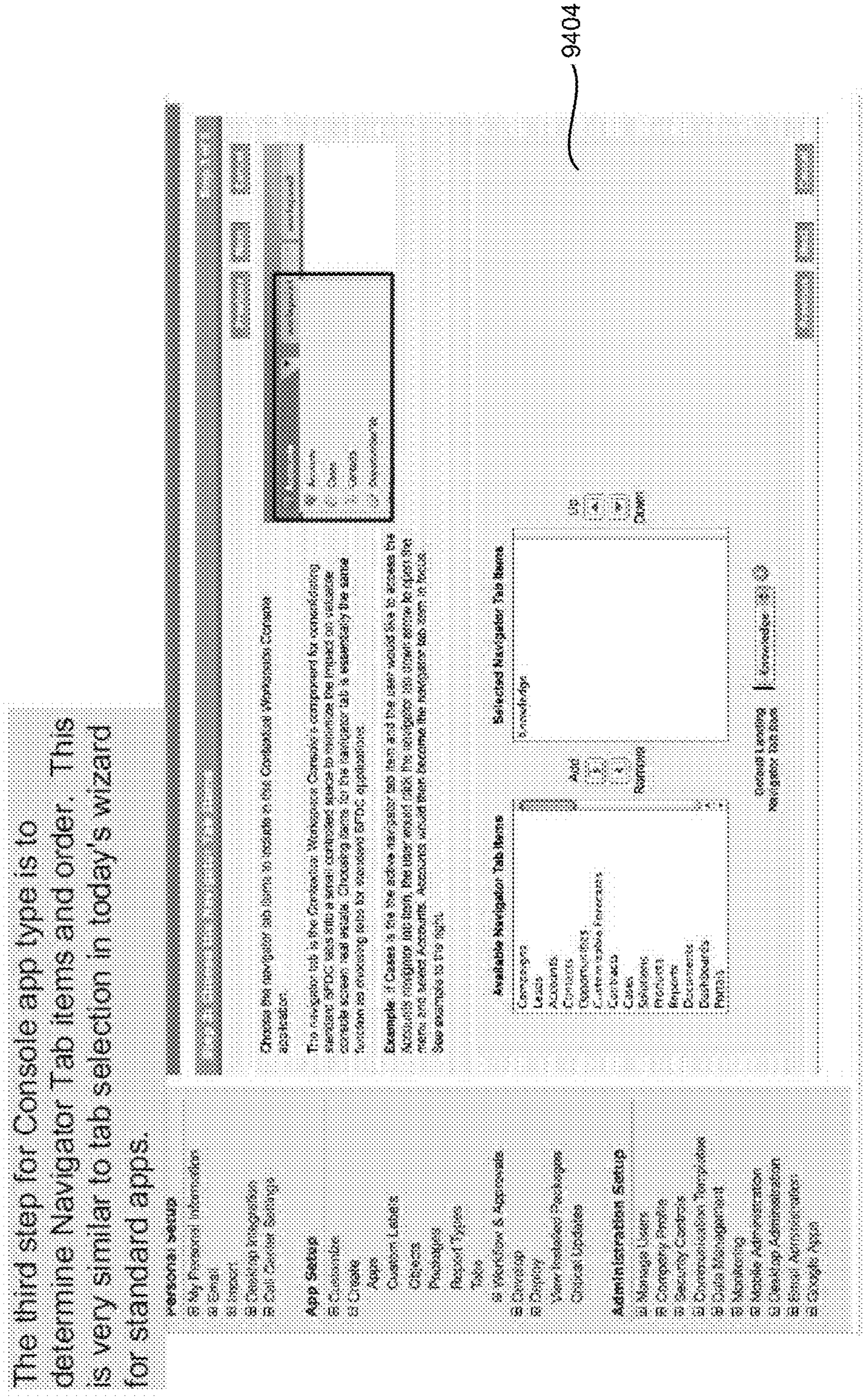

At 612, input identifying tabs to include in the navigation tab is received. Tabs that may be included in the navigation tab may include, but are not limited to: standard objects, custom objects (e.g., bills), custom web tabs, dashboards, reports, forecasts, list views, special workspaces, content, social networking feeds, etc. An example of the selection of tabs is illustrated in the user interface shown in FIG. 94, in which the Knowledge tab item has been added to the navigation tab via navigation tab setup interface 9404.

At 616, input indicating console behavior for opening records may be received. The input indicating behavior for opening records may include information identifying which objects should open as primary tabs (e.g., workspaces), and/or which objects should open as secondary tabs. The input may also include information identifying associations between primary and secondary tabs.

Figure 95:
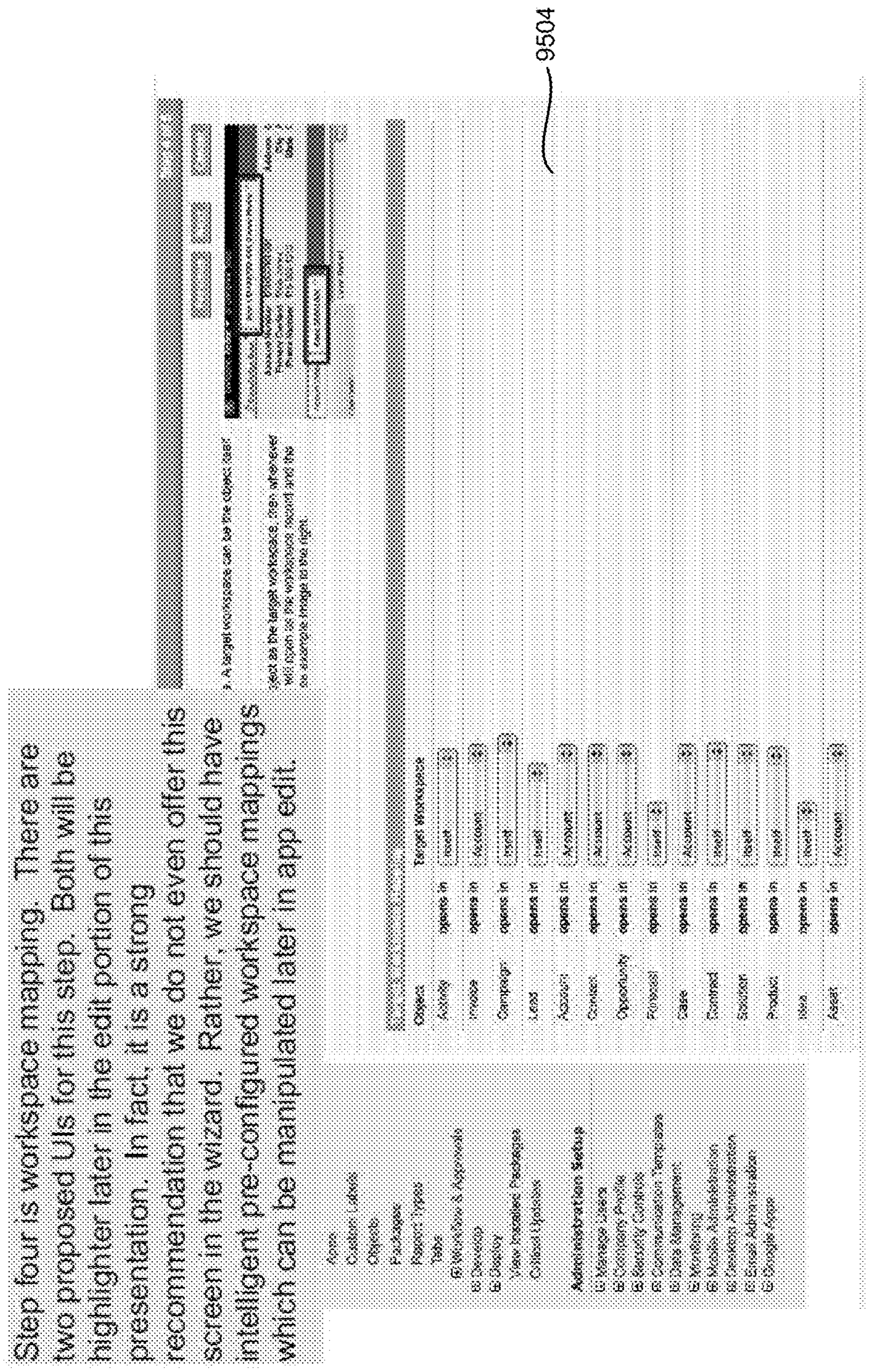

One or more objects may be associated with a target workspace in which the object opens. For example, FIG. 95 includes a workspace mapping setup interface 9504 through which workspace mappings may be manually assigned. Alternately, or additionally, one or more objects may be associated with an intelligent pre-configured workspace mapping which can be manipulated later by editing the console application.

The default application may include one or more objects such as account, contact, case, opportunity, lead, articles, etc. In the default application, objects of type contact, case, and/or opportunity may be subordinate to account. That is, each contact, case, and/or opportunity object may open as a subtab within an account workspace. One or more other objects may be set to open in their own workspace.

At 620, input is received identifying permissions information for the new console application. The permissions information may be used to specify access, editing, and/or configuration information.

In one or more embodiments, the permissions information may specify which users or groups of users may view or edit all or selected portions of information accessible via the new console application. Specifying data access information for users or groups of users may assist in protecting data integrity and privacy.

In some embodiments, the permissions information may specify which users or groups of users who may view, edit, or configure all or selected portions of the new console application. Specifying console application access information may ensure that only authorized users, such as administrators, configure the console application.

Figure 96:
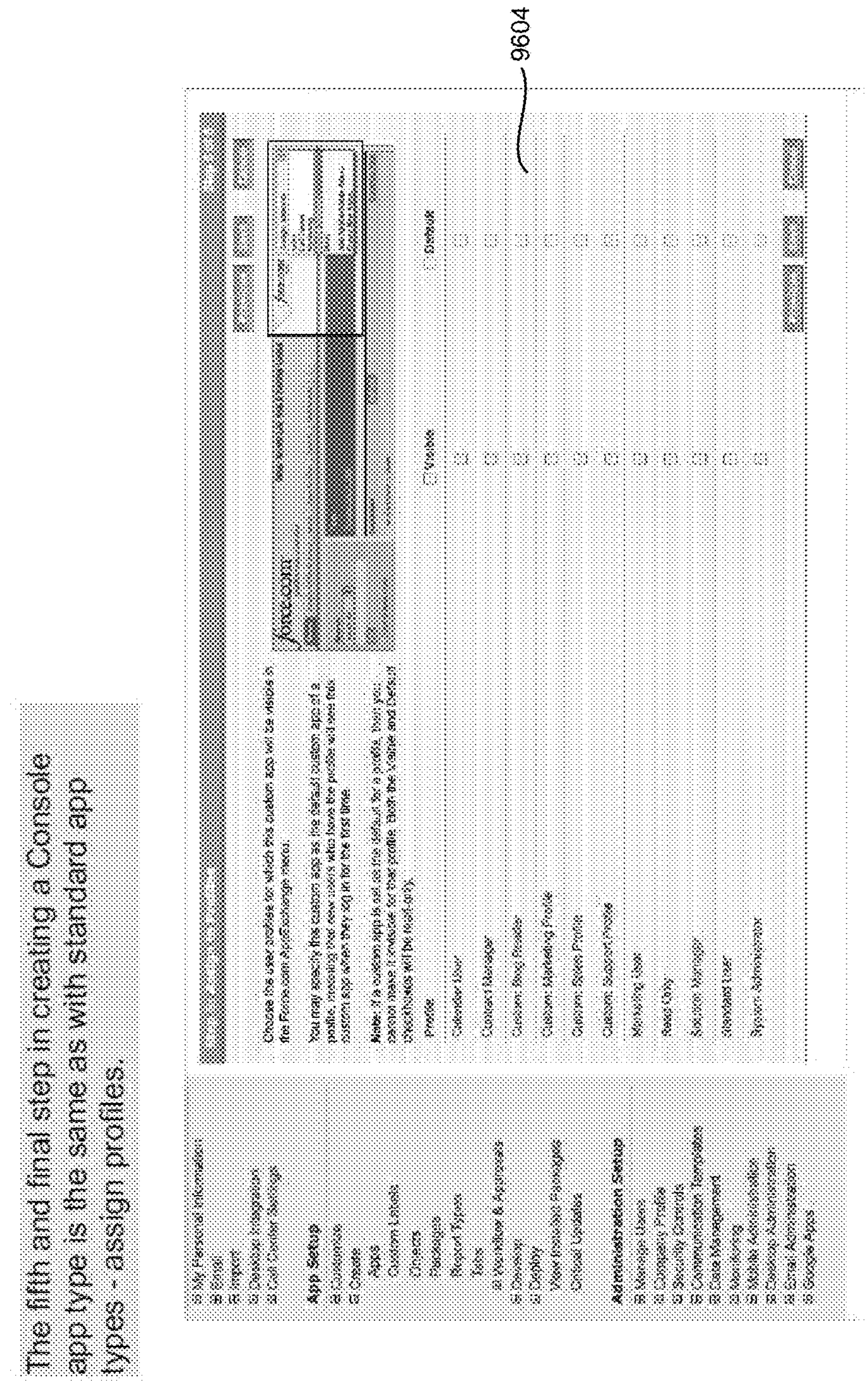

In some embodiments, permissions may be specified according to profile. A profile is a label for a grouping of one or more users. By grouping users into profiles, user access to the customized service cloud console application can be customized. For example, the identified profiles may include agents and administrators. Agents may be permitted to view the console application, while administrators may be permitted to configure the console application. For example, the console application may be set as visible or default for one or more profiles in the console application profile settings interface 9604 shown in FIG. 96.

Figure 97:
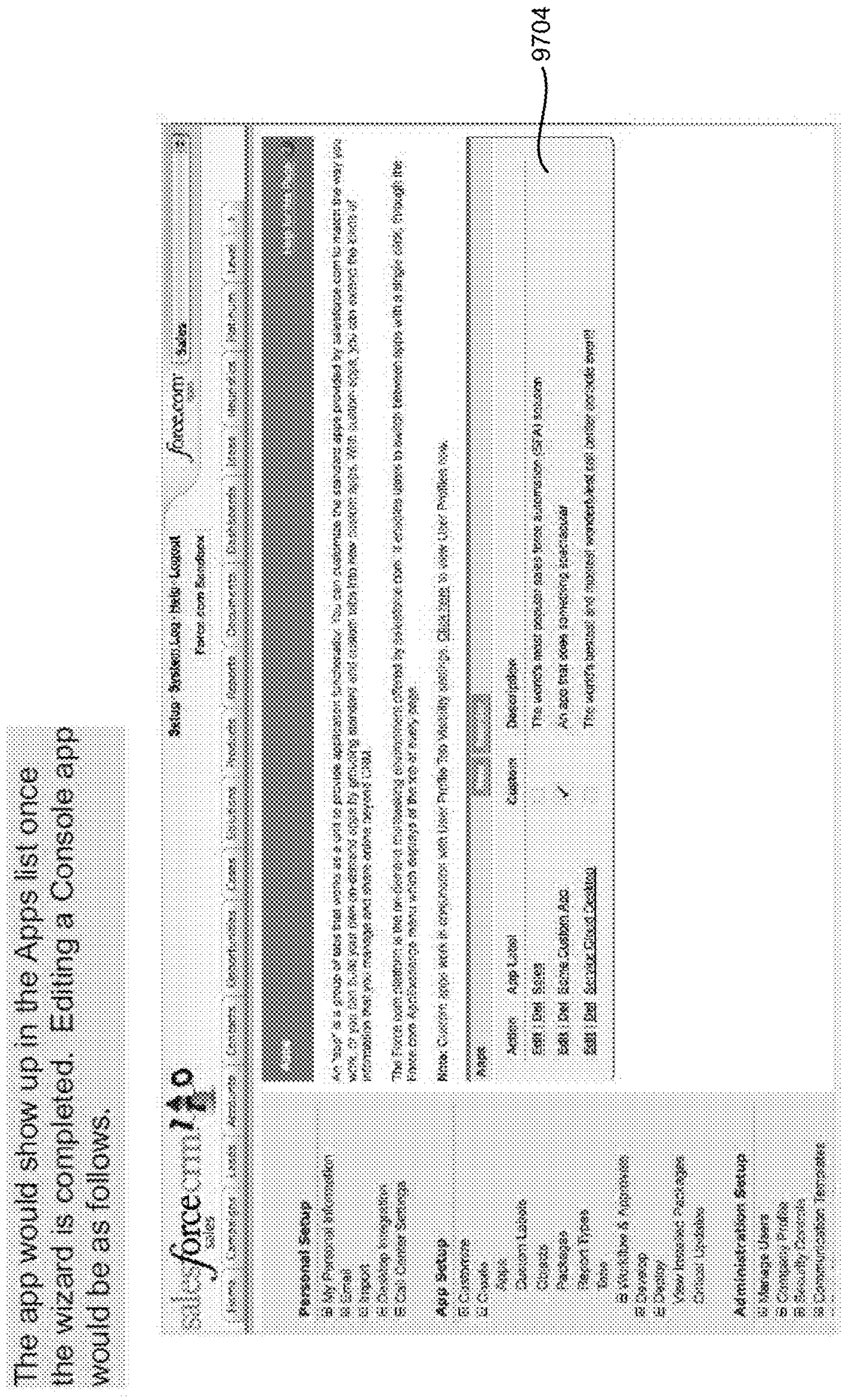
Figure 98:
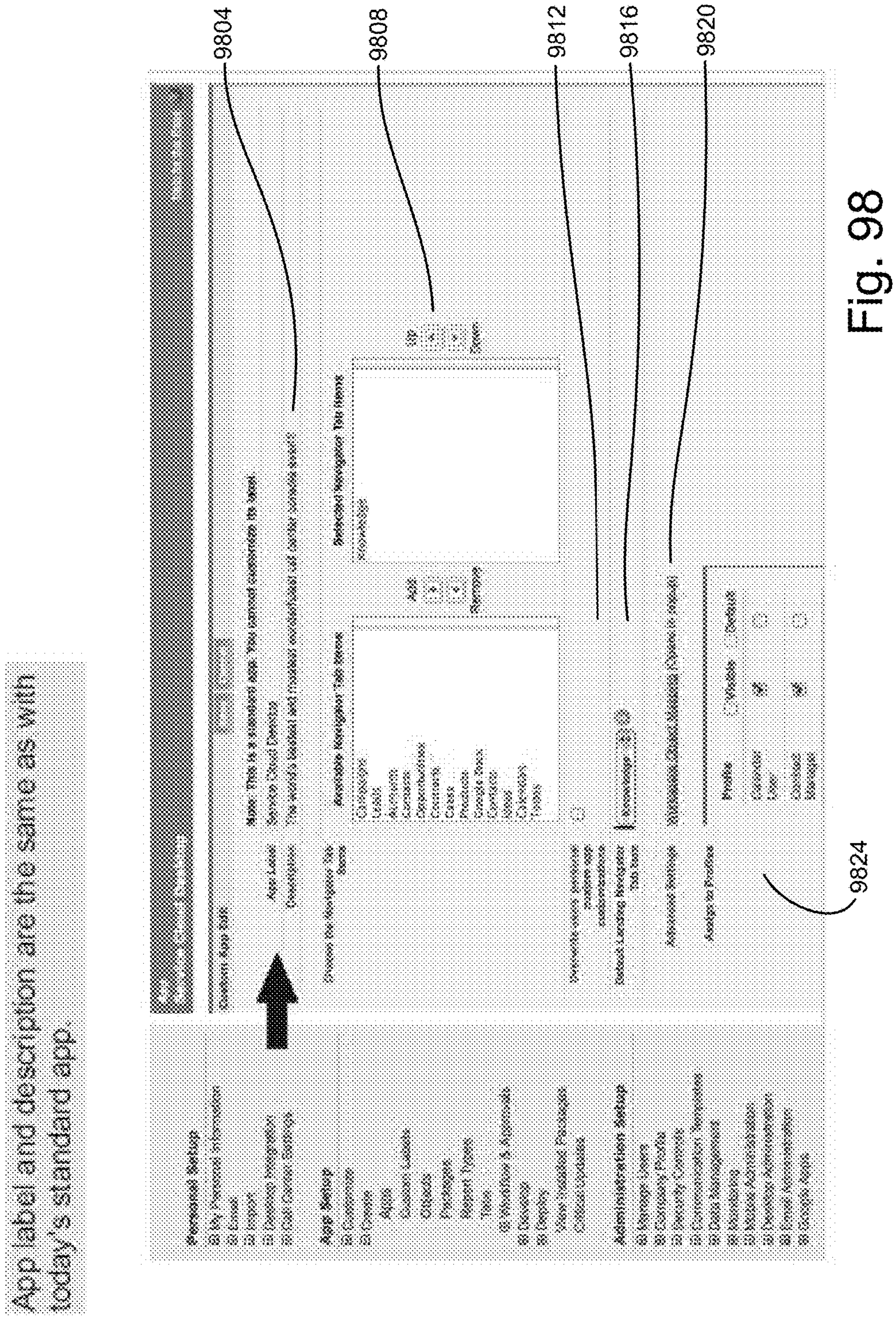

At 624, the new console application is saved. Saving the console application may include transmitting the received input to the server and/or saving the received input in a database. Once the console application is saved, it may be accessed by members of the organization in an on-demand basis according to the access procedures defined in the customization process. As is shown in FIG. 97, the saved console application may be accessible through a list of applications that are accessible by one or more of the organization's users. The list of applications may be provided via a console application information input interface 9704.

In one or more embodiments, a saved console application may be customized using a service cloud console customization interface, as shown in FIGS. 98-106. The graphical user interfaces shown in FIGS. 98-106 each may include one or more of a description field 9804, the navigation tab customization interface 9808, the personalized customization field 9812, the default navigation tab interface 9816, the workspace mappings advanced settings link 9820, and the profile assignment area 9824.

Figure 99:
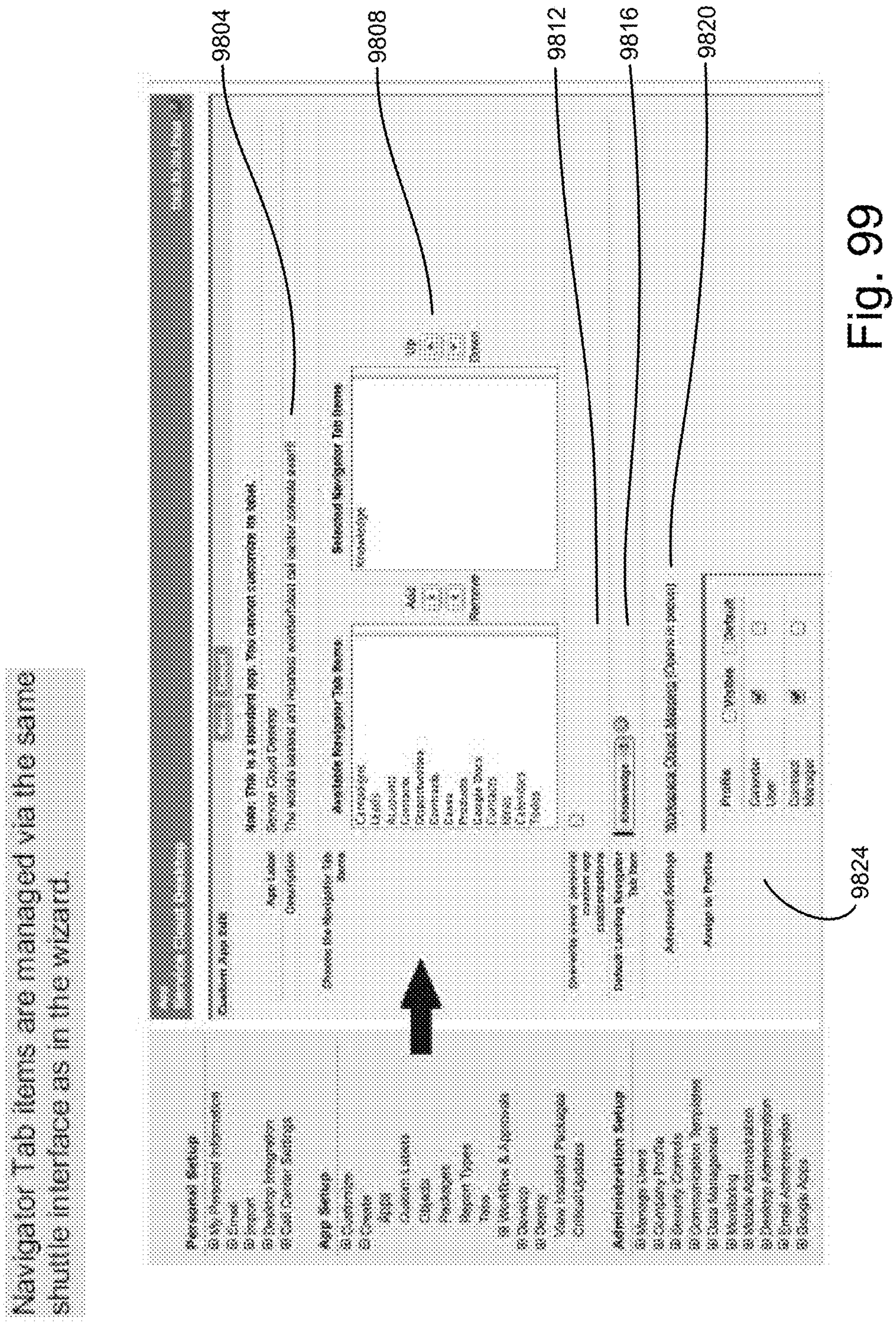
Figure 100:
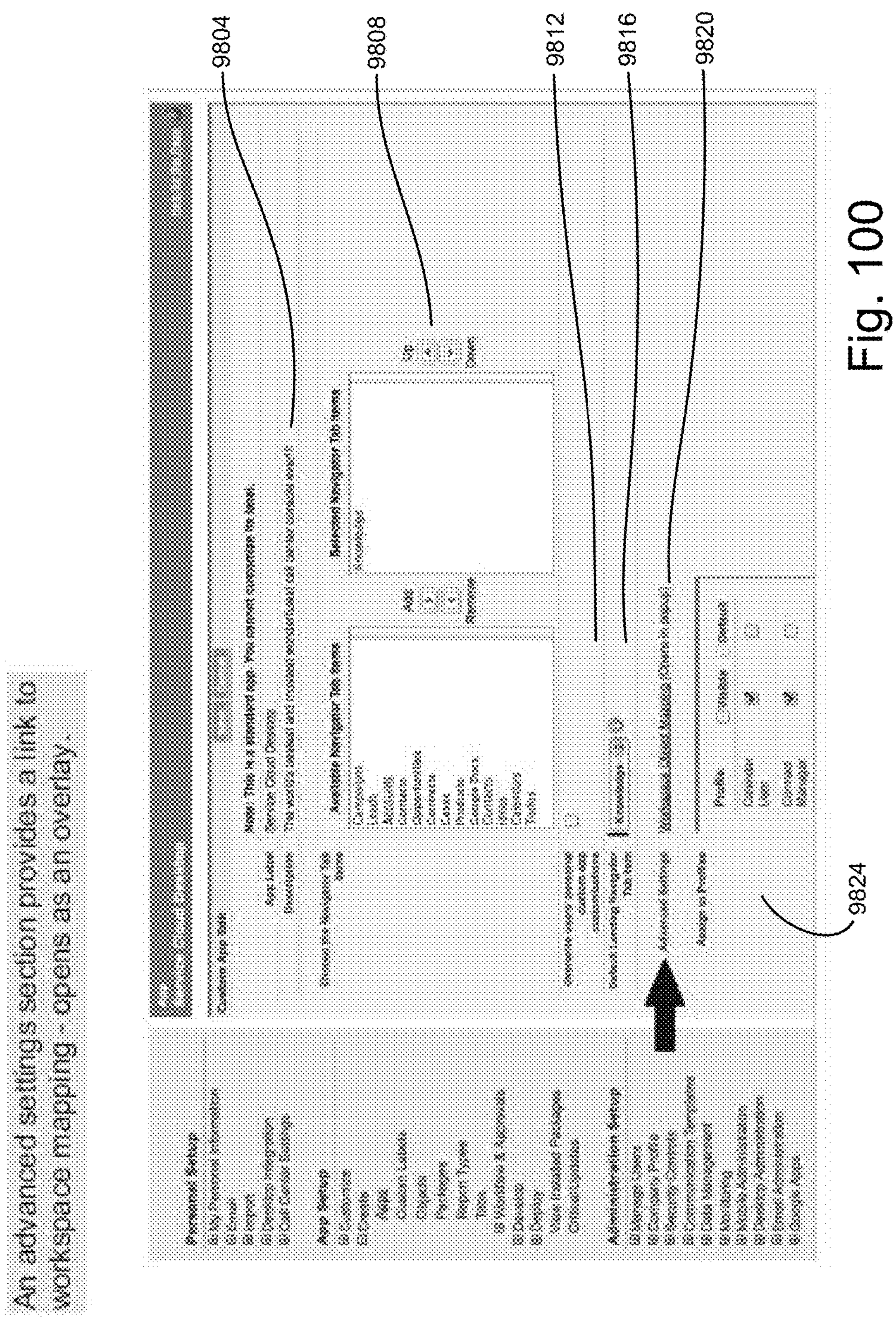
Figure 101:
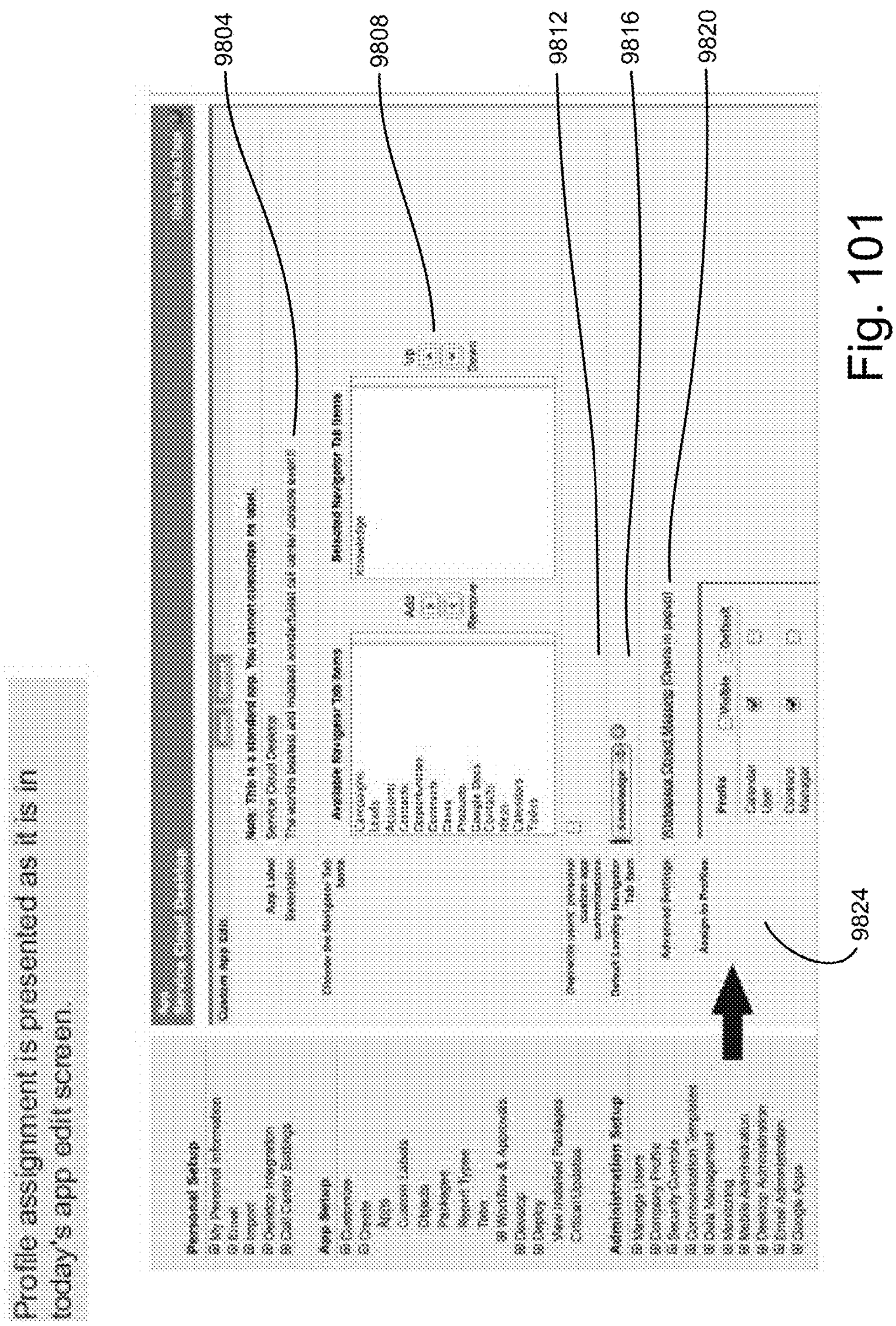

Using the service cloud console customization interface, navigation tab items may be edited as shown in FIG. 99 using the navigation tab customization interface 9808. Profile-specific settings may be adjusted using the profile assignment area 9824.

Another example of a user interface that may be used to edit one or more workspace mappings is the user interface customization interface 1300 shown in FIG. 13. The user interface customization interface 1300 includes an account field 1304 and a case field 1308. The account field 1304 and case field 1308 may be used to specify whether an account or case object should each open as its own workspace or within a different workspace such as a parent account.

Figure 102:
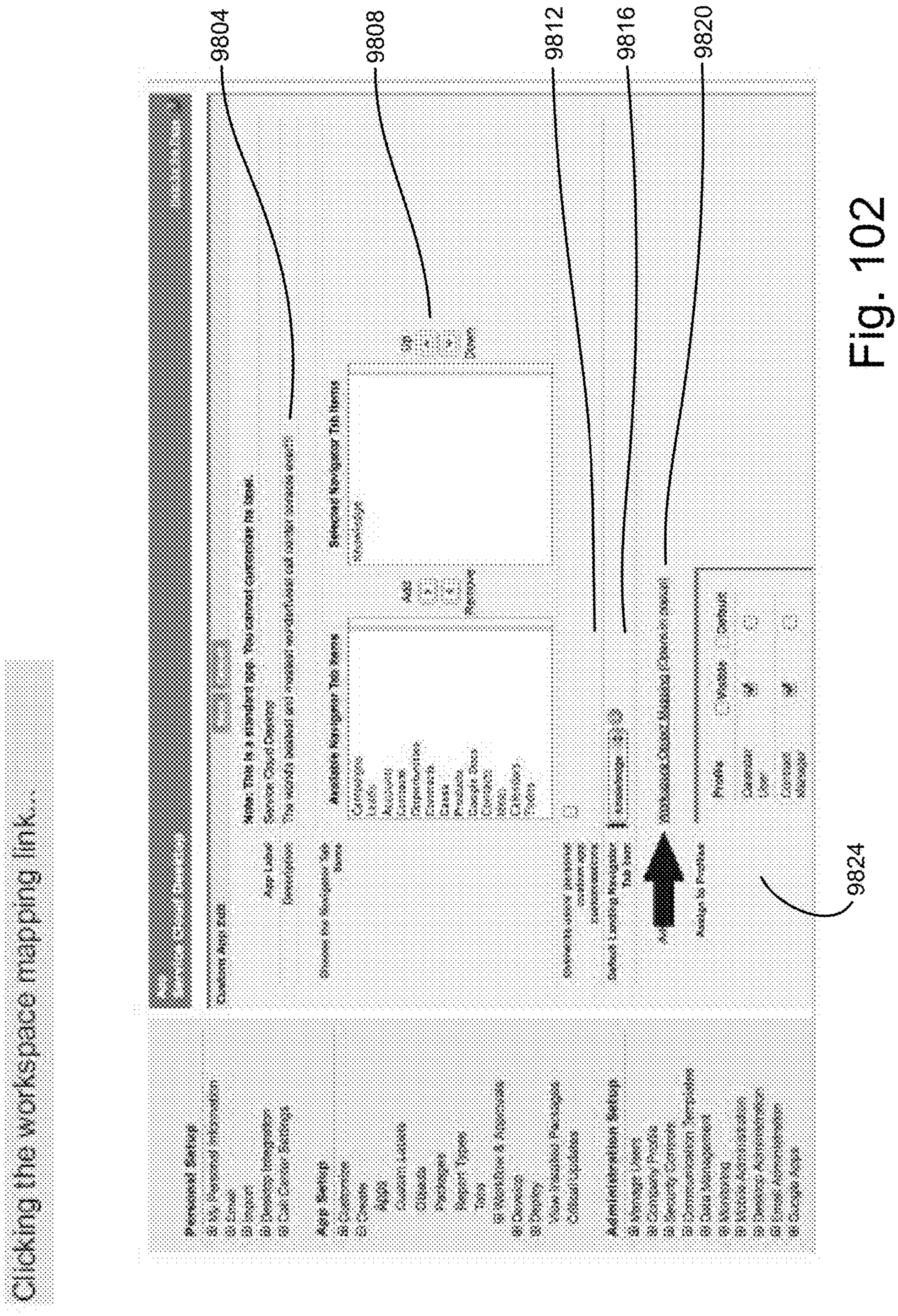
Figure 103:
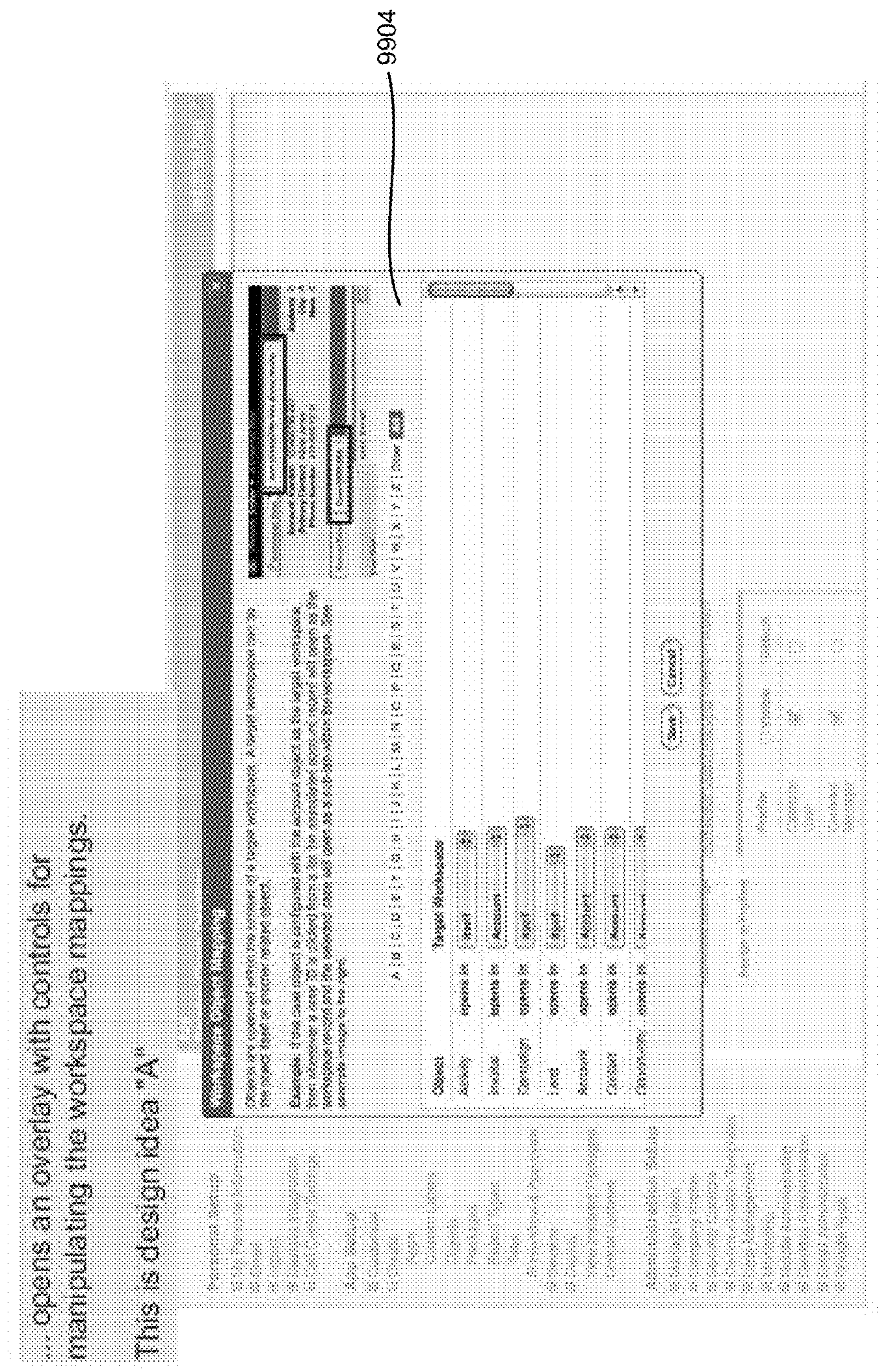
Figure 104:
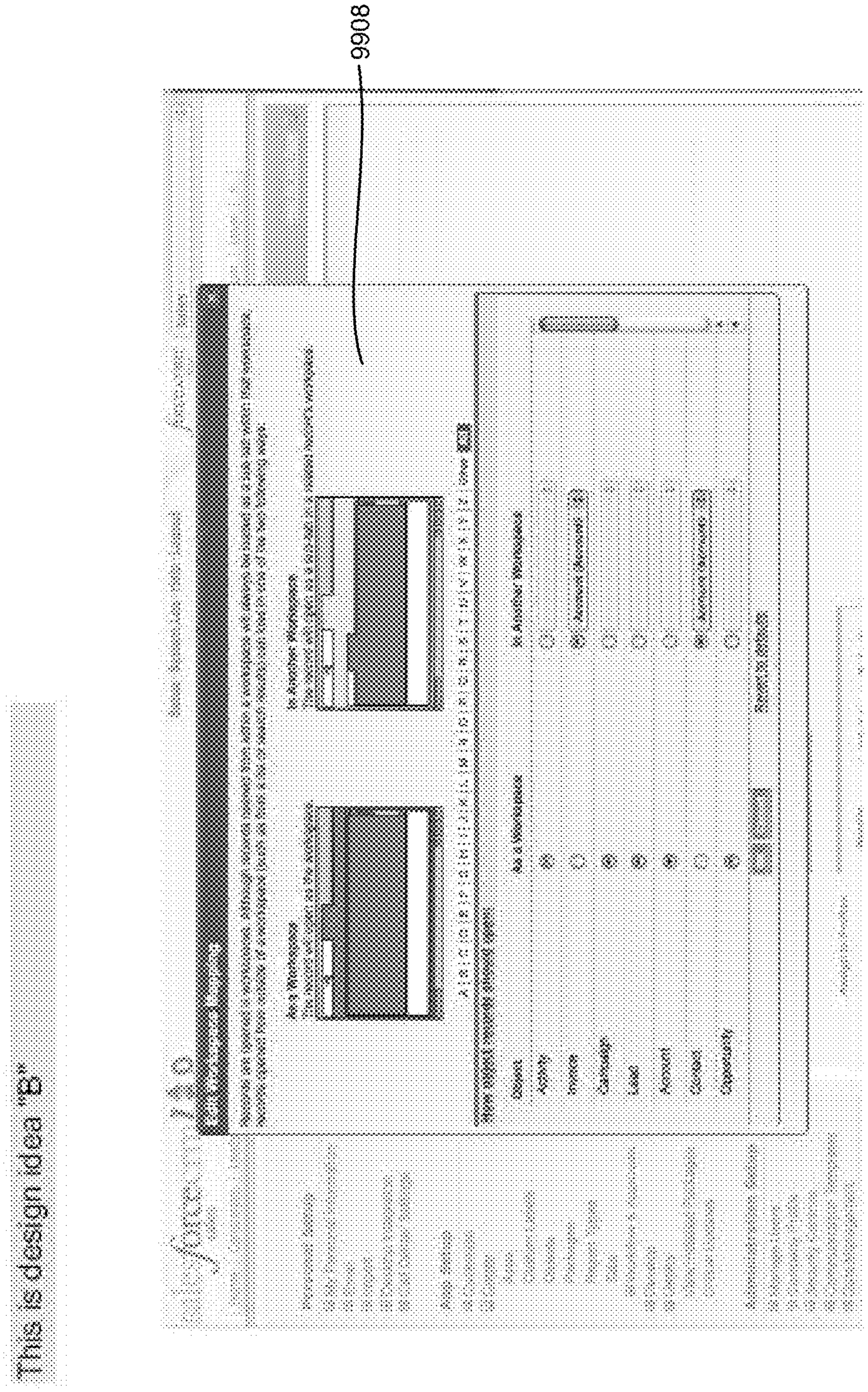
Figure 105:
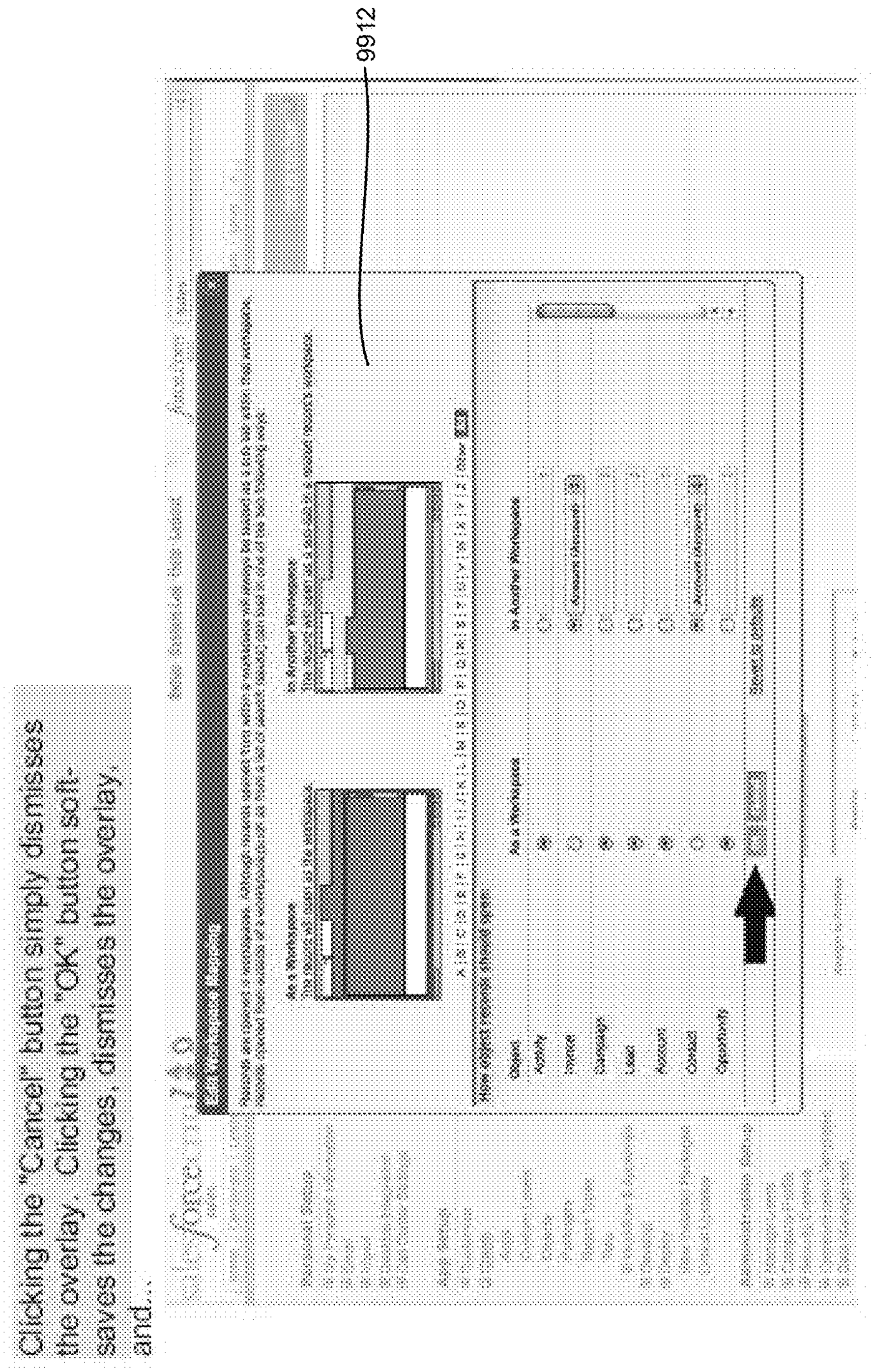

Clicking the workspace mapping link 9820, as shown in FIG. 102, may open an overlay with controls for manipulating the workspace mappings. FIGS. 103-105 show workspace mapping overlay interfaces 9904, 9908, and 9912 through which workspace mappings may be adjusted.

Figure 106:
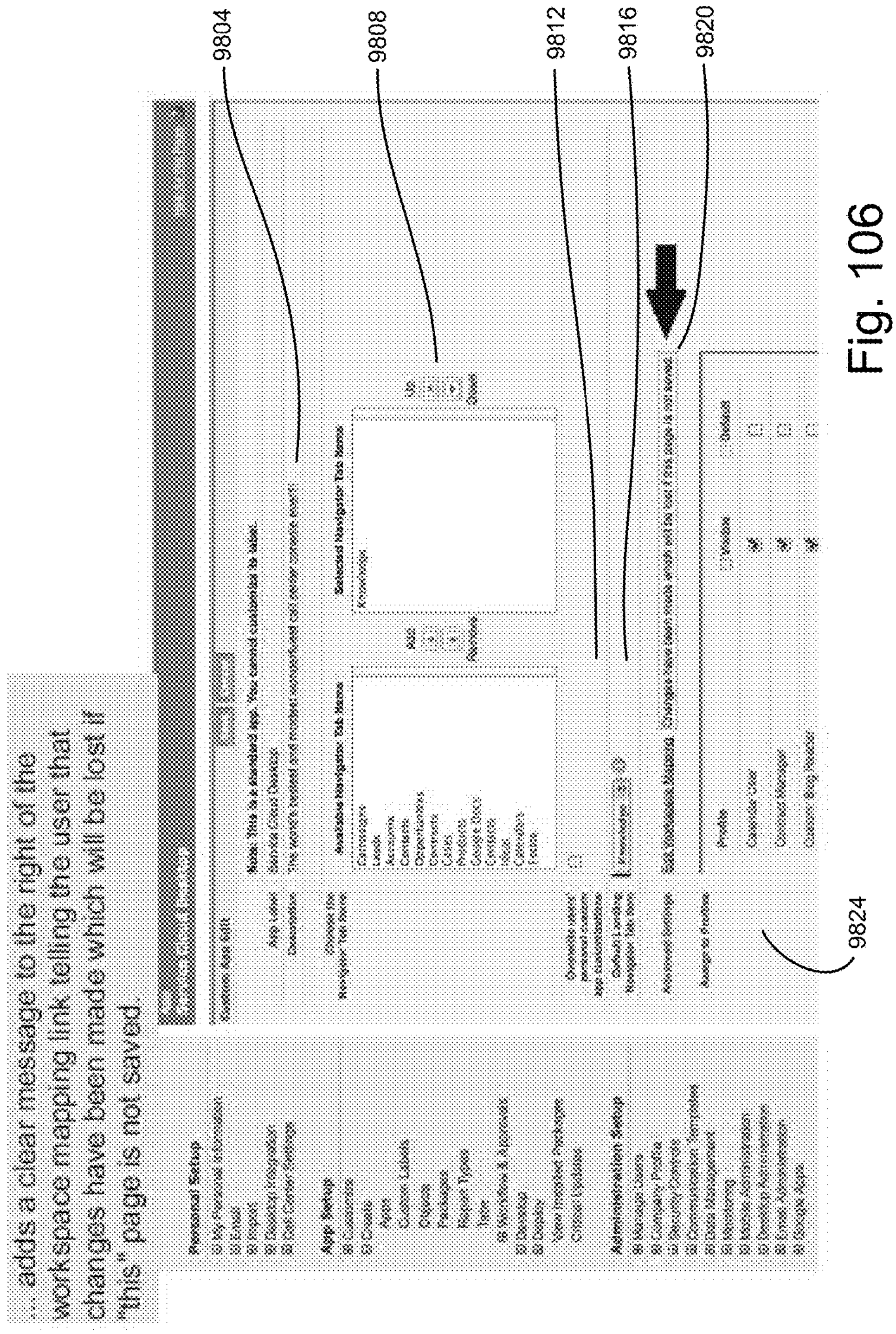

As shown in FIGS. 105 and 106, accepting changes to the workspace mappings may result in a message appearing in the configuration interface warning that the workspace mapping changes need to be saved. For example, a message which states: "Changes have been made which will be lost if this page is not saved" has been added near the workspace mappings advanced settings link 9820 shown in FIG. 106. Alternately, accepting changes to the workspace mappings may save the changes immediately.

Figure 7A:
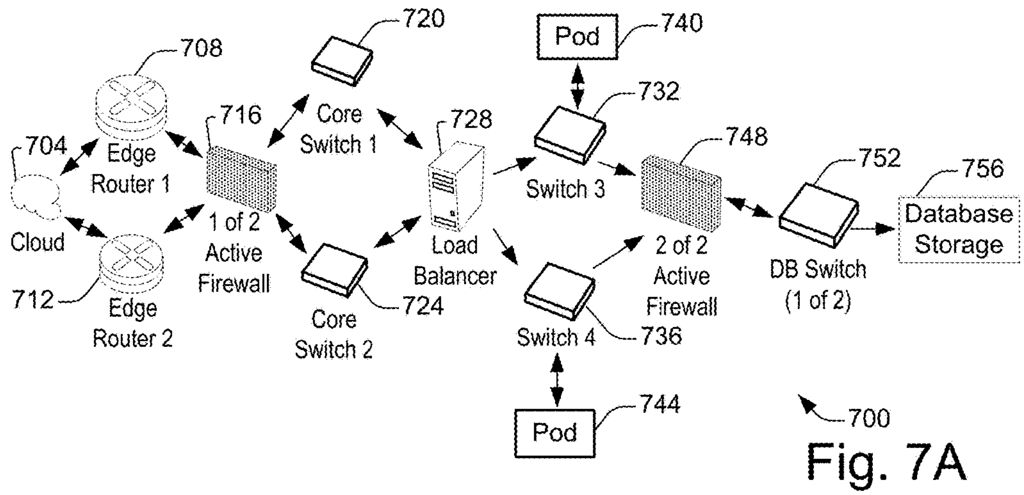
FIG. 7A shows a system diagram 700 illustrating architectural components of an on-demand service environment, in accordance with one embodiment.

FIG. 7A shows a system diagram 700 illustrating architectural components of an on-demand service environment, in accordance with one embodiment.

A client machine located in the cloud 704 (or Internet) may communicate with the on-demand service environment via one or more edge routers 708 and 712. The edge routers may communicate with one or more core switches 720 and 724 via firewall 716. The core switches may communicate with a load balancer 728, which may distribute server load over different pods, such as the pods 740 and 744. The pods 740 and 744, which may each include one or more servers and/or other computing resources, may perform data processing and other operations used to provide on-demand services. Communication with the pods may be conducted via pod switches 732 and 736. Components of the on-demand service environment may communicate with a database storage system 756 via a database firewall 748 and a database switch 752.

Figure 7B:
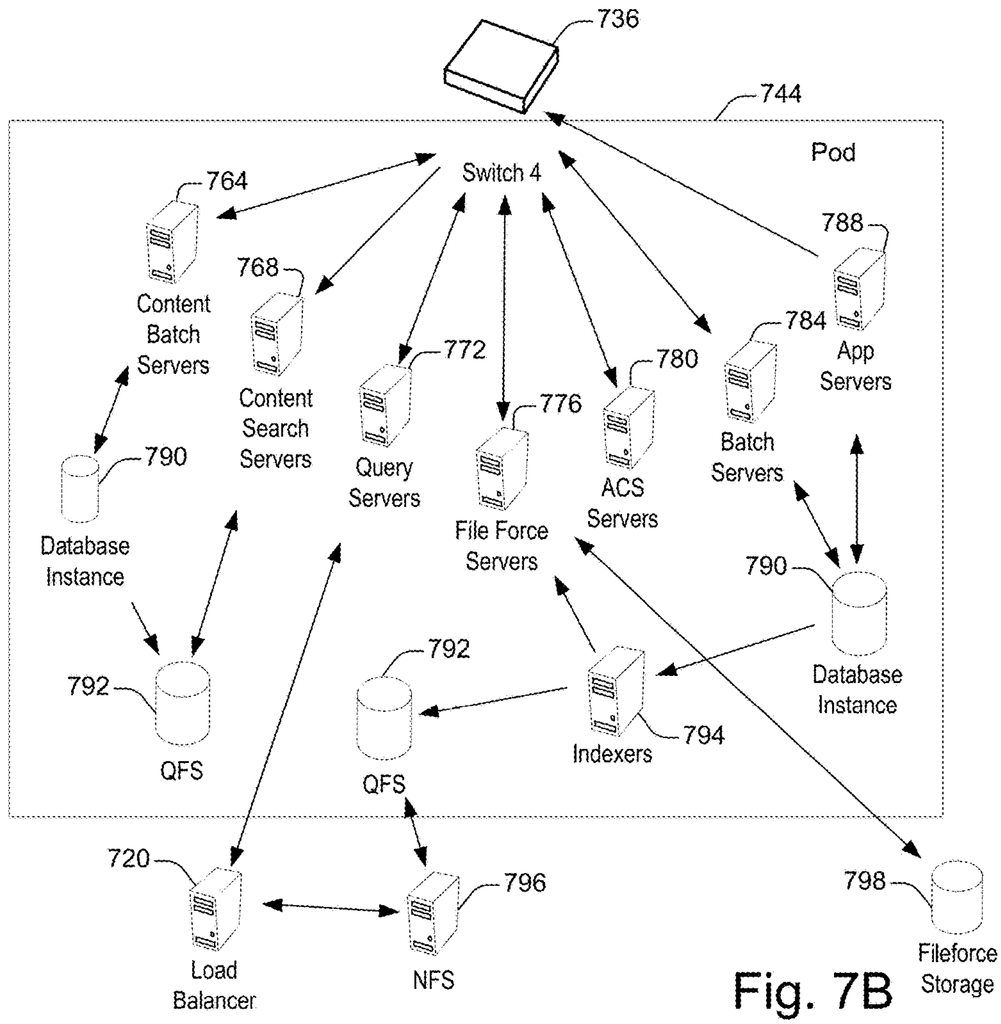
FIG. 7B shows a system diagram further illustrating architectural components of an on-demand service environment, in accordance with one embodiment.

As shown in FIGS. 7A and 7B, accessing an on-demand service environment may involve communications transmitted among a variety of different hardware and/or software components. Further, the on-demand service environment 700 is a simplified representation of an actual on-demand service environment. For example, while only one or two devices of each type are shown in FIGS. 7A and 7B, some embodiments of an on-demand service environment may include anywhere from one to many devices of each type. Also, the on-demand service environment need not include each device shown in FIGS. 7A and 7B, or may include additional devices not shown in FIGS. 7A and 7B.

Moreover, one or more of the devices in the on-demand service environment 700 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 704 is intended to refer to a data network or plurality of data networks, often including the Internet. Client machines located in the cloud 704 may communicate with the on-demand service environment to access services provided by the on-demand service environment. For example, client machines may access the on-demand service environment to retrieve, store, edit, and/or process information.

In some embodiments, the edge routers 708 and 712 route packets between the cloud 704 and other components of the on-demand service environment 700. The edge routers 708 and 712 may employ the Border Gateway Protocol (BGP). The BGP is the core routing protocol of the Internet. The edge routers 708 and 712 may maintain a table of IP networks or 'prefixes' which designate network reachability among autonomous systems on the Internet.

In one or more embodiments, the firewall 716 may protect the inner components of the on-demand service environment 700 from Internet traffic. The firewall 716 may block, permit, or deny access to the inner components of the on-demand service environment 700 based upon a set of rules and other criteria. The firewall 716 may act as one or more of a packet filter, an application gateway, a stateful filter, a proxy server, or any other type of firewall.

In some embodiments, the core switches 720 and 724 are high-capacity switches that transfer packets within the on-demand service environment 700. The core switches 720 and 724 may be configured as network bridges that quickly route data between different components within the on-demand service environment. In some embodiments, the use of two or more core switches 720 and 724 may provide redundancy and/or reduced latency.

In some embodiments, the pods 740 and 744 may perform the core data processing and service functions provided by the on-demand service environment. Each pod may include various types of hardware and/or software computing resources. An example of the pod architecture is discussed in greater detail with reference to FIG. 7B.

In some embodiments, communication between the pods 740 and 744 may be conducted via the pod switches 732 and 736. The pod switches 732 and 736 may facilitate communication between the pods 740 and 744 and client machines located in the cloud 704, for example via core switches 720 and 724. Also, the pod switches 732 and 736 may facilitate communication between the pods 740 and 744 and the database storage 756.

In some embodiments, the load balancer 728 may distribute workload between the pods 740 and 744. Balancing the on-demand service requests between the pods may assist in improving the use of resources, increasing throughput, reducing response times, and/or reducing overhead. The load balancer 728 may include multilayer switches to analyze and forward traffic.

In some embodiments, access to the database storage 756 may be guarded by a database firewall 748. The database firewall 748 may act as a computer application firewall operating at the database application layer of a protocol stack. The database firewall 748 may protect the database storage 756 from application attacks such as structure query language (SQL) injection, database rootkits, and unauthorized information disclosure.

In some embodiments, the database firewall 748 may include a host using one or more forms of reverse proxy services to proxy traffic before passing it to a gateway router. The database firewall 748 may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some embodiments, communication with the database storage system 756 may be conducted via the database switch 752. The multi-tenant database system 756 may include more than one hardware and/or software components for handling database queries. Accordingly, the database switch 752 may direct database queries transmitted by other components of the on-demand service environment (e.g., the pods 740 and 744) to the correct components within the database storage system 756.

In some embodiments, the database storage system 756 is an on-demand database system shared by many different organizations. The on-demand database system may employ a multi-tenant approach, a virtualized approach, or any other type of database approach. An on-demand database system is discussed in greater detail with reference to FIGS. 8 and 9.

FIG. 7B shows a system diagram illustrating the architecture of the pod 744, in accordance with one embodiment. The pod 744 may be used to render services to a user of the on-demand service environment 700.

In some embodiments, each pod may include a variety of servers and/or other systems. The pod 744 includes one or more content batch servers 764, content search servers 768, query servers 772, file force servers 776, access control system (ACS) servers 780, batch servers 784, and app servers 788. Also, the pod 744 includes database instances 790, quick file systems (QFS) 792, and indexers 794. In one or more embodiments, some or all communication between the servers in the pod 744 may be transmitted via the switch 736.

In some embodiments, the application servers 788 may include a hardware and/or software framework dedicated to the execution of procedures (e.g., programs, routines, scripts) for supporting the construction of applications provided by the on-demand service environment 700 via the pod 744. Some such procedures may include operations for providing the services described herein.

The content batch servers 764 may requests internal to the pod. These requests may be long-running and/or not tied to a particular customer. For example, the content batch servers 764 may handle requests related to log mining, cleanup work, and maintenance tasks.

The content search servers 768 may provide query and indexer functions. For example, the functions provided by the content search servers 768 may allow users to search through content stored in the on-demand service environment.

The Fileforce servers 776 may manage requests information stored in the Fileforce storage 778. The Fileforce storage 778 may store information such as documents, images, and basic large objects (BLOBs). By managing requests for information using the Fileforce servers 776, the image footprint on the database may be reduced.

The query servers 772 may be used to retrieve information from one or more file systems. For example, the query system 772 may receive requests for information from the app servers 788 and then transmit information queries to the NFS 796 located outside the pod.

The pod 744 may share a database instance 790 configured as a multi-tenant environment in which different organizations share access to the same database. Additionally, services rendered by the pod 744 may require various hardware and/or software resources. In some embodiments, the ACS servers 780 may control access to data, hardware resources, or software resources.

In some embodiments, the batch servers 784 may process batch jobs, which are used to run tasks at specified times. Thus, the batch servers 784 may transmit instructions to other servers, such as the app servers 788, to trigger the batch jobs.

In some embodiments, the QFS 792 may be an open source file system available from Sun Microsystems® of Santa Clara, Calif. The QFS may serve as a rapid-access file system for storing and accessing information available within the pod 744. The QFS 792 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 768 and/or indexers 794 to identify, retrieve, move, and/or update data stored in the network file systems 796 and/or other storage systems.

In some embodiments, one or more query servers 772 may communicate with the NFS 796 to retrieve and/or update information stored outside of the pod 744. The NFS 796 may allow servers located in the pod 744 to access information to access files over a network in a manner similar to how local storage is accessed.

In some embodiments, queries from the query servers 722 may be transmitted to the NFS 796 via the load balancer 720, which may distribute resource requests over various resources available in the on-demand service environment. The NFS 796 may also communicate with the QFS 792 to update the information stored on the NFS 796 and/or to provide information to the QFS 792 for use by servers located within the pod 744.

In some embodiments, the pod may include one or more database instances 790. The database instance 790 may transmit information to the QFS 792. When information is transmitted to the QFS, it may be available for use by servers within the pod 744 without requiring an additional database call.

In some embodiments, database information may be transmitted to the indexer 794. Indexer 794 may provide an index of information available in the database 790 and/or QFS 792. The index information may be provided to file force servers 776 and/or the QFS 792.

Figure 8:
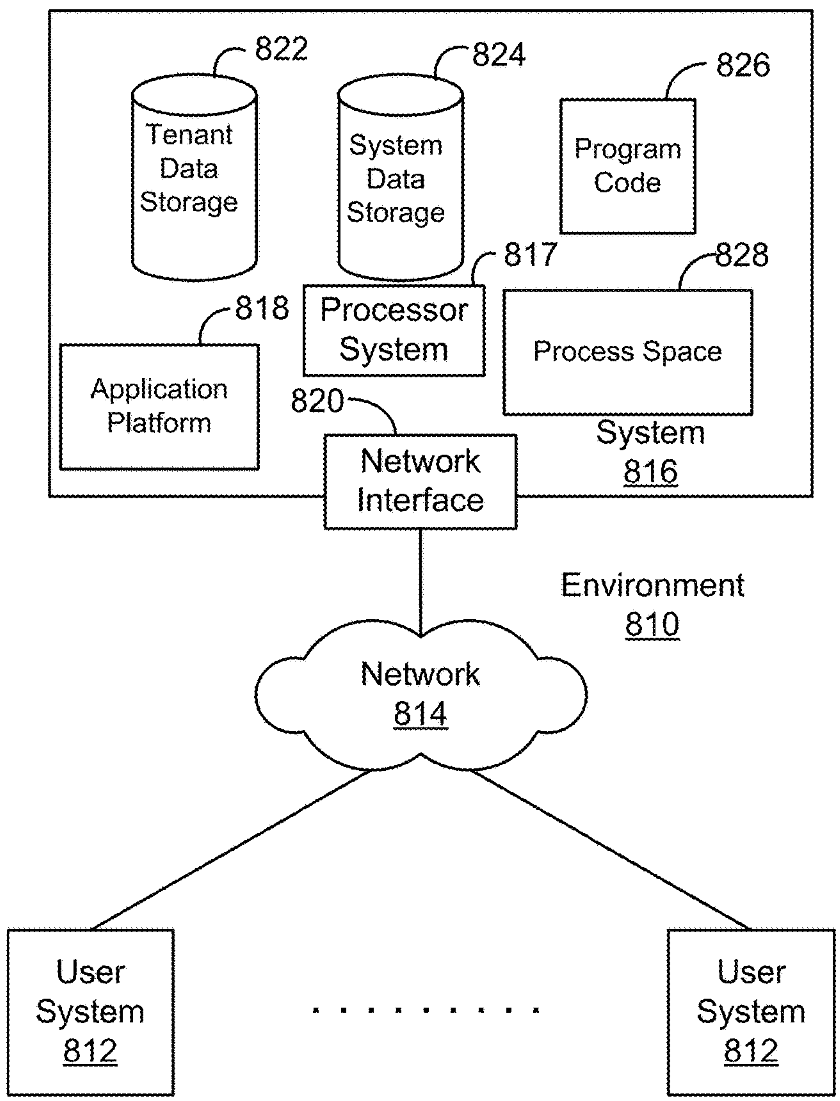
FIG. 8 shows a system diagram 810 illustrating the architecture of a multitenant database environment, in accordance with one embodiment.

FIG. 8 shows a block diagram of an environment 810 wherein an on-demand database service might be used, in accordance with one embodiment.

Figure 9:
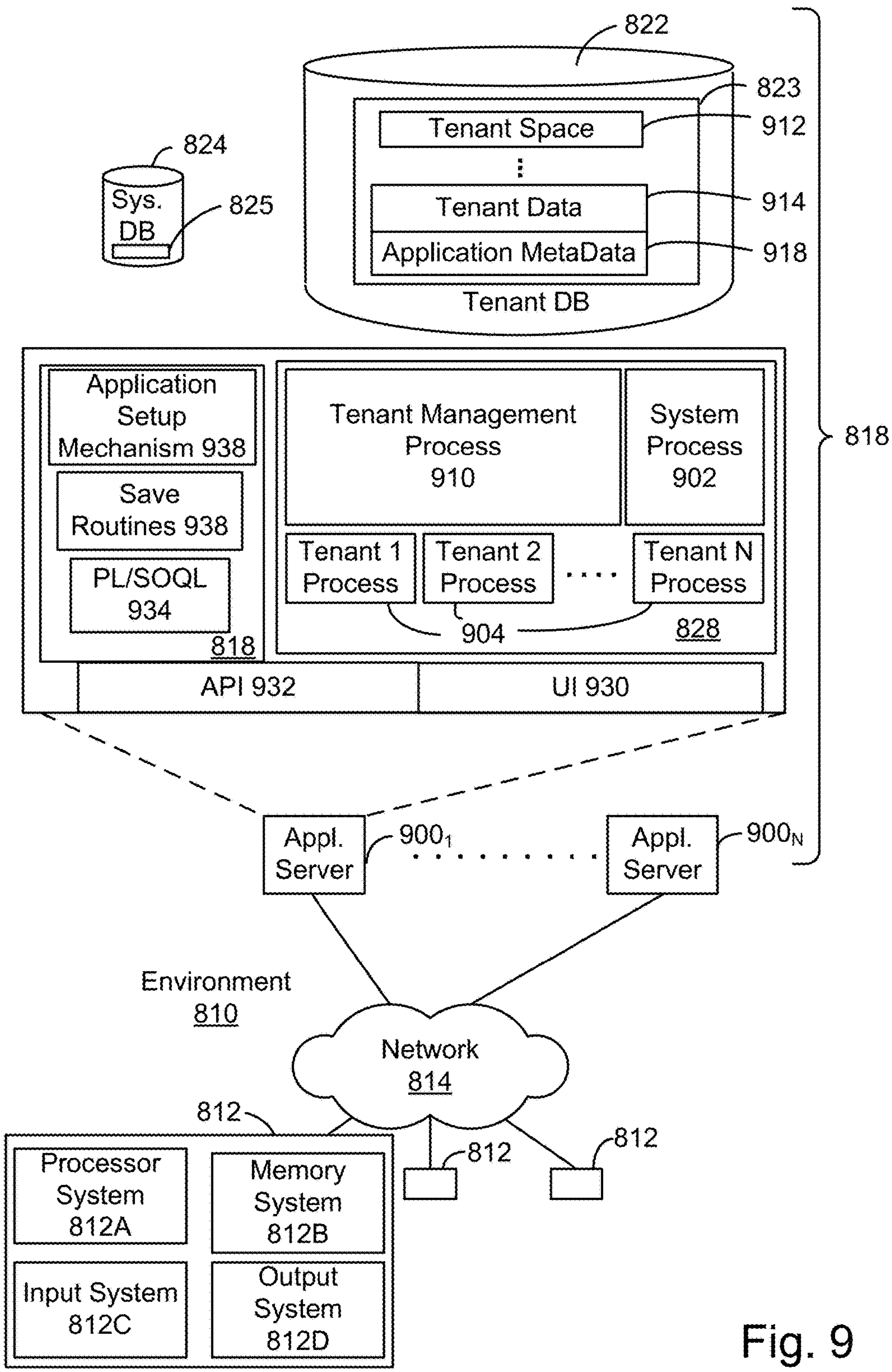
FIG. 9 shows a system diagram 810 further illustrating the architecture of a multitenant database environment, in accordance with one embodiment.

Environment 810 includes an on-demand database service 816. User system 812 may be any machine or system that is used by a user to access a database user system. For example, any of user systems 812 can be a handheld computing device, a mobile phone, a laptop computer, a work station, and/or a network of computing devices. As illustrated in FIGS. 8 and 9, user systems 812 might interact via a network 814 with the on-demand database service 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 816" and "system 816" will be used interchangeably herein. A database image may include one or more database objects. A relational database management system (RDBMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

The users of user systems 812 may differ in their respective capacities, and the capacity of a particular user system 812 might be entirely determined by permissions (permission levels) for the current user. For example, where a call center agent is using a particular user system 812 to interact with system 816, the user system 812 has the capacities allotted to that call center agent. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system such as the service cloud console. For example, in one embodiment, system 816 includes application servers configured to implement and execute CRM software applications as well as provide related data, code, forms, web pages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications. User (or third party developer) applications, which may or may not include CRM, may be supported by the application platform 818, which manages creation, storage of the applications into one or more database objects and executing of the applications in a virtual machine in the process space of the system 816.

Each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 812 to access, process and view information, pages and applications available to it from system 816 over network 814.

Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 816 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one embodiment, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 9 also shows a block diagram of environment 810 further illustrating system 816 and various interconnections, in accordance with one embodiment. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SOQL 934, save routines 936, application setup mechanism 938, applications servers 9001-900N, system process space 902, tenant process spaces 904, tenant management process space 910, tenant storage area 912, user storage 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of processors. Memory system 812B may be any combination of one or more memory devices, short term, and/or long term memory. Input system 812C may be any combination of input devices, such as keyboards, mice, trackballs, scanners, cameras, and/or interfaces to networks. Output system 812D may be any combination of output devices, such as monitors, printers, and/or interfaces to networks. As shown by FIG. 9, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes to users and/or developers at user systems 812. The tenant data and the system data may be stored in various databases, such as Oracle™ databases.

Application platform 818 includes an application setup mechanism 938 that supports application developers' creation and management of applications, which may be saved as metadata into tenant data storage 822 by save routines 936 for execution by subscribers as tenant process spaces 904 managed by tenant management process 910 for example. Invocations to such applications may be coded using PL/SOQL 34 that provides a programming language style interface extension to API 932. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server 9001 might be coupled via the network 814 (e.g., the Internet), another application server 900N−1 might be coupled via a direct network link, and another application server 900N might be coupled by yet a different network connection. Transfer Control Protocol and Internet Protocol (TCP/IP) are typical protocols for communicating between application servers 900 and the database system. However, other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each call center agent uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client machines/systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

Figure 10A:
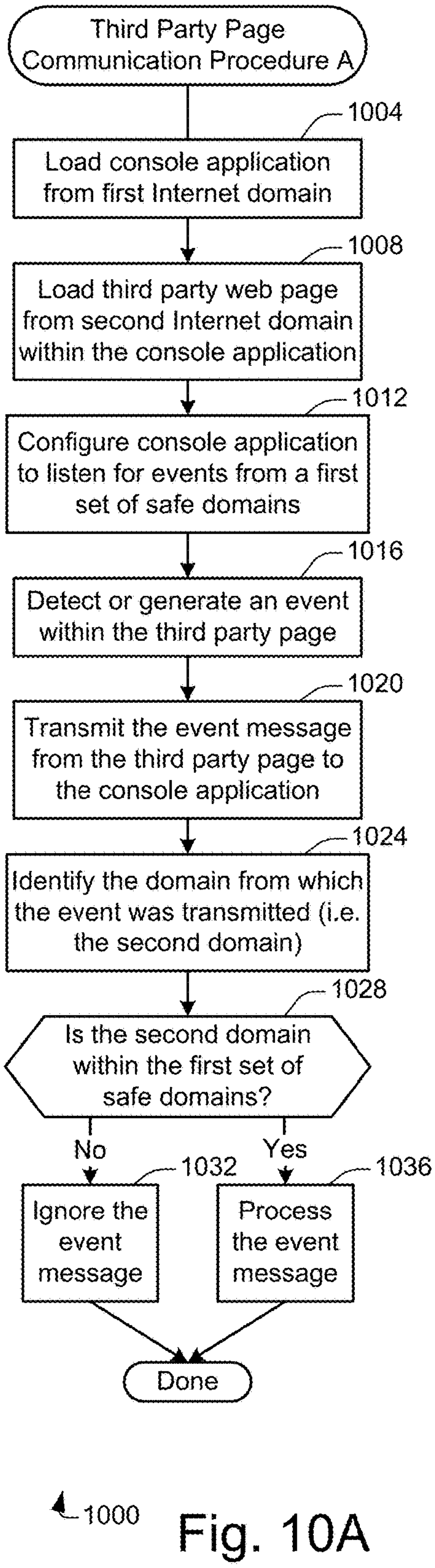
FIGS. 10A and 10B show flow diagrams illustrating interactions of third party pages with the service cloud console environment, in accordance with one or more embodiments.
Figure 10B:
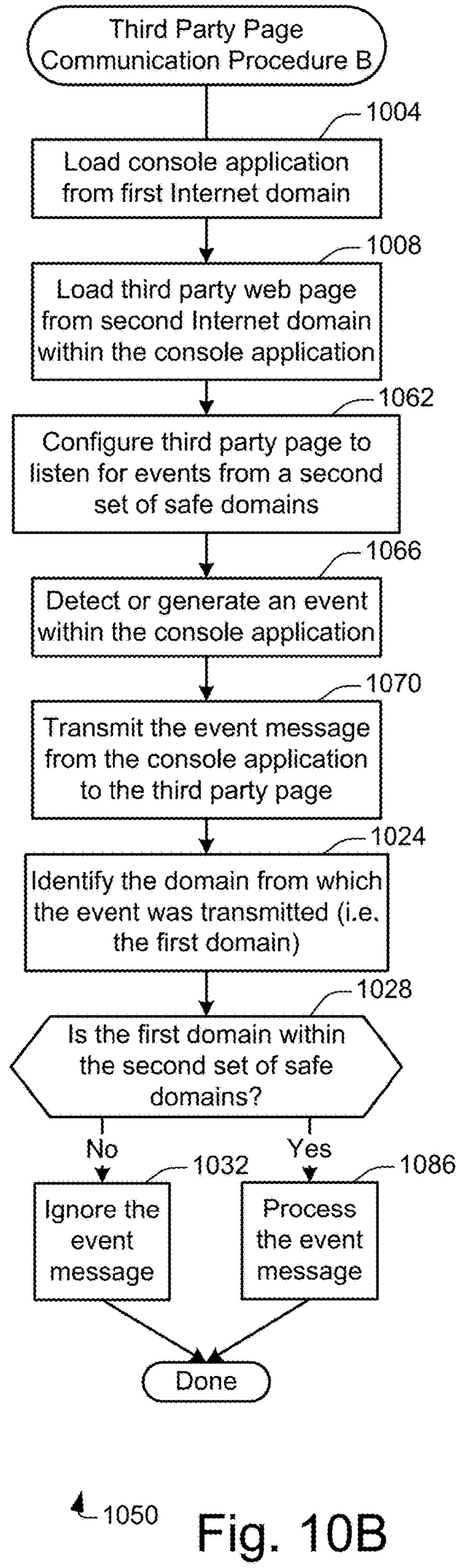

The embodiments disclosed herein may include a cross-domain API situated at a client machine that allows pages served from external domains to perform certain actions, such as exchanging information with one another, within a web browser program running on the client machine. These pages may be referred to as "third party pages." FIGS. 10A and 10B show flow diagrams illustrating interactions of third party pages, in accordance with one or more embodiments. In one or more embodiments, this cross-domain API may be referred to as a service cloud console integration toolkit.

Call centers that use the service cloud console may have integrations to third party systems, such as billing systems, shipping systems, accounting systems, etc. The service cloud console may provide an interface that allows agents access to one or more of these applications. In some embodiments, one or more of these third party applications may participate in the tabbed model provided through the service cloud console.

Because communication between frames from different domains presents a security risk within the browsers, this functionality is explicitly restricted in some modern browsers. In other modern browsers, however, cross-domain communication has been addressed, for instance, in HTML 5 (available from W3.org at http://www.w3.org/TR/html5/comms.html) with the postMessage framework. However, HTML 5 is currently supported in only a limited number of browsers, such as Internet Explorer 8, Firefox 3, and Opera 9.

In some embodiments, the cross-domain API may be used to facilitate integration with third party pages within Salesforce.com® itself. For example, VisualForce™ pages may be served from a different domain than the service cloud console.

Given the potential security concerns, it may be desirable to avoid exposing the ability for a third-party domain to directly perform data manipulation. For example, in Salesforce.com® it may be possible to open an edit page, make modifications to an object, and save it, all by opening a single URL with a set of parameters in the query string. However, this type of operation may not be permitted by the cross-domain API, as it could open up a means for attackers to modify data without the user's knowledge or consent.

The third party page communication methods shown in FIGS. 10A and 10B may be used to facilitate secure cross-domain communication. These methods may be run in a web browser at a client machine in communication with one or more servers that provide data to the browser. However, some or all of the individual processing steps shown in FIGS. 10A and 10B may be performed without communication with the server. Thus, cross-domain communications may be facilitated without requiring the additional latency or computational burdens that would exist if cross-domain communications were accomplished using a proxy or other type of server communication.

In one embodiment, in 1004, a service cloud console application from the data provider is loaded from a first domain, such as www.salesforce.com. The console application may be loaded by sending instructions from one or more data provider servers hosting the first domain to a web browser at a client machine. When the console application is loaded, records served from the first domain may be visible in the console application. For example, one or more records may be opened using a record open method, as shown in FIG. 2.

In 1008, a third party web page is loaded from a second domain, for instance, from phone system 108, in a portion of a user interface also displaying the console application. In some embodiments, the third party web page may be loaded as a primary or secondary tab within the console application. The third party web page may also be automatically loaded in response to receiving data from the console application. For example, a first object record may include a link to accounting information visible through a third party web page. When the link is clicked, the third party web page is loaded.

In some embodiments, the first domain is controlled by a data provider, e.g., Salesforce.com®, while the second domain may be controlled by a different entity, such as the phone provider. For example, the console application may be loaded from a first domain controlled by Salesforce.com®, while the third party page is loaded from a second domain controlled by a third party service provider unaffiliated with the service provider controlling the first domain In 1012, the console application is configured to listen to events from a first set of safe domains. The first set of safe domains identifies the one or more trusted domains from which the console application may safely accept cross-domain messages. In some embodiments, the first set of safe domains may be limited to a particular group of domains, such as those provided by the data provider of the console application. The first set of safe domains may also include domains identified as trusted, such as the second domain associated with a third party service provider system.

In some embodiments, wildcards may be used to identify groups of domains using a single string. For example, the first set of safe domains may include domains such as na1.force.com, *.na2.force.com, and/or *.salesforce.com.

In 1016, the third party page may detect or generate an event of some type, such as the receipt of phone event information from some source, as described above. The detected event may include any type of occurrence that causes cross-domain communication. In some embodiments, the event may be a scripting event triggered directly by a user action, such as clicking a link or button within the third party page. Alternately, or additionally, the event may be generated by code running within the third party page that identifies a triggering condition.

In 1020, the event triggers a message that is sent to the console application. The message may include a JavaScript® event message, or other type of event message. The message may be sent to a JavaScript® Event Listener operating in the console application served from the first domain. Alternately, or additionally, a different type of scripting language may be used, such as VBScript.

When the event message is received, the console application identifies the domain from which the event message was sent (i.e. the second domain), as shown at 1024. The domain may be identified by retrieving a value associated with the event message. After the second domain is identified as the source of the event, the second domain is compared to the first set of safe domains, as shown at 1028.

As shown at 1032, if the second domain is not within the first set of safe domains, then the message is ignored. In this case, the second domain has not been identified as a "safe" domain from which to receive messages. By only accepting messages sent from an identified subset of domains, the security risks inherent in cross-domain communications may be mitigated.

In some embodiments, receiving a cross-domain event message from a third party domain not in the first set of safe domains may cause one or more security or logging actions to be taken. For example, the event message may be logged in a security record to help identify unauthorized attempts to access the service cloud console application.

As shown at 1036, the event message is processed if the second domain is within the first set of safe domains. The event message may be processed according to one or more event handlers in the console application.

In some embodiments, even domains included in the first set of safe domains may be limited to triggering particular actions or types of actions within the console application, in order to provide further protection against unauthorized access. Examples of such actions are discussed below. However, different embodiments may allow various actions or types of actions in response to an event message.

Regardless of whether the event message is processed, the service cloud console may continue monitoring for additional messages transmitted from third party domains. Continual monitoring for cross-domain event messages may be accomplished using, for example, an Observer design pattern. Thus, the third party page may be able to send messages to the service cloud console, while the security of the console application is maintained.

FIG. 10B shows a complementary third party page communication method B for transmitting messages from the console application to a third party page. The method shown in FIG. 10B is similar to the method shown in FIG. 10A in some respects, with like reference numerals indicating like operations.

In some embodiments, a different set of safe domains may be identified at 1062 than at 1012. For example, the second set of safe domains may be limited to domains associated with the service cloud console (e.g., *.force.com, *.salesforce.com), while the first set of safe domains may include one or more domains associated with third party service providers. By using different sets of safe domains, the security of the third party pages may be maintained because the third party pages may not be operable to communicate with each other.

In 1066, an event within the console application is detected, similar to 1016. In 1070, an event message from the console application is communicated to the third party page, similar to 1020. In some embodiments, a different set of actions or types of actions may be allowed in response to receiving an event message from an accepted domain, as shown at 1086. In both figures, the set of allowable actions or types of actions may be strategically determined based on security concerns and the type of cross-domain communication that is needed to facilitate integration.

In some embodiments, the methods shown in FIGS. 10A and 10B may be performed concurrently, thus allowing for secure cross-domain two-way communication between the console application and the third party page. Alternately, one of the methods shown in FIGS. 10A and 10B may be omitted so that only one-way cross-domain communication is allowed.

The cross-domain API is described with reference to a pseudocode implementation according to some embodiments. However, the pseudocode is provided only as an example, and some embodiments may employ a different implementation. For example, cross-domain API methods may be specified using some methods, method names, parameters, and/or parameter names (e.g., method(parameter1:type, parameter2:type):returntype). However, different methods, method names, parameters, and/or parameters names may be used in different embodiments. As another example, at least part of the cross-domain API pseudocode here may appear as methods that return values synchronously. However, some embodiments may include one or more methods that return values asynchronously (e.g., via a callback method).

Developers may be able to import one or more libraries into various pages, but some methods within these libraries may be prevented from operating unless the pages are run in a designated context.

Third party pages may have the ability to open primary tabs, subtabs, or both. Primary tabs and subtabs opened from third party pages may follow navigation rules similar to standard pages. For example, duplicate pages may not be allowed by default. However, developers may be permitted to allow duplicate pages. As another example, third party pages may behave with back, forward, and/or refresh buttons in a manner similar to standard pages.

A page may only be able to manipulate itself and the tabs which it has opened itself. If a VisualForce™ page is embedded on a standard page, it may be able to manipulate the tab in which it is contained.

Examples of Page Methods isInConsole( ):Boolean:

In one or more embodiments, this method returns true if this page is in a Console context, false otherwise.

openPrimaryTab(id:String, url:URL, active:Boolean, tabLabel:String (optional), tabIcon:URL (optional)):Boolean:

In one or more embodiments, this method opens a new primary tab to the URL specified, which can be either a relative or absolute URL.

The id parameter may be the id of the newly opened tab. If this id parameter corresponds to a tab that already exists, then this method may redirect that existing tab to the given URL. If said tab already exists and is dirty, then the exit procedure for a dirty tab may be followed, e.g. the user may be asked if he wishes to proceed with the operation. A tab may be said to "already exist" for a given URL if that URL exactly matches the current URL of the tab, including its querystring (but excluding the special querystring parameters retURL and csrf).

If the URL is a Salesforce.com® URL or a relative link, any querystring parameters necessary for that page to function within service cloud console may be appended automatically.

If the active parameter is true then the new tab may be loaded and focus may be given to it immediately. If the active parameter is false, then the new tab may be loaded in the background, its contents preferably lazy-loaded, and the current tab may maintain its focus.

If the tabLabel parameter is specified, then the newly opened tab may show this string as its label, otherwise it may show the default external page tab label. The tab label may be text only; HTML may not be supported in tab labels. If the tabIcon parameter is specified then the image it points to may be the icon of the newly opened tab. This icon may be the same size as standard service cloud console tab icons; if not, it is acceptable to clip or resize the image. This method may return a Boolean indicating whether the primary tab was successfully opened.

In some embodiments, no URL may be allowed which maps to a standard save operation, such as a URL containing the save=1 parameter. In this case this method may fail and/or log a warning to the JavaScript® console.

openSubtab(id:String, primaryTabId:String, url:URL, active:Boolean, tabName:String (optional), tabIcon:URL (optional)):Boolean:

In one or more embodiments, this method opens a new subtab to the URL specified, which can be either a relative or absolute URL, within the primary tab specified by the primaryTabId parameter. This method may be similar to the openPrimaryTab( )method.

getEnclosingTabId( ):String:

In one or more embodiments, this method returns the ID of the enclosing subtab.

getEnclosingPrimaryTabId( ):String:

In one or more embodiments, this method returns the ID of the enclosing primary tab.

setTabTitle(tabTitle:String):void:

In one or more embodiments, this method sets the title of the tab containing this page, whether that tab is a primary tab or a subtab.

set TabDirtiness(dirty:Boolean, error:Boolean (optional)):void:

In one or more embodiments, this method sets the dirtiness indicator of the current primary or subtab to the value given in the dirty parameter. If the error parameter is specified and is true, this tab may be marked dirty with the error indicator. If the dirty parameter is false, then the error parameter is ignored entirely, and the current tab will be considered clean.

closeTab(id:String):Boolean:

In one or more embodiments, this method attempts to close the tab specified by the id given in the parameter. The tab may follow the same close routine as if the user had attempted to close it, e.g. if it's dirty it may allow the user to choose whether to save it before closing. If no tab exists for this id then it may fail silently but a warning may be emitted to the browser's JavaScript® console. This method may return a Boolean indicating whether the tab was closed successfully.

focusTab(id:String):Boolean:

In one or more embodiments, this method attempts to give focus to the tab specified by the id given in the parameter. If no tab exists for this id then it may fail silently but a warning may be emitted to the browser's JavaScript® console. This method may return a Boolean indicating whether the tab was closed successfully.

refreshSubtab(Id:String):Boolean:

In one or more embodiments, this method may attempt to refresh the subtab specified by the ID given in the parameter. This method may return a Boolean indicating whether the subtab was closed successfully.

Examples of Event Methods

In one or more embodiments, the service cloud console may provide a generalized message-passing system whereby pages in primary tabs, subtabs, and the context bar can communicate with each other. This message-passing system may follow an Observer design pattern.

onConsoleMessageReceived(fromDomain:String, messageId:String, callback:Function):void:

Allows this page to receive messages from the domains given in the fromDomain parameter coded with the given messageId. The fromDomain parameter should be allowed to contain wildcards, like "*.salesforce.com" or "*.na1.force.com". The wildcard "*" should be allowed to enable the page to lists to this messageId from any domain. The function specified by the callback parameter should be a function expecting at least one parameter (to receive the data component of the message). If no function by that signature exists then a warning should be emitted to the JavaScript® Console.

onSave(callback:Function):void:

Allows this page to react to the user's attempt to save all tabs by clicking "Save All" on the tab selector.

postConsoleMessage(messageId:String, data:String):void:

Posts a message to all subscribers containing the data specified.

Examples of Highlights Panel Methods showHighlightsPanel(visible:Boolean):void:

Shows or hides the highlights panel according to the visible parameter. This method should only work for pages that are occupying a primary tab.

addHighlightsPanelField(fieldName:String, fieldLabel:String, value:String, xPosition:int, yPosition:int):void:

Adds a field with the identifier of fieldName and the label of fieldLabel to the HP with the value given by the value parameter to the x and y positions given by their respective parameters. If a field already exists in that position then this field name and value shall replace it. This method should only work for pages that are occupying a primary tab.

setHighlightsPanelField(fieldName:String, value:String): void:

Replaces the value of the (presumably already-shown) field with the identifier of fieldname with the value given in the value parameter.

removeHighlightsPanelField(fieldName:String):void:

Removes the field with the identifier fieldName and blanks out its position in the HP.

Examples of Context Bar Methods showContextBar(visible:Boolean):void:

Shows the context bar for this subtab.

addContextBarComponent(page:String, id:String):void:

Adds to this subtab's context bar a component containing the VisualForce™ page specified by the page parameter and referenced by the ID provided by the id parameter.

removeContextBarComponent(id:String):void:

Removes from this subtab the context bar component referenced by the ID given in the parameter.

Examples of Interaction Log Methods addObjectToInteractionLog(objectId:String,select:Boolean (optional)):Boolean:

Adds the given object to the Name or Related To field of the Interaction Log of the currently selected primary tab. If the given object is eligible for the Name field (i.e. it is a Contact, Lead or Person Account) then it should be added to the Name field; otherwise it should be added to the Related To field, unless the object type is one that does not support activities. If the object type does not support Activities, or if the given objectId points to an ID of an object that does not exist or is inaccessible, then a warning should be emitted to the JavaScript® Console and this method should return false. This method may return true if the object was successfully added to the IL, false otherwise. Note: implementation of this function will likely require a server roundtrip to determine the type, entity name, label, and activity eligibility of the specified object. Said roundtrip is acceptable.

setInteractionLogFieldValue(fieldApiName:String, value: String):Boolean:

Sets the value of any field on the IL except for the Name and Related To fields (aka the WhoId and Whadd fields); Name and Related To should be set by the special method addObjectToInteractionLog. The fieldApiName parameter shall be the API name of the field (such as "MyCustomField_c" for custom fields). The value shall be a value that is valid for the type of field. If the field is a multiselect picklist then the value specified can contain multiple semicolon-separated entries. The value selected by this method will wholly replace any value currently selected for this field in the IL.

This method should work for any field on "Task," even if said field is not actually shown to the user on the interaction log. If there is a type mismatch (i.e. the page tries to set a Number-typed field to a string value) then this method should fail silently, emit a warning to the JavaScript® Console and return false. This should also be the case for other types of errors, e.g. the method tries to set a field which is read-only for this user, or a picklist value which does not actually exist.

This method may return true if the value was successfully set, false otherwise.

Example of a CTI Method dialNumber(number:String):void:

Instructs CTI adapter to attempt to dial the number given by the parameter.

Examples of Navigation Tab Methods goToListView(listViewId:String):Boolean:

Redirects the navigation tab to the list view given by the listViewId parameter, and changes the active object in the navigation tab to point to the object referred to by the list view. This method may return true if the navigation to this list view was successful, false otherwise.

refreshCurrentListView(focusNavigationTab:Boolean): void:

Refreshes whatever list view is currently loaded in the navigation tab, if any. If the focusNavigationTab parameter is true, gives focus to the navigation tab, otherwise maintains the current tab of focus.

getCurrentListView( ):String:

This method may return the list view ID of whatever list view is currently loaded in the navigation tab, or the empty string if no list view is currently loaded there.

Other Cross-Domain Communication Techniques

In some embodiments, more than one technique may be used to facilitate cross-domain communication between HTML iframes. Accordingly, some embodiments may include JavaScript® libraries that abstract the handling of event passing between cross-domain HTML iframes. The code may determine whether to use the cross-domain scripting API, the postMessage method provided by HTML 5, the hidden HTML iframe method based on the browser, or any other method. Events that are fired within the console may be captured and re-fired to cross-domain HTML iframes and/or vice versa using one of these methods. Some embodiments may include VisualForce™ tags that customers can use to fire and/or listen to events.

Some embodiments may include a server push framework, such as the VOMET technology developed by Salesforce.com®, for providing cross-domain communication between frames. Events from the browser may be passed to VOMET software on a server, which would then push the events directly to the cross-domain frames.

Some embodiments may include a hash (or HTML anchor) technique for providing cross-domain communication between frames. The hash technique relies on two browser behaviors: 1) the location of a window can be modified cross-domain, and 2) the page is not reloaded when only the anchor is modified. The hash technique may require the particular window or frame to poll for changes to the URL.

Some embodiments may include a hidden HTML iframe technique for providing cross-domain communication between frames. Using the hidden HTML iframe technique, messages may be passed through the hash as with the hash technique. In contrast to the hash technique, however, the messages are passed to a hidden HTML iframe that points to a proxy page within the same domain as the target frame. Since the hidden HTML iframe and the target HTML iframe are in the same domain, they can safely communicate with each other. Because code is placed on the target domain when using the hidden HTML iframe technique, this technique does not break browser security. However, the developer may need access to both domains. Using the hidden HTML iframe technique, events can be pushed instead of pulled to the target frame by taking advantage of the iframe resize event. Since messages only change the URL of the hidden HTML iframe, they do not modify the parent window URL. In some embodiments, the communication iframe may only be created on an as-needed basis, which may result in improved performance.

Supporting Apparatus and Services

One or more embodiments may incorporate various technologies for constructing pages. For example, one or more components or pages may be constructed using Lumen, Ext, ExtJS, Flex, and/or VisualForce™ technologies available from Salesforce.com®. As another example, one or more components or pages may be constructed using Flash, Ajax, HTML, JavaScript®, or other publicly available technologies.

In one or more embodiments, one or more technologies developed by Salesforce.com®, such as the Web Services API, VisualForce™, and/or Apex Service-oriented Architecture ("SOA") may be used to display and/or integrate disparate data sources from across multiple systems. The service cloud console may be designed or configured for use with various web browsers, such as IE 7+, Firefox 3.5+, Safari, etc.

In some embodiments, performance may be improved by optimizing pages for high performance in a browser environment. One or more web analytics and/or on-line business optimization platforms such as Omniture® may be used to measure the performance and adjust it as needed. In one or more embodiments, a network operations center ("NOC") may be used to monitor performance and react quickly to performance degradation.

Ext is a JavaScript® platform developed by Salesforce.com® that includes a broad variety of UI components that can be used to develop highly interactive browser UIs. Ext may allow a complex layout. It also has a well-defined event model which facilitates component communication. JavaScript components may be created by subclassing Ext's components.

The following components provide an example of the subclassing that may be used in one or more embodiments. ServiceDesk extends Ext.Panel and represents the entire console (everything between the header and footer). ScrollableTabPanel extends Ext.TabPanel and implements Ext's tab scrolling but implements the tab menu seen at the right of the top and second level tabs. NavigatorTabPanel extends ScrollableTabPanel and also renders the navigation tab which is a SplitButton at the upper left of the console which lives outside of the scrollable area (it is fixed in place). NavigatorTab extends Ext.Panel and represents the contents of the navigation tab. It may display the Enhanced List View associated with the currently selected navigation tab. WorkspaceContextPanel extends Ext.Panel and displays a set of fields related to the workspace as well as a splitbutton to quickly create new records. Workspace extends Ext.Panel and represents the top level tabs. It reserves space for the WorkspaceContextPanel and ScrollableTabPanel in its layout. ContextPane extends Ext.Panel and represents the 'Knowledge' component shown at the right. In some embodiments, a knowledge component for the ContextPane may be provided. Alternately, or additionally, customers may create their own content for the ContextPane which may interact with the service cloud console through an event model. IFrameComponent extends Ext.BoxComponent and represents content within an iframe like Detail/Edit pages. View extends Ext.Container and represents the second level tabs. It reserves space for the ContextPane and IframeComponent in its layout.

In one or more embodiments, some or all of the content viewable through the service cloud console will be inside of HTML iframes. The content included inside HTML iframes may include, but is not limited to: detail/edit pages, enhanced list views, customer and Salesforce®-created VisualForce™ pages and any random sites that customers put into custom links.

HTML iframes may be useful because putting content of multiple detail/edit pages on the same browser page. Without iframes, for example, there may be conflicting ids and/or broken JavaScript®.

In one or more embodiments, a set of rules may govern handling the browser back and forward buttons. When the user interface is enclosed in HTML iframes, some of this history management will work automatically. For instance, when an agent interacts with content in an HTML iframe by clicking on the edit button from a detail page, the HTML "src" element of the HTML iframe changes from the detail to edit page. That change may be automatically added to the browser history, so clicking on the back button from the edit page can navigate the HTML iframe back to the detail page.

Additionally, or alternately, one or more embodiments may include tab navigation in the browser history so that if a user starts on 'account tab 1' and clicks over to 'account tab 2,' clicking on the browser back button can reopen 'account tab 1.' This may be accomplished by adding a hidden HTML iframe to store tab state history.

Whenever the user clicks on a tab, JavaScript® may handle that event to change the URL of the hidden history HTML iframe. The iframe will point to a simple HTML page called history.html which will have JavaScript® which fires onload. The JavaScript® on history.html may parse its own URL and read the tab state which is in the URL's query string (for instance, 'account tab 1' is active and subtab 'case tab 1' is open within that account's workspace) then fire an event instructing the user interface to activate that tab. Since the tab is already active, nothing will happen. However, when the agent clicks on the browser back button, the JavaScript® on history.html may run again but this time with the previous tab state and activate those tabs.

In some instances, clicking on any tab could require a trip to the server. However, the impact of server calls may be mitigated by making history.html lightweight and/or by making any queries to it cachable. For example, one or more tab change increments may be represented by a state token so clicking on a first tab would make the request to history.html using '?history=1,' the second click would be '?history=2,' and so on. The actual tab state for those history tokens may be stored in a hidden input field and the state may be serialized in a string. This technique allows reducing the size of the unique URLs that hit history.html and improves the usage of the browser cache. By using an input field, the history state can persist for the back button even if the user leaves the service cloud console entirely and then clicks the browser back button to return. The state in the input field may clear when the user actively navigates back to the service cloud console.

One or more embodiments may include a browser-specific approach to history management. For example, one or more versions of the Safari web browser may not add an entry to the browser's history when an HTML iframe URL is changed from JavaScript®. Accordingly, one or more embodiments may employ history management frameworks and/or techniques that use a combination of HTML iframes for adding history entries in Internet Explorer and storing the state as part of the hash '#' in the browser's URL for Firefox.

In one or more embodiments, the service cloud console client may communicate with the server via Ajax. The workspace context panel may display a layout-driven grid of fields from the detail page to the user. The HTML for these fields may differ from that in the Detail page because, for example, one or more complex elements (e.g., lookup) may have specific HTML IDs and output JavaScript® that references those HTML IDs. In order to reconstruct those elements and reassign HTML IDs to redisplay them, the workspace context panel may request the HTML for its fields from a servlet that resolves the HTML ID and JavaScript® issues.

In some embodiments, metadata may define the behavior of a record when it is clicked from a list view (e.g., on the navigator tab, from search, from a CTI popup, etc.). The metadata may include instructions telling the record whether to open in a workspace or in a subtab with one of its parent objects opened as the workspace. In order to determine whether to open a record as a workspace or subtab, the service cloud console may make a call to the server to identify the record's parent so it can open a workspace tab to the appropriate parent if necessary. A servlet may handle console requests and route them appropriately.

In some embodiments, the event model may be simple and/or granular. One or more embodiments may employ Ext's built-in event model and event bubbling to fire events. The events may include, but are not limited to:

SearchNavigationEvent: A agent has clicked on a record in their search results.

ListNavigationEvent: A agent has clicked on a record for its Detail or Edit page.

PageNavigationEvent: A agent has clicked on a link which would normally take them to a new page.

DetailPageLoadedEvent: A detail page has finished loading in one of the Service Desk's iframes.

EditPageLoadedEvent: An edit page has finished loading in one of the Service Desk's iframes.

PageUpdatedEvent: A page has successfully passed validation and completed saving.

FieldUpdatedEvent: A agent has changed a field on a page. For 166 we are only going to fire this for a couple of specific Case fields.

CTIPopEvent: A call has come in and CTI is popping up.

TabChangeEvent: A agent has changed the active console tab by clicking on another.

The payload for these events may be similar. The navigation events may include the HTML HREF of their destination and the page events may include the HTML ID of the record the page represents. Field events may contain both the HTML id of the record and the field name.

In one or more embodiments, an example flow for event firing and handling would be as follows. The agent views a case detail page and clicks a contact related list record. This executes JavaScript® that fires a PageNavigationEvent through the Ext component that contains the detail page. That event bubbles up through the Ext component hierarchy until it reaches the workspace component. The workspace component is listening for PageNavigationEvents and handles it by opening a new tab for the contact.

One or more embodiments may expose some or all of these events to customers so that, for example, they can build their own VisualForce™ pages for the service cloud console.

One or more embodiments may provide significant performance benefits. For example, actions like opening/closing tabs and expanding/collapsing sections may be nearly instantaneous. Client side performance may be monitored by adding instrumentation to the source code.

One or more embodiments may include a new GenericJSPPage to avoid laying code on top of an existing page. Some embodiments may display a highlights panel similar to that shown on the deal view page. The deal view highlights panel may add time to the page load (e.g., to execute label and value truncation logic), but this effect may be mitigated by UI design. Accordingly, one or more embodiments may include a visual design and/or performance benefits similar to deal view. The highlights panel may retrieve data asynchronously (e.g., using Ajax), which in some instances may improve the perceived performance. For example, the agent can click on a link and a new tab may open almost immediately with the highlights panel and detail page filling in as the data becomes available. Additionally, or alternately, the Back/Forward implementation may reduce the traffic to the server.

It should be noted that any of the embodiments described herein may or may not be equipped with any one or more of the features set forth in one or more of the following published applications: US2003/0233404, US2004/0210909, US2005/023022, US2005/0283478, US2006/0206834, and/or US2005/0065925; which are each incorporated herein by reference in their entirety for all purposes.

Highlights Panel

One or more embodiments may include a highlights panel that may contain various types of information related to the currently selected workspace. For example, FIG. 19 includes a highlights panel 1520.

In one or more embodiments, the highlights panel may contain field data only (e.g., no buttons, widgets, or custom content). However, one or more embodiments may allow one or more highlights panels that contain other types of information. In one or more embodiments, the highlights panel may accommodate standard and/or custom formula fields, such as those that calculate count-down or count-up information (e.g., "Age," "Days Until Close," etc.). In some embodiments, the highlights panel may contain analytic charts and/or custom content. In one or more embodiments, certain field types may be ineligible for inclusion on the highlights panel.

It is anticipated that administrators ("admins") may want control over what fields are featured in the highlights panel, in what order, and/or how they are styled. Accordingly, in some embodiments the highlights panel may be configurable. The configuration tool may support one or more of field selection, arrangement, styling, etc. Further, one or more embodiments may allow agents to personalize the highlights panel by specifying properties such as which fields belong in the highlights panel and/or how the fields are displayed.

In one or more embodiments, the highlights panel stretches to full page width. Further, the highlights panel may have from 1 to 4 columns of equal (or substantially equal) width. By limiting the number of columns displayed in the highlights panel, expanding the width of the highlights panel, and ensuring substantial equality in column width, a substantial amount of space is reserved in each field for field content. However, in some embodiments one or more columns may be resizeable. For example, one or more field types (e.g., text area, multi-select picklist, etc.) may trigger a custom width option.

In some embodiments, functionally and/or aesthetically ill-advised selections may be prevented by limiting available choices. For example, using two or more rows of bold items or mixing a left-aligned styling with a gutter-aligned styling may be prevented. As another example, admins may be prevented from selecting the same field more than once in the highlights panel field arrangement. As yet another example, the configurator may require some fields to be placed on the detail page layout in order to eligible for inclusion in the highlights panel, which may ensure editability since highlights panels fields may not be directly editable. In one or more embodiments, choices may be guided by allowing users to select one or more highlights panel templates that prevent or discourage certain choices.

In some embodiments, visibility of fields may be restricted by field-level security rules. Field-level security rules may render some fields invisible to some users. When field-level security rules hide fields placed in the detail area, the end-user may be unaware because adjacent fields can fill in the gaps.

In some embodiments, one or more fields may be included in the highlights panel by default. One or more default fields may be present until the highlights panel is configured, present until they are removed, or non-removable.

In one or more embodiments, some fields may be excluded from the highlights panel. For example, 255-character text area fields, 32,000-character text areas, multi-select picklists, fields that display images, and/or other types of fields may be excluded. Alternately, some embodiments may allow any type of field to be displayed in the highlights panel.

Field values and/or field labels too long to fit in their allotted space may be truncated, ending with an ellipsis. As the user stretches his browser window wider and narrower, the width of the page may adjust. When the page width adjusts, the amount of text a user can see as overflow "runoff" may be revealed inside newly-gained pixels.

Truncation properties may vary depending on field type. For example, text truncation may be handled with ellipses, while image truncation may have a different approach such as forcing the image to resize to fit in the cell dimensions. Design considerations that may affect truncation properties may include, but are not limited to dynamic browser resizing and/or quick and easy viewing of overflow content on truncated fields.

Some embodiments may include one or more crutches and shortcuts for easier configuration. For example, the configurator may contain user interface objects demarcating which fields have already been placed into the highlights panel).

In some embodiments, a column may contain up to two fields in primary and secondary positions (styled accordingly). Certain fields that require more space (e.g., text, text area, etc.) may occupy only primary field positions, will take up the entire column, and cannot be combined with secondary fields. When one of these fields from a primary field position picklist, an explanatory message may appear where the secondary field picklist would normally appear. One or more fields may be designated blank by default. Intentionally blank fields may be distinguished from unspecified fields.

Admins should not be required to make too many visual design choices. Thus, styling options may be intentionally limited. Admins may not have an aesthetically sensitive eye, and too many options may bog down the configuration, stealing focus from field selections and ordering.

Admins may need to configure multiple variations of an object's highlights panel, for example to support the needs of different users in different contexts. Accordingly, in some embodiments a highlights panel configuration may map to a page layout, letting admins leverage the flexibility of profiles and record types to support their end-users' various needs. Associating the highlights panel with a page layout allows the highlights panel to use the page layout's properties, such as its profile, record type associations, etc. The list of available layouts may be filtered by user (e.g., profile, role, public group, individual user, etc.). However, because some very large organizations may create hundreds or even thousands of page layouts, some embodiments may allow applying one or more highlights panel configurations to multiple page layouts in just a few quick clicks.

Admins generally prefer to avoid any unnecessary and/or unjustified configuration work. Accordingly, one or more embodiments may include a single configuration tool for the highlights panel in every context. Thus, a single configuration may satisfy all contexts in which this component may appear. However, other embodiments may allow an admin to configure a highlights panel for all contexts, selected contexts, and/or a single context. One or more embodiments may include highlights panels having different configurations for different contexts. For example, one or more highlights panels may include three columns and three rows.

In one or more embodiments, the deal view may be the only context in which a highlights panel appears. However, other embodiments may include one or more highlights panels in different contexts. In one or more embodiments, the highlights panel is always part of the deal view. Thus, an admin may not disable it for a layout, but an end-user may collapse it for all detail pages on an object.

In one or more embodiments, an admin may access the highlights panel configuration tools via the page layout editor for any given layout. The detail page may include a new section to represent the highlights panel. Hovering over the page layout editor highlights panel may tint the editable section and/or reveal a wrench icon. The admin may click on the wrench to open the highlight panel configurator. In some embodiments, the highlight panel configurator may open in a custom overlay dialog. Alternately, the highlight panel configurator may be integrated into the page layout editor interface and/or may employ a different type of user interface, such as an expandable panel. As yet another example, the configurator dialog box may form a multi-page wizard that allows the user to choose one or more templates.

In some embodiments, users may drag and drop to rearrange columns, remove columns (e.g., using an "x" button), add columns (up to the maximum), change field selections, revert to defaults, and/or view suggestions for effective field pairings to be featured in the highlights panel.

In one or more embodiments, the highlights panel may include more than one page and may include one or more affordances for moving between the pages. For example, the highlights panel configuration dialog may include an "Assign to Other Layouts>" button to access a second page. As another example, the highlights panel configuration dialog may include a "<Back to Configuration" to return to the first page of the dialog.

The highlights panel configuration dialog may include a button allowing an admin to cancel configuration without retaining any highlights panel configuration changes. Also, the highlights panel configuration dialog may include a button allowing the administrator to accept the changes and apply them to the page layout editor. In some embodiments, changes to the highlights panel will not be saved until the page layout editor is saved.

The buttons that may be allowed to show in the mutton per entity may include, but are not limited to:

Custom Object: New Custom Object
Activity (Task): Log A Call, Send An Email, Mail Merge
Activity (Event): New Event
Campaign: New Campaign
Lead: Add To Campaign, New Lead
Account: New Account
Contact: New Contact Opportunity: New Opportunity
Opportunity Product: New Opportunity Product
Case: New Case
Case Comment: New Case Comment
Solution: New Solution
Contract: New Contract
Asset: New Asset
Product: Add Product
Idea: New Idea
Answer: New Answer
Article: New Article
Quote: New Quote
Entitlement: New Entitlement
Service Contract: New Service Contract
Entitlement Contact: New Entitlement Contact Title Bar and Page Tools One or more embodiments may include a title bar, which is a UI element at the top of a primary or secondary tab containing information about the record opened in the tab, such as the record's object type, title, other identifier, and/or page tools. Page tools are functional utilities available for that particular record, such as "Printable View," "Help for this Page," etc.

Figure 38:
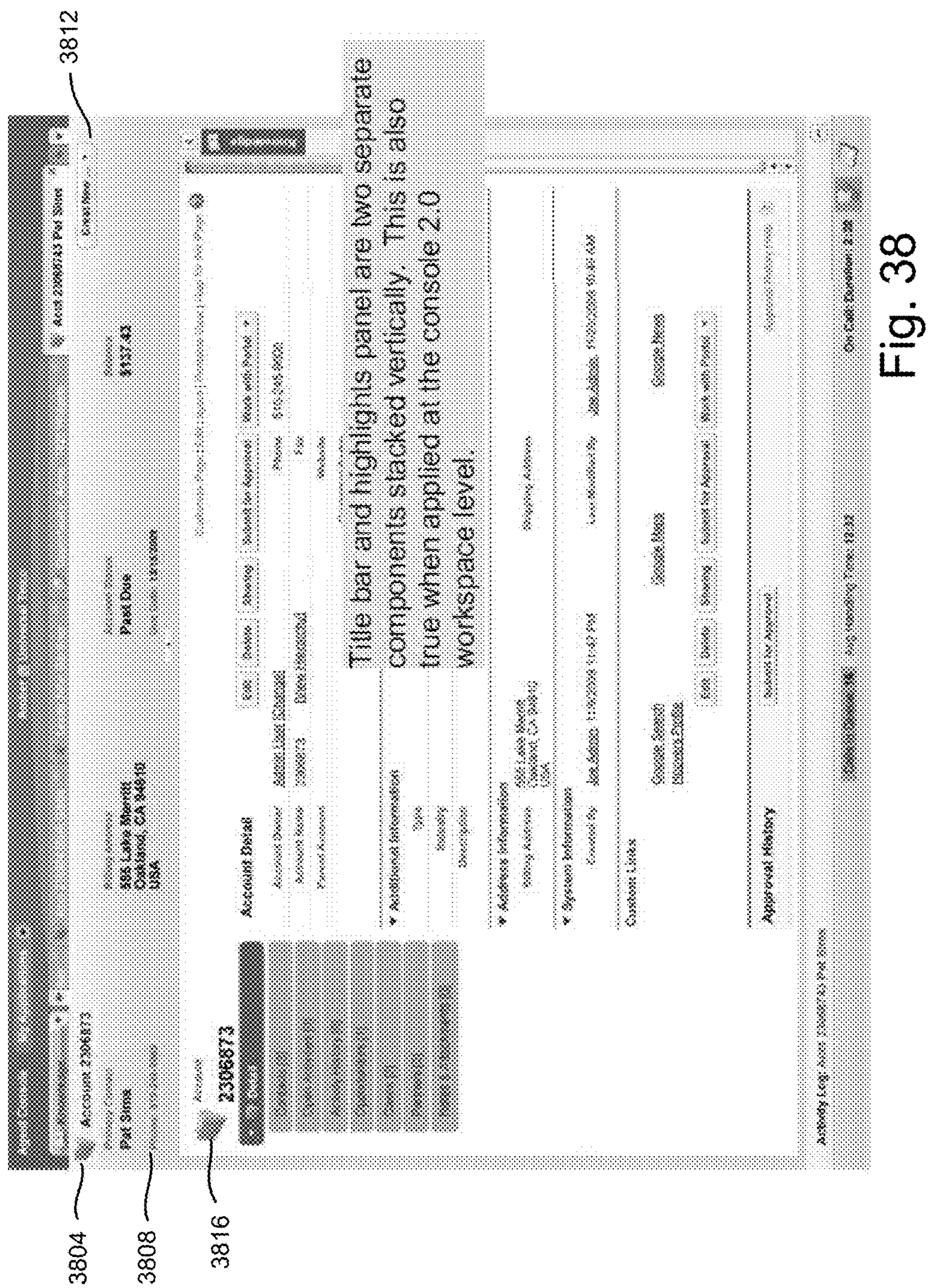
Figure 39:
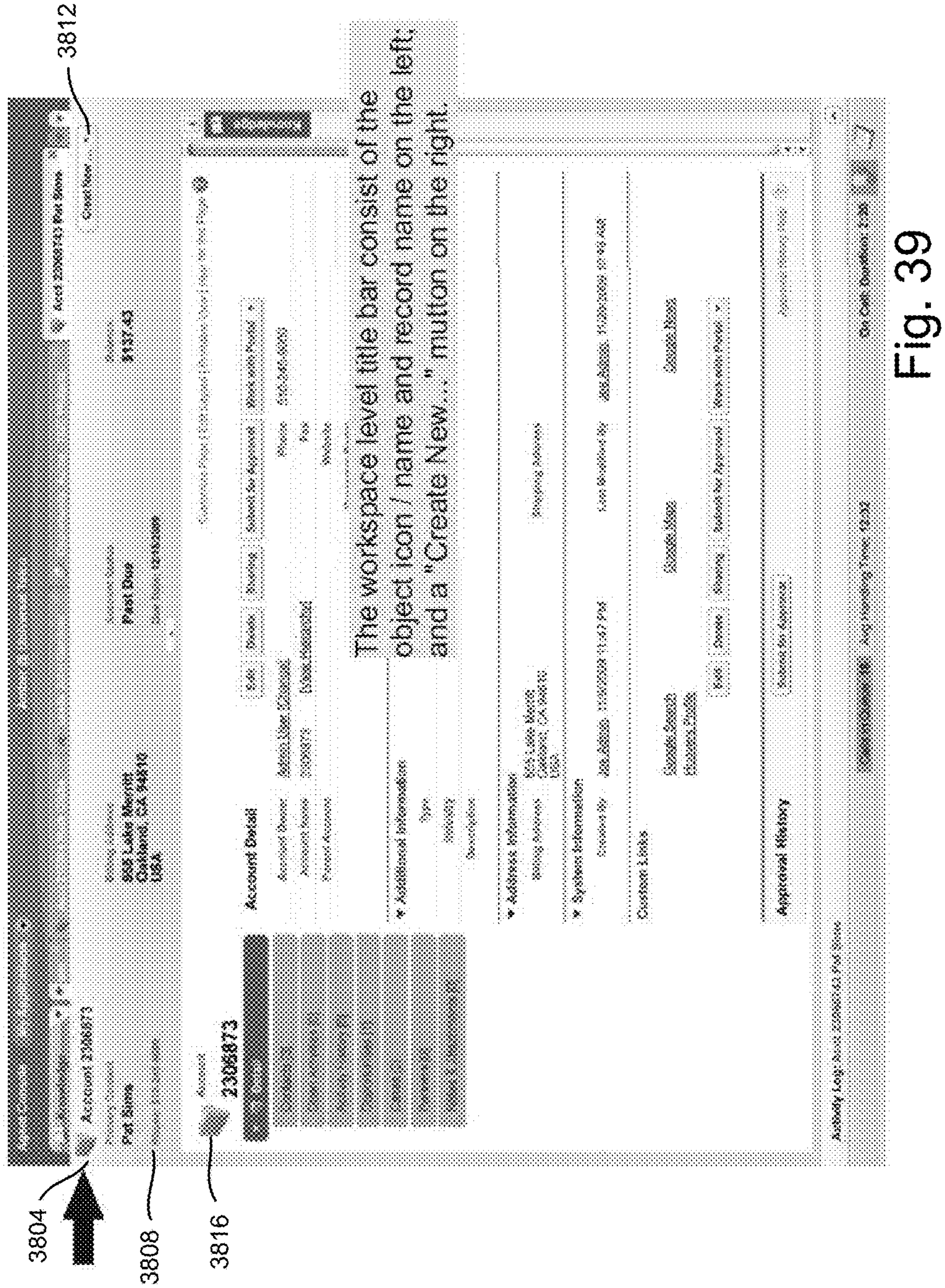

FIGS. 38-42 show examples of title bars, according to one or more embodiments. The graphical user interface shown in FIGS. 38-42 includes a title bar 3804, a highlights panel 3808, a mutton 3812, and a main view area 3816. As is shown in FIGS. 38 and 39, the title bar 3804 for a primary tab may be positioned above the highlights panel 3808 and may include information such as the account number. The title bar may include a "mutton," such as the "Create New" mutton 3812 shown in FIG. 39. The mutton 3812 is a dynamic, contextual button with a drop-down list of options.

In some embodiments, each object detail record page has a title bar, whether the object detail record page is rendered as a workspace object record or otherwise. The title bar may provide reference and navigational orientation when viewing a page. In some embodiments, the title bar may have an object-specific color, which may assist in identifying the object displayed.

Figure 40:
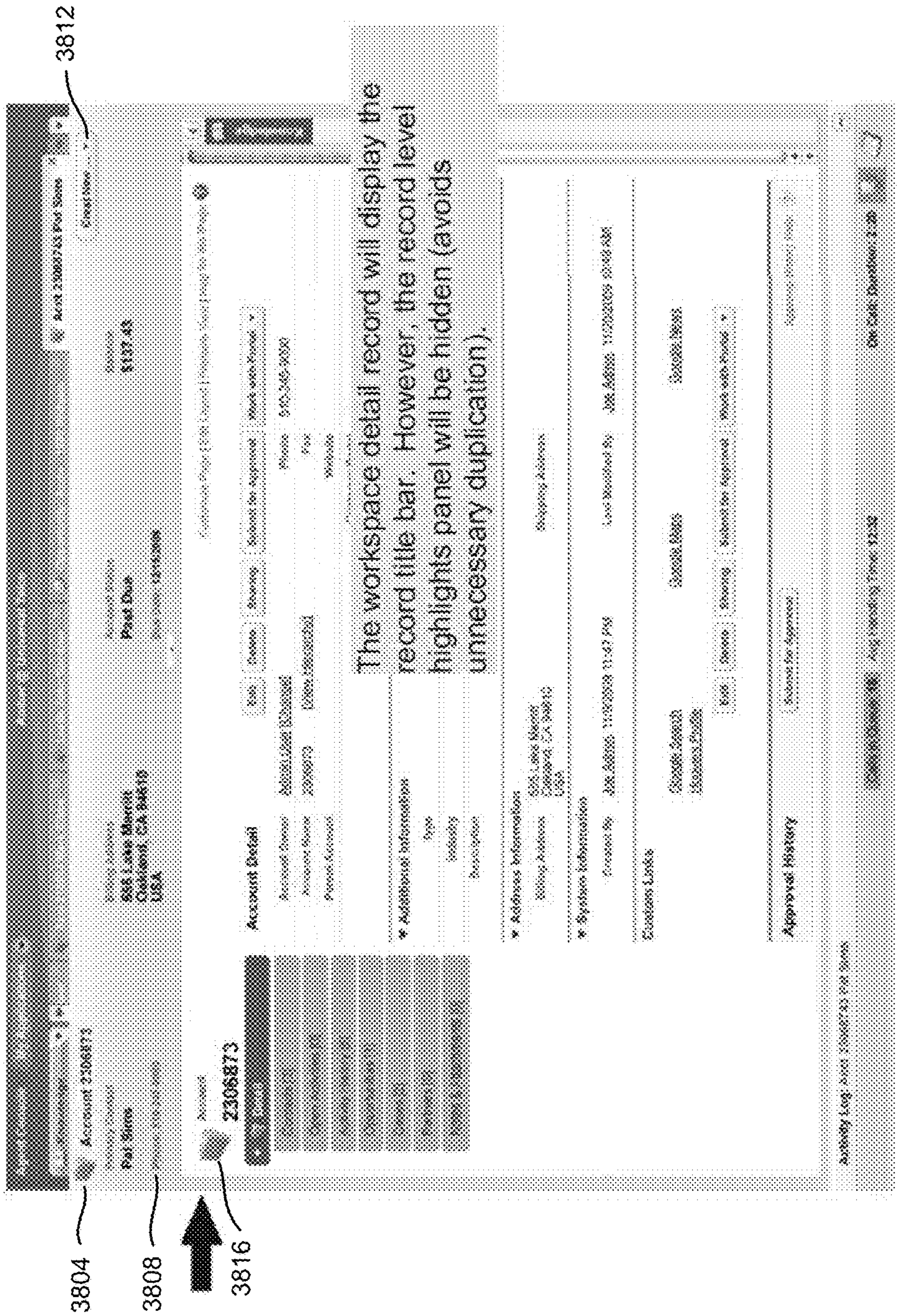
Figure 41:
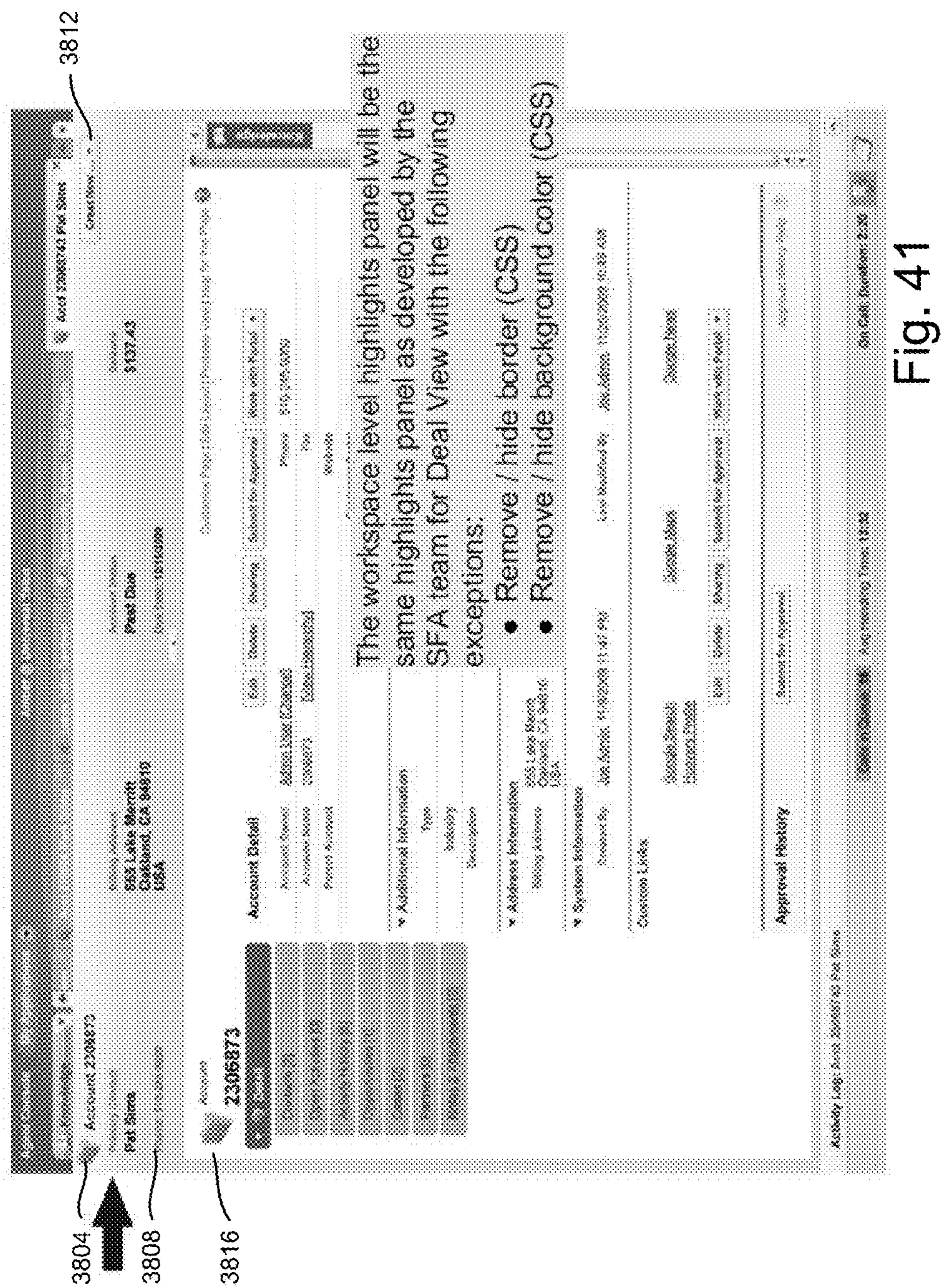
Figure 42:
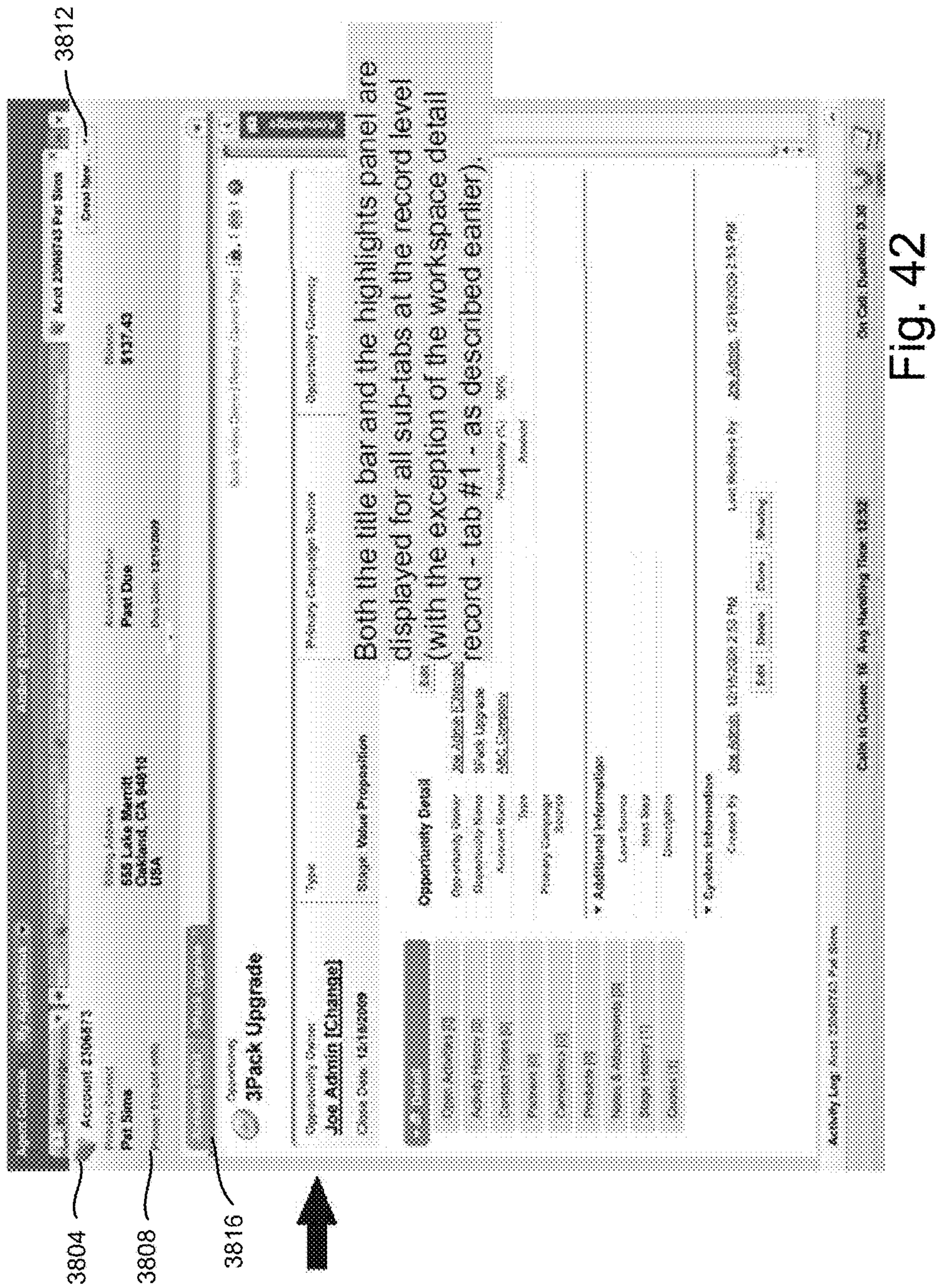

As is shown in FIG. 40, the title bar for a subtab may be displayed below the highlights panel for the primary tab within the main view area 3816. In some instances, such as when the workspace detail record is displayed, the highlights panel for the secondary tab may be hidden, as shown in FIG. 40. However, in other instances both the title bar and highlights panel may be displayed for a subtab in the main view area 3816, as shown in FIG. 42. In one or more embodiments, the highlights panel for a primary tab may appear similar to the highlights panel used for the deal view, as shown in FIG. 41. In one or more embodiments, the deal view may be an opportunity page that allows a call center agent to view his or her opportunities. In a deal view, important details may be shown in a highlights panel.

Page tools may each be represented using one or more text links, icons, tool tips, custom hover bubbles, buttons, etc. Some embodiments may include one or more universal page tools features on every (or nearly every) detail page.

One or more embodiments may include page tools for customizing a page, such as a "Customize Page" link. Alternately, or additionally, such information may be displayed using a side tab page navigation approach.

Some embodiments may include one or more page tools related to providing a record-level feed. Alternately, or additionally, such information may be displayed in a side tab.

One or more embodiments may include next/previous page tools to allow users to navigate to the next and previous record in a list or report. In this case, the title bar may include one or more of next, previous, and back to list/report page tool controls.

Workspace Objects

This section describes properties of workspace objects in one or more embodiments.

In one or more embodiments, an administrator may map a field on an object to a workspaceable object using a workspace driver field. When an object has a field configured in this way, it may become a subordinate object. In this case, the object may only open in the workspace of the object to which it is subordinate. Each object may be limited to one workspace driver field.

For example, one custom object may be a bill. A bill may have fields such as amount (a currency), account (a lookup to account), and contact (a lookup to contact). One of these fields, or the bill itself, may be the workspace driver. If account is set as the workspace driver field, then when opening a bill, the account will appear in the workspace tab, and the bill will appear as a subtab.

In one or more embodiments, almost any object may be a workspace object. A workspace driver field may be used to define what workspace an object will open in if not its own. Those driver fields may be selectable from the set of lookup relationships on a given object. Any of an object's relationships may be available in this list.

Despite the existence of a workspace driver field, an object may open in its own workspace if it happens to be orphaned. For example, a case object may be configured such that the parent account is its workspace object, but the user may open a case which is orphaned, (i.e. its parent account is null). In this event, the case may open in its own workspace, even though under normal circumstances cases don't do so.

In one or more embodiments, each objects have a highlights panel layout. If no highlights panel is defined for an object, its mini view layout may be used by default. This layout may be specified by the same mechanism used by the "deal view."

In one or more embodiments, only non-setup entities may be included in the metadata allowing end users to choose their workspace properties. Setup entities like user may implicitly be configured as "Opens In Itself."

In one or more embodiments, VisualForce™ pages may be configurable as workspaceable pages or as subordinate objects. In the event that a VisualForce™ page is workspaceable, it may be allowed to omit the highlights panel.

In one or more embodiments, objects selected from a subtab may stay within the context of that workspace. For example, suppose contact is a workspaceable object and an account is open. A contact opened from the account details section may open as a subtab under the account and not in its own contact workspace. Even though contact is a workspaceable object, it may be opened in the context of an account. In some embodiments, a user may drag the contact tab up to workspace bar to make it its own workspace and/or drag one or more workspaces into subtabs.

Navigation Tab

One or more embodiments may include a navigation tab within the user interface. FIGS. 15 and 79-89 show images of a navigation tab according to one or more embodiments. The navigation tab may alternately be referred to as the navigator tab or the silvertab. As shown in FIG. 15, the navigation tab 1504 may be displayed in the primary navigation bar of the service cloud console.

The graphical user interface shown in FIGS. 79-89 includes a navigation tab button 7904, a navigation tab drop down button 7908, a navigation tab drop down menu 7912, and a navigation tab scroll bar 7916.

Figure 79:
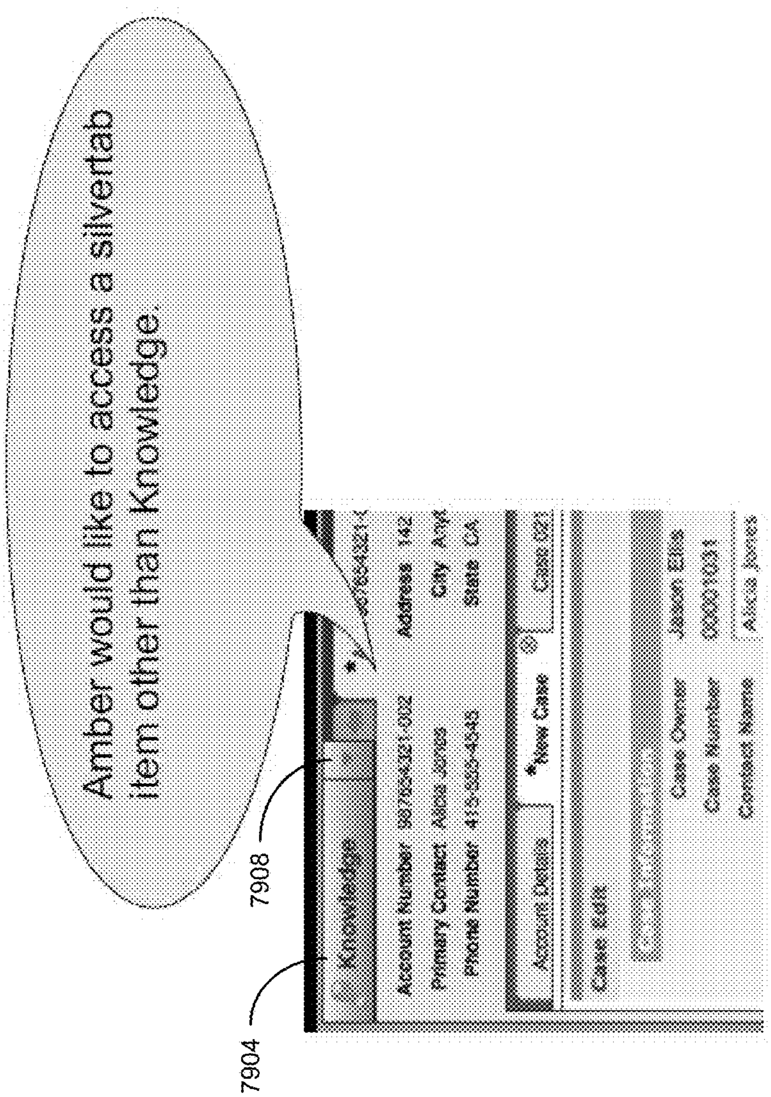
Figure 80:
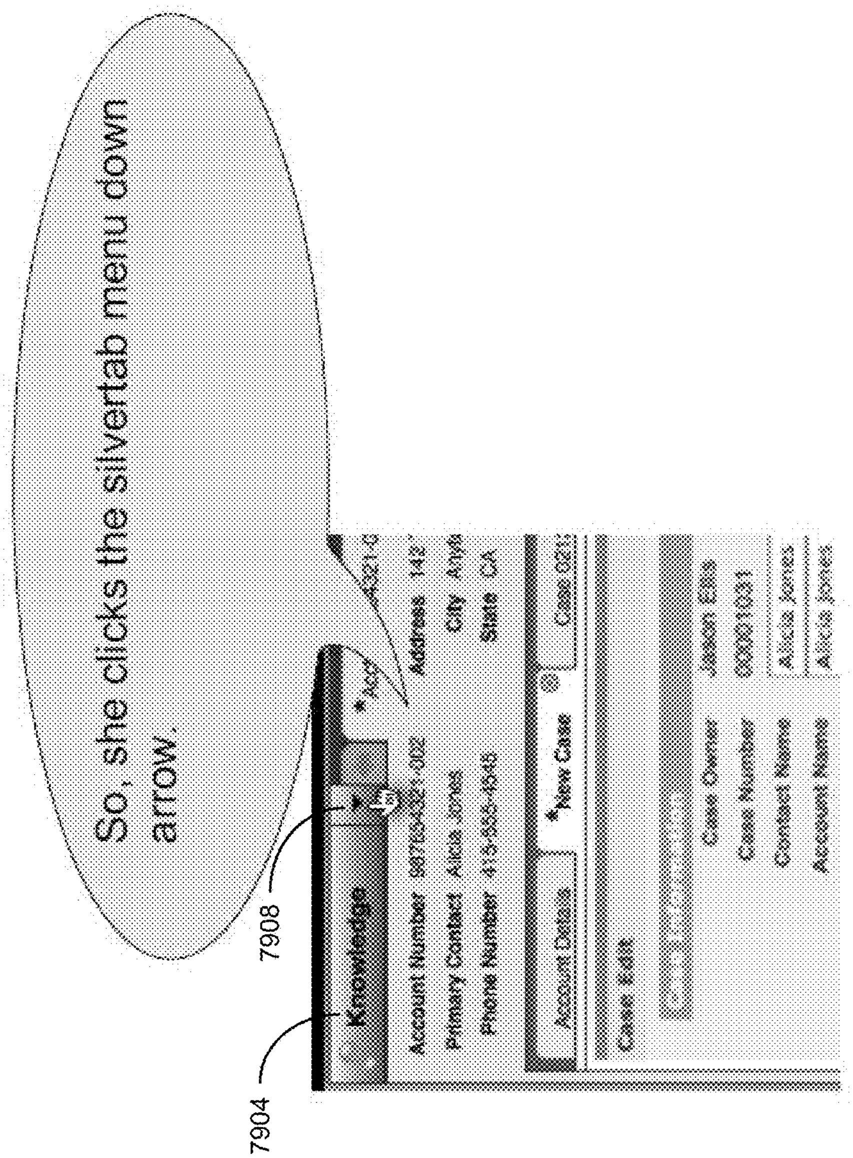
Figure 81:
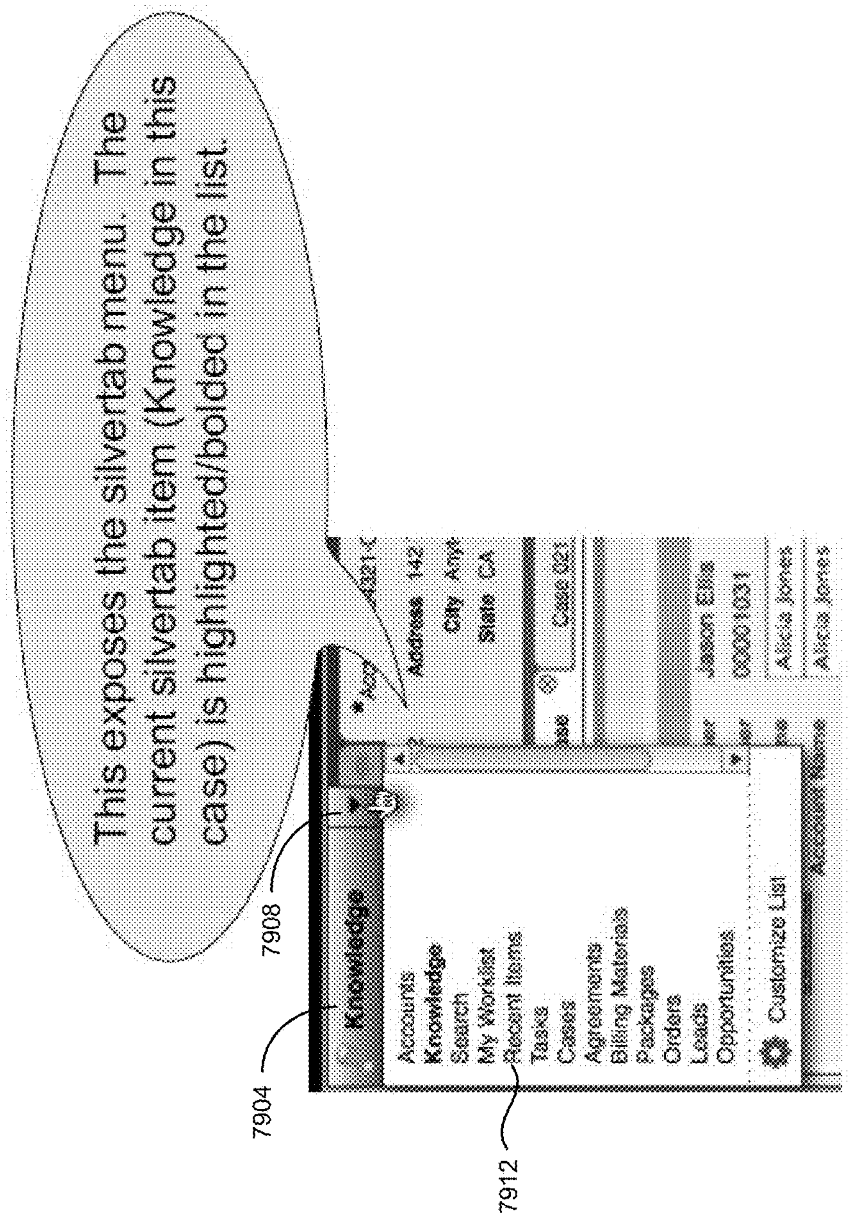
Figure 82:
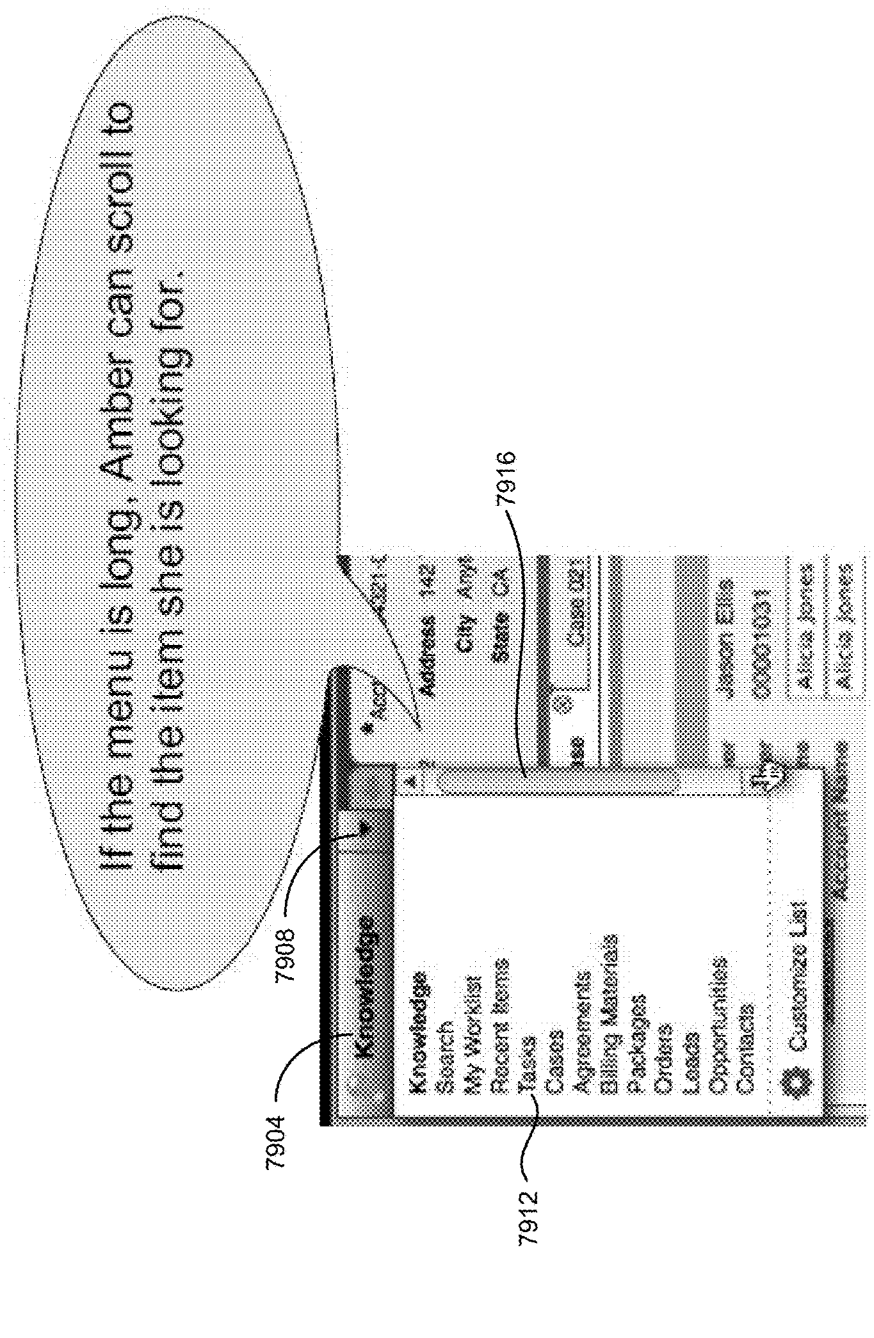
Figure 83:
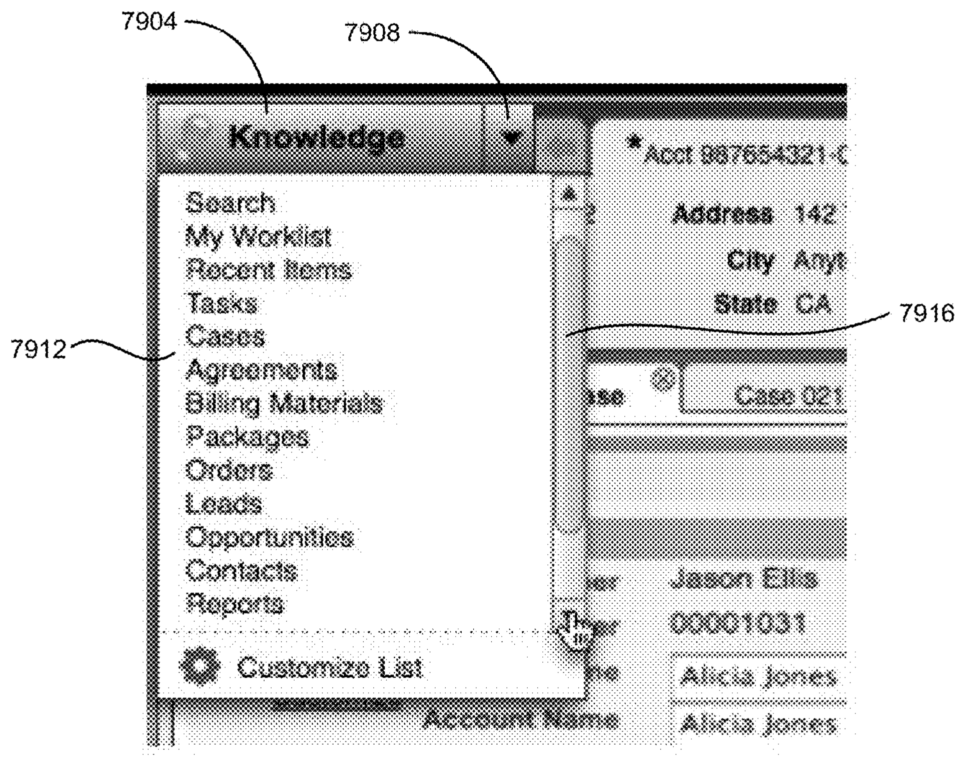

When the navigation tab is selected, the navigation page corresponding to the current navigation tab item may be displayed. For example, the navigation tab shown in FIG. 79 is set to the "Knowledge" element, which is displayed on the navigation tab button 7904. Accordingly, clicking the navigation tab button 7904 may result in the service cloud console displaying a primary tab that includes one or more knowledge-base articles or other knowledge-related information.

In one or more embodiments, the navigation tab may include a drop-down button used to select one of a list of elements for navigating the service cloud console. For example, clicking the navigation tab drop down button 7908 shown in FIG. 80 results in the display of the navigation tab drop down menu 7912 shown in FIG. 81.

Figure 84:
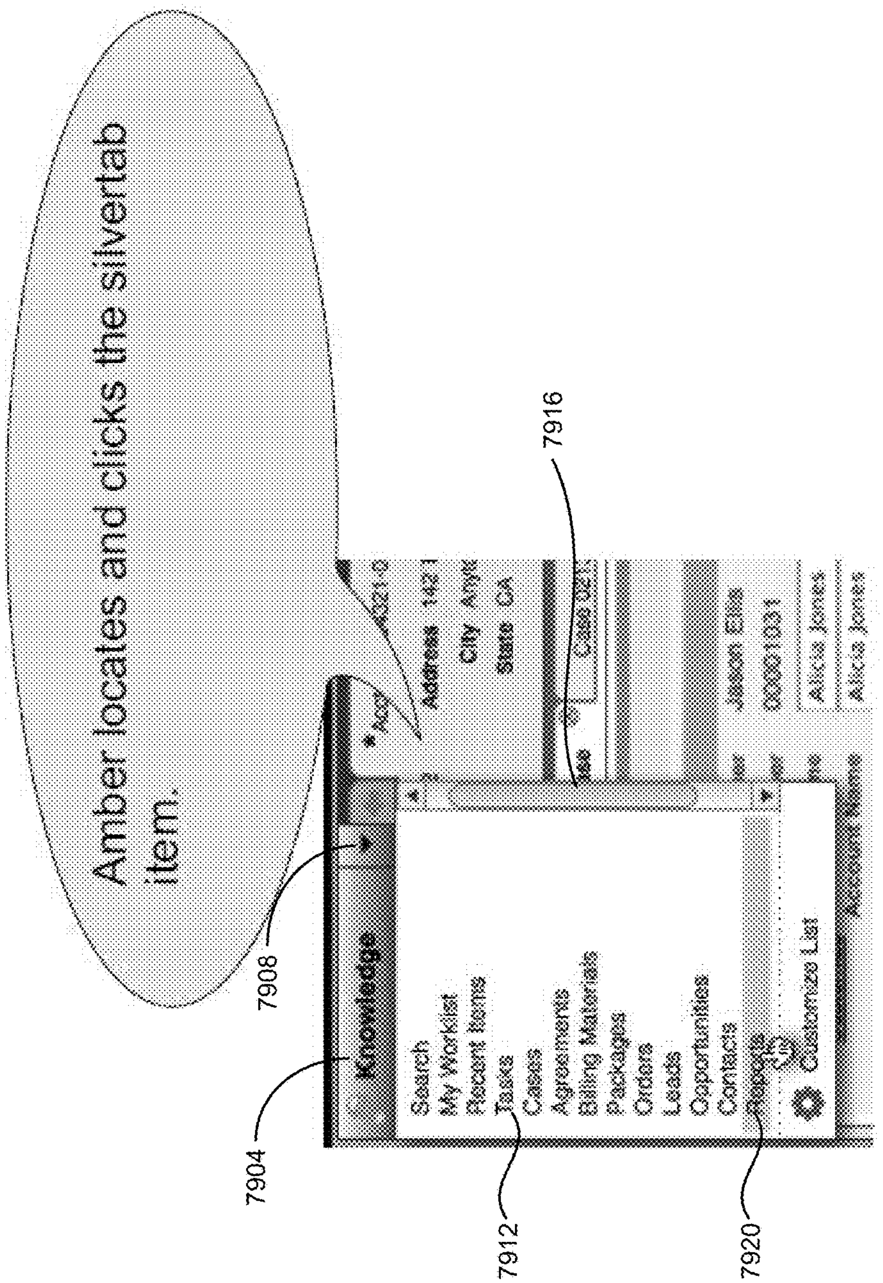
Figure 85:
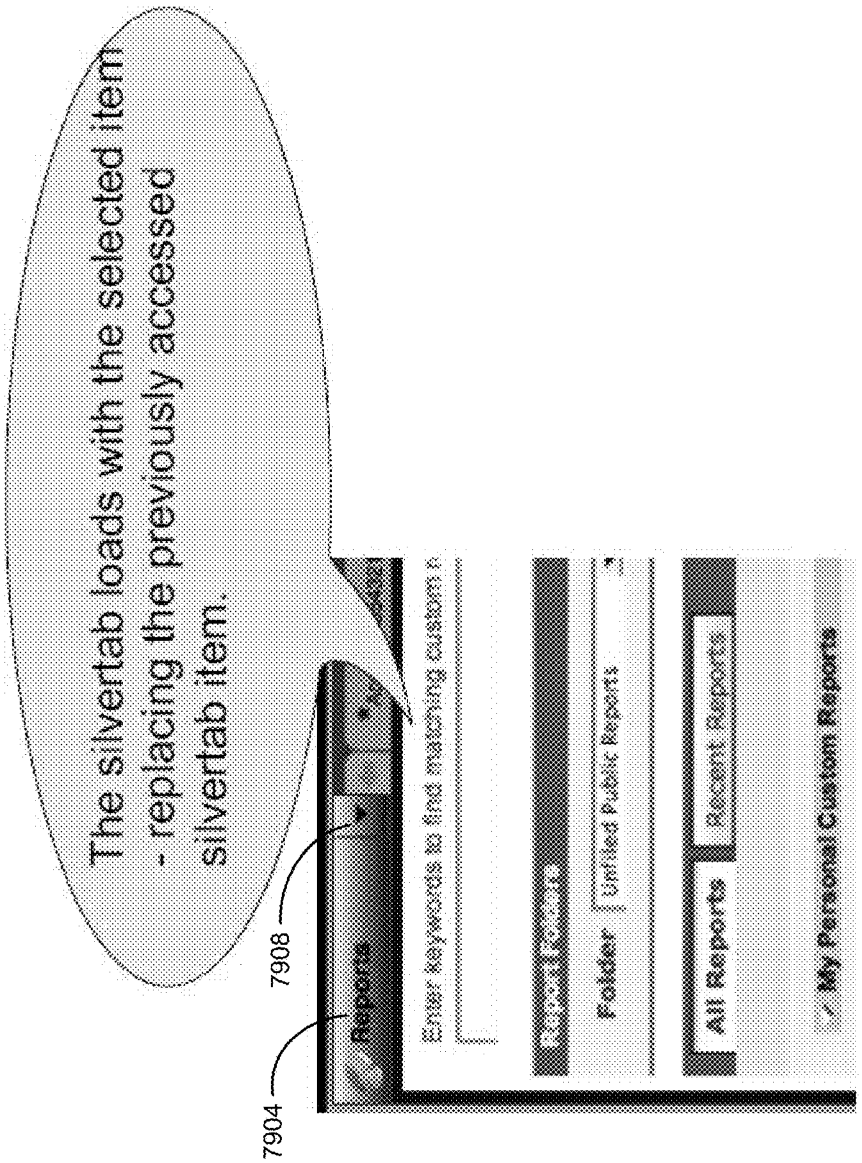

As shown in FIGS. 81-84, the agent can navigate the dropdown menu to select a different navigation tab element, such as the reports link 7920 shown in FIG. 84. When the reports link 7920 is clicked, a primary tab corresponding to the reports link 7920 is loaded in the user interface, as shown in FIG. 85.

Figure 86:
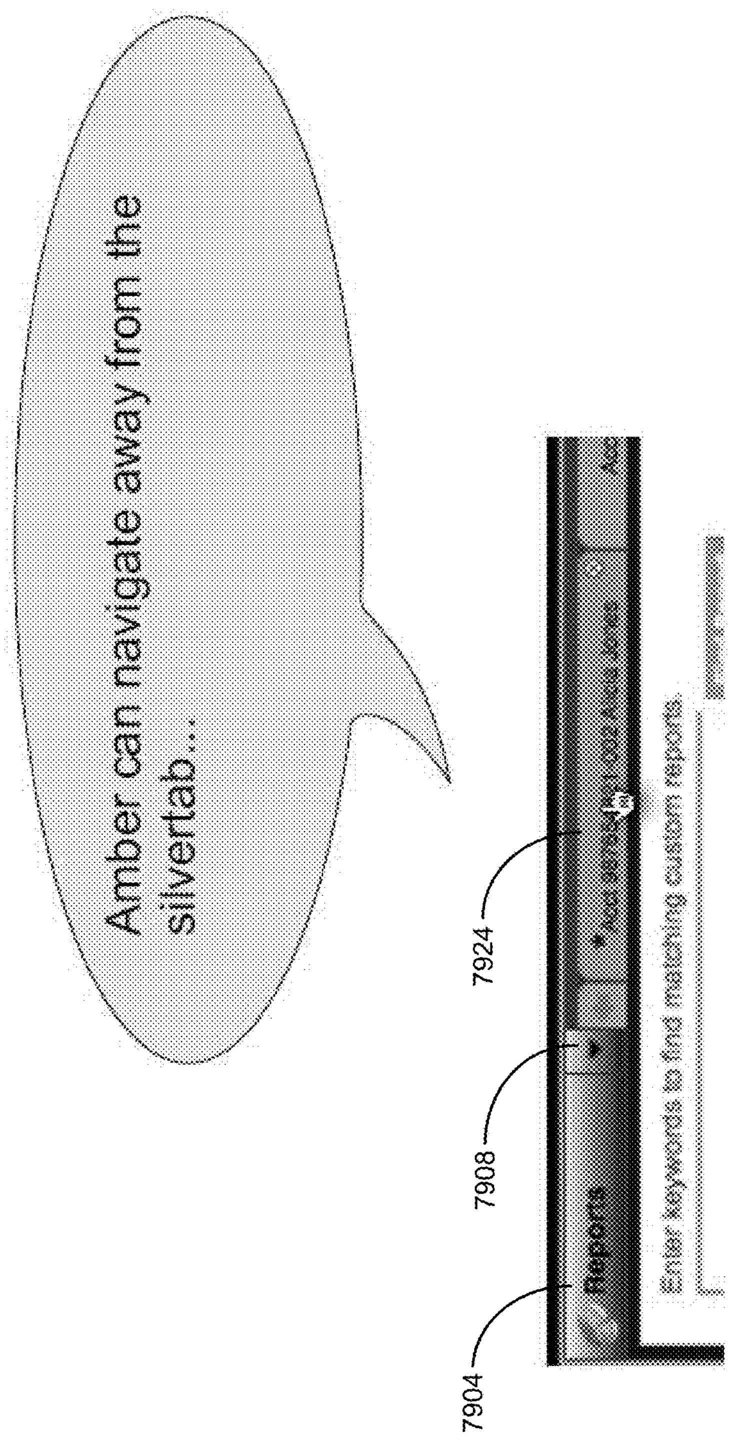
Figure 87:
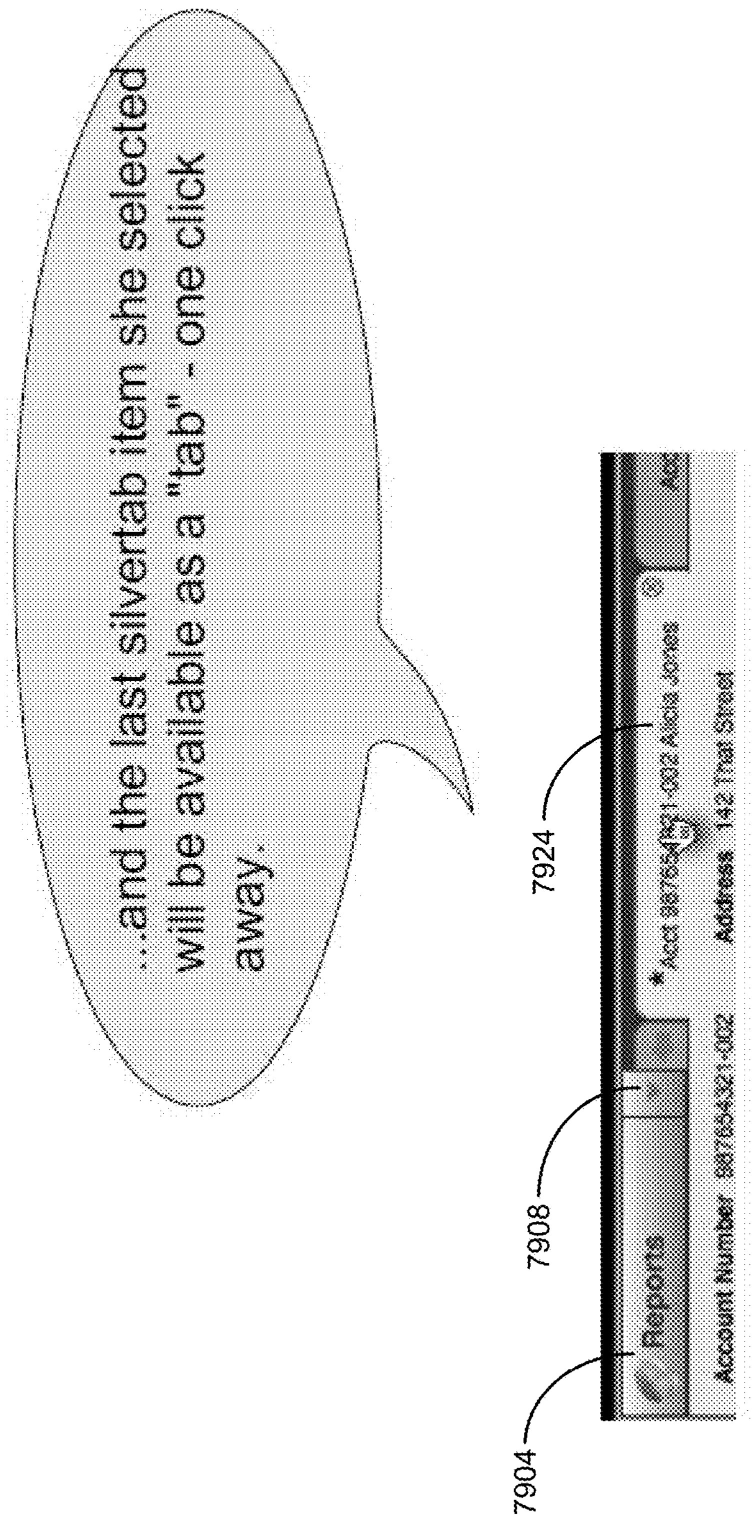
Figure 88:
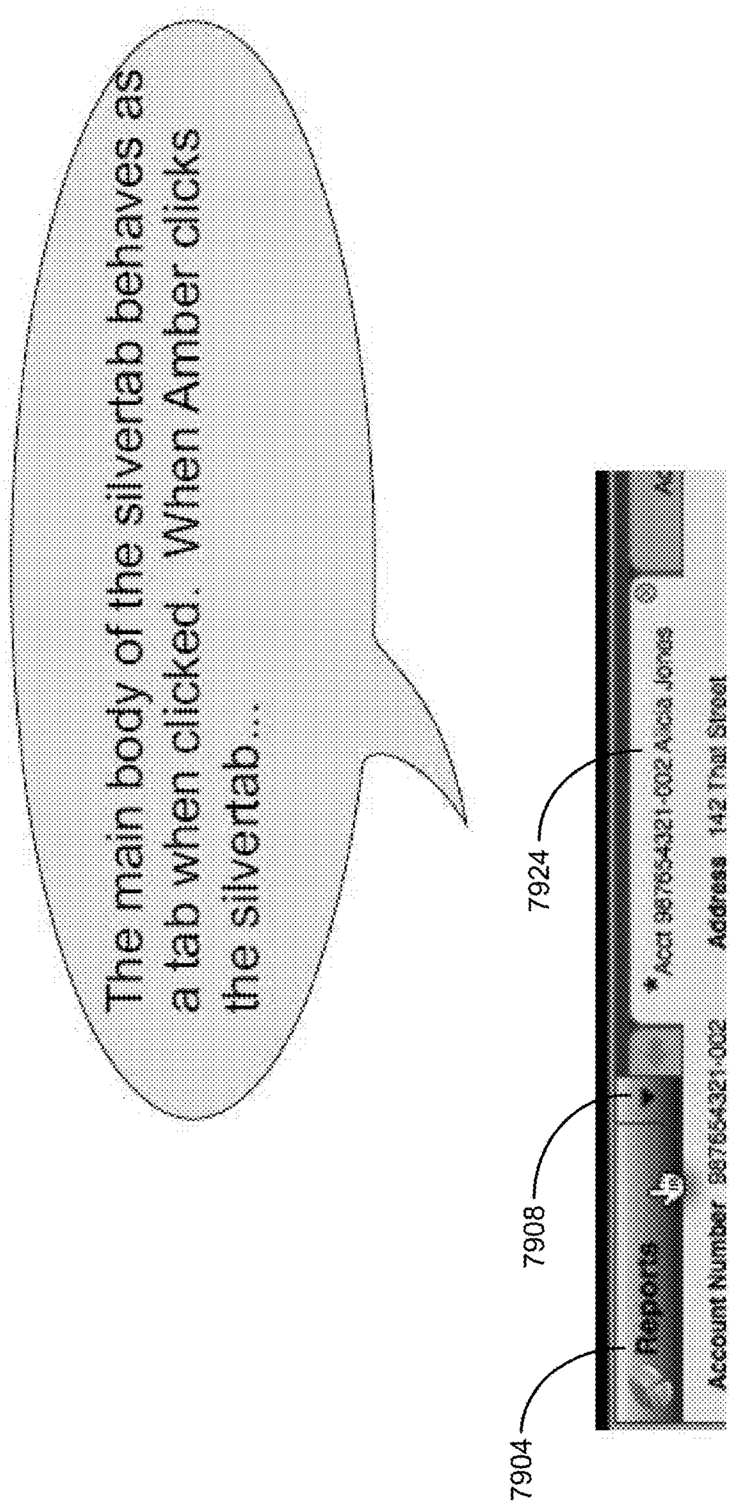
Figure 89:
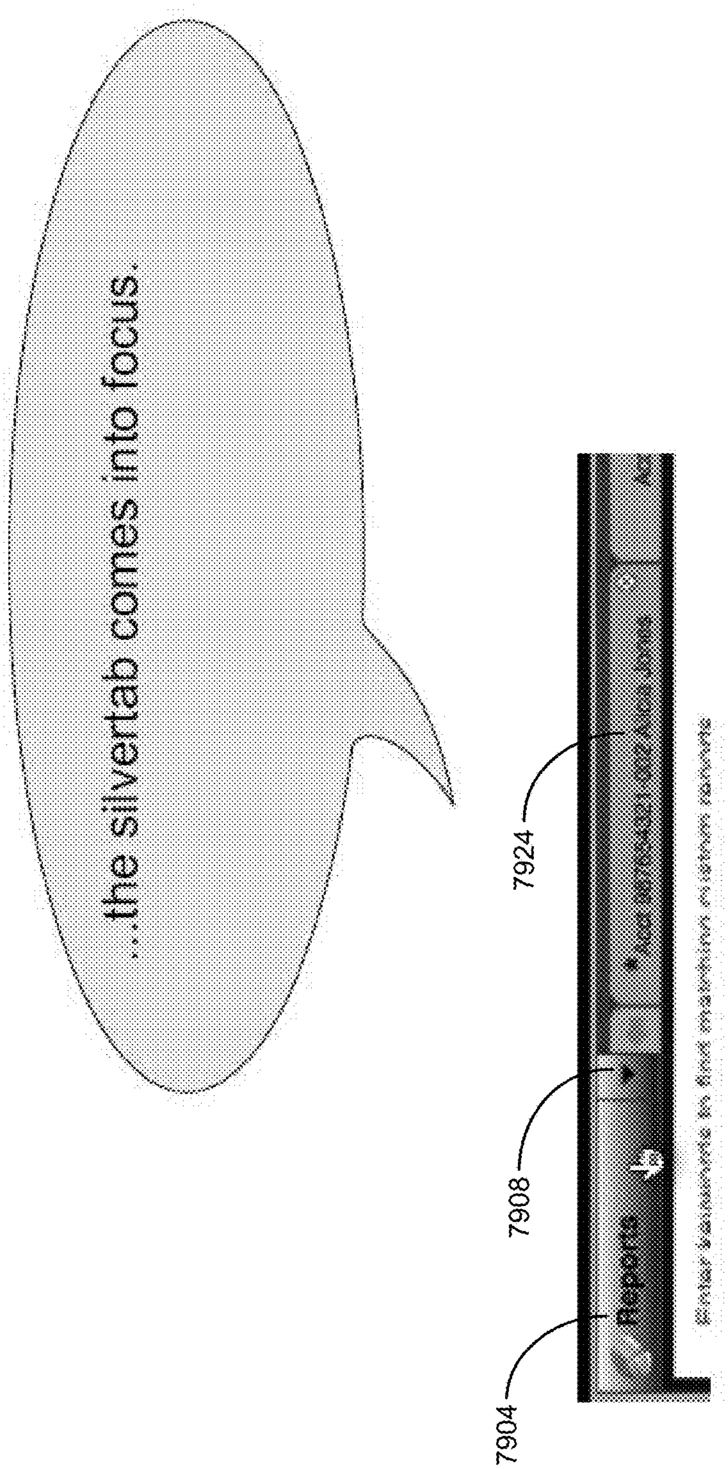

The agent can navigate away from the navigation tab by selecting a different primary tab, such as the account tab 7924 shown in FIG. 86. However, the last navigation tab item accessed by the agent may remain in the navigation tab, as shown in FIG. 87. Thus, the agent can return to the previously-access navigation tab item by clicking on the navigation tab button 7904, as shown in FIGS. 88 and 89.

The Browser Back/Forward Buttons

In one or more embodiments, the browser back and/or forward buttons may be used to navigate within the service cloud console. This section describes functionality associated with the browser back and forward buttons in one or more embodiments.

If the user has just clicked from one tab to another, then the back button may return the user to the prior tab. The forward button may only be active after the back button has been pressed, and may do the inverse of the action that the back button did.

If the user opens a new tab by clicking a link or pressing a "New" button, then the back button may return the user to the page from which he originated the new tab. This may mean that the user may be redirected back to the navigation tab, if that's where he was when he clicked the link. The new tab may remain open.

If the user closes a tab, the back button may not reopen that tab since the contents of the tab may have changed or become invalid since it was closed.

If a user has just navigated to the service cloud console from a non-console page, the back button may redirect the browser to that prior page.

If a user has redirected a tab with a detail page button, the back button may return the user to the original page. For example if a user has pressed "Edit" and then presses "Back," he may be returned to the detail page.

If the user has navigated completely away from service cloud console, the back button may take him back to the service cloud console.

If a user navigates from a view on the navigation tab to a data tab, the back button may return the user to that page of the navigation tab.

If a user navigates from one navigation tab page to another navigation tab page, the back button may return the user to the original page of the navigation tab.

List Views

One or more embodiments may include one or more list views, such as list view 9828 shown in FIG. 107. This section describes functionality associated with list views in one or more embodiments.

If the user clicks on a standard list view button from a list view within the navigation tab that acts on the list view itself, the current iframe within the navigation tab may be redirected to the ensuing page. In some embodiments, no workspaces or subtabs may be created.

If the user clicks on a standard list view button from a list view within the navigation tab that results in navigation to an unrelated new page (e.g. "New Case"), that new page may open in a workspace tab containing nothing but an iframe holding the contents of that page. In some embodiments, that page may not have a highlights panel.

If the user clicks on a custom list view button from a list view within the navigation tab, the current iframe within the navigation tab may be redirected to the ensuing page. In some embodiments, no workspaces or subtabs may be created.

If the user clicks a list view link (e.g. "Create New View," "Edit," or "Delete"), the current iframe within the navigator tab may be redirected to the ensuing page. In some embodiments, no workspaces or subtabs may be created.

If a given entity has no list views, such as Ideas, then its overview page may be shown when its header is clicked on the navigation tab.

If the current user has no access to any list views on a given entity, then its overview page may be shown for that user when its header is clicked on the navigation tab.

If a particular feature has a non-setup tab but has no specific entity associated with it (e.g., "Articles" or "Dashboards"), it may nonetheless be available for display in the navigation tab, and its overview page may be shown.

If a new object is created from a list view, it may be created according to an edit page button procedure and/or new objects procedure discussed herein.

If a user presses an "Edit" link from a list view to an object which is already open in detail mode, that object's tab may be activated and the edit page may be loaded in it.

If a user presses a detail link from a list view, that object's tab may be activated but not reloaded, since data should not be lost if the tab is currently in an edit or an inline edit state.

Links and Detail Page Buttons

One or more embodiments may include one or more links and/or detail page buttons. This section describes functionality associated with the links and detail page buttons in one or more embodiments.

Some links on the detail page open new tabs. Such links may include links from the navigation tab, links inside detail pages and VisualForce™ pages, and/or other types of links.

Links that edit the current page may redirect the current HTML iframe. Links on the "Knowledge Articles" context bar may open a new subtab when clicked.

Hyperlinks from formula fields may redirect the current iframe, as their functions may be unpredictable and/or may include JavaScript® which might not function properly in a new tab.

Standard buttons and links which directly edit the data on the current page may open in the current subtab. These buttons and links may include, but are not limited to: "Edit," "Delete" (which may destroy the current subtab), "Change Record Type," "Change Owner," "Change Territory," and "Close Case." Standard buttons that do not directly edit the data on the current page may open a new subtab. This buttons and links may include, but are not limited to: "View Hierarchy" (e.g., on "Account"), "Sharing," and "Clone."

Custom links and buttons may to some degree respect the custom link and button metadata. Custom links that are set to "Open In New Window" may open in a new window. Custom links that are set to "Execute JavaScript" or to "Display in existing window" may open in the existing window, but the "with sidebar and header" setting may be ignored.

If a user clicks "Delete" on a subtab record, then that record may be deleted and its subtab may be destroyed. If a user clicks "Delete" on the detail page corresponding to the primary tab, then the user may be presented with a warning saying that deleting that record may cause the primary tab and all of its subtabs to be destroyed. If the user affirms it, then the record may be deleted and the primary tab and all its subtabs may be destroyed.

Edit Page Buttons and New Objects

This section describes functionality associated with new objects and edit page buttons in one or more embodiments.

If a user presses "Save" on an edit page, the current tab may be navigated to the detail page of the object that was just saved. This may also apply to new objects and/or edited existing objects.

If a user presses "Save & New" on an edit page, the current tab may be navigated to the detail page of the object that was just saved and a new tab may be opened for the creation of the new object.

If a user presses "Cancel" on the edit page of an existing object that is being edited, the current tab may revert to the detail page of that object.

In some instances, if a new record was created and saved, its tab may revert to the detail page view of the newly saved record. When the user creates a new record, a workspace tab or subtab may be created for it.

In other instances, if a new record of one of the following types is created and saved, its tab may be destroyed and the view may shift to the detail page of its parent, which may be reloaded unless it is currently in edit or inline edit mode. Types of new records that may reflect this behavior may include records that do not have a meaningful detail page. Types of records that may reflect this behavior may include, but are not limited to: "AccountContactRole" and/or "Account Team," "Attachment," "Case Comment," "CampaignMember," "CaseTeamMember," "CustomObjectTeamMember," "Event," "Note," "Opportunity Competitor," "Opportunity Product," "Opportunity Campaign influence," "OpportunityContactRole," "Sales Team," "Task," etc.

If a new record was created but not saved and the user presses "Cancel," then the current tab may be destroyed.

Duplicate Tab Handling

This section describes functionality associated with duplicate tab handling in one or more embodiments.

If a user attempts to create a workspace for a record which is already open as a workspace, then the view may shift to the already-open workspace. In some embodiments, there may not be duplicate workspaces.

If the user clicks a link for a record that is already open as a subtab in the current workspace, the view may switch to that record's subtab. In some embodiments, it may not create a duplicate subtab.

If the user clicks a link for a record that is already open as a subtab in a different workspace than the current workspace, then a subtab may be created for that record in the current workspace. In some embodiments, this may mean that there may be subtabs in two different workspaces that are out of sync. Alternately, the subtabs may be kept in sync, or the user may not be permitted to open the second subtab.

If the user clicks a link for a record that is already open as a workspace other than the current workspace, then a subtab may be created for that record in the current workspace. This may mean that there may be the same record in a workspace and in a subtab that are out of sync.

The URL Bar and the Default Tab

One or more embodiments may include one or more default tabs. This section describes functionality associated with the URL Bar and default tab in one or more embodiments.

When a user first navigates to the service cloud console, Console may navigate to the default tab.

When navigating to a Salesforce.com® page outside of the console, the app specified in the app selector may remain "Service Cloud Console," and the only tab displayed may be "Return To Service Cloud Console."

An attempt to navigate to a page outside the service cloud console may be silently allowed unless there exist dirty tabs that require saving. If there are dirty tabs then a warning may be displayed prior to the navigate that allows the user to cancel the navigation.

If the user navigates directly to the console URL without actually being in a console app, an error may be displaying asking the user to use the app dropdown to navigate to the console.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an embodiment in which a service cloud console is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A database system comprising:

at least one database storing a plurality of data objects; and at least one server comprising at least one processor configurable to cause:

providing user interface data to a client machine, the user interface data capable of being processed by the client machine to display on a display device of the client machine a user interface providing at least one customer relationship management (CRM) service, the user interface capable of presenting a plurality of session tabs and a plurality of application tabs, a first one of the session tabs having a parent-child relationship with at least a first one of the application tabs, the first application tab being presentable within the first session tab;

retrieving, from a database, customer data associated with a customer, the customer data comprising at least:

account data of an account data object maintained in the database for the customer, and child CRM data of a CRM data object maintained in the database for the customer, the CRM data object having a child-parent relationship with the account data object;

providing the retrieved customer data to the client machine, the customer data capable of being processed by the client machine to display in the user interface:

the account data in association with the first session tab, and the child CRM data in association with the first application tab;

detecting at least one user-submitted change to the displayed child CRM data;

detecting an attempt by the user to close a form in which the at least one change is displayed in the user interface;

determining, responsive to detecting the attempt to close the form, that the at least one change has not been saved to the CRM data object maintained in the database;

identifying the first session tab associated with the account data as having the parent-child relationship with the first application tab associated with the child CRM data; and displaying in the user interface a prompt indicating that the at least one change has not been saved to the CRM data object maintained in the database and requesting that the at least one change be saved before closing the form, the displaying of the prompt being performed without reloading the user interface.

2. The database system of claim 1, the child CRM data being data of a web page external to the at least one CRM service.

3. The database system of claim 1, the at least one processor further configurable to cause:

detecting, via the user interface, an interrupt event associated with possible loss of the at least one change, the prompt comprising a warning message indicating the detection of the interrupt event; and sending, to the client machine, an indication of at least one operation to perform in response to the interrupt event.

4. The database system of claim 3, wherein the interrupt event is associated with at least one of: an attempt to close the user interface, an attempt to navigate away from the user interface, an attempt to close a session tab, or an attempt to close an application tab.

5. The database system of claim 1, the at least one processor further configurable to cause:

setting a state indication for the first application tab indicating that the first application tab is in an unsaved state; and displaying in the user interface the indication that the first application tab is in the unsaved state.

6. A method comprising:

providing user interface data to a client machine, the user interface data capable of being processed by the client machine to display on a display device of the client machine a user interface providing at least one customer relationship management (CRM) service, the user interface capable of presenting a plurality of session tabs and a plurality of application tabs, a first one of the session tabs having a parent-child relationship with at least a first one of the application tabs, the first application tab being presentable within the first session tab;

retrieving, from a database, customer data associated with a customer, the customer data comprising at least:

account data of an account data object maintained in the database for the customer, and child CRM data of a CRM data object maintained in the database for the customer, the CRM data object having a child-parent relationship with the account data object;

providing the retrieved customer data to the client machine, the customer data capable of being processed by the client machine to display in the user interface:

the account data in association with the first session tab, and the child CRM data in association with the first application tab;

detecting at least one user-submitted change to the displayed child CRM data;

detecting an attempt by the user to close a form in which the at least one change is displayed in the user interface;

determining, responsive to detecting the attempt to close the form, that the at least one change has not been saved to the CRM data object maintained in the database;

identifying the first session tab associated with the account data as having the parent-child relationship with the first application tab associated with the child CRM data; and displaying in the user interface a prompt indicating that the at least one change has not been saved to the CRM data object maintained in the database and requesting that the at least one change be saved before closing the form, the displaying of the prompt being performed without reloading the user interface.

7. The method of claim 6, the child CRM data being data of a web page external to the at least one CRM service.

8. The method of claim 6, the method further comprising:

detecting, via the user interface, an interrupt event associated with possible loss of the at least one change, the prompt comprising a warning message indicating the detection of the interrupt event; and sending, to the client machine, an indication of at least one operation to perform in response to the interrupt event.

9. The method of claim 8, wherein the interrupt event is associated with at least one of: an attempt to close the user interface, an attempt to navigate away from the user interface, an attempt to close a session tab, or an attempt to close an application tab.

10. The method of claim 6, the method further comprising:

setting a state indication for the first application tab indicating that the first application tab is in an unsaved state; and displaying in the user interface the indication that the first application tab is in the unsaved state.

11. A system comprising:

database system software stored on a non-transitory data storage medium for execution by at least one server of a database system, the database system software configured to cause:

providing user interface data to a client machine, the user interface data capable of being processed by the client machine to display on a display device of the client machine a user interface providing at least one customer relationship management (CRM) service, the user interface capable of presenting a plurality of session tabs and a plurality of application tabs, a first one of the session tabs having a parent-child relationship with at least a first one of the application tabs, the first application tab being presentable within the first session tab;

retrieving, from a database, customer data associated with a customer, the customer data comprising at least:

account data of an account data object maintained in the database for the customer, and child CRM data of a CRM data object maintained in the database for the customer, the CRM data object having a child-parent relationship with the account data object;

providing the retrieved customer data to the client machine, the customer data capable of being processed by the client machine to display in the user interface:

the account data in association with the first session tab, and the child CRM data in association with the first application tab;

detecting at least one user-submitted change to the displayed child CRM data;

detecting an attempt by the user to close a form in which the at least one change is displayed in the user interface;

determining, responsive to detecting the attempt to close the form, that the at least one change has not been saved to the CRM data object maintained in the database;

identifying the first session tab associated with the account data as having the parent-child relationship with the first application tab associated with the child CRM data; and displaying in the user interface a prompt indicating that the at least one change has not been saved to the CRM data object maintained in the database and requesting that the at least one change be saved before closing the form, the displaying of the prompt being performed without reloading the user interface.

12. The system of claim 11, the child CRM data being data of a web page external to the at least one CRM service.

13. The system of claim 11, the database system software further configured to cause:

detecting, via the user interface, an interrupt event associated with possible loss of the at least one change, the prompt comprising a warning message indicating the detection of the interrupt event; and sending, to the client machine, an indication of at least one operation to perform in response to the interrupt event.

14. The system of claim 13, wherein the interrupt event is associated with at least one of: an attempt to close the user interface, an attempt to navigate away from the user interface, an attempt to close a session tab, or an attempt to close an application tab.

15. The system of claim 11, the database system software further configured to cause:

setting a state indication for the first application tab indicating that the first application tab is in an unsaved state; and displaying in the user interface the indication that the first application tab is in the unsaved state.

16. A computer program product comprising program code to be executed by at least one processor when retrieved from a non-transitory computer-readable medium, the program code configured to cause:

providing user interface data to a client machine, the user interface data capable of being processed by the client machine to display on a display device of the client machine a user interface providing at least one customer relationship management (CRM) service, the user interface capable of presenting a plurality of session tabs and a plurality of application tabs, a first one of the session tabs having a parent-child relationship with at least a first one of the application tabs, the first application tab being presentable within the first session tab;

retrieving, from a database, customer data associated with a customer, the customer data comprising at least:

account data of an account data object maintained in the database for the customer, and child CRM data of a CRM data object maintained in the database for the customer, the CRM data object having a child-parent relationship with the account data object;

providing the retrieved customer data to the client machine, the customer data capable of being processed by the client machine to display in the user interface:

the account data in association with the first session tab, and the child CRM data in association with the first application tab;

detecting at least one user-submitted change to the displayed child CRM data;

detecting an attempt by the user to close a form in which the at least one change is displayed in the user interface;

determining, responsive to detecting the attempt to close the form, that the at least one change has not been saved to the CRM data object maintained in the database;

identifying the first session tab associated with the account data as having the parent-child relationship with the first application tab associated with the child CRM data; and displaying in the user interface a prompt indicating that the at least one change has not been saved to the CRM data object maintained in the database and requesting that the at least one change be saved before closing the form, the displaying of the prompt being performed without reloading the user interface.

17. The computer program product of claim 16, the child CRM data being data of a web page external to the at least one CRM service.

18. The computer program product of claim 16, the program code further configured to cause:

detecting, via the user interface, an interrupt event associated with possible loss of the at least one change, the prompt comprising a warning message indicating the detection of the interrupt event; and sending, to the client machine, an indication of at least one operation to perform in response to the interrupt event.

19. The computer program product of claim 16, wherein the interrupt event is associated with at least one of: an attempt to close the user interface, an attempt to navigate away from the user interface, an attempt to close a session tab, or an attempt to close an application tab.

20. The computer program product of claim 16, the program code further configured to cause:

setting a state indication for the first application tab indicating that the first application tab is in an unsaved state; and displaying in the user interface the indication that the first application tab is in the unsaved state.

* * * * *